US009685034B2

(12) United States Patent
Weber et al.

(10) Patent No.: US 9,685,034 B2
(45) Date of Patent: Jun. 20, 2017

(54) METHODS AND SYSTEMS FOR INTERFACING WITH A THIRD-PARTY APPLICATION

(75) Inventors: Reid M. Weber, Reno, NV (US);
William C. Little, Las Vegas, NV (US); Steven G. LeMay, Reno, NV (US); Adrian R. Marcu, Reno, NV (US); Warner R. Cockerille, IV, Sparks, NV (US); Nicole M. Beaulieu, Reno, NV (US); David A. Gipp, Portland, OR (US); Daniel De Waal, Las Vegas, NV (US); Vincent S. Manfredi, Henderson, NV (US); Bryan Bullard, Las Vegas, NV (US); Cara L. Iddings, Henderson, NV (US); Brad Robert Steinbach, legal representative, Las Vegas, NV (US); Richard J. Schneider, Las Vegas, NV (US); Glen Keith Russell, Reno, NV (US); Jacob Graham, Sparks, NV (US); Gregory A. Schlottmann, Sparks, NV (US); Richard E. Rowe, Las Vegas, NV (US); David C. Williams, Carson City, NV (US); Kurt M. Larsen, Reno, NV (US); Jae Man Yi, Reno, NV (US); Erik B. Petersen, Corvallis, OR (US); Kevin M. Higgins, Reno, NV (US); Gregory H. Parrott, Reno, NV (US); David L. Salls, Reno, NV (US)

(73) Assignee: IGT, Las Vegas, NV (US)

( * ) Notice: Subject to any disclaimer, the term of this patent is extended or adjusted under 35 U.S.C. 154(b) by 0 days.

(21) Appl. No.: 13/612,653

(22) Filed: Sep. 12, 2012
(Under 37 CFR 1.47)

(65) Prior Publication Data
US 2013/0035157 A1 Feb. 7, 2013

Related U.S. Application Data

(63) Continuation of application No. 12/435,962, filed on May 5, 2009, now Pat. No. 8,968,077, which is a
(Continued)

(51) Int. Cl.
*G07F 17/32* (2006.01)
*H04L 29/08* (2006.01)
(Continued)

(52) U.S. Cl.
CPC ........... *G07F 17/323* (2013.01); *G06Q 30/02* (2013.01); *G06Q 50/34* (2013.01); *G07F 17/32* (2013.01);
(Continued)

(58) Field of Classification Search
CPC .......................... G07F 17/323; G07F 17/3255
(Continued)

(56) References Cited

U.S. PATENT DOCUMENTS

| | | |
|---|---|---|
| 3,708,219 A | 1/1973 | Forlini et al. |
| 3,931,504 A | 1/1976 | Jacoby |

(Continued)

FOREIGN PATENT DOCUMENTS

| | | |
|---|---|---|
| AU | 1996 0050576 | 4/1997 |
| AU | 704691 | 4/1997 |

(Continued)

OTHER PUBLICATIONS

U.S. Office Action dated Feb. 10, 2009 issued in U.S. Appl. No. 11/595,774.
(Continued)

*Primary Examiner* — Omkar Deodhar
*Assistant Examiner* — Eric M Thomas
(74) *Attorney, Agent, or Firm* — Neal, Gerber & Eisenberg LLP

(57) ABSTRACT

A system for interfacing with a third-party application is described. The system includes a third-party device, a server-based system configured to communicate with the third-party device, and a gaming device configured to communicate with the server-based system to display content of the product or service. The gaming device is configured to generate an outcome of a wager-based game independent of the content that is displayed.

39 Claims, 42 Drawing Sheets

Related U.S. Application Data continuation-in-part of application No. 12/120,191, filed on May 13, 2008, now Pat. No. 8,992,304, which is a continuation-in-part of application No. 11/595,774, filed on Nov. 10, 2006, now Pat. No. 8,777,737, said application No. 12/120,191 is a continuation-in-part of application No. 11/595,798, filed on Nov. 10, 2006, now Pat. No. 8,784,196, and a continuation-in-part of application No. 11/682,253, filed on Mar. 5, 2007, now abandoned, which is a continuation-in-part of application No. 11/595,774, said application No. 12/120,191 is a continuation-in-part of application No. 11/827,060, filed on Jul. 9, 2007, now Pat. No. 9,028,329, which is a continuation-in-part of application No. 11/595,774, said application No. 12/120,191 is a continuation-in-part of application No. 11/983,770, filed on Nov. 9, 2007, now Pat. No. 8,512,139, which is a continuation-in-part of application No. 11/595,774, said application No. 12/120,191 is a continuation-in-part of application No. PCT/US2007/007617, filed on Mar. 27, 2007, which is a continuation of application No. 11/595,774, said application No. 12/120,191 is a continuation-in-part of application No. PCT/US2007/007857, filed on Mar. 28, 2007, which is a continuation of application No. 11/595,774.

(60) Provisional application No. 61/055,316, filed on May 22, 2008, provisional application No. 60/792,082, filed on Apr. 13, 2006, provisional application No. 60/882,859, filed on Aug. 18, 2006, provisional application No. 60/822,859, filed on Aug. 18, 2006, provisional application No. 60/858,741, filed on Nov. 13, 2006, provisional application No. 60/993,985, filed on Sep. 13, 2007.

(51) Int. Cl.
*G06Q 50/34* (2012.01)
*G06Q 30/02* (2012.01)

(52) U.S. Cl.
CPC .......... *G07F 17/3227* (2013.01); *H04L 67/20* (2013.01); *G06Q 30/0277* (2013.01)

(58) Field of Classification Search
USPC .......................................... 463/16–20, 40–42
See application file for complete search history.

(56) References Cited

U.S. PATENT DOCUMENTS

| | | |
|---|---|---|
| 4,333,715 A | 6/1982 | Brooks |
| 4,430,728 A | 2/1984 | Beitel et al. |
| 4,454,594 A | 6/1984 | Heffron et al. |
| 4,517,558 A | 5/1985 | Davids |
| 4,607,844 A | 8/1986 | Fullerton |
| 4,621,814 A | 11/1986 | Stepan et al. |
| 4,659,182 A | 4/1987 | Aizawa |
| 4,718,672 A | 1/1988 | Okada |
| 4,856,787 A | 8/1989 | Itkis |
| 4,911,449 A | 3/1990 | Dickinson et al. |
| 4,912,548 A | 3/1990 | Shanker et al. |
| 5,086,354 A | 2/1992 | Bass et al. |
| 5,113,272 A | 5/1992 | Reamey |
| 5,132,839 A | 7/1992 | Travis |
| 5,319,491 A | 6/1994 | Selbrede |
| 5,342,047 A | 8/1994 | Heidel et al. |
| 5,364,100 A | 11/1994 | Ludlow et al. |
| 5,375,830 A | 12/1994 | Takemoto et al. |
| 5,376,587 A | 12/1994 | Buchmann et al. |
| 5,393,061 A | 2/1995 | Manship et al. |
| 5,467,893 A | 11/1995 | Landis, II et al. |
| 5,539,547 A | 7/1996 | Ishii et al. |
| 5,580,055 A | 12/1996 | Hagiwara |
| 5,585,821 A | 12/1996 | Ishikura et al. |
| 5,589,980 A | 12/1996 | Bass et al. |
| 5,643,086 A | 7/1997 | Alcorn et al. |
| 5,655,961 A | 8/1997 | Acres et al. |
| 5,745,197 A | 4/1998 | Leung et al. |
| 5,752,881 A | 5/1998 | Inoue |
| 5,761,647 A | 6/1998 | Boushy |
| 5,764,317 A | 6/1998 | Sadnovik et al. |
| 5,851,149 A | 12/1998 | Xidos et al. |
| 5,910,046 A | 6/1999 | Wada et al. |
| 5,923,307 A | 7/1999 | Hogle, IV |
| 5,951,397 A | 9/1999 | Dickinson |
| 5,956,180 A | 9/1999 | Bass et al. |
| 5,967,893 A | 10/1999 | Lawrence et al. |
| 6,001,016 A | 12/1999 | Walker et al. |
| 6,015,346 A | 1/2000 | Bennett |
| 6,027,115 A | 2/2000 | Griswold et al. |
| 6,050,895 A | 4/2000 | Luciano et al. |
| 6,054,969 A | 4/2000 | Haisma |
| 6,059,658 A | 5/2000 | Mangano et al. |
| 6,068,552 A | 5/2000 | Walker et al. |
| 6,099,408 A | 8/2000 | Schneier et al. |
| 6,104,815 A | 8/2000 | Alcorn et al. |
| 6,106,396 A | 8/2000 | Alcorn et al. |
| 6,110,041 A | 8/2000 | Walker et al. |
| 6,113,495 A | 9/2000 | Walker et al. |
| 6,135,884 A | 10/2000 | Hedrick et al. |
| 6,149,522 A | 11/2000 | Alcorn et al. |
| 6,159,098 A | 12/2000 | Slomiany et al. |
| 6,190,256 B1 | 2/2001 | Walker et al. |
| 6,213,875 B1 | 4/2001 | Suzuki |
| 6,244,596 B1 | 6/2001 | Kondratjuk |
| 6,251,014 B1 | 6/2001 | Stockdale et al. |
| 6,252,707 B1 | 6/2001 | Kleinberger et al. |
| 6,253,374 B1 | 6/2001 | Dresevic et al. |
| 6,254,481 B1 | 7/2001 | Jaffe |
| 6,293,866 B1 | 9/2001 | Walker et al. |
| 6,315,666 B1 | 11/2001 | Mastera et al. |
| 6,337,513 B1 | 1/2002 | Clevenger et al. |
| 6,347,996 B1 | 2/2002 | Gilmore et al. |
| 6,368,216 B1 | 4/2002 | Hedrick et al. |
| 6,379,244 B1 | 4/2002 | Sagawa et al. |
| 6,398,220 B1 | 6/2002 | Inoue |
| 6,416,827 B1 | 7/2002 | Chakrapani et al. |
| 6,444,496 B1 | 9/2002 | Edwards et al. |
| 6,445,185 B1 | 9/2002 | Damadian et al. |
| 6,446,257 B1 | 9/2002 | Pradhan et al. |
| 6,449,687 B1 | 9/2002 | Moriya |
| 6,453,319 B1 | 9/2002 | Mattis et al. |
| 6,454,648 B1 | 9/2002 | Kelly et al. |
| 6,491,583 B1 | 12/2002 | Gauselmann |
| 6,503,147 B1 | 1/2003 | Stockdale et al. |
| 6,511,375 B1 | 1/2003 | Kaminkow |
| 6,512,559 B1 | 1/2003 | Hashimoto et al. |
| 6,514,141 B1 | 2/2003 | Kaminkow et al. |
| 6,517,433 B2 | 2/2003 | Loose et al. |
| 6,517,437 B1 | 2/2003 | Wells et al. |
| 6,547,664 B2 | 4/2003 | Sauders |
| 6,575,541 B1 | 6/2003 | Hedrick et al. |
| 6,585,591 B1 | 7/2003 | Baerlocher et al. |
| 6,620,047 B1 | 9/2003 | Alcorn et al. |
| D480,961 S | 10/2003 | Deadman |
| 6,634,550 B1 | 10/2003 | Walker et al. |
| 6,645,077 B2 | 11/2003 | Rowe |
| 6,646,695 B1 | 11/2003 | Gauselmann |
| 6,648,761 B1 | 11/2003 | Izawa et al. |
| 6,652,378 B2 | 11/2003 | Cannon et al. |
| 6,659,864 B2 | 12/2003 | McGahn et al. |
| 6,661,425 B1 | 12/2003 | Hiroaki |
| 6,695,703 B1 | 2/2004 | McGahn |
| 6,702,675 B2 | 3/2004 | Poole et al. |
| 6,712,694 B1 | 3/2004 | Nordman |
| 6,715,756 B2 | 4/2004 | Inoue |
| 6,717,728 B2 | 4/2004 | Putilin |
| 6,722,979 B2 | 4/2004 | Gilmore et al. |

(56) References Cited

U.S. PATENT DOCUMENTS

| | | |
|---|---|---|
| 6,802,777 B2 | 10/2004 | Seelig et al. |
| 6,804,763 B1 | 10/2004 | Stockdale et al. |
| 6,811,486 B1 | 11/2004 | Luciano, Jr. et al. |
| 6,817,945 B2 | 11/2004 | Seelig et al. |
| 6,817,946 B2 | 11/2004 | Motegi et al. |
| 6,887,157 B2 | 5/2005 | LeMay et al. |
| 6,890,259 B2 | 5/2005 | Breckner et al. |
| 6,906,762 B1 | 6/2005 | Witehira et al. |
| 6,937,298 B2 | 8/2005 | Okada |
| 6,969,319 B2 | 11/2005 | Rowe et al. |
| 7,022,017 B1 | 4/2006 | Halbritter et al. |
| 7,095,180 B2 | 8/2006 | Emslie et al. |
| 7,097,560 B2 | 8/2006 | Okada |
| 7,128,647 B2 | 10/2006 | Muir et al. |
| 7,159,865 B2 | 1/2007 | Okada |
| 7,160,187 B2 | 1/2007 | Loose et al. |
| 7,198,571 B2 | 4/2007 | LeMay et al. |
| 7,204,753 B2 | 4/2007 | Ozaki et al. |
| 7,207,883 B2 | 4/2007 | Nozaki et al. |
| 7,220,181 B2 | 5/2007 | Okada |
| 7,252,288 B2 | 8/2007 | Seelig et al. |
| 7,252,591 B2 | 8/2007 | Van Asdale |
| 7,255,643 B2 | 8/2007 | Ozaki et al. |
| 7,309,284 B2 | 12/2007 | Griswold et al. |
| 7,322,884 B2 | 1/2008 | Emori et al. |
| 7,329,181 B2 | 2/2008 | Hoshino et al. |
| 7,419,428 B2 | 9/2008 | Rowe |
| 7,510,475 B2 | 3/2009 | Loose et al. |
| 7,594,855 B2 | 9/2009 | Meyerhofer |
| 7,619,585 B2 | 11/2009 | Bell et al. |
| 7,730,413 B1 | 6/2010 | Engel et al. |
| 7,758,420 B2 | 7/2010 | Saffari |
| 7,819,747 B2 | 10/2010 | Kane et al. |
| 7,918,734 B2 | 4/2011 | Gould |
| 7,959,502 B2 | 6/2011 | Kane et al. |
| 7,997,972 B2 | 8/2011 | Nguyen et al. |
| 8,029,351 B2 † | 10/2011 | Kosaka |
| 8,131,649 B2 † | 3/2012 | Yen |
| 8,157,642 B2 | 4/2012 | Paulsen |
| 8,192,276 B2 | 6/2012 | Walker et al. |
| 8,220,019 B2 | 7/2012 | Stearns et al. |
| 8,313,371 B1 | 11/2012 | Luciano, Jr. |
| 8,357,033 B2 | 1/2013 | Williams et al. |
| 2001/0013681 A1 | 8/2001 | Bruzzese et al. |
| 2001/0029528 A1 | 10/2001 | Coutts et al. |
| 2002/0045472 A1 | 4/2002 | Adams et al. |
| 2002/0142825 A1 | 10/2002 | Lark et al. |
| 2002/0142846 A1 | 10/2002 | Paulsen |
| 2002/0173354 A1 | 11/2002 | Winans et al. |
| 2002/0183105 A1 | 12/2002 | Cannon et al. |
| 2002/0194505 A1 | 12/2002 | Muschenborn |
| 2003/0018403 A1 | 1/2003 | Braun et al. |
| 2003/0027624 A1 | 2/2003 | Gilmore et al. |
| 2003/0032478 A1 | 2/2003 | Takahama et al. |
| 2003/0032479 A1 | 2/2003 | LeMay et al. |
| 2003/0064771 A1 | 4/2003 | Morrow et al. |
| 2003/0064801 A1 | 4/2003 | Breckner et al. |
| 2003/0069074 A1 | 4/2003 | Jackson |
| 2003/0078103 A1 | 4/2003 | LeMay et al. |
| 2003/0083943 A1 | 5/2003 | Adams et al. |
| 2003/0087690 A1 | 5/2003 | Loose et al. |
| 2003/0130028 A1 | 7/2003 | Aida et al. |
| 2003/0157980 A1 | 8/2003 | Loose et al. |
| 2003/0162582 A1 | 8/2003 | Gordon |
| 2003/0176214 A1 | 9/2003 | Burak et al. |
| 2003/0176218 A1 | 9/2003 | LeMay et al. |
| 2003/0216961 A1 | 11/2003 | Barry |
| 2003/0222876 A1 | 12/2003 | Giemborek et al. |
| 2003/0236114 A1 | 12/2003 | Griswold et al. |
| 2004/0009813 A1 | 1/2004 | Wind |
| 2004/0023714 A1 | 2/2004 | Asdale |
| 2004/0029636 A1 | 2/2004 | Wells |
| 2004/0048671 A1 | 3/2004 | Rowe |
| 2004/0063490 A1 | 4/2004 | Okada |
| 2004/0066475 A1 | 4/2004 | Searle |
| 2004/0087360 A1 | 5/2004 | Chamberlain et al. |
| 2004/0103444 A1 | 5/2004 | Weinberg et al. |
| 2004/0106449 A1* | 6/2004 | Walker .................. G07F 17/32 463/25 |
| 2004/0110557 A1 | 6/2004 | Rowe |
| 2004/0116178 A1 | 6/2004 | Okada |
| 2004/0117484 A1 | 6/2004 | Singer et al. |
| 2004/0127284 A1 | 7/2004 | Walker et al. |
| 2004/0147303 A1 | 7/2004 | Imura et al. |
| 2004/0150162 A1 | 8/2004 | Okada |
| 2004/0162146 A1 | 8/2004 | Ooto |
| 2004/0166925 A1 | 8/2004 | Emori et al. |
| 2004/0171419 A1 | 9/2004 | Walker et al. |
| 2004/0171423 A1 | 9/2004 | Silva et al. |
| 2004/0180712 A1 | 9/2004 | Forman et al. |
| 2004/0180721 A1 | 9/2004 | Rowe |
| 2004/0183972 A1 | 9/2004 | Bell |
| 2004/0192430 A1 | 9/2004 | Burak et al. |
| 2004/0198485 A1 | 10/2004 | Loose |
| 2004/0207154 A1 | 10/2004 | Okada |
| 2004/0208126 A1 | 10/2004 | Wassew et al. |
| 2004/0209666 A1 | 10/2004 | Okada |
| 2004/0209667 A1 | 10/2004 | Emori et al. |
| 2004/0209668 A1 | 10/2004 | Okada |
| 2004/0209671 A1 | 10/2004 | Okada |
| 2004/0209678 A1 | 10/2004 | Okada |
| 2004/0209683 A1 | 10/2004 | Okada |
| 2004/0214622 A1 | 10/2004 | Atkinson |
| 2004/0214635 A1 | 10/2004 | Okada |
| 2004/0214637 A1 | 10/2004 | Nonaka |
| 2004/0224747 A1 | 11/2004 | Okada |
| 2004/0233663 A1 | 11/2004 | Emslie et al. |
| 2004/0239582 A1 | 12/2004 | Seymour |
| 2004/0254010 A1 | 12/2004 | Fine |
| 2005/0020348 A1 | 1/2005 | Thomas et al. |
| 2005/0020358 A1 | 1/2005 | Cram |
| 2005/0032571 A1 | 2/2005 | Asonuma |
| 2005/0037843 A1 | 2/2005 | Wells et al. |
| 2005/0043086 A1 | 2/2005 | Schneider |
| 2005/0049032 A1 | 3/2005 | Kobayashi |
| 2005/0049046 A1 | 3/2005 | Kobayashi |
| 2005/0054438 A1* | 3/2005 | Rothschild .......... G07F 17/3239 463/29 |
| 2005/0059494 A1 | 3/2005 | Kammler |
| 2005/0062410 A1 | 3/2005 | Bell et al. |
| 2005/0063055 A1 | 3/2005 | Engel |
| 2005/0079913 A1 | 4/2005 | Inamura |
| 2005/0085292 A1 | 4/2005 | Inamura |
| 2005/0125660 A1 | 6/2005 | Raciborski |
| 2005/0153772 A1 | 7/2005 | Griswold et al. |
| 2005/0153775 A1 | 7/2005 | Griswold et al. |
| 2005/0153776 A1 | 7/2005 | LeMay et al. |
| 2005/0164762 A1 | 7/2005 | Smith et al. |
| 2005/0192090 A1 | 9/2005 | Muir et al. |
| 2005/0193269 A1 | 9/2005 | Haswell et al. |
| 2005/0206582 A1 | 9/2005 | Bell et al. |
| 2005/0208994 A1 | 9/2005 | Berman |
| 2005/0233799 A1 | 10/2005 | LeMay et al. |
| 2005/0239539 A1 | 10/2005 | Inamura |
| 2005/0266912 A1 | 12/2005 | Sekiguchi |
| 2005/0282638 A1 | 12/2005 | Rowe |
| 2005/0285337 A1 | 12/2005 | Durham et al. |
| 2006/0009273 A2 | 1/2006 | Moshal |
| 2006/0019747 A1 | 1/2006 | Loose et al. |
| 2006/0041586 A1 | 2/2006 | Nassef, Jr. |
| 2006/0063581 A1 | 3/2006 | Harris et al. |
| 2006/0068898 A1 | 3/2006 | Maya |
| 2006/0079333 A1 | 4/2006 | Morrow et al. |
| 2006/0089194 A1 | 4/2006 | Joshi et al. |
| 2006/0094508 A1 | 5/2006 | D'Amico et al. |
| 2006/0100014 A1 | 5/2006 | Griswold et al. |
| 2006/0103951 A1 | 5/2006 | Bell et al. |
| 2006/0105837 A1 | 5/2006 | Walker et al. |
| 2006/0105841 A1 | 5/2006 | Rom et al. |
| 2006/0125745 A1 | 6/2006 | Evanicky |
| 2006/0143085 A1 | 6/2006 | Adams et al. |
| 2006/0154729 A1 | 7/2006 | LeMay et al. |
| 2006/0166727 A1 | 7/2006 | Burak |
| 2006/0184626 A1 | 8/2006 | Agapi et al. |

(56) References Cited

U.S. PATENT DOCUMENTS

| | | | |
|---|---|---|---|
| 2006/0190482 A1 | 8/2006 | Kishan et al. | |
| 2006/0191177 A1 | 8/2006 | Engel | |
| 2006/0217202 A1 | 9/2006 | Burke et al. | |
| 2006/0264256 A1 | 11/2006 | Gagner et al. | |
| 2006/0264257 A1* | 11/2006 | Jaffe et al. .................. 463/20 | |
| 2006/0282855 A1 | 12/2006 | Margulis | |
| 2006/0284574 A1 | 12/2006 | Emslie et al. | |
| 2006/0287035 A1 | 12/2006 | Walker et al. | |
| 2006/0290594 A1 | 12/2006 | Engel et al. | |
| 2007/0004510 A1 | 1/2007 | Underdahl et al. | |
| 2007/0004513 A1 | 1/2007 | Wells et al. | |
| 2007/0010315 A1 | 1/2007 | Hein | |
| 2007/0015569 A1 | 1/2007 | Norton et al. | |
| 2007/0024002 A1 | 2/2007 | McMain et al. | |
| 2007/0026916 A1* | 2/2007 | Juds et al. .................. 463/1 | |
| 2007/0032288 A1 | 2/2007 | Nelson et al. | |
| 2007/0043616 A1 | 2/2007 | Kutaragi et al. | |
| 2007/0060317 A1 | 3/2007 | Martin | |
| 2007/0180400 A1 | 8/2007 | Zotov et al. | |
| 2007/0243925 A1 | 10/2007 | LeMay et al. | |
| 2007/0243928 A1 | 10/2007 | Iddings | |
| 2007/0243934 A1 | 10/2007 | Little et al. | |
| 2008/0004104 A1 | 1/2008 | Durham et al. | |
| 2008/0008188 A1 | 1/2008 | Buga et al. | |
| 2008/0009344 A1 | 1/2008 | Graham et al. | |
| 2008/0020816 A1 | 1/2008 | Griswold et al. | |
| 2008/0020839 A1 | 1/2008 | Wells et al. | |
| 2008/0020840 A1 | 1/2008 | Wells et al. | |
| 2008/0020841 A1 | 1/2008 | Wells et al. | |
| 2008/0076574 A1 | 3/2008 | Okada | |
| 2008/0096655 A1 | 4/2008 | Rasmussen et al. | |
| 2008/0113747 A1 | 5/2008 | Williams et al. | |
| 2008/0125219 A1 | 5/2008 | Williams et al. | |
| 2008/0167106 A1* | 7/2008 | Lutnick .................. G07F 17/32 463/16 | |
| 2008/0200233 A1 | 8/2008 | Aida | |
| 2008/0318655 A1 | 12/2008 | Davies | |
| 2009/0018917 A1* | 1/2009 | Chapman .............. G06Q 30/02 705/14.46 | |
| 2009/0098943 A1 | 4/2009 | Weber et al. | |
| 2009/0104954 A1 | 4/2009 | Weber et al. | |
| 2009/0156303 A1 | 6/2009 | Kiely et al. | |
| 2009/0197684 A1 | 8/2009 | Arezina et al. | |
| 2009/0209350 A1 | 8/2009 | Kelly et al. | |
| 2009/0233705 A1 | 9/2009 | LeMay et al. | |
| 2010/0105454 A1 | 4/2010 | Weber et al. | |
| 2010/0190553 A1 | 7/2010 | Buchholz et al. | |

FOREIGN PATENT DOCUMENTS

| | | |
|---|---|---|
| AU | 775882 B2 | 11/2000 |
| CN | 1867939 | 11/2006 |
| CN | 1910632 | 2/2007 |
| EP | 0 454 423 | 10/1991 |
| EP | 0 484 103 | 5/1992 |
| EP | 0 769 769 | 4/1997 |
| EP | 0 997 857 | 10/1999 |
| EP | 1 195 184 | 4/2002 |
| EP | 1 255 234 | 11/2002 |
| EP | 1 260 928 | 11/2002 |
| EP | 1 282 088 | 2/2003 |
| EP | 1 462 152 | 9/2004 |
| EP | 1 492 063 | 12/2004 |
| EP | 1 524 617 | 4/2005 |
| GB | 1 464 896 | 2/1977 |
| GB | 2 120 506 | 11/1983 |
| JP | 04-220276 | 8/1992 |
| JP | 06-043425 | 2/1994 |
| JP | 07-124290 | 5/1995 |
| JP | 2000-300729 | 10/2000 |
| JP | 2000-350805 | 12/2000 |
| JP | 2001-062032 | 3/2001 |
| JP | 2001-238995 | 9/2001 |
| JP | 2001-252393 | 9/2001 |
| JP | 2001-252394 | 9/2001 |
| JP | 2002-085624 | 3/2002 |
| JP | 2004-089707 | 3/2004 |
| JP | 2004-105616 | 4/2004 |
| JP | 2004-166879 | 6/2004 |
| JP | 2005-253561 | 9/2005 |
| JP | 2005-266387 | 9/2005 |
| JP | 2005-266388 | 9/2005 |
| JP | 2005-274906 | 10/2005 |
| JP | 2005-274907 | 10/2005 |
| JP | 2005-283864 | 10/2005 |
| JP | 2006-346226 | 12/2006 |
| WO | WO 98/52665 | 11/1998 |
| WO | WO 99/42889 | 8/1999 |
| WO | WO 99/44095 | 9/1999 |
| WO | WO 01/15127 | 3/2001 |
| WO | WO 01/15128 | 3/2001 |
| WO | WO 01/15132 | 3/2001 |
| WO | WO 01/09664 | 8/2001 |
| WO | WO 02/073501 | 9/2002 |
| WO | WO 03/023647 | 3/2003 |
| WO | WO 03/039699 | 5/2003 |
| WO | WO 04/001486 | 12/2003 |
| WO | WO-2004/025583 | 3/2004 |
| WO | WO 2004/102520 | 11/2004 |
| WO | WO 2006/033986 | 3/2006 |
| WO | WO 2006/034192 | 3/2006 |
| WO | WO 2006/038819 | 4/2006 |
| WO | WO 2006/039132 | 4/2006 |
| WO | WO 2007/032916 | 3/2007 |
| WO | WO 2007/040413 | 4/2007 |
| WO | WO 2007/075278 | 7/2007 |
| WO | WO 2007/120444 | 10/2007 |
| WO | WO 2007/120450 | 10/2007 |
| WO | WO 2008/056844 | 5/2008 |
| WO | WO 2008/061068 | 5/2008 |
| WO | WO 2009/009269 | 1/2009 |
| WO | WO 2009/036445 | 3/2009 |
| WO | WO 2009/140096 | 11/2009 |
| WO | WO 2009/143274 | 11/2009 |
| WO | WO 2010/056418 | 5/2010 |
| WO | WO 2010/120451 | 10/2010 |

OTHER PUBLICATIONS

U.S. Examiner Interview Summary dated May 22, 2009 issued in U.S. Appl. No. 11/595,774.

U.S. Office Action Final dated Aug. 26, 2009 issued in U.S. Appl. No. 11/595,774.

U.S. Office Action—Supplemental Final dated Sep. 16, 2009 issued in U.S. Appl. No. 11/595,774.

U.S. Office Action dated Apr. 15, 2011 issued in U.S. Appl. No. 11/595,774.

U.S. Office Action Final dated Oct. 14, 2011 issued in U.S. Appl. No. 11/595,774.

U.S. Office Action dated Aug. 3, 2011 issued in U.S. Appl. No. 12/426,165.

U.S. Office Action Final dated Feb. 17, 2012 issued in U.S. Appl. No. 12/426,165.

U.S. Office Action dated Jun. 19, 2009 issued in U.S. Appl. No. 11/682,253.

U.S. Office Action Final dated Nov. 30, 2009 issued in U.S. Appl. No. 11/682,253.

U.S. Office Action dated Jan. 26, 2012 issued in U.S. Appl. No. 11/682,253.

U.S. Office Action Final dated Jul. 17, 2012 issued in U.S. Appl. No. 11/682,253.

U.S. Office Action dated Jun. 24, 2011 issued in U.S. Appl. No. 12/209,608.

U.S. Office Action Final dated Mar. 16, 2012 issued in U.S. Appl. No. 12/209,608.

U.S. Office Action dated Jul. 26, 2011 issued in U.S. Appl. No. 12/271,884.

U.S. Office Action Final dated Apr. 27, 2012 issued in U.S. Appl. No. 12/271,884.

(56) References Cited

OTHER PUBLICATIONS

U.S. Office Action dated Jan. 20, 2011 issued in U.S. Appl. No. 11/983,770.
U.S. Office Action Final dated May 16, 2011 issued in U.S. Appl. No. 11/983,770.
U.S. Office Action dated Feb. 15, 2012 issued in U.S. Appl. No. 12/120,191.
U.S. Office Action Final dated Jun. 7, 2012 issued in U.S. Appl. No. 12/120,191.
U.S. Office Action dated Sep. 30, 2011 issued in U.S. Appl. No. 12/435,962.
U.S. Office Action Final dated Apr. 16, 2012 issued in U.S. Appl. No. 12/435,962.
U.S. Office Action dated Feb. 12, 2009 issued in U.S. Appl. No. 11/595,798.
U.S. Examiner Interview Summary dated May 22, 2009 issued in U.S. Appl. No. 11/595,798.
U.S. Office Action Final dated Sep. 24, 2009 issued in U.S. Appl. No. 11/595,798.
U.S. Office Action Final dated Apr. 14, 2011 issued in U.S. Appl. No. 11/595,798.
U.S. Office Action Supplemental dated Apr. 29, 2011 issued in U.S. Appl. No. 11/595,798.
U.S. Office Action Final dated Oct. 14, 2011 issued in U.S. Appl. No. 11/595,798.
U.S. Office Action dated Oct. 27, 2011 issued in U.S. Appl. No. 11/827,060.
PCT International Search Report dated Sep. 21, 2007 issued in PCT/US2007/007617.
PCT Written Opinion dated Sep. 21, 2007 issued in PCT/US2007/007617.
PCT International Preliminary Report on Patentability and Written Opinion dated Oct. 14, 2008 issued in PCT/US2007/007617.
Australian Examiner's First Report dated May 25, 2011 issued in AU 2007239023.
Australian Patent Examination Report No. 2 dated Jun. 20, 2012 issued in AU 2007239023.
Chinese First Office Action dated May 18, 2010 issued in CN 200780021740.1.
Chinese Second Office Action dated Nov. 16, 2011 issued in CN 200780021740.1.
Chinese Third Office Action dated Apr. 17, 2012 issued in CN 200780021740.1.
European Examination Report dated Apr. 20, 2009 issued in EP 07 754 175.3-1238.
PCT International Search Report dated Aug. 3, 2010 issued in PCT/US2010/028368 [WO 2010/120451].
PCT International Preliminary Report on Patentability and Written Opinion dated Oct. 27, 2011 issued in PCT/US2010/028368 [WO 2010/120451].
PCT International Search Report and Written Opinion dated Dec. 11, 2008 issued in PCT/US2008/076428 [WO 2009/036445].
PCT International Preliminary Report on Patentability and Written Opinion dated Mar. 16, 2010 issued in PCT/US2008/076428 [WO 2009/036445].
Australian Patent Examination Report No. 1 dated Jul. 11, 2012 issued in AU 2008298501.
PCT International Search Report and Written Opinion dated Dec. 4, 2009 issued in PCT/US2009/057551.
PCT International Preliminary Report on Patentability and Written Opinion dated May 17, 2011 issued in PCT/US2009/057551.
PCT International Search Report and Written Opinion dated May 2, 2008 issued in PCT/US2007/084459 (WO 2008/061068).
PCT International Preliminary Report on Patentability and Written Opinion dated May 12, 2009 issued in PCT/US2007/084459 [WO 2008/061068].
Australian Examiner's first report dated Jul. 7, 2011 issued in AU 2007319331.
European Examination Report dated Oct. 28, 2009 issued in EP 07 845 059.0-1238.
PCT International Search Report and Written Opinion dated Sep. 8, 2009 issued in PCT/US2009/042741.
PCT International Preliminary Report on Patentability and Written Opinion dated Nov. 25, 2010 issued in PCT/US2009/042741.
PCT International Search Report dated Jul. 24, 2009 issued in PCT/US2009/044716.
PCT International Preliminary Report on Patentability and Written Opinion dated Dec. 2, 2010 issued in PCT/US2009/044716.
Great Britain Examination Report dated Feb. 15, 2012 issued in GB1020135.8.
PCT International Search Report and Written Opinion dated Sep. 21, 2007 issued in PCT/US2007/007857 (WO 2007/120450).
PCT International Preliminary Report on Patentability and Written Opinion dated Oct. 14, 2008 issued in PCT/US2007/007857 (WO 2007/120450).
Australian Examiner's first report dated May 25, 2011 issued in AU 2007239029.
Australian Patent Examination Report No. 2 dated Jun. 20, 2012 issued in AU 2007239029.
Chinese First Office Action dated Mar. 25, 2010 issued in CN 200780021699.8.
Chinese Second Office Action dated Aug. 24, 2010 issued in CN 200780021699.8.
Chinese Third Office Action dated Dec. 3, 2010 issued in CN 200780021699.8.
Chinese Fourth Office Action dated Feb. 23, 2011 issued in CN 200780021699.8.
Chinese Fifth Office Action dated May 25, 2011 issued in CN 200780021699.8.
Chinese Sixth Office Action dated Dec. 7, 2011 issued in CN 200780021699.8.
European Examination Report dated Apr. 20, 2009 from EP 07 754 383.3-1238.
PCT International Search Report and Written Opinion dated Sep. 26, 2008 issued in PCT/US2008/067543.
PCT International Preliminary Report on Patentability and Written Opinion dated Jan. 12, 2010 issued in PCT/US2008/067543.
Australian Examiner's First Report dated May 25, 2012 issued in AU 2008275477.
Bonsor, Kevin, "How Smart Windows Will Work," Howstuffworks, Inc. 1998-2002, http://www.howstuffworks.com/smart-window.htm/printable Printed Nov. 25, 2002, 5 pp.
Bonsor, Kevin, "How Smart Windows Work," HowStuffWorks, Inc., www.howstuffworks.com, 1998-2004, 9 pp.
"Debut of Let's Make a Deal Slot Machine," Let's Make a Deal 1999-2002, http://www.letsmakeadeal.com/pr01.htm. Printed Dec. 3, 2002, 2 pp.
"Light Valve". Retrieved from the internet URL http://www.meko.co.uk/lightvalve.shtml [retrieved on Nov. 15, 2005, 1 page.
Liquid Crystal Display. Retrieved from the internet URL http://en.wikipedia.org/wiki/LCD [retrieved on Nov. 16, 2005, 6 pp.
Living in a flat world? Advertisement written by Deep Video Imaging Ltd., published 2000, 21 pp.
Miser, Brad, "Using Mac OS 8.5," (Nov. 1998) Que Publishing accessed at <http://www.netlibrary.com/nlreader.d11?bookid=8218&filename=Page_ii.html>, 29 pp.
Novel 3-D Video Display Technology Developed, News release: Aug. 30, 1996, www.eurekalert.org/summaries/1199.html, printed from Internet Archive using date Sep. 2, 2000, 1 page.
Regulation 14 of Regulations of the Nevada Gaming Commission and State Gaming Control Board, Regulation 14.230 adopted Jul. 1989, Nevada Gaming Commission and State Gaming Control Board, 15 pp.
Saxe et al.,"Suspended-Particle Devices," www.refr-spd.com, Apr./May 1996, 5 pp.
"SPD," Malvino Inc., www.malvino.com, Jul. 19, 1999, 10 pp.
Time Multiplexed Optical Shutter (TMOS): A Revolutionary Flat Screen Display Technology, http://web.archive.org/web/19991006064049/http://www.vea.com/TMOS.html, Apr. 8, 1999, printed from Internet on Oct. 6, 1999, 6 pp.

(56) References Cited

OTHER PUBLICATIONS

Time Multiplexed Optical Shutter (TMOS): A Revolutionary Flat Screen Display Technology, http://web.archive.org/web/20010814143641/www.tralas.com/TMOS.html, printed from internet on Apr. 11, 2001, 6 pp.
What is SPD? SPD Systems, Inc. 2002, http://www.spd-systems.com/spdq.htm. Printed Dec. 4, 2002, 2 pp.
Office Action for Chinese Application No. 201080027463.7 (and it's English translation), mail date Jul. 10, 2013, 16 pps.
Macau Search Report dated Jun. 22, 2016 issued in Application No. I/000956 (293), 8 pages.
Australian Patent Examination Report No. 2 dated Jun. 16, 2016 for Australian Application No. 2015202271.
Australian Patent Examination Report No. 4 dated Jan. 30, 2017 for Australian Application No. 2015202271.

\* cited by examiner
† cited by third party

METHODS AND SYSTEMS FOR INTERFACING WITH A THIRD-PARTY APPLICATION

CROSS-REFERENCE TO RELATED APPLICATIONS

This application is a continuation of U.S. application Ser. No. 12/435,962, filed May 5, 2009, titled, "METHODS AND SYSTEMS FOR INTERFACING WITH A THIRD-PARTY APPLICATION," which claims benefit of U.S. Provisional Application No. 61/055,316, filed on May 22, 2008, titled "METHODS AND SYSTEMS FOR INTERFACING WITH A THIRD-PARTY APPLICATION", which is incorporated by reference herein in its entirety for all purposes.

The U.S. patent application Ser. No. 12/435,962 is also a continuation-in-part of and claims the priority to co-pending U.S. patent application Ser. No. 12/120,191, filed on May 13, 2008, titled "METHODS AND SYSTEMS FOR TRACKING AN EVENT OF AN EXTERNALLY CONTROLLED INTERFACE". The U.S. patent application Ser. No. 12/120,191, filed on May 13, 2008, titled "METHODS AND SYSTEMS FOR TRACKING AN EVENT OF AN EXTERNALLY CONTROLLED INTERFACE" is a continuation-in-part of and claims priority to co-pending U.S. patent application Ser. No. 11/595,774, filed on Nov. 10, 2006, titled "METHOD AND APPARATUS FOR INTEGRATING REMOTELY-HOSTED AND LOCALLY RENDERED CONTENT ON A GAMING DEVICE". The U.S. patent application Ser. No. 11/595,774, filed on Nov. 10, 2006, titled "METHOD AND APPARATUS FOR INTEGRATING REMOTELY-HOSTED AND LOCALLY RENDERED CONTENT ON A GAMING DEVICE" claims benefit of U.S. Provisional Patent Application No. 60/792,082, filed on Apr. 13, 2006, titled "REMOTE CONTENT MANAGEMENT AND RESOURCE SHARING ON A GAMING MACHINE", and also claims benefit of U.S. Provisional Patent Application No. 60/822,859, filed on Aug. 18, 2006, titled "REMOTE CONTENT MANAGEMENT AND RESOURCE SHARING ON A GAMING MACHINE AND METHOD OF IMPLEMENTING SAME". The U.S. patent application Ser. No. 12/120,191, filed on May 13, 2008, titled "METHODS AND SYSTEMS FOR TRACKING AN EVENT OF AN EXTERNALLY CONTROLLED INTERFACE" is a continuation-in-part of and claims the priority to co-pending U.S. patent application Ser. No. 11/595,798, filed on Nov. 10, 2006, titled "REMOTE CONTENT MANAGEMENT AND RESOURCE SHARING ON A GAMING MACHINE AND METHOD OF IMPLEMENTING SAME". The U.S. patent application Ser. No. 11/595,798, filed on Nov. 10, 2006, titled "REMOTE CONTENT MANAGEMENT AND RESOURCE SHARING ON A GAMING MACHINE AND METHOD OF IMPLEMENTING SAME" claims benefit of U.S. Provisional Patent Application No. 60/792,082, filed on Apr. 13, 2006, titled "REMOTE CONTENT MANAGEMENT AND RESOURCE SHARING ON A GAMING MACHINE", and also claims benefit of U.S. Provisional Patent Application No. 60/822,859, filed on Aug. 18, 2006, titled "REMOTE CONTENT MANAGEMENT AND RESOURCE SHARING ON A GAMING MACHINE AND METHOD OF IMPLEMENTING SAME". The U.S. patent application Ser. No. 12/120,191, filed on May 13, 2008, titled "METHODS AND SYSTEMS FOR TRACKING AN EVENT OF AN EXTERNALLY CONTROLLED INTERFACE" is a continuation-in-part of and claims priority to co-pending U.S. patent application Ser. No. 11/682,253, filed on Mar. 5, 2007 titled "CASINO GAMING INCENTIVES USING GAME THEMES, GAME TYPES, PAYTABLES, DENOMINATIONS". The U.S. patent application Ser. No. 11/682,253, filed on Mar. 5, 2007 titled "CASINO GAMING INCENTIVES USING GAME THEMES, GAME TYPES, PAYTABLES, DENOMINATIONS" is a continuation-in-part of and claims priority to co-pending U.S. patent application Ser. No. 11/595,774, filed on Nov. 10, 2006, titled "METHOD AND APPARATUS FOR INTEGRATING REMOTELY-HOSTED AND LOCALLY RENDERED CONTENT ON A GAMING DEVICE". The U.S. patent application Ser. No. 11/595,774, filed on Nov. 10, 2006, titled "METHOD AND APPARATUS FOR INTEGRATING REMOTELY-HOSTED AND LOCALLY RENDERED CONTENT ON A GAMING DEVICE" claims benefit of U.S. Provisional Patent Application No. 60/792,082, filed on Apr. 13, 2006, titled "REMOTE CONTENT MANAGEMENT AND RESOURCE SHARING ON A GAMING MACHINE", and also claims benefit of U.S. Provisional Patent Application No. 60/822,859, filed on Aug. 18, 2006, titled "REMOTE CONTENT MANAGEMENT AND RESOURCE SHARING ON A GAMING MACHINE AND METHOD OF IMPLEMENTING SAME". The U.S. patent application Ser. No. 12/120,191, filed on May 13, 2008, titled "METHODS AND SYSTEMS FOR TRACKING AN EVENT OF AN EXTERNALLY CONTROLLED INTERFACE" is a continuation-in-part of and claims priority to co-pending U.S. patent application Ser. No. 11/827,060, filed on Jul. 9, 2007, titled "INTEGRATING REMOTELY-HOSTED AND LOCALLY RENDERED CONTENT ON A GAMING DEVICE". The U.S. patent application Ser. No. 11/827,060, filed on Jul. 9, 2007, titled "INTEGRATING REMOTELY-HOSTED AND LOCALLY RENDERED CONTENT ON A GAMING DEVICE" is a continuation-in-part of and claims priority to co-pending U.S. patent application Ser. No. 11/595,774, filed on Nov. 10, 2006, titled "METHOD AND APPARATUS FOR INTEGRATING REMOTELY-HOSTED AND LOCALLY RENDERED CONTENT ON A GAMING DEVICE". The U.S. patent application Ser. No. 11/595,774, filed on Nov. 10, 2006, titled "METHOD AND APPARATUS FOR INTEGRATING REMOTELY-HOSTED AND LOCALLY RENDERED CONTENT ON A GAMING DEVICE" claims benefit of U.S. Provisional Patent Application No. 60/792,082, filed on Apr. 13, 2006, titled "REMOTE CONTENT MANAGEMENT AND RESOURCE SHARING ON A GAMING MACHINE", and also claims benefit of U.S. Provisional Patent Application No. 60/822,859, filed on Aug. 18, 2006, titled "REMOTE CONTENT MANAGEMENT AND RESOURCE SHARING ON A GAMING MACHINE AND METHOD OF IMPLEMENTING SAME". The U.S. patent application Ser. No. 12/120,191, filed on May 13, 2008, titled "METHODS AND SYSTEMS FOR TRACKING AN EVENT OF AN EXTERNALLY CONTROLLED INTERFACE" is a continuation-in-part of and claims priority to co-pending U.S. patent application Ser. No. 11/983,770, filed on Nov. 9, 2007, titled "MULTI-LAYER DISPLAY 3D SERVER BASED PORTALS". The U.S. patent application Ser. No. 11/983,770, filed on Nov. 9, 2007, titled "MULTI-LAYER DISPLAY 3D SERVER BASED PORTALS" is a continuation-in-part of and claims priority to co-pending U.S. patent application Ser. No. 11/595,774, filed on Nov. 10, 2006, titled "METHOD AND APPARATUS FOR INTEGRATING REMOTELY-HOSTED AND LOCALLY RENDERED CONTENT ON A GAMING DEVICE". The U.S.

patent application Ser. No. 11/595,774, filed on Nov. 10, 2006, titled "METHOD AND APPARATUS FOR INTEGRATING REMOTELY-HOSTED AND LOCALLY RENDERED CONTENT ON A GAMING DEVICE" claims benefit of U.S. Provisional Patent Application No. 60/792,082, filed on Apr. 13, 2006, titled "REMOTE CONTENT MANAGEMENT AND RESOURCE SHARING ON A GAMING MACHINE", and also claims benefit of U.S. Provisional Patent Application No. 60/822,859, filed on Aug. 18, 2006, titled "REMOTE CONTENT MANAGEMENT AND RESOURCE SHARING ON A GAMING MACHINE AND METHOD OF IMPLEMENTING SAME". The U.S. patent application Ser. No. 11/983,770, filed on Nov. 9, 2007, titled "MULTI-LAYER DISPLAY 3D SERVER BASED PORTALS" claims benefit of U.S. Provisional Patent Application No. 60/858,741, filed on Nov. 13, 2006, titled "MULTIPLE LAYER DISPLAYS AND THEIR USE IN GAMING MACHINES". The U.S. patent application Ser. No. 12/120,191, filed on May 13, 2008, titled "METHODS AND SYSTEMS FOR TRACKING AN EVENT OF AN EXTERNALLY CONTROLLED INTERFACE" is a continuation-in-part of and claims priority to co-pending International patent application No. PCT/US07/07617, filed on Mar. 27, 2007, titled "METHOD AND APPARATUS FOR INTEGRATING REMOTELY-HOSTED AND LOCALLY RENDERED CONTENT ON A GAMING DEVICE". The International patent application No. PCT/US07/07617, filed on Mar. 27, 2007, titled "METHOD AND APPARATUS FOR INTEGRATING REMOTELY-HOSTED AND LOCALLY RENDERED CONTENT ON A GAMING DEVICE" is a continuation of and claims priority to co-pending U.S. patent application Ser. No. 11/595,774, filed on Nov. 10, 2006, titled "METHOD AND APPARATUS FOR INTEGRATING REMOTELY-HOSTED AND LOCALLY RENDERED CONTENT ON A GAMING DEVICE". The U.S. patent application Ser. No. 11/595,774, filed on Nov. 10, 2006, titled "METHOD AND APPARATUS FOR INTEGRATING REMOTELY-HOSTED AND LOCALLY RENDERED CONTENT ON A GAMING DEVICE" claims benefit of U.S. Provisional Patent Application No. 60/792,082, filed on Apr. 13, 2006, titled "REMOTE CONTENT MANAGEMENT AND RESOURCE SHARING ON A GAMING MACHINE", and also claims benefit of U.S. Provisional Patent Application No. 60/822,859, filed on Aug. 18, 2006, titled "REMOTE CONTENT MANAGEMENT AND RESOURCE SHARING ON A GAMING MACHINE AND METHOD OF IMPLEMENTING SAME". The U.S. patent application Ser. No. 12/120,191, filed on May 13, 2008, titled "METHODS AND SYSTEMS FOR TRACKING AN EVENT OF AN EXTERNALLY CONTROLLED INTERFACE" is a continuation-in-part of and claims priority to co-pending International patent application No. PCT/US07/07857, filed on Mar. 28, 2007, titled "REMOTE CONTENT MANAGEMENT AND RESOURCE SHARING ON A GAMING MACHINE AND METHOD OF IMPLEMENTING SAME". The International patent application No. PCT/US07/07857, filed on Mar. 28, 2007, titled "REMOTE CONTENT MANAGEMENT AND RESOURCE SHARING ON A GAMING MACHINE AND METHOD OF IMPLEMENTING SAME" is a continuation of and claims priority to of co-pending U.S. patent application Ser. No. 11/595,774, filed on Nov. 10, 2006, titled "METHOD AND APPARATUS FOR INTEGRATING REMOTELY-HOSTED AND LOCALLY RENDERED CONTENT ON A GAMING DEVICE". The U.S. patent application Ser. No. 11/595,774, filed on Nov. 10, 2006, titled "METHOD AND APPARATUS FOR INTEGRATING REMOTELY-HOSTED AND LOCALLY RENDERED CONTENT ON A GAMING DEVICE" claims benefit of U.S. Provisional Patent Application No. 60/792,082, filed on Apr. 13, 2006, titled "REMOTE CONTENT MANAGEMENT AND RESOURCE SHARING ON A GAMING MACHINE", and also claims benefit of U.S. Provisional Patent Application No. 60/822,859, filed on Aug. 18, 2006, titled "REMOTE CONTENT MANAGEMENT AND RESOURCE SHARING ON A GAMING MACHINE AND METHOD OF IMPLEMENTING SAME".

The U.S. patent application Ser. No. 12/120,191, filed on May 13, 2008, titled "METHODS AND SYSTEMS FOR TRACKING AN EVENT OF AN EXTERNALLY CONTROLLED INTERFACE" claims benefit of U.S. Provisional Patent Application Ser. No. 60/993,985, filed on Sep. 13, 2007, titled "GAMING MACHINE WITH EXTERNALLY CONTROLLED CONTENT DISPLAY".

All of the above-referenced applications are incorporated by reference herein in their entireties.

FIELD OF THE INVENTION

The present invention relates to methods and systems for interfacing with a third-party application.

BACKGROUND OF THE INVENTION

As technology in the gaming industry progresses, the traditional mechanically driven reel slot machines are being replaced with electronic counterparts having a cathode ray tube (CRT), liquid crystal display (LCD) video displays or the like. These video/electronic gaming advancements enable the operation of more complex main games, which would not otherwise be possible on mechanical-driven gaming machines. Gaming machines such as video slot machines and video poker machines are becoming increasingly popular. Part of the reason for their increased popularity is the nearly endless variety of main games that can be implemented on gaming machines utilizing advanced electronic technology.

There are a wide variety of associated devices that can be connected to video gaming machines such as a video slot machines and video poker machines. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller (MGC), the gaming machine controls various combinations of devices that allow a player to play a main game on the gaming machine and also encourage game play of the main game on the gaming machine. For example, the main game played on a gaming machine usually requires a player to input money or indicia of credit into the gaming machine, indicate a wager amount, and initiate a game play. The gaming machine controls input devices, including bill validators and coin acceptors, to accept money into the gaming machine and recognizes user inputs from devices, including key pads and button pads, to determine the wager amount and initiate game play of the main game. After game play of the main game has been initiated, the gaming machine determines a game outcome of the main game, presents the game outcome to the player and may dispense an award of some type depending on the outcome of the main game.

However, a player may lose interest in playing the main game and may look for other sources of entertainment besides game play of the main game. Moreover, the gaming machine provides a limited amount of game interfaces that the player is exposed to.

SUMMARY OF THE INVENTION

Provided herein are systems and methods for interfacing with a third-party application. The systems and methods enable a third-party user to offer a product or service to a player playing a wager-based game at a gaming device. In addition to increasing excitement of the player as a results of the variety of offers of products or services, the gaming device offers a venue for the third-party user to offer its product or service to the player.

In one aspect, a system for interfacing with a third-party application is provided. The system includes a third-party device, a server-based system that communicates with the third-party device, and a gaming device that communicates with the server-based system to display content of the product or service. The gaming device generates a game outcome of a wager-based game independent of the content that is displayed.

In another aspect, a system for interfacing with a third-party application is described. The system includes the third-party device that sends a command to trigger an event representation describing the product or server offered by the third-party user. The system further includes a server-based system that receives the command from the third-party device in a system-to-system (S2S) protocol format and a protocol converter that converts the command from the S2S protocol format to a game-to-system (G2S) protocol format. The system also includes a gaming device that receives the command in the G2S protocol format and displays the event representation.

In another aspect, a system for interfacing with a third-party application is described. The system includes the third-party device, the server-based system that is configured to communicate with the third-party device, and a gaming device configured to determine whether information is received from the third-party device. The gaming device is configured to determine whether the information is approved for display upon determining that the information is received from the third-party device. The gaming device is configured to not determine whether the information is approved upon determining that the information is not received from the third-party device.

In yet another aspect, a method for interfacing with a third-party application is described. The method includes determining a set of commands to communicate with the third party user that offers the service or product to the player playing the wager-based game. The method further includes providing the set of commands to the third party. The third party user is other than a developer of the wager-based game. The method further includes communicating, by the third party user, with the gaming device to display a description of the product or server on the gaming device.

DESCRIPTION OF THE DRAWINGS

The included drawings are for illustrative purposes and serve only to provide examples of possible structures and process steps for the disclosed inventive systems and methods for interfacing with a third-party application. These drawings in no way limit any changes in form and detail that may be made to the systems and methods by one skilled in the art without departing from the spirit and scope of the systems and methods.

DETAILED DESCRIPTION OF THE INVENTION

Figure 1A:
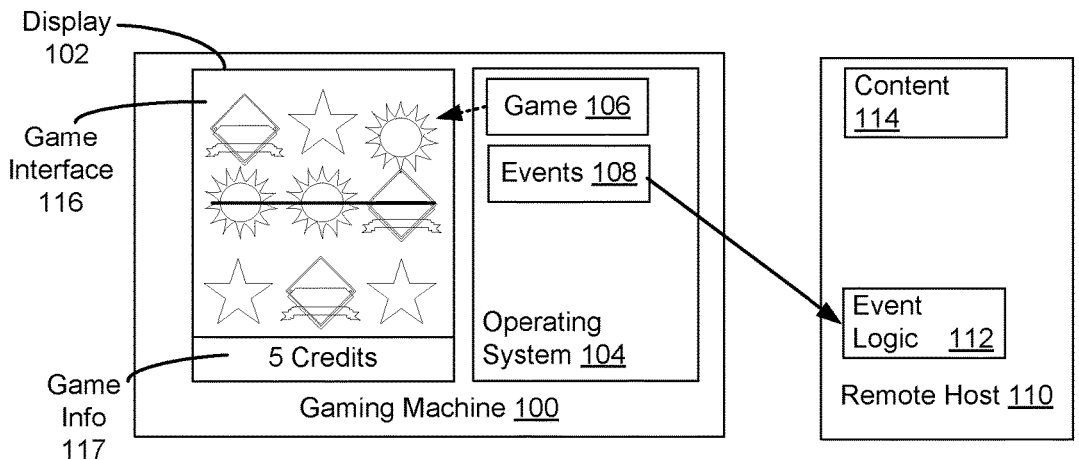
FIGS. 1A, 1B, and 1C are block diagrams illustrating an interaction between a host and gaming machine for one embodiment of the systems and methods for interfacing with a third-party application.

Exemplary applications of systems and methods according to the systems and methods for interfacing with a third-party application are described in this section. These examples are being provided solely to add context and aid in the understanding of the systems and methods. It will thus be apparent to one skilled in the art that the systems and methods may be practiced without some or all of these specific details. In other instances, well known process steps have not been described in detail in order to avoid unnecessarily obscuring the systems and methods. Other applications are possible, such that the following example should not be taken as definitive or limiting either in scope or setting.

In the following detailed description, references are made to the accompanying drawings, which form a part of the description and in which are shown, by way of illustration, specific embodiments of the systems and methods. Although these embodiments are described in sufficient detail to enable one skilled in the art to practice the systems and methods, it is understood that these examples are not limiting, such that other embodiments may be used and changes may be made without departing from the spirit and scope of the systems and methods.

Although the systems and methods are directed primarily to gaming machines and systems, it is worth noting that some of the apparatuses, systems and methods disclosed herein might be adaptable for use in other types of devices, systems or environments, as applicable, such that their use is not restricted exclusively to gaming machines and contexts. Such other adaptations may become readily apparent upon review of the inventive apparatuses, systems and methods illustrated and discussed herein.

In the following figures, methods and apparatus applicable to various gaming system configurations and their associated components are described. The gaming systems may comprise a network infrastructure for enabling one or more hosts to communicate with gaming machines. The gaming machines may be operable to provide wagering on a game of chance. A plurality of auxiliary devices, such as bill/ticket validators, printers, mechanical displays, video displays, coin hoppers, light panels, input buttons, touch screens, key pads, card readers, audio output devices, etc., may be coupled to the gaming machine. The auxiliary devices may be controlled by a master gaming controller (MGC) executing authenticated software to provide a game interface for a game play experience on the gaming machine.

In particular embodiments, the auxiliary devices on the gaming machine may be controlled by software executed by a master gaming controller 46 (see at least FIG. 6) on the gaming machine in conjunction with software executed by a remote logic device (e.g., a remote host, a central server or a central controller) in communication with the gaming machine. The master gaming controller may execute externally-controlled interface (ECI) processes, described in more detail below, that enable content generated and managed on the remote host to be output on the gaming machine. The gaming machine may receive and send events to the remote host that may affect the content output by one or more ECI processes as well as enable an ECI process to be initiated on the gaming machine.

The master gaming controller may be configured to limit the resources that can be utilized by the ECI processes executing on the gaming machine. Specific resource limitations may be predetermined, negotiated with a host device controlling an ECI prior to the execution of the ECI on the gaming machine or combinations thereof. To enforce any established resource limitations, the master gaming controller may constantly monitor resources utilized by the ECI processes and other gaming processes executing on the gaming machine.

The ECI's may be executed while a gaming machine is operable to provide a play of wager-based game of chance. During operation, one or more games and one or more executed simultaneously, one or more games may be executed without execution of an ECI or one or more ECIs may be executed while a game is not being played. Therefore, the resources may be limited to ensure that a gaming experience on the gaming machine is optimal while access to gaming resources is granted to a remote host. The resources allocated to ECI's may be limited for many reasons, such as ensuring the game play experience is adequate or for security purposes, and the examples described herein, which are provided for illustrative purposes only. For instance, the central processing unit (CPU) cycles provided to executing ECI processes may be limited to ensure a minimal graphically rendered frame rate is maintained on the gaming machine. As another example, the ECI processes may not be allowed to directly control or access certain devices, such as money handling devices, to prevent the ECI from allowing cash or an indicia of credit to be input or output from the gaming machine.

It should be appreciated that the gaming device resources utilized by the ECI processes include, but are not limited to: graphic resources of the gaming machine (i.e., what graphical real estate is available on the display device without interfering with the graphics of the primary game), audio resources of the gaming machine (i.e., what audio content may be provided by the gaming machine without interfering with the audio of the primary game), timing resources available (i.e., has the primary game ended or is the primary game beginning), and/or CPU processing resources of the gaming machine. In one embodiment, access to such resources may be based on a priority system configured to maximize an optimal gaming experience for each player.

In particular embodiments, the host-controlled ECI processes may be decoupled from the processes used to generate the game of chance played on the gaming machine such that the content output by the host-controlled ECI processes doesn't alter the play of game of chance. Thus, the logic for the game processes may be designed such that information regarding the state or content generated by the ECI processes is not needed to generate the game of chance and/or the game and related processes may not recognize any information produced by the ECI's. The ECI processes may be designed in a similar manner.

An advantage of ECI software and game software decoupled in this manner may be that content may be provided from a remote host that enhances the functionality and features available on the gaming machine. The content can be easily varied with little or no modification to the gaming software resident on the gaming machine. For instance, many features and services on a gaming machine can be provided using a generic ECI that enables access to a display and a touch screen on the gaming machine (e.g., see at least FIGS. 5A and 5B). Externally controlled interfaces, the interaction between a remote host and a gaming machine, embodiments of hardware and software architectures on a gaming machine related to ECI's are described with respect to the following figures.

Figure 1B:
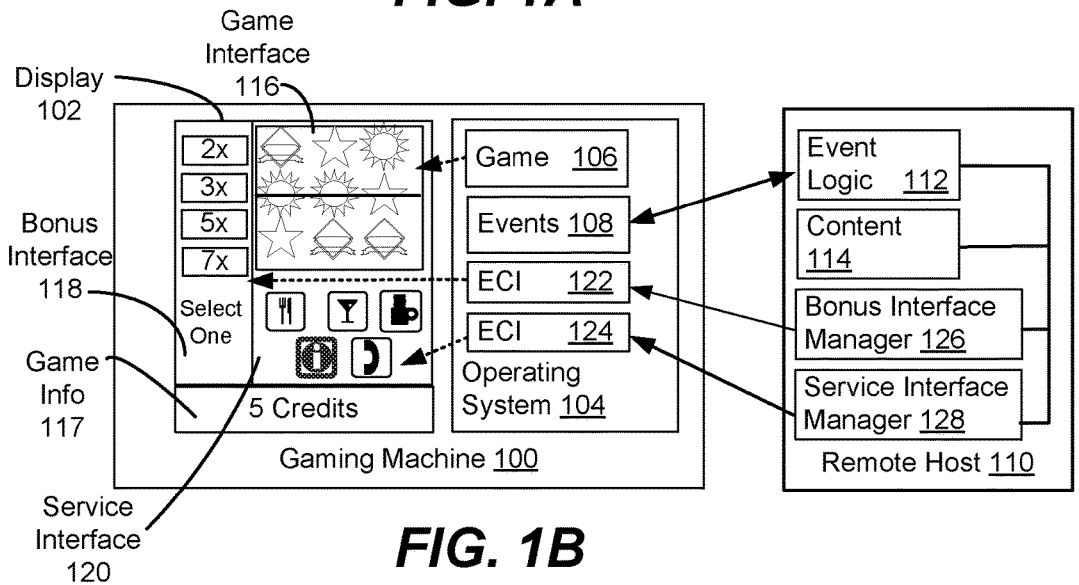
Figure 1C:
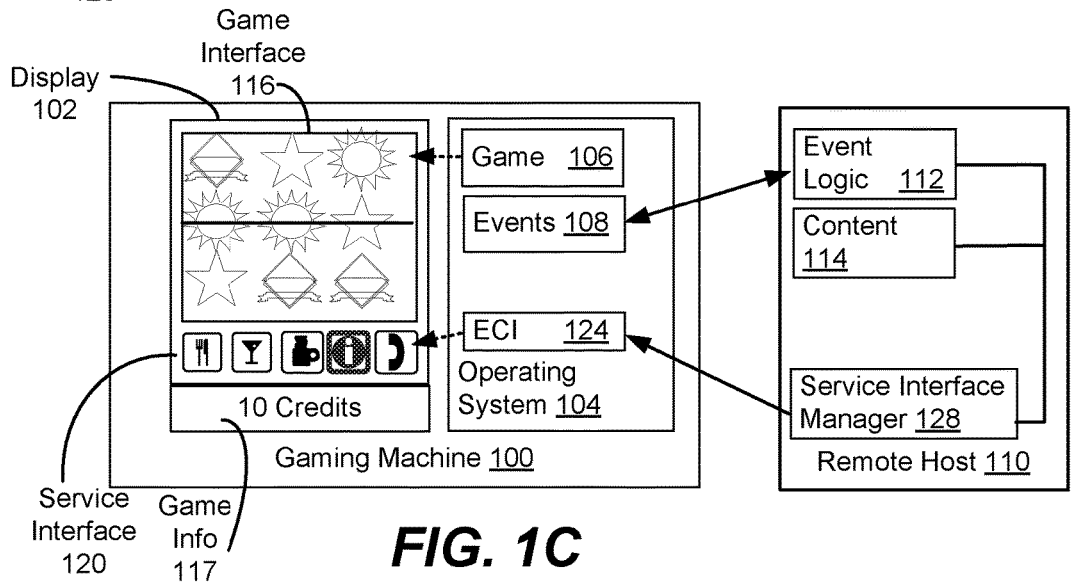

FIGS. 1A to 1C are block diagrams illustrating an interaction between a host and gaming machine for one embodiment of the systems and methods for interfacing with a third-party application. In FIG. 1A, a block diagram of a gaming system comprising a gaming machine 100, a remote host 110 and a network that enables for communication between the gaming machine and the remote host 100 (not shown) is illustrated. The gaming system is provided for illustrative purposes only. Gaming systems comprising multiple gaming machines and multiple remote hosts are possible. Further, in some embodiments, the gaming machine 100 may perform functions of the remote host 100 or the remote host 110 may be a game server providing games that are output on other gaming devices or the remote host 110 may be a gaming machine similar to gaming machine 100. Further details of embodiments of gaming systems and gaming devices that may be used are described with respect to FIGS. 2-9D.

The gaming machine 100 comprises a touch screen display 102 that may be a component of a game interface 116. The game interface 116 comprises the components on the gaming machine 100, such as input buttons (not shown), audio output devices (not shown), etc., that enable a game to be played on the gaming machine 100. An operating system 104 executes a number of processes including game logic 106 for providing a game on the game interface 116, event logic 108 and communication logic for communicating with the remote host 110 (not shown). Further details of gaming machines and game play are described with respect to FIGS. 2 to 9D.

In FIG. 1A, the game interface 116 may be divided into two regions on the touch screen display 102. A first region includes symbols and paylines for a video slot game. A second region 117 includes game information including the number of credits available for wagering on the slot game. In the game state illustrated in the figure, five credits are available for wagering.

The remote host 110 comprises a processor, memory and a communication interface (each not shown). Content 114 that may be output on the gaming machine 100 and event logic 112 that enables the remote host 110 to respond to events and information received from the gaming machine and/or generate events to send to the gaming machine 100. Additional details of remote hosts are described with at least respect to FIGS. 2, 4 and 7.

In FIG. 1A, the event logic 108 detects an event message and sends an event message with information describing the event to the remote host 110. As is described with respect to FIG. 1B, the remote host 110 responds to the event by requesting the gaming machine to launch an externally controlled interface (ECI) that enables content 114 stored on the remote host 110 to be output on the gaming machine. A few examples of events occurring on the gaming machine 100 that may trigger an instantiation of an ECI to be launched on the gaming machine 100 include but are not limited to (1) a deposit of credits on the gaming machine, (2) a player tracking card inserted into a card reader, (3) information being read from a portable instrument carried by a player (e.g., a cell phone, RFID tag or other wireless device), (4) an actuation of button, such as a mechanical button or a touch screen button, (5) an event triggered from a play of the game 106, (6) a cash-out command detected on the gaming machine, (7) an input of a wager, (8) an initiation of the game 106, (9) a number of credits available on the gaming machine, (10) the result of one or more games, (11) the result of the generation of one or more symbols, (12) a designated win amount, (13) a player cashing out available credits, and (14) a player tracking card removed from a card reader. As is described in more detail with respect to FIG. 2, an event generated on the remote host may also trigger the launch of an ECI on the gaming machine.

The event sent from the gaming machine is evaluated by the event logic 112 on the remote host 110. In response to the receiving the event 110, the remote host 110 sends a message requesting access to resources on the gaming machine 100. In response, the gaming machine 100 may send a message to the remote host 110 describing the resources it has available for external control and any usage limitations that are associated with the resources, such as a portion of the display 102 including its dimensions that may be utilized by the remote host.

The remote host 110 may use the resource information provided by the gaming machine 100 to determine what content to send to the gaming machine 100. For example, video content to be output on the portion of the display 102 allocated for use by the remote host may be generated and/or selected to be compatible with the size of the display window. The process of establishing a resource sharing arrangement between the remote host 110 and the gaming machine 100, which may involve a negotiation between the remote host 110 and gaming machine 100, are described in further detail with respect to FIGS. 2 to 4.

In FIG. 1B, a state of the gaming machine 100 and the remote host 110 is illustrated where the gaming machine 100 has launched two ECI's, 122 and 124, that enable the remote host 110 to output content for a bonus interface 118 and a service interface 120 on touch screen display 102. The bonus interface 118 may be just one example of an interface that may be provided. A multimedia player, such as a Flash Player™ by Adobe™ (Adobe Systems Incorporated, San Jose, Calif.), may be one example of software that may be used as an ECI, such as 122 and 124. The multimedia player may allow, as one of its features, multimedia content received from the remote host 110 to be displayed on the touch screen display 102 and/or output on other gaming devices, such as speakers coupled to the gaming machine.

The remote host may download the multimedia content as part of application files that are utilized by the ECI's, 122 and 124. The application files may include embedded content, data, scripts and other instructions for accessing the capabilities of the ECI to be utilized. For example, the Flash Player™ runs and/or parses flash files which may include Adobe Flash Action Script™ The flash files may include information relating to utilizing raster or vector graphics, a scripting language to control functions of the player and information for providing bidirectional streaming including audio and video information. In particular, an ECI may be operable to receive video and/or audio streaming of content from a remote host. The multimedia player and associated files, such as the Flash Player™ may be a component of a "Rich Internet Application," (RIA).

Rich Internet applications (RIA) are typically interface applications provided by a host to a client with downloadable components that have the features and the functionality of locally installed and executed programs. RIAs typically transfer the processing necessary for the interface generated by the application to the client but keep the bulk of the data (i.e., maintaining the state of the program, the data etc.) back on the host. RIA's are not limited to web-based applications applied over the Internet and may be utilized in other network architectures. In an RIA involving a host device and a client device (e.g., remote host 110 may be considered a "host" and gaming machine 100 may be considered a "client" in particular embodiments), an application for generating an interface executed on the client may be operable to perform functions independently of the host, such as computations, send and retrieve data in the background, store data locally, redraw sections of the screen, and/or use audio and video in an integrated manner, etc.

The application for generating the interface may also share data with other applications locally executing. For example, two ECIs executing on gaming machine 100 may share data. The shared data may affect the content displayed on one or both ECIs. In particular embodiments, the ECIs may be prevented from directly sharing data with other processes executing on the gaming machine. For example, to share data with a non-ECI process, the ECI may have to send the information to the remote host first, which then may or may not perform additional processing on the data before communicating it back to the gaming machine.

Returning to FIG. 1B, after the ECI's, 122 and 124, have been launched by the operating system 104, the touch screen display 102 may be divided into four regions. The game interface 116 may be displayed in a first region, the bonus interface 118 may be displayed in a second region, the service interface 120 may be displayed in a third region and the game information 117 in a fourth region. The game interface 116 is configured to fit in a smaller region as compared to FIG. 1A, which may affect the graphical presentation of the game and may affect a mapping of touch screen buttons to the display 102 associated with the game interface 116.

In general, a master gaming controller in the gaming machine may be operable to provide content to display regions of different sizes. To provide content to display regions of different sizes, the gaming machine may perform one or more of the following, 1) select from among stored content, such as bitmaps, movies, animations, geometric models, etc., according to which content is more appropriate for a given display size, 2) rearrange a position of one or more components in a display window relative to one another, 3) scale content, 4) stretch content, 5) interpolate content, 6) generate new content, 7) adjust parameters of a 3-D graphical environment used to generate content and 8) combinations thereof.

In one embodiment, the wager-based games played on the gaming machine may be configured such that the manner in which a game is played or the manner in which an outcome is generated for the game may not be altered via any information from any instantiation of an ECI on the gaming machine 100. For example, in one embodiment, the bonus interface 118 may be used to provide a bonus multiplier for an award associated with an outcome of a game played on the gaming machine, such as a ten times bonus. In this example, the bonus multiplier doesn't affect how the game is played or how the outcome to the game is generated. But, the bonus multiplier does affect the award for the game, i.e., it is multiplied by a factor of ten.

In the example described in the preceding paragraph, the gaming program may include logic to generate a simple message that a bonus multiplier has been provided, such as a simple text message "You have won a bonus Multiplier." The bonus interface ECI 118 may be used to enhance and customize the presentation of the award of the bonus multiplier. For instance, in a particular embodiment, the bonus multiplier may be provided by a local casino and bonus interface ECI 118 may be used to display one or more of a casino logo, a custom message from the casino and a theme based presentation, such as a casino theme or a holiday theme as part of a presentation for the bonus multiplier award.

In many gaming jurisdictions, after a game played using game interface 116 is approved, the content of the game may not be altered. Thus, to customize a game played using game interface 116 for a particular casino or a particular gaming entity, customized content would have to be added to the game and then submitted to an associated gaming jurisdiction for approval at which point the content would be fixed (Gaming jurisdictions don't allow the gaming software to be altered in any way after it has been approved). The approval process is time consuming and expensive.

Prior to the approval process for a particular game played using game interface 116, the gaming software provider for the particular game often doesn't know which casinos or other gaming entities are going to purchase the particular game. For instance, game purchasers often wait and see how the particular game played using game interface 116 is performing at other casinos before they choose to buy it. Thus, the desire for a customized version of the particular game played using game interface 116 generally arises after the content of the game has been fixed by the approval process. To provide desired customization after the approval process, the customized game would have to be resubmitted for approval, which is very expensive.

One advantage of using ECIs is that a presentation of a game played using game interface 116 may be enhanced using an ECI, such as by providing a presentation for a bonus multiplier, as described above, in conjunction with the presentation of the game. The content of the ECI may be customized and altered after the release of the game played using game interface 116 while the presentation provided by the game may not be altered after its release. The presentation provided via an ECI may be designed to look like a component of an associated game played using game interface 116, e.g., it may use the same theme and may be displayed on the same screen, and thus, to the player may appear as another component of the presentation of the associated game even though as will be discussed further, the ECI may be a logical entity decoupled from the associated game. Thus, using an ECI, the appearance of game customization may be provided to a user without having to customize the actual game played using game interface 116 that is submitted for jurisdiction approval.

In yet another embodiment, the gaming device utilizes a plurality of display devices to display the game interface and one or more ECIs. For example, a first display device may display the game interface and a second display device may display each ECI communicated from the remote host. In one such embodiment, each display device may be controlled by one or more different processors such that each display device may generate and display information or data independently of (or alternatively dependent on) information or data displayed by the other display devices.

In another embodiment, the remote host may be in communication with each such processor to oversee (and possibly control) what may be displayed on one or more display devices of each gaming device in the gaming system. In this embodiment, the remote host may be either in direct communication with or indirect communication with (such as through a player tracking server) each gaming device in a gaming establishment, described below. This configuration provides that even if the remote host is not directly in communication with a designated gaming device's CPU, the remote host may be still operable to communicate with and provide such designated gaming device (and all gaming devices in the gaming establishment) one or more ECIs as described herein. Examples of display devices that may be controlled via an ECI are described with respect to U.S. application Ser. No. 10/756,225, filed Jan. 12, 2004, entitled, "Virtual Glass for a Gaming Machine," by Lemay, et al, which is incorporated herein in its entirety and for all purposes.

The bonus interface 118 may enable a player to win a bonus award. In one embodiment, a player may be afforded an opportunity to select between a number of bonus multipliers where a probability of an award of the selected multiplier varies from multiplier to multiplier and may be calculated based upon which multiplier is selected. In one embodiment, the logic for determining whether the selection of a particular multiplier may reside on the remote host 110. In another embodiment, the logic for determining the selection of a particular multiplier resides on the remote host and uses data communicated from the gaming device, such as data based on a player tracking information.

When the player selects one of the multipliers, raw touch screen input data may be sent via event logic 108 and using necessary communication logic (not shown) to the event logic 112 on the remote host 110. When the ECI 122 for the bonus interface 118 is instantiated, a portion of the touch screen display 102 that may be used by the ECI 122 may be determined. This information provides a mapping in regards to which regions of the display are assigned to ECI's. With this information, the operating system 104 may determine whether a touch input received at a particular location is in a region assigned to an ECI and when it is determined that the input is in a region assigned to a particular ECI, route the touch information to a remote host controlling the particular ECI.

In another embodiment, the ECI, may be designed or configured to perform some data handling received from the touch screen. For instance, the ECI may be configured to receive raw touch screen data and determine whether a button has been activated. It may be possible to specify, prior to execution of the ECI what portion of a display screen is available to the ECI and its associated dimensions/coordinates. Thus, a remote host, such as 110, may download an application file including desired content for use by the ECI, such as 122 and 124, that allows the ECI to process touch input. For example, the application file may include a mapping of coordinate locations for each active area (i.e., an area for accepting touch inputs such as buttons on displayed on the display behind the touch screen). The mapping may allow the ECI to process the raw touch data and then send higher-level information to its external controller, i.e., host 110, such as, "Button A activated."

Input processing logic may be provided with an ECI for input devices other than a touch screen. For instance, as part of an instantiation of an ECI controlled by a first remote host, it may be agreed that when input from one or more input devices, such as a touch screen, card reader, a mechanical key pad, mechanical input buttons and combinations thereof, is detected, the input information is to be sent to the first remote host as long as the ECI is active or sent to the ECI for processing, which then may forward the processed information to the remote host. Thus, in general, as part of the initial instantiation of an ECI, information regarding what input devices are associated with the ECI and/or what types of input information to route to the ECI and/or to route directly to the remote host associated with the ECI may be determined and stored on the gaming machine. The information regarding what input devices are associated with the ECI may be determined during an initial negotiating process between the host and the gaming machine.

In another embodiment, the ECI may provide initial processing of information. For example, during the negotiation process, the gaming machine may specify information regarding inputs it receives from various input devices that it will share with the ECI. The specified information may include but is not limited to the type of device, manufacturer of the device, one or more inputs generated from the device and a format for the information for each the inputs. Using the specified information, the remote host may generate application files for an ECI or generate a new ECI application that performs the proper processing/filtering of the inputs received from the gaming machine and routes needed information to the remote host or remote hosts associated with the ECI.

As described in the previous paragraph, the gaming machine may not pass along information regarding all of the inputs it receives from devices coupled to the gaming machine. For instance, the gaming machine may not pass along input information generated by a bill validator or money handling devices coupled to the gaming machine. In one embodiment, the gaming machine may include logic for providing a standard set of device descriptions and associated inputs that may be provided to an ECI. In another embodiment, the gaming machine device descriptions and associated inputs may be varied depending on the remote host that is requesting resources for an ECI.

As described above, even when the remote host or ECI is to receive input from an input device, not all of the input information received from an input device may be routed to the ECI and/or the remote host controlling the ECI. For instance, the remote host may specify that information read from a player tracking card is to be sent directly to the remote host or routed through the ECI but not information from a credit card. As another example, the remote host may specify that it is looking for input only from a portion of the mechanical input buttons on the gaming machines and that only input from the specified buttons is to be directly routed to the remote host or routed through the ECI but not other buttons. In yet another example, the remote host may specify that if the player inserts a ticket into the bill validator while the ECI is active that the gaming machine is to directly route the ticket information to the remote host or route it through the ECI.

Returning to FIG. 1B, after the remote host 110 receives from the gaming machine 100 the raw touch input corresponding to the selection of one of the bonus multipliers, in one embodiment, the bonus interface manager 126 on the remote host 110 determines that the raw touch input corresponds to a selection of the "2.times." multiplier illustrated in FIG. 1B. In another embodiment, the raw touch input may be routed to ECI 122, which process the raw touch input and then notifies the remote host that the "2.times." multiplier has been selected.

In response to the selection of the "2.times." multiplier, the bonus interface manager may send updated content to gaming machine 100 that indicates the "2.times." multiplier was selected, which may be displayed by the ECI process 122 to the display screen. For instance, the "2.times." multiplier may be highlighted or emphasized in some manner in the bonus interface 118 on the touch screen display 102. In another embodiment, the ECI 122 may have the capability to update the display to indicate the "2.times." multiplier has been selected without receiving additional content or instructions from the bonus interface manager 126.

In this example, the bonus interface manager 126 next generates a random number and determines that the player has won the "2.times." multiplier. In response, the bonus interface manager 126 sends updated content indicating the player has won the "2.times." multiplier, which may be displayed by the ECI process 122 to the display screen. Next, the remote host 110 may send two events to the gaming machine 100 which may be received and processed by the event logic on the gaming machine.

The first event received from the remote host 110 may cause the gaming machine 100 to double the credits in the credit meter stored on the gaming machine. The first event may be processed by event logic 108 on the gaming machine. When the credit meter has been doubled, as shown in FIG. 1C, the gaming machine 100 may send a message to the remote host 110 indicating the amount credited to the player. Both the gaming machine 100 and the remote 110 may store a record of this event (i.e., the award of the additional credits) for auditing and dispute resolution purposes to secure memory location, such as a Non-volatile memory. It should be appreciated that this first event illustrates an occurrence of an ECI (in this case, a 2.times. multiplier) modifying one or more aspects of the locally controlled game of chance.

The second event sent from the remote host 110 causes the gaming machine 100 to close down or hide the bonus interface 118 and terminate the ECI process 122 associated with the bonus interface (see at least FIG. 1C). The remote host 110 terminates the bonus interface manager 126 used to send content associate with the ECI 122 to the gaming machine 100 (see at least FIG. 1C). During the termination process, the gaming machine 100 and remote host 110 may exchange messages with information indicating the ECI 122 is no longer active and session termination information, such as a session associated with the ECI 122 ended at a certain time, date, etc.

In one embodiment, the gaming machine enables the player at least partial control in when to open and close down (or hide) the ECI. In one such embodiment, a player may open and close an ECI via a button connected to (or otherwise associated) with the remote host. In this embodiment, the master gaming controller may receive a message from the remote host indicating a desire to close down or hide the ECI. In another embodiment, a player may open and close an ECI via a button connected to (or otherwise associated) with the master gaming controller. For example, a dedicated mechanical input switch/button may be provided on the gaming machine that generates a signal indicating a desire to open or close an ECI.

When an ECI is initiated or terminated on the gaming machine, in response to an input from an input device on the gaming machine, such as the actuation of an input switch as described in the preceding paragraph, in response to some other event generated on the gaming machine, or in response to an event generated on a remote host, in one embodiment, the gaming machine may initiate a session with a remote host that is to provide the ECI or terminate a session with the remote host that provided the ECI.

In another embodiment, when a request is received to terminate an ECI, the gaming machine may maintain the session with the remote host but place the ECI into an inactive or hibernating state and notify the remote host of the ECI status. For example, when the ECI is used to output content to a portion of a display and a request is received to terminate the ECI, the gaming machine may display other content in the portion of the display previously utilized by the ECI, such as resizing the game interface to fit into this portion of the display, place the ECI into an inactive state and notify the remote host of its inactive state without terminating the session. When it is later determined that the ECI is to be reopened, the gaming machine may open the ECI in the display again and notify the remote host of the active status of the ECI. At this time, the gaming machine may or may not renegotiate resources for the ECI.

Returning to FIGS. 1B and 1C, after the bonus interface 118 and ECI 122 are terminated, additional resources related to the touch screen display 102 become available on the gaming machine. In this example, ECI 124 associated with the service interface 120 may be still active after the ECI 122 is terminated. Thus, the gaming machine 100 and the remote host 110 may renegotiate the resources assigned to ECI 124.

As is illustrated in FIG. 1C, after the renegotiation of resources, the game interface 116 and/or the service interface 120 may be resized and assigned to different areas of the touch screen display 102. In response, service interface manager 128 on the remote host 110 generates new content from the content 114 stored on the remote host 110 for the service interface 120 that is consistent with the new display area. In particular, the icons displayed in the service interface 120 may be rearranged as compared to FIG. 1B, to fit into the new display region and the remote host 110 may generate a new touch screen mapping that corresponds to the rearranged icons. The remote host 110 download content, information, applications files, etc., to the gaming machine to implement or all or a portion of the specified changes. The content provided from the remote host may be output on the gaming machine 100 via the ECI 124 associated with the service interface 120.

As illustrated in FIGS. 1B and 1C, the service interface 120 includes a number of icons that enable a user to select a service. These icons include food, drinks, coffee, information and communications with another person, such as another game player or a concierge associated with a casino. The types of icons displayed may depend on personal preferences and game play habits of the game player at gaming machine 100 as well operating environment specified at the casino. For instance, a more valued game player may have access to food, drinks and coffee while a less valued game player may have access to only drinks and coffee. Accordingly, for the less valued game player, the food icon would not be displayed on the service interface 120. Additional details regarding service interfaces are described with respect to FIGS. 5A and 5B.

To personalize an ECI, such as 124, if the remote host 110 does not store player information, the remote host 110 may receive player information from another gaming device, such as a player tracking server, that enables the ECI's controlled by the remote host to be personalized. The player information may include information regarding game play history for a particular player. In addition, while games are being played on the gaming machine 100, the remote host 110 may directly receive from the gaming machine 100 or via an intermediary device, game play information, such as wager amounts, amounts won, amounts lost, types of games played, amounts deposited to the gaming machine, number of games played, game started, game completed, etc. The game play information may or may not be associated with a particular player.

When an icon on the service interface 120 is selected, the touch screen input data may be sent to the remote 110 which determines what selection was made, i.e., food, coffee, drink, etc. In response, as further described with respect to FIGS. 5A and 5B, the service interface manager 128 on the remote host 110, may generate new content to send to the gaming machine 100. For example, in response to a selection of the food icon, new content regarding food choices may be sent to the gaming machine 100. These food choices may be displayed in the service interface 120 region on the touch screen display 102 instead of the icons illustrated in FIGS. 1B and 1C.

After a food choice is selected, in one embodiment, the remote host 110 may contact a casino entity providing the food services and may place an order for the food. When the food is ready, it may be delivered to the gaming machine 100. In another embodiment, after the food choice is selected, the remote host 110 may place an order for the food and instruct the gaming machine 100 to print a ticket and/or display information indicating a time and/or a location where the food may be picked up by the game player.

As previously described, the remote host 110 may download information/content in an appropriate format, such as application files including embedded content, such as video and audio files, and other information and/or instructions for an ECI, such as 122 and 124. The application files may be stored locally on the gaming machine 100. In addition, when resources are available (resource monitoring is described with respect to at least FIGS. 2 and 3A), one or more application files or one or more portions of an application file may be stored on the gaming machine 100 even after an ECI has completed execution.

The gaming machine 100 and/or remote host 110 may include logic in regards to storing or purging files. For example, some commonly used files may be stored permanently, other files may be stored for a certain time period, other files may be stored only as long as a particular ECI is active, other files may be stored as long as storage space is available. When application files executed are downloaded from the host 110 to the gaming machine, the host may provide information that helps the gaming machine manage it applications files. For example, the host 110 may designate some application files that are used regularly or are likely to be needed in the future. The gaming machine may use this information when determining where to store the application file or when determining a purge schedule for application files.

One advantage of saving one or more application files on the gaming machine may be that download times may be reduced. For example, if all or a portion of the application files used to generate the bonus interface 118 used by ECI 122 are stored on the gaming machine after the bonus interface is terminated, then a similar bonus interface 118 may be later instantiated on the gaming machine using the one or more stored application files rather downloading all of the need files in total each time.

Further, in some embodiments, two or more ECIs may be able to share application files or a portion of the data stored in an application file. For instance, a video image for a casino logo may be shared by the bonus interface 118 and the service interface 120. Thus, once the video image of the casino logo is downloaded and stored for either bonus interface 118 or the service interface 120, it may be possible to reduce a size of the download by letting the host 110 know that this video image is already available on the gaming machine. In particular embodiments, the gaming machine 100 or the host 110 may initiate a process where information regarding the application files or other content stored locally on the gaming machine 100 that may be utilized with an ECI is communicated between the remote 110 and the gaming machine 100. The remote host 100 may use this information to determine what information/content/instructions, such as application files or application file components to download to the gaming machine 100.

In yet another embodiment, ECIs, such as ECIs 122 and 124, may be operable to directly share information with one another. For example, the bonus interface 118 may allow a player to when a free meal. When a player has won a free meal, the ECI 122 generating the bonus interface 118 may be operable to share this information with the ECI 124 generating the service interface 120. The service interface 120 may be operable to provide dinner reservations. Thus, in response to information received from ECI 122, the service interface 120 may be modified to ask the player if they wish to make a reservation at the restaurant and to display information about the restaurant where the free meal was awarded.

In FIG. 1A-1C, the display screen 102 is divided into a number of portions where the size of the portions and the processes used to provide the content to the portions vary with time. The arrangement of display portions and their associated processes are provided for illustrative purposes only. In a particular embodiment, pixel dimension or screen coordinates for a display portion used to output content may be selected to provide various shapes, such as substantially circular, diamond shaped, triangular shaped, star-shaped, etc. For example, an ECI may be operable to output content to one or more of the diamonds or stars on the game interface 116 in FIG. 1A, 1B or 1C. In this example, the ECI may be operable to display content within a moving symbol. In general, the ECI may be operable to display content within a display portion that moves around the screen. For example, the display portion assigned to the ECI may be a shape that moves, such as appears to bounce and the ECI may output content to this remote shape.

In another embodiment, one display portion may be surrounded or overlap another display portion. For example, a first ECI or other process may output content to a rectangular display portion with a "hole" in it. The hole may simply be another display portion at the location of the hole that is controlled by a second ECI or other process, such as a game process. In one embodiment, the first ECI may be aware of the "hole" and arrange its content so that it does not fall with the hole.

In yet other embodiments, the gaming machine may be operable to provide display portions for utilization by an ECI, as "pop-up" windows that overlap or overlay one or more other display portions. The gaming machine may include logic that prevents a pop up window from blocking an important gaming component on the display, such as a touch screen input button for a game that is being played, or from blocking important game information on the display, such as an outcome of a game that is being played. Whether the gaming component or the game information is important may vary with time, such as when a game is being played or not being played.

In general, the gaming machine may allow for "pop-up" windows (also, non-overlapping windows) that may be controlled by in certain locations in a time dependent manner. For instance, when a gaming machine has been idle of a particular amount of time, the gaming machine may allow a pop-up window for an attract feature where the attract feature is provided in the pop-window by an ECI and where the pop-up window blocks a portion of the game interface. The pop-up window for the attract feature may be closed when the gaming machine detects an event that may indicate that a player wishes to play a game, such as when a bill validator or coin acceptor is activated or when a card insert is detected at a card reader. In another example, a "pop-up" window that is controlled by an ECI may be allowed after an event indicating a player no longer wishes to play a game, such as when a player has pressed a cash-out button at this point a pop-up window or non-overlapping window, may appear where a remote host via an ECI provides content in the pop-window or non-overlapping window that may entice a player to continue playing (e.g., promotional credits, free spin, etc.) or to spend their winnings in some manner (redeem their winnings for a prize).

In particular embodiments, an ECI may be utilized to output content to a display portion on the display that is non-contiguous. For instance, the ECI may be permitted to output content to a display portion comprising a rectangular bar across the top of the display and a rectangular bar across the bottom display where the rectangular bar at the top of the display and the rectangular bar across the bottom of the display don't over-lap.

In yet particular embodiment, an ECI may be utilized to output content across a display portion that spans multiple displays. For instance, the ECI may be utilized to display content on all or a portion of a secondary display separate from display 102 and a portion of display 102. Thus, in one example, content may be provided that appears to move from one display to the other. As another example, the separate secondary display may not include a touch sensor while the portion of display 102 does include a touch sensor. Thus, the portion of the display 102 controlled by the ECI may be used to provide input buttons that affect content that is displayed on the secondary display controlled by the ECI when the ECI controls a portion of the touch screen display 102 and all or a portion of the secondary display.

Figure 2:
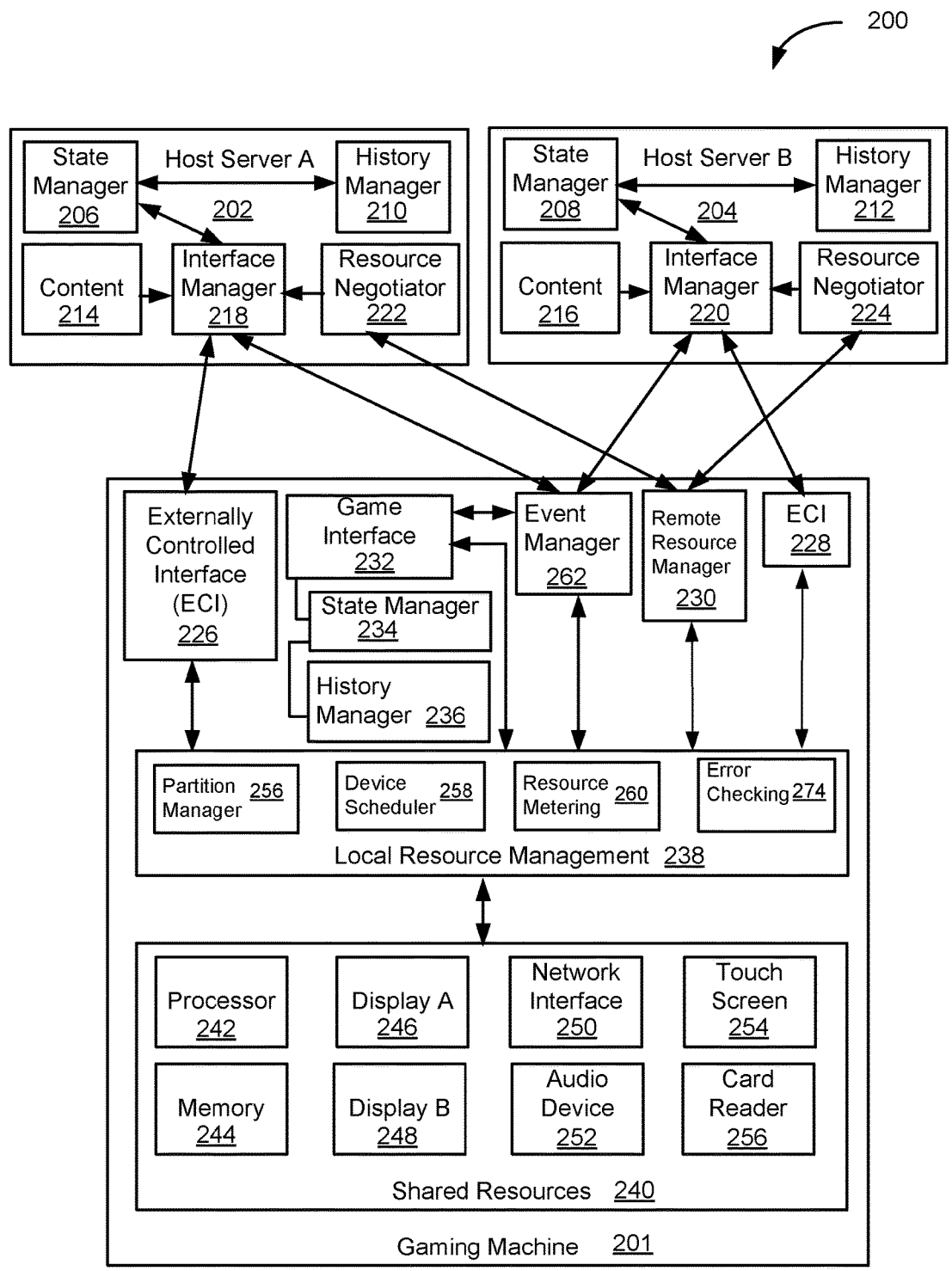
FIG. 2 is a block diagram illustrating an interaction between two hosts and a gaming machine for one embodiment of the systems and methods.

FIG. 2 is a block diagram illustrating an interaction between two hosts, 202 and 204, and a gaming machine 201 for one embodiment of the systems and methods for interfacing with a third-party application. Each host controls an ECI on gaming machine 201. Host 202 controls ECI 226 and host 204 controls ECI 228. The hosts, 202 and 204, may control their respective ECIs, 226 and 228, in an independent or a dependent manner with respect to one another. In the independent case, events generated with respect to the execution of one ECI don't affect the execution of the other ECI. In the dependent case, one or both ECIs may generate events that affect one another. In one embodiment of the systems and methods described herein, two remote hosts, such as 202 and 204, may share access to a single ECI and may alternately or simultaneously provide content for the ECI. Further, as previously described, the ECIs, such as 226 and 228, may directly share information without routing it through their respective hosts.

Each host includes a state manager, 206 and 208, content, 214 and 216, a history manager, 210 and 212, an interface manager, 218 and 220, and a resource negotiator, 222 and 224. The state manager may maintain a state of the ECI on the gaming machine. In the event of a malfunction on a) the gaming machine, b) the host or c) in the network between the host and the gaming machine. The state manager may be designed to store information that enables the remote host, if it chooses to restore an ECI on the gaming machine 201 to a state proximate to the state immediately prior to an occurrence of the malfunction. In one embodiment, the gaming machine maintains its own state via state manager 234 but not the state of any of the ECIs executing on the gaming machine 201. In other embodiments, the gaming machine may maintain some state information regarding the content displayed in the ECI. For example, the gaming machine may capture frames output to its display that include information from an ECI controlling a portion of the display.

The hosts, 202 and 204, may each provide content to ECIs executing simultaneously on a plurality of gaming machines. The content provided on each gaming machine may be different (e.g., the content may be personalized using information regarding the player at each machine or the hosts may be dynamically responding to events generated on each gaming machine and adjusting content accordingly) and the gaming machines served by each host may be different (e.g., host 202 may provide content to gaming machines A, B and C while host 204 is providing content to gaming machines B, C, D). For each gaming machine that the host provides content via an ECI, the hosts, 202 and 204, may maintain a state of the content. The content, as described above, may comprise data and/or instructions provided as application files that are run and/or parsed by the ECI. The application files may include information/data used by the ECI and commands/instructions for utilizing one or more functions of the ECI. For instance, an ECI may be operable to receive command/instructions in regards to utilizing vector graphic capabilities of the ECI. In addition, when vector graphics are applied, the ECI may be operable to apply edge smoothing the vector-based graphics.

In regards to vector graphics, computers may display graphics in two formats: vector and bitmap. Bitmaps are made up of discrete units called pixels. Each pixel contains a single color. When combined, the variations in pixel color create the patterns that make up an image. Bitmaps contain color information for each pixel in an image plus the dimensions for the image, and transmit images pixel by pixel. To change the size of a bitmap image, i.e., to fit into a display region with different dimensions than the original bitmap. The bitmap image has to be regenerated at the desired dimensions or the image has to be stretched, usually with undesirable results.

By comparison, vector graphics store a series of commands/instructions necessary to create an image using lines and curves. The commands, called vectors, dictate attributes of lines and curves such as thickness, direction, color, and position. A processor associated with the master gaming controller may be utilized to process the commands locally to generate a specified vector image. For instance, the master gaming controller may execute an ECI that is operable to parse vector graphic instructions and generate the image specified by the instructions.

Vector graphics allow for fine detail and may be easily be resized without losing definition. An image generated with vector graphics may be modified by changing the attributes of the lines and curves comprising the image. Vector graphics are best for displaying simple shapes with flat areas of color, such as icons, logos, and cartoon-style drawings. Both vector and bitmap graphics may be drawn on request, but vectors may generally use much smaller file sizes and can be drawn much more quickly. When downloaded, bitmaps are transmitted pixel by pixel, so file size and download time are proportional to an image's dimensions. Vector graphics transmit instructions, which are then carried out by your processor, so that file size and rendering speed are determined by the complexity of the instructions, not the size of the graphic. In various embodiments, various graphical techniques and data may be utilized for providing video content to an ECI including vector graphics, bit map images, movies, etc.

The state managers, 206 and 208, may each generate information that is sent to their history manager, 210 and 212, for dispute resolution and auditing purposes. In the event of a dispute, for example, a player may dispute an event that happened three games ago on the gaming machine when ECI 226 and ECI 228 were executing. The gaming machine 201 may include logic that enables the gaming machine to contact each host and request information regarding one or more states of the ECI it supported during the disputed game. The host may send the requested information to the gaming machine for display.

To enable for dispute resolution, the gaming machine 201 and the hosts 202 and 204 may exchange information, such as time stamps, game start time, game finish time, ECI start time, ECI finish time, event occurred at time A, etc., that enable content generated by each device and stored by the history manager to be recalled and correlated to one another. This information may be exchanged while the ECI is executing and then again later when requests for stored information are received by one of the hosts.

As an example of state history management and access, the gaming machine 201 may store a start and stop time for each game, whether one or more ECIs were executed during the game and when at least one ECI is executed during a particular game, information needed to contact the host that provided content for the ECI. Thus, the gaming machine 201 may be able to contact one of the remote host and request ECI states during a time period, which corresponds to a particular game. In response, the host may send the requested information to the gaming machine.

The gaming machine 201 may provide a number of shared resources 240 that may be utilized by an ECI, such as 226. For instance, in one embodiment, the gaming machine 201 may be operable to share a) processing resources from a processor, such as 242, b) memory 244 which may comprise volatile memory, such as RAM or non-volatile memory, such as flash memory or a hard drive, c) one or more displays, such as display A 246 or display B, 248, d) one or more communication interfaces, such as a network communication interface 250 or a wireless interface (not shown) that allows the gaming machine to communicate with wireless devices located proximate to the gaming machine 201, e) audio devices 252, such as speakers, amps and signal codecs for processing sound files, f) input/output devices, such as a touch screen 254 or card reader 256.

Prior to launching the ECI, a negotiation may take place between the gaming machines and one or more remote hosts in regards to the resources that may be utilized by the ECI while it is executed on the gaming machine. In one embodiment, when an ECI, such as 226, is shared or controlled by two or more hosts or where each host controls its own ECI but the ECIs share common resources and/or resource limitations based on the combined usage of resources used by the ECIs controlled by each host, a resource negotiation may take place between the two or more hosts to determine what resources are needed by each host. The host-to-host negotiation may allow the hosts to provide content/instructions to a shared ECI or to each of their ECIs in an integrated manner so that each host has enough resources to display their content/instructions on the shared ECI or each of their respective ECIs.

For example, if a first ECI controlled by a first host utilizes display 246 and a second ECI controlled by a second host utilizes display 246 each host may only need a portion of the display 246 rather than the whole display. If one or both hosts try to utilize the entire display then both hosts may not be able to have content displayed via their ECIs simultaneously. But, if the first and the second host agree to share the display by utilizing only a portion of it via a resource negotiation, then the first and second host may be able to display content via their ECIs on the display 246 at the same time. In general, the gaming machine may be the final arbiter of what resources are assigned to each ECI and the host-host negotiations may take place in the context of negotiations with the gaming machine.

In particular embodiments, the resource negotiators 222 and 224 may communicate with the remote resource manager 230 on the gaming machine 201 or each other to determine what resources are available for the ECI that each remote host controls, such as 226 or 228 or for an ECI which the remote hosts share. The one or more remote hosts may use this information to adjust the content that is sent to the gaming machine for its respective ECI. For instance, display 246 and display 248 may be of different sizes. Thus, at some times, a remote host may be provide access to display 246 and provide content to an ECI formatted to be compatible with the resolution of display 246 while at other times display 246 may not be available and the remote host may provide content formatted to be compatible with the resolution of display 248 (The content provided at different times to the displays 246 and 248 may be the same or different content). Further details of resource management are described with respect to at least FIGS. 3A and 3C.

In yet another embodiment, the remote hosts, 202 and 204, may compete for access to resources on the gaming machine. For example, remote host 202 may provide one advertising stream/content and remote host 204 may provide another advertising stream/content. The gaming machine may allow only one advertising stream/content at a time. Thus, the gaming machine 201 may initiate negotiations where access to its resources goes to the remote host, which is the highest bidder.

The gaming machine may notify potential hosts when resources become available and solicit bids for the resources from two or more hosts. In one embodiment, the gaming machine 201 while displaying content from one host may receive a bid for resources from another remote host and switch access to the gaming machine from a first remote host, such as 202, to a second remote host, such as 204, after receiving a better bid for resources from the second remote host 202.

In yet another embodiment, the gaming machine 201 may provide information regarding various resource packages with various costs to potential remote hosts. The cost of a resource package may affect the amount of resources and priority of access of resources afforded to a remote host providing an ECI. For instance, access to a larger portion of a display that is shared may cost more than access to a smaller portion of the display. As another example, access to a display where control of the display is not to be switched to another remote host provided ECI or taken over by the gaming machine for a particular time period may cost more than sharing access to the display with another remote host and allowing the gaming machine to intermittently use the display.

The interface managers, 218 and 220, may be responsible for determining what content to send each ECI and sending the content. Further, the interface managers may be designed to respond to events generated on the gaming machine. For example, when interface manager 218 receives information indicating a touch screen has been activated on the gaming machine via the event manager 262, the interface 218 manager may determine whether the touch screen is activated in a display area that it controls and whether content displayed on ECI 226 needs to be adjusted. As another example, when the interface managers, 218 or 220, receive information regarding the resolution of a particular display and visual content is to be displayed, the interface managers, may select content stored on their respective remote host that is closet to a needed resolution, reformat (if needed) the content, generate new content to fit the resolution of the particular display or locate and/or download needed content from another source, such as another remote host.

In particular embodiments, an ECI and/or remote host may not be granted access to all of the features of the shared resources. For example, when the card reader is operable to read/write data to a card, such as a smart card. The ECI may be allowed to receive data read from a card but not write data to the card. In one embodiment, during the negotiation phase, the gaming machine may provide a) a list of available shared resources, b) features of the shared resources that may be controlled by the remote host directly and/or via an ECI including commands and data formats that allow the features to be utilized, c) under an environment the features may be utilized, etc.

In one embodiment, the data formats, commands and/or instructions that an ECI or remote host may utilize may be incorporated in a communication protocol that is utilized by both the ECI and/or remote host and gaming machine (or gaming device). In particular embodiment, the commands/instructions that the ECI and the remote host may communicate to the gaming machine, such as to control a device, may be high-level commands that are translated by the gaming machine to low-level instructions that are used to actually perform the operation that is requested. For instance, to spin a bonus wheel coupled to the gaming machine, a remote host and/or ECI may send a "spin wheel" command to the gaming machine. The gaming machine may translate the command to a number of low-level instructions that a stepper motor coupled to the gaming machine to be controlled. In another embodiment, the ECI and/or remote host may be operable to provide low-level instructions that allow a device to be directly controlled. For instance, the ECI and/or remote host may be able to send the low-level instructions for controlling the stepper motor directly to the bonus wheel without needing the gaming machine to translate.

In a particular embodiment, the communications between the gaming machine and the remote host may be separated into two parts. The first part of the communications may include information regarding gaming machine transactions, such as money handling, metering, game outcomes, random number generation, player identification (ID) information The player ID information may be stored on a card, such as a player tracking card, a credit card, or a debit card, that is provided to a player. In general, the first part of the communications may include information that is generated as a result of game play from a primary game of chance executed on the gaming machine. In one embodiment, the gaming machine transaction information may be communicated using a game-to-system (G2S) protocol approved by the Gaming Standards Association (Fremont, Calif.). The second part of the communications between the gaming machine and the remote host may enable the communications between the remote host and the ECI, such as commands sent between the remote host and the ECI, which may include content for the ECI to output.

One advantage separating the communications in this manner is that the ECI may be isolated from game play information. When the ECI is isolated from game play information, it may result in a more secure system. The higher level of security is based on the assumption that if a process executing on the gaming machine is unaware of game play information, such as the state of a game, it will more difficult for the process to affect the game in unacceptable manner. It is noted that although the ECI may not be aware of game play information, as described in the previous paragraph, the remote host may be aware of game play information.

The game play information described in the previous paragraph may be related to information generated as a result of play of a primary game of chance generated on the gaming machine. Further, in some embodiments, the ECI itself may provide the play of games separate from the primary game. Nevertheless, the ECI may not be aware that is providing the play of a game and may be still unaware of any game play information that is generated. From the perspective of the ECI, it is simply outputting content utilizing commands, instructions and data provided by a remote host where the ECI does not distinguish between game related content and non-game related content.

In particular embodiments, the ECI may be operable to process input generated as a result of the play of the game provided by the ECI but may not be operable to distinguish this input from other types of input, i.e., it may not be configured to determine the function associated with the input. For instance, the ECI may be instructed by the remote host to generate a bet button on a touch screen display for a game output utilizing the ECI. The ECI may be operable to receive input from the touch screen and determine that a particular button has been pressed. The ECI may forward this information to the remote host and the remote host may determine that this button corresponds to a bet button. The ECI may be unaware the button for a bet has been pressed or activated, i.e., it is unaware of the function of the button.

In particular embodiments, when an ECI and/or remote host is access or control is prohibited for one or more resources, such as utilizing a peripheral device or utilizing one of the features of the peripheral device coupled to the gaming machine, and the ECI and/or remote host generates an instruction that tries to utilize or control the resource, then the gaming machine may respond in various manners. For example, in one embodiment, if the device or device feature the ECI and/or remote host is trying to access or control is not critical, then the gaming machine may simply ignore the command or instruction and possibly notify the device that it is trying to perform a function that is not available to it. For instance, the ECI and/or remote host may send instructions to a gaming machine to flash lights when this function is not available to it, and the gaming machine may simply ignore the instructions.

In another embodiment, the ECI and/or remote host may try to access or control a critical device in a manner that is prohibited. For instance, ECI or remote host could try to send a command to a printer to print a cashless ticket of a particular value, which is not allowed. In some possible responses, the gaming machine may 1) log the event, 2) terminate the connection with the ECI, 3) enter a tilt state or 4) combinations thereof. Some details of tilt handling that may be utilized with various embodiments are described in U.S. Pat. No. 6,890,259, entitled, "Modular Tilt Handling," which is incorporated by reference and for all purposes.

In particular embodiments, the available resources that may be utilized by a remote host as part of an ECI may vary from gaming device to gaming device. For example, a casino-type gaming machine with random number generation capability may have more capabilities that may be utilized in an ECI than a portable hand-held device. Further, in other embodiments, the capabilities of a gaming device, such as gaming machine 201, that may be offered to a remote host for utilization may vary depending on the remote host. For example, some remote hosts may be more trusted than other remote hosts and thus may be afforded greater access to devices on the gaming machine than other remote hosts.

During operation of an ECI, the gaming machine may check the resources utilized by an ECI to determine whether the resources utilized by the ECI are in compliance with limits established for the ECI, such as during the negotiation phase. The gaming machine 201 may utilize its local resource management 238 including the partition manager 256, the device scheduler 258 and the resource metering 260 on the gaming machine 201 to check the resource utilization of one or more ECIs individually or a group of ECIs in combination against resource allocations for each individual ECI or the group of ECIs. When resource allocation for an ECI is exceeded, a number of remedial actions may be taken. For instance, when CPU resources are exceeded, the ECI may be denied further CPU cycles and the display characteristics of the ECI may slow down and become jerky. Further, the gaming machine may notify the ECI that it has it exceeded it resource requirements. As another example, when resources are exceeded, the gaming machine may terminate a session with the remote host and stop execution of the ECI on the gaming machine. The execution of the ECI may be stopped permanently or may be stopped temporarily until more resources become available on the gaming or until the remote host adjusts the content of the ECI.

As examples, an ECI may exceed its allocated resources because the gaming machine downwardly adjusted the resources available to the ECI after the start of an ECI session or because the remote host didn't correctly estimate an amount of resources it needed. In response to learning it is exceeding resources it has been allocated on the gaming machine, the remote host, such as 202 or 204, may adjust their content to consume less resources on the gaming machine. In particular embodiments, the remote hosts, such as 202 and 204, may be operable to dynamically adjust the content that is sent to the gaming machine for utilization by an ECI after a session has been initiated (at the start of the session an initial resource allocation may be specified) 1) to satisfy changing resource allocations on the gaming machine, which may change, and thus, to prevent it from exceeding its resource allocation.

Since the manner in which an ECI and/or remote host may be allowed to access or utilize a gaming machine may vary, such as from one remote host to another, from one time to another and different gaming machine may have different capabilities (e.g., a gaming machine may have different capabilities than a portable), the gaming machine may include logic for checking instructions and/or data received from an ECI and/or remote host to comply with their access privileges. For example for illustrative purposes only as a communication protocol doesn't have to be utilized, when the instructions and/or data are codified in a communication protocol, the gaming machine may first check to see whether the instructions and/or data is a recognized part of the protocol. Then, even if the instructions and/or data is part of the protocol, the gaming machine may not offer the capability requested, thus compatibility of instructions and/or data with the gaming machine capabilities may be checked (At the negotiation phase, the instructions and/or data that the gaming machine is capable of utilizing, which may be a subset of the instructions and/or data that may be communicated as part of the communication protocol may be established). Then, the instructions and/or data may be checked against the access privileges for the particular ECI and/or remote host. For each remote host and its associated ECI, information regarding resource access privileges may be stored (The information may have been generated at the negotiation phase or at some other time). The privilege and/or error checking may be performed by the privilege checking logic 274 in the local resource management 238.

Figure 3A:
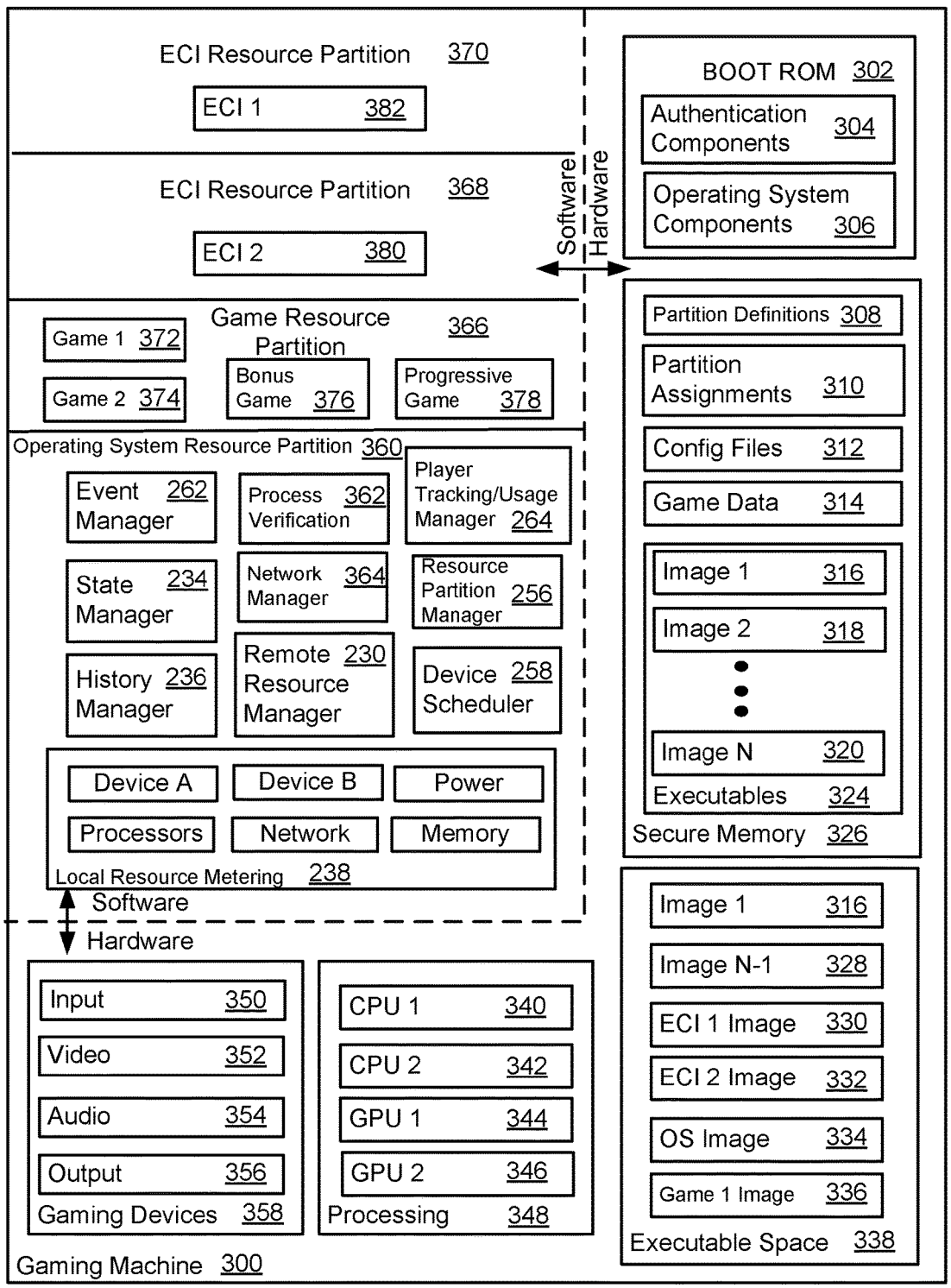
FIGS. 3A, 3B, and 3C are block diagrams showing hardware and software components and their interactions on a gaming machine for embodiments of the systems and methods.
Figure 3B:
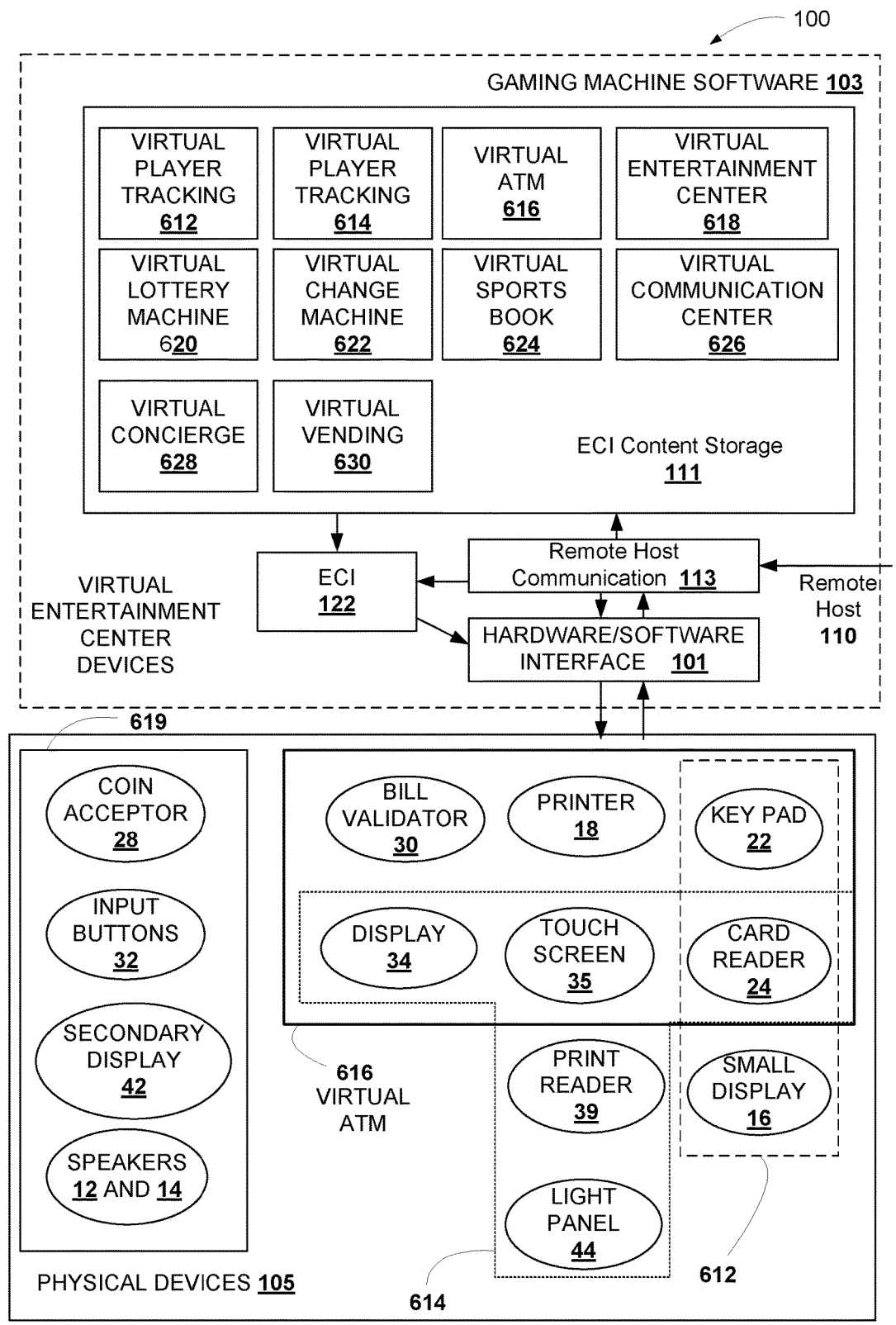
Figure 3C:
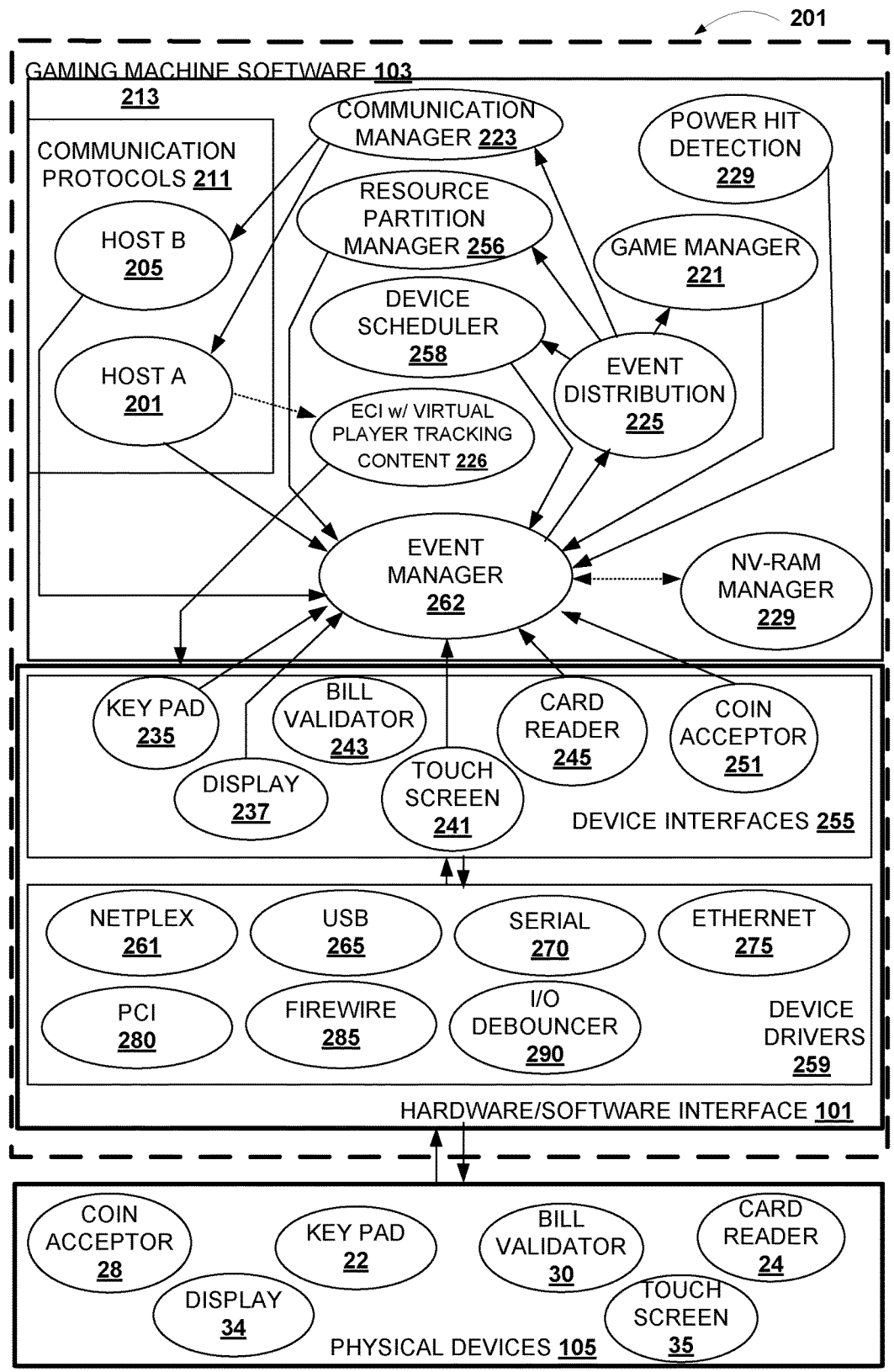

FIGS. 3A to 3C is a block diagram showing hardware and software components and their interactions on a gaming machine for embodiments of the systems and methods for interfacing with a third-party application. In embodiments of the systems and methods, the operating system may maintain "resource partitions." A resource partition may be logical abstraction implemented in the operating system logic that enables the operating system to monitor and limit the resources used by all of the process or process threads executing in each resource partition. At any given time, a resource partition may include one or more member processes or member process threads. For example, in one embodiment of the present invention, a QNX operating system (Ottawa, Canada) may be employed. With QNX, each thread of execution may be individually assigned to a different resource partition. Thus, one process may have several threads each running in different partitions. In general, the operating system may be a portable operating system interface (POSIX) compliant operating system, such as Unix and Linux variants, Windows™ NT, 2000, XP, Vista, etc.

Resource partitioning is one example or aspect of virtualization. Virtualization is the process of presenting a logical grouping or subset of computing resources so that they can be accessed in ways that give benefits over the original configuration. In particular, virtualization may provide techniques for hiding the physical characteristics of computing resources from the way in which other systems, applications, or end users interact with those resources. These techniques may include making a single physical resource (such as a server, an operating system, an application, or storage device) appear to function as multiple logical resources; or it can include making multiple physical resources (such as storage devices or servers) appear as a single logical resource. Virtualization may refer to the abstraction of resources in many different aspects of computing and may include virtual machines and systems management software. Thus, the examples of resource partitioning and other virtualization examples are provided for illustrative purposes only and are not intended to limit the invention to virtualizations providing only resource partitioning or the other examples of virtualization mentioned herein.

As noted above, threads may be assigned to different partitions in some embodiments of the present invention. A thread may be short for a thread of execution. Threads are a way for a program to split itself into two or more simultaneously (or pseudo-simultaneously) running tasks. Threads and processes differ from one operating system to another, but in general, the way that a thread is created and shares its resources may be different from the way a process does.

Multiple threads may be executed in parallel on many computer systems. This multithreading may be provided by time slicing, where a single processor switches between different threads, in which case the processing is not literally simultaneous, for the single processor is only really doing one thing at a time. This switching can happen so fast as to give the illusion of simultaneity to an end user. For instance, a typical computing device may contain only one processor, but multiple programs can be run at once, such as an ECI for player tracking alongside an a game program; though the user experiences these things as simultaneous, in truth, the processor may be quickly switching back and forth between these separate threads. On a multiprocessor system, threading can be achieved via multiprocessing, wherein different threads can run literally simultaneously on different processors.

In various embodiments, multiprocessor systems with multiple CPUs may be used in conjunction with multiprocessing. For example, an ECI process or ECI thread may be executed on one or more CPUs while a game is executed on one or more different CPUs. In a particular embodiment, in a multiprocessor system, CPU accessibility may be limited according to the application. For instance, ECIs may be only executed on certain processors and games on other processors. The ECIs may be prevented from utilizing processors dedicated to executing games or other applications.

Threads are distinguished from traditional multi-tasking operating system processes in that processes are typically independent, carry considerable state information, have separate address spaces, and interact only through system-provided inter-process communication mechanisms. Multiple threads, on the other hand, typically share the state information of a single process, and share memory and other resources directly. Although, as noted above, threads of the same process may be assigned to different resource partitions. Context switching between threads in the same process may be typically faster than context switching between processes.

In general, the term, "process" refers to a manipulation of data on a device, such as a computer. The data may be "processed" in a number of manners, such as by using logical instructions instantiated in hardware, by executing programming logic using a processor, or combinations thereof. Thus, a "process" for the purposes of this specification may describe one or more logical components instantiated as hardware, software or combinations thereof that may be utilized to allow data to be manipulated in some manner. Therefore, the terms "process", "processes", and "process thread" as described are provided for the purposes of clarity only and are not meant to be limiting.

Four resource partitions, 360, 366, 368 and 370 are illustrated in FIG. 3A. An operating system resource partition 360 that includes processes (or process threads) executed by the operating system. A game resource partition 366 from which game processes (or process threads) are executed. An ECI resource partition 382 from which a first ECI process 382 (or ECI process thread) may be executed and an ECI resource partition 368 from which a second ECI process 380 (or ECI process thread) may be executed. As noted above, resource partitioning may be performed at the process level, the process thread level or combinations thereof.

In one embodiment, resource partition definitions 308, such as resources allocated to each resource partition and processes that are enabled to execute in each partition (e.g. partition assignments 310) may be stored in the secure memory 326. Data stored in the secure memory may have been authenticated using the authentication components 304 stored on the Boot ROM 302. When a process is launched by the operating system, it may check to see which resource partition to assign the process using the partition assignments 310, which may include a list of processes that may be executed in each partition. In one embodiment, some processes may be assigned to more than one resource partition. Thus, when the resources associated with a first resource partition are being fully utilized, the process may be executed from a second resource partition with available resources.

In another embodiment, the partition assignment information may be stored with each executable image, such as images, 316, 318 and 320. When a process or process thread is launched, the operating system may determine which partition to assign the process or the process thread (In general, each process will have at least one process thread). With this method, new executable images may be downloaded to the gaming machine from a remote device that are not listed in the partition assignments 310 and still be assigned to a resource partition.

In a particular embodiment, the operating system may only allow one ECI process or ECI process thread to execute in a partition at one time. In other embodiments, a plurality of ECI processes may be executed from a single partition at one time. When only a single ECI process is allowed to execute from a partition at one time, the amount of resources available to the ECI process occupying the partition may be more predictable. This type of architecture may be valuable when ECIs are provided from two or more different hosts simultaneously where each remote host doesn't necessarily know the resource requirements utilized by an ECI from another remote host. When two or more ECIs are allowed to occupy a single partition and execute simultaneously, the resources provide to each ECI, respectively, may be more vary more if each respective ECI is competing for a limited amount of resources.

The resource competition may be become more acute when the resources needed by two or more ECIs are near or greater than one or more resources (e.g., CPU cycles or memory) provided in a partition. In some embodiments, the gaming machine may prioritize resource utilization by each ECI process. For instance, an execution priority may be assigned to each ECI process executing in a resource partition such that based on the priority one ECI process is favored over another ECI process when they are both competing for resources.

The priority assigned to each ECI process may be based on another factors. A priority to resources may be assigned to an ECI process based upon its function. For instance, an ECI for providing a bonus interface may be given a higher priority to resources than an ECI for providing advertising. In another embodiment, a priority may be assigned to an ECI process in accordance with a price paid to allow the ECI process and its content to be presented on the gaming device. In general, prioritization for utilizing resources is another way of providing virtualization on a gaming device.

Resources that may be monitored and limited for each partition include but are not limited CPU usage, memory usage, such as RAM usage, NV-RAM usage, disk memory usage, etc., GPU (graphics processing usage), network bandwidth, sound card usage and access to gaming devices, such as displays, audio devices, card readers, bill validators (e.g., as described with respect to FIG. 2, for some resource partitions, for security purposes, access to certain devices, such as bill validators and cashless devices, or device features may not be available). Resources that may be monitored on the gaming machine 300 include the executable space 338, the processing devices 348, the gaming devices 358 and the secure memory 326. The local resource metering process 238 may monitor resource usage for each partition. In FIG. 3A, the local resource metering process 238 is shown monitoring, device A, device B, network bandwidth usage, processor usage of processors, 340 and 342, power usage, and memory usage.

The local resource metering process 238 may report information to the resource partition manager 256. In particular embodiments, based upon limits placed on each resource partition, the resource partition manager 256 may prevent new processes from executing in a particular resource partition or may even terminate certain processes to free up resources processes executing in other partitions. For example, if the output of the game on the gaming machine 300 is less than optimal because of the resources utilized by the ECI 380 or ECI 382, the gaming machine may suspend execution or terminate execution of one or both of the ECI 380 or ECI 382.

In particular embodiments of the systems and methods for interfacing with a third-party application, prior to enabling a remote host to control an ECI on the gaming machine 300 and based on its resource partitioning system, the gaming machine 300 may notify the remote host of information regarding the resources it may have available to use while the ECI it wishes to control is executing on the gaming machine 300. In one embodiment, the remote resource manager 230 may report this information to the remote host. In another embodiment, the gaming machine may broadcast its available resources to a plurality of remote hosts that may control an ECI on the gaming machine 300. These messages may be broadcast at regular intervals and change depending on a current resource utilization on the gaming machine.

The resource information may include information regarding an upper limit of resources that may be available (e.g., a maximum of 10% CPU usage, 100 MB of RAM), a lower limit of resources that may be available (e.g., a minimum of 5% CPU usage, 50 MB of RAM, no audio capabilities), a prediction of a range of resources that may be available over time (e.g., at least 400.times.300 pixel window with periodic access to a 1600.times.1200 pixel window and at least 4 channels of 32 channel sound card with periodic access to all channels), a prediction of platform performance based on the available resources (e.g., an output frame rate of 25 frames per second at 60 Hz screen refresh rate using 16 bits of color). An upper and lower limit of resources may be provided because the resources available on the gaming machine may change with time while an ECI is executing.

Additional partitioning information may include a display mode, such as a translucent overlay of the game screen or a display location (e.g., left third of the display screen). Further, information sent to the remote host may include game theme, graphics and sound information currently executing on the gaming machine 300. The remote host may utilize this information to customize content for an ECI executing on the gaming machine 300 that is thematically consistent with a game executing on the gaming machine 300.

In addition, the gaming machine may send, within a command, file information to the remote host information regarding files, such as application files executed by an ECI, stored in the resource partitions. The files may have been previously downloaded from the remote host or a different remote host at an earlier. One or more files or information/data/commands within the one or more files may be of use to the remote host and thus, the remote host may structure a download based on the file information. For instance, the remote host may download files/data/content that is only needed in addition to the files/data/content already stored on the gaming machine.

In response to receiving a command including the resource information from the gaming machine, the remote host may determine whether the resources are adequate to output the content it wishes to present on the gaming machine via the ECI. In some embodiments, the remote host may adjust the content to output via the ECI to account for the available resources. For instance, when resources are limited, pre-rendered images, 2-D graphics or vector-based graphics may be used instead of dynamically rendered 3-D graphics. As another example, if network traffic is high, such that the network bandwidth is limited, the remote host may reduce the amount of data sent to gaming machine. Details of graphical related apparatus and methods that may be utilized in embodiments of the present invention are described with respect to U.S. Pat. No. 6,887,157, filed Aug. 9, 2001, by LeMay, et al., and entitled, "Virtual Cameras and 3-D gaming environments in a gaming machine," which is incorporated herein and for all purposes.

In a particular embodiment, the remote host may request additional resources than the gaming machine 300 indicates are available. In response, the gaming machine 300 may temporarily create a resource partition, such as 370 or 368, or another type of virtualization (e.g., a virtual machine) that enables the remote host to access the additional requested resources while the ECI is executed. In other embodiments, the resources available on the gaming machine may not be suitable for the content that the remote host has available and the remote host may decide not to control an ECI, such as 382 or 380.

One advantage of using a virtualization, such as resource partitions, may be that a remote host in control of an ECI on a gaming machine may be enabled to control of resources while guaranteeing adequate game performance. A gaming machine operator always wants a game player to be presented with a quality game experience including event presentations with desirable graphics and sounds. If providing access to gaming machine resources via an ECI results in an excessive degradation of the game experience (e.g., the graphics become jagged or jumpy), then sharing of gaming resources using an ECI would not be desirable. New gaming machine are becoming increasingly powerful in their capabilities. The use of ECIs in combination with resource partitioning enables under utilized gaming machine resources to be used in an effective manner while insuring that a quality game experience is always is provided to a game player.

Another advantage of using a virtualization, such as resource partitions, may be that testing requirements related to the development of game software and ECI software may be simplified. One method of ensuring a quality game experience is maintained on a gaming device while a game process for generating a game is executing on the gaming device while one or more ECI processes are executing is to extensively test the one or more ECI processes and game process. Testing every possible ECI process in combination with one or more possible ECI process in conjunction with every different game variation quickly becomes very unattractive in terms of both cost and time.

Using virtualization, where the maximum resources allowed to be utilized by one or more ECI processes are prevented from exceeding a set limit, the gaming software for generating a game on the gaming machine may be tested where a maximum resource utilization allowed for the one or more ECI processes is simulated while the game is being executed. The game may be tested under a variety of operational specifications, such as when it is using a maximum number of CPU cycles or graphic processor cycles, to ensure that the generated game is adequate at the maximum resource utilization specification allowed for the one or more ECI processes. After the testing, it may be concluded that the game performance will be adequate for any combination of one or more ECI processes using up to the maximum allowable resources for the ECIs. Thus, new ECI processes may be developed after the game is released without having to test the performance of the game in combination with each new ECI.

In addition, each ECI process may be tested to determine whether they perform adequately under various resource specifications up to the maximum resources allowed for a single ECI on a gaming device. This process may allow ECI developers to develop and test ECIs and associated content that are appropriate for different resource ranges up to the maximum allowed resources without needing to test them in combination with each possible game. Further, the developer may develop multiple ECIs and associated content to perform a particular function using different amount of resources with the knowledge that each ECI will perform adequately after testing. For example, a first ECI may use vector graphics to provide an animation, which requires less memory and allows for a faster download time, as compared to a second ECI that uses pre-rendered bitmaps to provide the animation where the function of the first and second ECI are the same.

As described above, in regards to virtualization, the present invention is not limited to resource partitioning. Other examples of virtualization that may be employed in embodiments of the present invention are described as follows. Via Intel's Virtualization Technology (or the corresponding AMD technology), these microprocessor vendors have introduced features in their micro-architectures that may improve the processor's ability to run multiple operating systems and applications as independent virtual machines. Using this virtualization technology, one computer system can appear to be multiple "virtual" systems. Thus, in various embodiments, a gaming environment utilizing virtual gaming machines where the operating systems may vary from virtual gaming machine to virtual gaming machine may be employed. In a particular embodiment, a virtual gaming machine may use a core of a multi-core processor.

A virtual gaming machine may use a virtual machine monitor (VMM) A virtual machine monitor may be a host program that allows a single computer to support multiple, identical execution environments. All the users may see their systems as self-contained computers isolated from other users, even though every user is served by the same machine. In this context, a virtual machine may be an operating system (OS) that may be managed by an underlying control program.

Low interrupt latency, direct access to specialized input/output (I/O) interface, and the assurance that a VMM won't "time slice away" the determinism and priority of real-time tasks may be important for a real-time virtual gaming machine used in a gaming environment. In one embodiment, the combination of multi-core CPUs and Intel VT or a related technology may be used to build a real-time hypervisor based on dynamic virtualization.

A real-time hypervisor may be a VMM that uses hardware virtualization technology to isolate and simultaneously host general-purpose operating systems and real-time operating systems. Unlike a static virtualization, the dynamic virtualization implemented by a real-time hypervisor may use an "early start" technique, to take control of the hardware platform. Thus, operating systems may only be allowed to "boot" only after the real-time hypervisor has constructed a virtual machine for them. The guest operating system may be associated with a particular game provided by a software provider. Thus, in the systems and methods described herein, a gaming platform may support games provided by multiple software vendors where different games may be compatible with different operating systems.

In the processors that include Intel VT an overarching operating-mode has been added, called VMX root, where a hypervisor executes with final control of the CPU hardware. A hypervisor that uses Intel VT may intercept key supervisor-mode operations executed by any software operating outside of VMX root without requiring a prior knowledge of the guest OS binaries or internals. Using this Intel VT hardware assist for virtualization, one may build a hypervisor VMM that hosts protected-mode operating systems executing in ring 0 without giving up control of key CPU resources. Also, Intel VT provides a way for the VMM to implement virtual interrupts.

In the systems and methods described herein, static and dynamic virtualization may be used. Nevertheless, two advantages to building a multi-OS real-time system by using dynamic virtualization rather than static virtualization may be: first, a wide range of operating systems, both general-purpose and real-time, may be supported and, second, the boot sequence for each guest OS may be under the control of the hypervisor. The second advantage means it may possible, in embodiments of the systems and methods, to restart one guest OS while other guest operating systems continue to run without interruption.

TenAsys provides an example of a hypervisor that may be used in embodiments of the present invention. The hypervisor may be capable of supporting the demands of a Real-time operating system (RTOS) while simultaneously hosting a general-purpose operating system (GPOS), like Windows or Linux. The hypervisor may enhance real-time application responsiveness and reliability in a "multi-OS, single-platform" environment, by providing control over interrupt latency and partitioning of I/O resources between multiple guest operating systems.

In various embodiments, the hypervisor may be used to distinguish between resources that may be multiplexed by the VMM and those that are exclusive to a virtual machine. For example, When user interface I/O is not associated with time-critical events, input devices like the keyboard, mouse, console, disk, and an enterprise Ethernet interface may be multiplexed and shared between all virtual machines. However, hardware that is specific to a real-time control application, such as a video capture card, fieldbus interface, or an Ethernet NIC designated for communication with real-time I/O devices, may not be multiplexed between virtual machines. Using the hypervisor, specialized real-time I/O may be dedicated to its real-time virtual machine, so the RTOS and application using that I/O can maintain real-time determinism and control.

In one embodiment of a VMM some or all of the memory in each virtual machine may be swapped to disk, in order to more efficiently allocate limited physical RAM among multiple virtual machines. In another embodiment, a real-time hypervisor may be used to guarantee that each real-time virtual machine is locked into physical RAM, and is never swapped to disk. This approach may be used to insure that every real-time event is serviced consistently, with deterministic timing. In yet another embodiment, the hypervisor may be used to dedicate a core in a multi-core processor to a virtual machine, such as a virtual gaming machine.

FIG. 3B is a block diagram of a gaming machine 100 including hardware and software components for one embodiment of the systems and methods for interfacing with a third-party application. The gaming machine 100 may include RNG software or the gaming machine 100 may be a terminal in a central determination system where the random numbers are generated remotely from the gaming machine or combinations thereof (see at least FIGS. 6 and 7 for more possible gaming machine/device embodiments). ECIs that may be used in conjunction with various gaming devices coupled to the gaming machine to provide gaming services on the gaming machine 100 under control of a remote host are described. The ECI's may be a component of gaming machine software 103 and may be executed as processes by a gaming operating system on the gaming machine 100 (see at least FIGS. 1A and 4).

In one embodiment, the gaming operating system is part of the master gaming controller of the gaming machine. The master gaming controller also controls the play of a game of chance on the gaming machine 100. In another embodiment, logic devices separate from the master gaming controller, such as a logic device on a player tracking unit, may also be used to execute the ECI processes.

In one such embodiment, a player tracking unit including a logic device executing an operating system and coupled to the gaming machine may also be used to host ECI processes controlled by remote host including a remote logic device. That is, the gaming machine disclosed herein may be associated with or otherwise integrated with one or more player tracking servers. In this embodiment, the gaming machine and/or player tracking server tracks the player's gaming activity at the gaming machine. In one such embodiment, the gaming machine and/or associated player tracking server timely tracks when a player inserts their player tracking card to begin a gaming session and also timely tracks when a player removes their player tracking card when concluding play for that gaming session. In another embodiment, rather than requiring a player to insert a player tracking card, the gaming machine may utilize one or more portable devices carried by a player, such as a cell phone, a radio frequency identification tag or any other suitable wireless device to track when a player begins and ends a gaming session. In another embodiment, the gaming machine may utilize any suitable biometric technology or ticket technology to track when a player begins and ends a gaming session.

During one or more gaming sessions, the gaming machine and/or player tracking server tracks any suitable information, such as any amounts wagered, average wager amounts and/or the time these wagers are placed. In different embodiments, for one or more players, the player tracking server includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In another such embodiment, the remote host maintains or keeps track of the play and/or other activity on or relating to the gaming machines in the gaming system. In one embodiment, the remote host keeps track of the play on each gaming machine including at least: (1) the amount wagered by the player(s) for each play of the primary game for each gaming machine (i.e., a total or partial coin-in or wager meter which tracks the total or partial coin-in wagers placed on all of the primary games for all of the gaming machines in the gaming system); and (2) the time the wagers are placed or the amount of time between each play of the primary game for each gaming machine. In another embodiment, each gaming machine includes a separate coin-in, wager meter or pool which tracks the total or partial coin-in or wagers placed at that gaming machine. It should be appreciated that the player playing a designed gaming machine may change during this tracking and that this tracking can be independent of the specific player playing the designated gaming machine. It should be further appreciated that the wagers placed may be tracked in any suitable compatible or comparable manner such as credits wagered (i.e., if all of the system gaming machines are of the same denomination) or monetary units (e.g., total dollars or other currency) wagered. It should be further appreciated that tracking in monetary units may account for gaming machines having multi-denominations and/or for gaming machines of different denominations and/or gaming machines which accept different currencies.

Via the remote host communication 113, the ECI 124 may receive content from a remote host 110. As described with respect to at least FIG. 2, a first ECI may receive content from a first remote host and a second ECI may receive content from a second remote host. In a particular embodiment, the content received from the remote host 110 comprises video and/or audio content that may be output on display devices, such as 16, 34, and 42 and audio devices, such as 12 and 14, coupled to the gaming machine 100. Further, the remote host 110 may send via the remote host communication 113 a command, which is one of a plurality of commands within a specific set of commands described below, including instructions for controlling the physical devices 105 and also receive input from the physical devices 105. The remote host 110 may send via the remote host communication 113 a command, which is one of the commands within the specific set of commands, including content/instructions to the ECI and instructions for controlling one or more of the physical devices 105. The instructions for the physical devices 105 from the remote host 110 may be routed from the remote host communication to the hardware/software interface 101 and then to the physical devices 105.

A program, such as an Adobe™ flash player or compatible player, may be used to output content received from the remote host. The program may be used to output content for a number of different game services, such as player tracking, ATM, communications, lottery, concierge, reservations and entertainment. In some embodiments, the gaming machine may not store content related to a particular ECI. After the ECI is launched, the ECI may loaded into a memory device or a protected memory space on the gaming machine 100, then the gaming machine 100 may load content received from the remote host directly into volatile memory. After the ECI is terminated, the downloaded content associate with the ECI may be lost and the volatile memory used by the ECI may be assigned to other processes. In one embodiment, streaming of information, such as video and audio information, may be employed.

In one embodiment, the memory device of the gaming machine includes, but is not limited to, random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming machine disclosed herein. In one alternative embodiment, part or all of the program code and/or operating data described above can be stored in a detachable or removable memory device, including, but not limited to, a suitable cartridge, disk, CD ROM, DVD, flash memory, or USB memory device.

In another embodiment, the content associated with a particular ECI may be loaded into volatile memory but may also be stored to a non-volatile memory, such as disk memory or flash memory. In FIG. 3B, content related to a number of ECI's is stored on the gaming machine and illustrated as ECI content storage 111. An advantage of this approach is that when a remote host provides a game service multiple times on the gaming machine 100, the host may be able to use some content previously stored on the gaming machine and thus, reduce a size of a download that is needed to provide the game service.

Storage of previously used ECI content, such as ECI content storage 111, may lead to additional communications between the remote host 110 and the gaming machine 100. For example, the remote host 110 and the gaming machine 100 may comprise logic that enables the remote host 110 to 1) determine and validate the ECI content 111 stored on the gaming machine 100 and 2) direct the ECI 122 to load content from the ECI content storage 111. The ECI 122 may load content storage 111 in combination with content received directly from the remote host 111 to provide a game service.

In another example, the remote host 110 and/or the gaming machine 100 may comprise logic that determines what content to save to the ECI content storage 111 and what content to delete from the ECI content storage 111. In one embodiment, content may be deleted from the ECI content storage 111 when a storage limit is reached. In another embodiment, content may be deleted when it becomes old or outdated. The remote host may send information to gaming machine that prioritizes what content to delete first. Thus, for example, when a storage limit is reached, the gaming machine may delete content with a lower priority prior to deleting content with a higher priority. In another example, stored content may relate to upcoming events that may eventually pass or linked to a holiday period that may pass. As another example, the stored content may be simply changed to maintain player interest. In yet another example, the gaming machine track a last time content was utilized or a frequency of utilization and delete content items that were last used a long time ago versus recently used content items or delete content items that are used more frequently before deleting content items used less frequently.

Examples stored ECI content include but are not limited to 1) virtual player tracking 612 and 614 which may be used to provide player tracking services, 2) a virtual Automatic Teller Machine (ATM) 616 which may enable the gaming machine to provide fund transfers and monetary account management, 3) a virtual entertainment center 618 which may enable the gaming machine to provide one or more entertainment services besides game play to the game player, 4) a virtual lottery machine 620 that may enable a player to purchase a lottery ticket of some sort at the gaming machine, 5) a virtual change machine 622 that may enable a player to obtain change at a gaming machine, 6) a virtual sports book 624 that may enable a player to make a wager on an event at the gaming machine, to monitor events, to receive results and to cash out a winning event ticket, 7) a virtual communication center 625 that may enable a player to a) communicate with other game players, other individuals or a casino host, b) send and receive e-messages and/or c) locate other players, 8) a virtual concierge 628 that enables a player to a) learn about and obtain various hotel/casino, restaurant, entertainment and travel services and b) make reservations, 9) a virtual vending machine 628 that enables a player to purchase various vending items at the gaming machine and 10) a virtual kiosk (not shown) that enables for a) Internet enabled services, such as web-browsing, b) registration services such as for a loyalty program and c) comping and prize redemption associated with a loyalty program. As is described above, the ECI content doesn't have to be permanently stored on the gaming machine and may be received directly from the remote host 110 and stored temporarily in a non-volatile memory, such as a RAM while the ECI 124 is executed. Additional applications that may be adapted to provide embodiments using ECIs on a gaming machine are described with respect to U.S. Pat. No. 6,712,698, titled, "Game Service interfaces for Player Tracking Touch Screen Display," originally filed, Sep. 20, 2001, U.S. Pat. No. 6,942,574, entitled, "Method and Apparatus for Providing Entertainment Content on a Gaming machine," originally filed Sep. 19, 2000 and U.S. Pat. No. 6,997,803, entitled, "Virtual Gaming Peripherals for a gaming machine, originally filed Mar. 12, 2002 each of which are incorporated herein by reference and for all purposes.

The virtual vending machine 628 may enable a gaming machine to dispense items directly to the player, enable the player to order an item, which is brought to the player or sent to the player, or dispense a media that is redeemable for the item. In addition, the virtual vending machine 628 may be used to redeem or order prizes or merchandise. The virtual player tracking ECI's, 612 and 614, may be used to provide player tracking services. Addition details of player tracking services that may be incorporated into an ECI are described in co-pending U.S. application Ser. No. 09/642,192, filed Aug. 18, 2000, by LeMay, et al. and entitled, "Virtual Player Tracking and Related Services," which is incorporated herein in its entirety and for all purposes.

As described above, the ECI may output its content to a combination of gaming devices in the physical gaming devices 105 to provide a gaming service and present its content. In one embodiment, the ECI process may control or issue commands to devices and the remote host controlling the ECI may also issue commands to physical devices in conjunction with the ECI. Four examples of gaming device combinations are shown for illustrative purposes. The device combinations utilized by an ECI and a remote host may vary according to the gaming devices available on a particular gaming machine.

As an example of device combinations that may be used with an ECI and a remote host 110, the remote host may control the virtual ATM ECI 616 in conjunction the bill validator 30, the printer 18, the key pad 22, the display 34, the card reader 24 and the touch screen 35 to provide ATM services. The card reader 22 may be used to accept an ATM card. The key pad 22 may be used to enter a pin number. The bill validator 30 may be used to accept cash or printed tickets with a cash value. Funds entered into the gaming machine may be transferred to a bank account. The display 34 and the touch screen 35 may be used to display and select various ATM services. The printer 18 may be used to provide receipts and print cashless tickets, which may be used for game play in other gaming machines.

A virtual sports book ECI 624 and the virtual lottery machine ECI 620 may also provide services using the combination of devices described for the virtual ATM ECI 616. However, the context in which the devices are used may be different. For instance, the printer 18 may be used to print a lottery ticket for the virtual lottery machine 620 and a wager ticket for the virtual sports book 164 instead of a receipt. Also, the display 34 and touch screen 35 may be used to display and make lottery and sports bets selections instead of ATM selections. Logic residing on the remote host 110 may enable it determine the context the device is being used.

As another example, a virtual entertainment center peripheral ECI 618 may control a payment or coin acceptor 28, input buttons 32, the secondary display 42 and speakers 12 and 14 to provide entertainment sources to a player. In one embodiment, the virtual entertainment center ECI 618 may act as a musical video jukebox. Using the input buttons 32, a player may select musical videos, which are output on the secondary display 42 and speakers 12 and 14. In another embodiment, the player may be able to select a musical format, which is output on speakers 12 and 14. In yet another embodiment, the player may be able to watch a sporting event on the secondary display while playing a game on the gaming machine. In some cases, the player may be required to deposit money via the payment acceptor 28 to use the virtual entertainment center.

In yet another embodiment, a player may be enabled to win or purchase entertainment content and then download the entertainment content to a portable device carried by the player. An interface for communicating with the portable device, such as a wireless interface, may be coupled to the gaming machine to enable the download to the portable device. In another example, the player may receive a voucher valid for the entertainment content that is redeemable at another location.

In yet another example of a gaming service provided by an ECI, a virtual player tracking ECI, such as 612 and 614, may be used to provide player tracking services. Different combinations of gaming devices may be used to provide the same gaming service. For instance, the first virtual player tracking ECI 612 uses the key pad 22, the card reader 24 and the small display 16 to provide player tracking services. In another embodiment, instead of the small display 16, a portion of the large display 34, may also be used to output player tracking information.

To start a player tracking session, as described above, the player may insert a player tracking card in the card reader 24, enter a PIN number using the key pad 22 and receive player tracking information via the small display 16. The second virtual player tracking ECI 614 uses the display 34, the touch screen 35, the card reader 24, a finger print reader 39 and a light panel 44. To start a player tracking session, the player may insert a player tracking card in the card reader 24, provides finger print information via the print reader 39 and receives player tracking information via the display 34. Using the touch screen 35, the player may be able to select choices from player tracking service menus and interfaces displayed on the display 34, enter a PIN or provide other alphanumeric input. The light panel 44 may be used to convey to a player operational information. For example, the light panel may change color or flash when a player has inserted their player tracking card incorrectly in the gaming machine.

In one embodiment, one or more ECI processes described above are available to non-player tracking carded players. In one such embodiment, the gaming system provides one or more ECI processes to a non-carded player and informs the player of the different ECI processes that would become available to the player if the player were to obtain a player tracking card. In one embodiment, the gaming system enables the player to enroll in the player tracking system at the gaming machine.

In the systems and methods described herein, one or more ECI processes and game play processes on the gaming machine may share the same gaming device. For instance, the card reader 24 may be used by the virtual automated teller machine (ATM) ECI 616, the first virtual player tracking peripheral 612 and the second virtual player tracking peripheral 614. As another example, the bill validator 30 may be used by the virtual ATM peripheral 616 and by the master gaming controller on the gaming machine.

Traditionally, gaming devices have not been shared by different software elements or processes executing on the gaming machine and the functions of a particular gaming device have been fairly limited. For example, card readers on gaming machine are typically used only to read player tracking information from player tracking cards. Further, the card readers have been in player tracking units with a separate logic device from the master gaming controller that provide control and have not been accessible to a master gaming controller on the gaming machine. As another example, the bill validator 30 is typically used only to insert credits into the gaming machine. Thus, conflicts between different gaming processes wishing to use a gaming device at the same time have not generally had to be considered on gaming machines.

Since a given gaming device may be shared by multiple software entities, the context in which a given device is being used may be important. For example, a player tracking session may be usually initiated when a player inserts a player tracking card into the card reader 24. When a card is inserted into the card reader 24, one of the virtual player tracking peripherals (e.g., 612 or 614) may detect the insertion of the card and initiate the player tracking session. When the virtual ATM peripheral 116 is active, the player may insert an ATM card into the card reader 24 to begin ATM services (inserting the card may also activate the ATM peripheral if it is not active). Thus, one possible scenario using the card reader 24 is that the player has requested an ATM service, the virtual ATM peripheral 116 may be given control of the card reader 24 and the virtual ATM peripheral 116 is waiting for the player to insert an ATM card into the card reader 24. If the player mistakenly inserts a player tracking card into the card reader 24, the virtual ATM peripheral 116 may generate an error because the player tracking card is not an ATM card. In another embodiment, the gaming system disclosed herein may enable credits to be downloaded from a player's account via a player tracking card (and utilizing a designated pin specific to that player). When the virtual ATM peripheral 116 and the virtual player tracking peripheral (112 or 114) may be operating simultaneously, logic on the gaming machine may be required to determine in the situation described above whether a player tracking session is to be initiated or an error is to be generated.

In a particular embodiment, an ECI process executing on the gaming machine may be limited to only outputting video and/or audio content. For instance, the ECI may be limited to outputting only video content on a portion of display 34 and audio content on speakers 12 and 14. In another example, the ECI may be limited to outputting only video content on a portion of display 34.

In general, when a gaming device is shared by two or more entities, such as two or more ECI's or an ECI and another gaming process executed on the gaming machine, and when situations occur where the two or more entities may want to simultaneously use the same shared gaming device, shared gaming device logic may be required to arbitrate control of the shared gaming device. In traditional gaming machines, arbitrating control of a shared gaming device is generally not an issue because most gaming devices are usually either controlled by a single process or used for a single purpose. Control of the shared gaming device may be determined according to the context in which the device is being used. For instance, using the payment acceptor 28 in the context of entering credits to the gaming machine may be given priority over using the coin acceptor in the context to make change using the virtual change machine 622 or to purchase items from the gaming machine using the virtual vending machine 628. Device scheduling and resource management are described with respect to at least FIGS. 2 and 3A.

FIG. 3C is a block diagram illustrating further details relating to the hardware and software shown in FIG. 3B for one embodiment of the present invention. An exemplary software architecture including a number of processes that may be executed by the operating system 213 are shown. The ECI w/virtual player tracking content 226 is a "process" executed by an operating system 213 residing on the gaming machine. In a particular embodiment, a protected "process" may be defined as a separate software execution module that is protected by the operating system and executed by a logic device on the master gaming controller 224. When a process, including the ECI 226, is protected, other software processes or software units executed by the master gaming controller can't access the memory of the protected process. A process may include one or more process threads associated by the process.

The operating system 213 used to implement the gaming software architecture of the systems and methods described herein may be one of a number of commercially available operating systems, such as QNX by QNX Software Systems, LTD of Kanata, Ontario, Canada which is Unix-like, Windows NT, 2000, XP, Vista by Microsoft Corporation of Redmond, Wash. or Linux or a Linux variant, such as by Redhat, Durham, N.C., which is an open source Unix based operating system. Different operating systems may use different definitions of processes. In QNX, the processes are protected. With other operating systems, a "process" may be dedicated logic that is executed. Using different operating systems, many different implementations of the systems and methods described herein are possible and the systems and methods are not limited to the constraints of a particular operating system.

A few details of the processes that may be executed on gaming machines of the systems and methods described herein are as follows. The NV-RAM manager 229 controls access to the non-volatile memory on the gaming machine. By using the NV-RAM manager 229, the gaming processes may share the non-volatile memory resource at the same time. Thus, the non-volatile memory usage is optimally used which may lower the costs associated with adding new functions to the gaming machine. In some embodiments, ECI processes may be prevented from accessing non-volatile memory for security purposes in other embodiments the ECI processes may be enabled to send and receive information stored in a non-volatile memory on the gaming machine.

Other processes that may be considered part of the operating system include but are not limited to a communication manager 223, a partition manager 256, an event manager 263, a game manager 221, a power hit detection process 228, a device scheduler 258 and an ECI process 226, which for illustrative purposes provides player tracking content. The player tracking ECI process 226 in conjunction with logic executed on a remote host may be used to provide player tracking services using the card reader 24, the key pad 22, the finger-print reader 39 and the light panel 44 as described with respect to FIG. 3B.

The device scheduler 258 may be used to arbitrate control and manage the usage of one or more shared devices on the gaming machine. A "shared device" may refer to a physical device on the gaming machine that may be used in different contexts for multiple purposes. For instance, the display 34 may be used to output the results of a game of chance generated on the gaming machine via the game manager 221 and may be used to output player tracking content from player tracking ECI 226. The game manager process 221 and the ECI 226 may at times use the display 34 at the same time to control a varying portion of the display including a control of the entire display area. The device scheduler 258 may be used to determine which process under what circumstances is given access to how much of the display 34.

As described above with respect to FIG. 3C, the device scheduler 258 process may arbitrate requests, in particular concurrent requests, to use a shared gaming device, such as the display 34, from the different gaming processes executed by the gaming operating system or requests from processes executed on a remote host and determine which entity is given access to the shared gaming device, based on priority settings. For example, processes related to the output of the game of chance may be given a higher priority than ECI processes. Thus, when the game manager 221 needs control of the entire display 34, the ECI process 226 may lose access to the display 34 or may not be given access to the display in the first place.

In a particular embodiment, player inputs may affect access to a shared device. In one embodiment, an input switch or other type of input mechanism may be provided on the gaming machine that enables an ECI to be displayed or hidden. Thus, when a player actuates the switch, the gaming machine may allow or not allow the ECI to access the shared display. The gaming machine may have a default position, such as to allow an ECI to be generated or not generated in response to a player input, which may be changed by an input received on the gaming machine. The gaming machine may return to the default position after certain events, such as but not limited to the credits reaching zero on the gaming machine, a player tracking card being inserted/removed, determining that a player playing the gaming machine has changed or after a time period has expired.

In some instance, the gaming machine may override the player's selection not to provide the ECI. For instance, when input has been provided that indicates the player doesn't wish to see the ECI, the gaming machine may allow an ECI to access particular resources, such as a display, intermittently, such as in response to certain events. Thus, briefly or for some time period, the gaming machine may allow the ECI to generate its interface and then after the time period is expired, not allow the ECI to generate its interface. For instance, after a cash out request, the gaming machine may allow an ECI that provides promotional credits that may keep the player playing to be displayed even though an input had previously been received at the gaming machine indicating that the player didn't wish to see an ECI.

The device scheduler 258 may also include logic for determining when to route information received from physical device 105 via the hardware/software interface 101 to a remote host. For example, after an ECI process is launched and access is granted to a portion of touch screen display, input from the touch screen corresponding to the portion of the display controlled by the ECI may need to be routed to a host remote. Although, as previously noted with respect to at least FIGS. 1A-1C, the ECI may also include information handling capabilities that allow it to process and route information received from one of the physical devices.

In FIG. 3C, raw data received from a device, such as the touch screen 35 or card reader 24, may be posted as an event to the event manager 262 via a device driver in 259 for the touch screen or card reader and a device interface 255, such as a touch screen device interface 241 or card reader interface 245. As an example, the device scheduler 258 may see the event and determine that touch screen input has been received and post an event indicating that this information is to be copied and sent to a remote host. The communication manager 223 may see the event posted by the device scheduler 256 and send the information to a remote host using an appropriate communication protocol 211. For example, a remote host A may communicate using the host A protocol 203 while a remote host B may communicate using the host B protocol 205. The gaming devices of the systems and methods described herein may be operable to implement wireless and wired protocols of both a proprietary nature (e.g., Netplex, which is an International Game Technology (IGT™) proprietary protocol) or non-proprietary nature (universal serial bus (USB), wireless fidelity (Wi-Fi), Institute of Electrical and Electronic Engineers (IEEE) 1394-compatable, Ethernet as well as protocols approved by the Gaming Standards Association-GSA, Fremont, Calif., such as slot accounting system (SAS), game-to-system (G2S), or system-to-system (S2S).

The device scheduler 262 may incorporate logic of varying degrees of complexity to route information received from an input device to a remote host. For example, in one embodiment, after an ECI has been instantiated and its relation to one or more devices determined, the scheduler 262 may check to determine whether input has been received from the one or more devices of interest to the remote host. When input is received from one or more devices of interest to the remote host associated with the ECI, such as the touch screen input described in the preceding paragraph, the input may be routed, within a command, to remote host.

After the remote host receives the input, it determines whether the input is of interest and what response to make. For example, the remote host may not control the portion of the display from which the input was received and, thus, determine a response is not necessary. On the other hand, as described with respect to at least FIGS. 1A to 1C, the remote host may determine that the input is from an area on the display controlled by the remote host via the ECI, then send new content to the ECI to displayed on the gaming machine and/or additional instructions to the ECI control what content it is to output (e.g., the content may have already been downloaded to the gaming machine that is needed for output in response to the touch screen input and the remote host may instruct the ECI to output it).

In addition to sending content and/or instructions to the ECI 226 in response to receiving input from a physical device, the remote host may send instructions to the gaming machine that affect its operation. The remote host may send an event that is routed via the event manager 262 to one or more other processes. For example, the remote host may send an instruction to add credits to the gaming machine, which may cause a credit meter to increment and a display of the credits to be adjusted. As previously described, with at least respect to FIG. 2, the gaming machine may provide logic (not shown) for checking whether the remote host is allowed to provide a particular event. For example, all remote hosts may not be allowed to increment credits on the gaming machine. In another embodiment, the remote host may send an event that triggers a feature in a game to be unlocked, which affects the output of the game on the game interface. The game manager 221 may receive this information via the event manager 262 and event distribution 225.

As noted above, the device scheduler 258 or some other process executing on the gaming machine, may include more complex logic for determining what information received from a physical device to route to the remote host. For instance, for each device of interest to the remote host, the device scheduler 258 may have the capability to examine the input information and determine whether it of interest to the remote host. For example, the device scheduler may be able to determine whether the touch screen input is in the area controlled by the host and only route input received from this area. In another example, the remote host may be providing player tracking services but not ATM services, thus when a player tracking card is inserted into the card reader 24, the device scheduler 258 may determine that it is a player tracking card and route it to the remote host. When a credit card is inserted into the card reader 24, the device scheduler 258 may determine, the card is credit card and not route the information to the remote host.

In a particular embodiment, for each shared gaming device, a separate device scheduler process 258 may be used to arbitrate control of the shared gaming device, assess information received from the shared gaming device and direct the information to other processes and host devices. As another example, a device scheduler process 258 may be used to arbitrate control of multiple shared gaming devices. In general, a gaming machine may include multiple device scheduler processes that each manage one or more shared gaming devices.

As described in more detail below, the device scheduler 258 may listen to and respond to game events passed through the event manager 262 and event distribution 225 and more specifically to events that are requests for any of its known contexts to enter or exit. A context may be described as a situation defined in logic where a process may request control of a particular shared gaming device. A process, such as a via one or more process threads, may generate contexts for more than shared gaming device. For instance, the ECI process 226 in conjunction with processes with its associated host may generate contexts for the display 34, the touch screen 35, the card reader 24 and the light panel 44. The display 34, the touch screen 35, the card reader 24 and the light panel 44 may all be shared gaming devices. There are at least two circumstances under which the shared device manager 115 may grant control of the shared gaming device: 1) the current context is finished using the shared gaming device or 2) a higher priority context requires access to the shared gaming device.

Event based requests are one method of controlling access to a shared gaming device. Another method is arbitrated requests that are sent directly to a device scheduler 258 or a similar process. In embodiments of the present invention, event based request, arbitrated request or combinations thereof may be used.

The display 34 is one example of a gaming device that may also be a shared gaming device. Contexts that may request access to the display screen 34 include but are not limited to: a) a menu context that displays machine menu for maintenance situations, b) a tilt context that displays tilts including hand pays for tilt situations, c) a game context that displays regular game play, bonus games and cash outs, d) an attract context that displays attract menus in attract situations, and e) a main menu context that displays a game selection menu and other game service menus available on the gaming machine. The contexts for the display 34 may be generated by various gaming processes active on the gaming machine. For instance, in one embodiment, game service menu contexts may be generated by one or more ECIs, such as the player tracking ECI process 226. As another example, the game manager process 226 may generate the game context. Thus, the display 34 may be a device that may be shared multiple times. A practical limit may be applied to the display 34 or any other shared gaming device to keep the resource from being entirely exhausted.

The contexts described above for the display 34 may be prioritized. In one embodiment, the priorities for the display may be prioritized in descending order from highest to lowest, as the machine menu context, the tilt context, the game context, bonus game context, ECI context, the attract context and the main menu context. When the display is divided into different areas all or a portion of the contexts listed above may apply. For instance, the tilt context may apply for all areas. Thus, when the gaming machine enters a tilt state the tilt context may take over the entire display including all areas in which the display has been subdivided. As another example, certain games or bonus games may use the entire screen at certain times and may be given priority over an ECI context or attract context for the portion of the screen used by the ECI context. In other embodiments, the game context and bonus game context may use a dedicated portion of the display 34 and may not compete with the ECI context for display resources.

In general, the priorities assigned to contexts for a shared gaming device are fixed. However, variable priorities may also be used for some contexts of the shared gaming device. As an example, the priorities of attract mode contexts generated by different ECIs may be increased or decreased as a function of time to emphasize a particular game service. Thus, a priority for an attract mode context for a particular game service provided by a ECI may be increased at particular times such that the attract mode context is displayed more often than other attract mode contexts generated by other ECI processes during the time when its priority is increased. For example, an attract mode context that enables a patron to make a dinner reservation or an entertainment reservation may be emphasized more by increasing its priority in the early afternoon or at other times when the patron may desire these services.

Returning to FIG. 3C, the gaming machine software 201 may comprise communication protocols 211, an event manager 262 and event distribution 225, device interfaces 255, device drivers 259, the game manager 221 which interfaces with gaming processes used to generate the game of chance, game resources such as a power Hit Detection Manager 229, which monitors gaming power, the NV-RAM manager 229 and the communication manager 223, which may be used by other processes, the ECI's, such as ECI 226, the device scheduler process 258 that arbitrates control of one or more shared gaming devices and the resource partition manager 256, which monitors resource usage by different resource partitions as described with respect to FIG. 3A.

The software modules comprising the gaming machine software 201 may be loaded into memory of the master gaming controller 46 (see at least FIGS. 3A and 6) of the gaming machine at the time of initialization of the gaming machine. The game operating system (OS) may be used to load and unload the gaming software modules from a mass storage device on the gaming machine into RAM for execution as processes on the gaming machine. The gaming OS may also maintain a directory structure, monitor the status of processes and schedule the processes for execution. During game play on the gaming machine, the gaming OS may load and unload processes from RAM in a dynamic manner. The gaming OS, associated processes and related gaming data may be authenticated in verified on the gaming machine. Details of the authentication method and apparatus that may be used with the present invention are described in U.S. Pat. Nos. 5,643,086, 6,149,522, 6,620,047, 6,106,396, by Alcorn, et, al., each of which is incorporated by reference and for all purposes. Details of software verification methods that may be used with the present invention are described in U.S. Pat. No. 6,685,567, entitled, "Process verification," filed Aug. 8, 2001, which is incorporated herein by reference and for all purposes.

The NV-RAM manager 229 may be a protected process on the gaming machine to maintain the integrity of the non-volatile memory space on the gaming machine. All access to the non-volatile memory may be through the NV-RAM manager 229 via a defined API. During execution of the gaming machine software 100, the non-volatile manager 229 may receive access requests via the event manager 262 from other processes, including a resource partition manager 256, a game manager 221, an ECI process 226 and one or more device interfaces 255 to store or retrieve data in the physical non-volatile memory space. Other software units that request to read, write or query blocks of memory in the non-volatile memory are referred to as clients.

The device interfaces 255, including a key pad 235, a display 237, a card reader 245, a coin acceptor 251, a bill validator 243 and a touch screen 241, are software units that provide an interface between the device drivers and the gaming processes active on the gaming machine. The device interfaces 255 may receive instructions from virtual gaming peripherals requesting an operation for one of the physical devices. For example, in one context, the player tracking ECI process 226 may send an instruction to the display interface 237 requesting that a message of some type be displayed on the display 34. The display interface 237 sends the message to the device driver for the display 34. The device driver for the display communicates the instruction and message to the display 34 enabling the display 34 to display the message. When the display 34 may be controlled by more than one gaming process (e.g., the game manager 221 may use the display 34 to present the game of chance), the device scheduler 258 or a similar process may assign a priority to the context generated by the player tracking ECI process 226 and grant control of the display 34 to the context depending on whether the display 34 is currently in use. If the display 34 is in use, the device scheduler 258 may determine whether the current context using the device should be switched out for the context generated by the player tracking ECI process 226.

The device interfaces 255 also receive events from the physical devices. In general, events may be received by the device interfaces 255 by polling or direct communication. The solid black arrows indicate event paths between the various software units. Using polling, the device interfaces 255 regularly communicate with the physical devices 105 via the device drivers 259 requesting whether an event has occurred or not. Typically, the device drivers 259 do not perform any high level event handling. For example, using polling, the card reader 245 device interface may regularly send a message to the card reader physical device 24 asking whether a card has been inserted into the card reader.

Using direct communication, an interrupt or signal indicating an event has occurred, may be sent to the device interfaces 255 via the device drivers 259 when the physical devices need to communicate information. For example, when a card is inserted into the card reader, the card reader 24 may send a "card-in message" to the device interface for the card reader 245 indicating a card has been inserted which may be posted to the event manager 262. The card-in message may be an event. Other examples of events which may be received from one of the physical devices 105 by a device interface, include 1) Main door/Drop door/Cash door openings and closings, 2) Bill insert message with the denomination of the bill, 3) Hopper tilt, 4) Bill jam, 5) Reel tilt, 6) Coin in and Coin out tilts, 7) Power loss, 8) Card insert, 9) Card removal, 10) Promotional card insert, 11) Promotional card removal, 12) Jackpot, 13) Abandoned card and 14) touch screen activated.

Typically, the event may be information of some type posted by the device interface. The event is sent by a sender to one or more receivers. As an example, the sender of the card-in game event may be the card reader 24. The receivers for the card-in game event may be a bank manager (not shown), which manages credit transfers to the gaming machine, the communication manager 223 and the player tracking ECI 226. The communication manager 223 may communicate information read from the card to one or more devices located outside the gaming machine, such as a remote host. When the magnetic striped card is used to deposit credits into the gaming machine, the bank manager may prompt the card reader 24 via the card reader device interface 255 to perform additional operations. When the magnetic striped card is used to initiate a player tracking session, the player tracking ECI 226 or a remote host may prompt the card reader 24 via the card reader device interface 255 to perform additional operations related to player tracking. Since multiple contexts may be applied to the card-in event, a device scheduler, such as 258, may be used to determine which context is granted control of the gaming device. For example, the device scheduler 258 may grant control of the card reader to either bank manager 222, the ECI 226 or the remote host (not shown).

An event may be created when an input is detected by one of the device interfaces 255. Events may also be created by one process and sent to another process. For example, when the device scheduler 258 grants control of one shared gaming device to a context, an event may be generated. Further, as previously described, events may also be generated from entities located outside the gaming machine. For example, a remote host may send an event to the gaming machine, via the communication manager 223. The events may be distributed to one or more receivers via a queued delivery system using the event distribution software process 225. However, since the game events may be distributed to more than one receiver, or simply broadcast to the processes executing, the events differ from a device command or a device signal which is typically a point to point communication such as a function call within a program or inter-process communication between processes.

Since the sender of the event, which may be a device interface or a remote host outside of the gaming machine, is not usually directly connected to receiver of the event, the event manager 262 acts as an interface between the source and the one or more event destinations. After the source posts the event, the source returns back to performing its intended function. For example, the source may be a device interface polling a hardware device. The event manager 262 processes the game event posted by the source and places the game event in one or more queues for delivery. The event manager 262 may prioritize each event and place it in a different queue depending on the priority assigned to the event. For example, critical game events may be placed in a list with a number of critical game transactions stored in the NV-RAM as part of a state in a state-based transaction system executed on the gaming machine.

After the event manager receives an event, the event may be sent to event distribution 225 in the gaming system 213. Event distribution 225 broadcasts the event to the destination software units that may operate on the event. The operations on the events may trigger one or more access requests to the NV-RAM via the NV-RAM manager 229. Further, when one or more software units may request control of a shared gaming device in response to the event, then a device scheduler, such as 258, may be used to arbitrate the request.

As another example of event processing, when a player enters a bill into the gaming machine using the bill validator 30, this event may arrive at the bank manager after the event has passed through the device drivers 259, the bill validator device interface 240, the event manager 262, and the event distribution 225 where information regarding the event such as the bill denomination may be sent to the NV-RAM manager 229 by the event manager 262. After receiving the event, the bank manager evaluates the event and determines whether a response is required to the event. For example, the bank manager 222 may decide to increment the amount of credits on the machine according to the bill denomination entered into the bill validator 30. Further, the bank manager 222 may request control of the bill validator. When the bill validator 30 is a shared gaming device, the device scheduler 258 may arbitrate the request to use the bill validator 30. Thus, one function of the bank manager software and other software units that are executed as processes on the gaming machine may be as an event evaluator.

More generally, in response to the event, the bank manager or other processes on the gaming machine may 1) generate a new event and post it to the event manager 262, 2) send an instruction to the device interfaces 255, 3) send an instruction or information to the remote host via the communication manager using one of the communication protocols, 4) do nothing or 5) perform combinations of 1), 2) and 3).

Non-volatile memory may be accessed via the NV-RAM manager 229 via commands sent to the gaming machine from devices located outside of the gaming machine. For instance, an accounting server or a wide area progressive server may poll the non-volatile memory to obtain information on the cash flow of a particular gaming machine. The cash flow polling may be carried out via continual queries to the non-volatile memory via game events sent to the event manager 262 and then to the NV-RAM manager 229. The polling may require translation of messages from the accounting server or the wide area progressive server using communication protocol translators 211 residing on the gaming machine.

The communication protocols typically translate information from one communication format to another communication format. For example, a gaming machine may utilize one communication format while a remote host providing ECI services may utilize a second communication format. The communication protocols 211 may translate the information from one communication format to another enabling information to be sent and received from the server.

The power hit detection process 229 monitors the gaming machine for power fluctuations. The power hit detection process 229 may be stored in a memory different from the memory storing the rest of the gaming machine software 103. When the power hit detection software 229 detects that a power failure of some type may be imminent, an event may be sent to the event manager 230 indicating a power failure has occurred. This event may be posted to the event distribution software 225, which broadcasts the message to all of the processes and devices within the gaming machine that may be affected by a power failure. If time is available, the event may also be sent to processes executing on a remote host.

Device interfaces 255 are utilized with the gaming machine software 213 so that changes in the device driver software do not affect the gaming system software 213 or even the device interface software 255. For example, the gaming events and commands that each physical device 105 sends and receives may be standardized so that all the physical devices 105 send and receive the same commands and the same gaming events. Thus, when one of the physical devices 105 is replaced, a new device driver 259 may be required to communicate with the physical device. However, device interfaces 255 and gaming machine system software 213 remain unchanged. When the new physical device requires a different amount of NV-RAM from the old physical device, an advantage of the NV-RAM manager 229 may be that the new space may be easily allocated in the non-volatile memory without reinitializing the NV-RAM. Thus, the physical devices 105 utilized for player tracking services may be easily exchanged or upgraded with minimal software modifications.

The various software elements described herein (e.g., the device drivers, device interfaces, communication protocols, etc.) may be implemented as software objects or other executable blocks of code or script. In an embodiment, the elements are implemented as C++ objects. The event manager, event distribution, software player tracking unit and other gaming system 213 software may also by implemented as C++ objects. Each are compiled as individual processes and communicate via events and/or interprocess communication (IPC). Event formats and IPC formats may be defined as part of one or more Application Program Interfaces (APIs) used on the gaming machine. This method of implementation is compatible with the QNX operating system.

The operating system and its components have been described in the context of a gaming machine. A master gaming controller 46 on the gaming machine may include the operating system (see at least FIG. 6). The systems and methods for interfacing with a third-party application are not so limited. Gaming processes may also be activated by operating systems executed by logic devices different from the master gaming controller on the gaming machine. For instance, a peripheral device, such as a player tracking unit, mounted to a gaming machine may include a logic device that executes an operating system. The operating system on the gaming peripheral may be the same or different from the operating system executing on the master gaming controller on the gaming machine.

The peripheral device may include one or more devices. Like the gaming machine activating a process that controls the devices located on the peripheral device, the logic device on the gaming peripheral may activate processes that control the devices located on the peripheral device and the gaming machine. Further, like the gaming machine, the gaming machine may execute ECI processes under control of a remote host. In another embodiment, the peripheral device may act as a remote host to an ECI process executed on the gaming machine. For instance, a player tracking unit coupled to the gaming machine may act as the remote host for the player tracking ECI process 226 executed on the gaming machine. In yet another embodiment, the gaming machine may act as a remote host to an ECI process executing on another gaming device, such as another gaming machine.

Figure 4A:
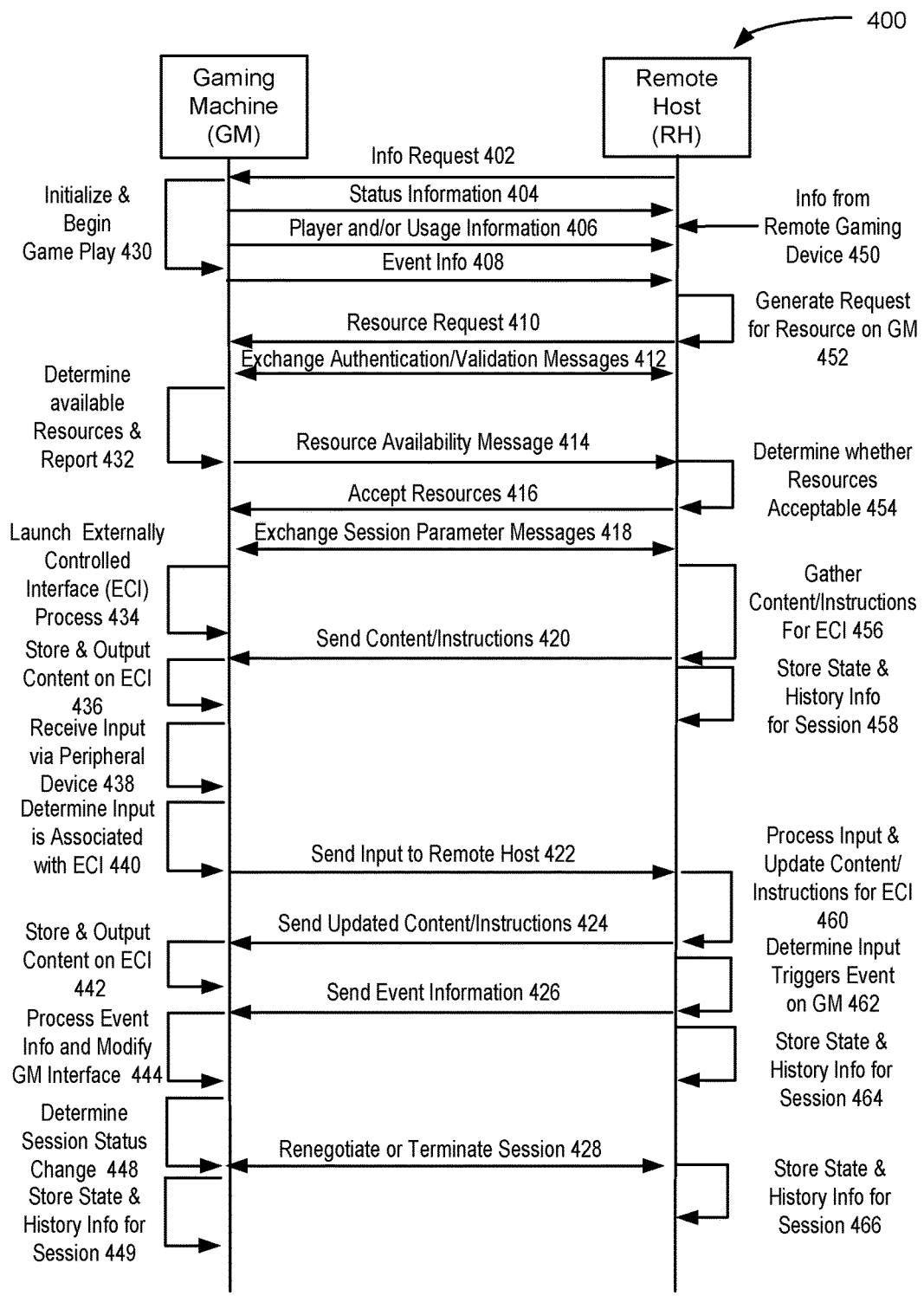
FIG. 4A is an interaction diagram between a host and gaming machine for one embodiment of the systems and methods.

FIG. 4A is an interaction diagram 400 between a host and gaming machine for one embodiment of the systems and methods described herein. The gaming machine may be operable to provide access to resources that may be controlled by the remote host as part of an ECI described above with at least respect to FIGS. 1A to 3C. In 430, the gaming machines powers up and becomes available for game play. At some time, the gaming machine may establish a relationship with a remote host. For example, in one embodiment, as part of an initialization phase on the gaming machine, a communication link may be established between gaming machine and the remote host. When a communication link is established between the gaming machine and the remote, the gaming machine and remote host may exchange authentication/validation messages 412 that enable both the gaming machine and the remote host to determine that the communications are from a valid source. This process may utilize methods known in the art, such as exchanging information encrypted or signed with public and private key pairs.

After a communication link is established between the remote host and the gaming machine, information may be exchanged between the devices that may be used to determine when to trigger an instantiation of an ECI on the gaming machine. In different embodiments, information requests may be initiated by remote host in 402 or may be initiated by the gaming machine. The information requests may be event driven, may occur at regular intervals as a result of polling messages initiated at the host or the gaming machine, may occur according to an agreed upon schedule or combinations thereof.

Different types of information needed to determine when to instantiate an ECI may be communicated. For instance, in 404, the gaming machine may send status information regarding its current status, such as idle or active, to the remote host. As another example, in 406 the gaming machine may send player and/or usage information, such as coin-in and coin-out, to the remote host. In yet another example, the event information, such as a request for a game service on the gaming machine, may be sent to the remote host that triggers a launch of the ECI.

In particular embodiment, the remote host may receive useful information indirectly. For example, a player tracking session may be initiated on the gaming machine that causes a communication link to be established between the gaming machine and a player tracking server. In response, the gaming machine may send information indicating that a player tracking session has been initiated. In response, the remote host may contact the player tracking server and in 450 receive information from the player tracking server, which is an example of remote gaming device. In another embodiment, after a communication link may be established with the gaming machine, the player tracking server may automatically contact the remote host and send information to the remote host in 450.

The information received from the player tracking server may be used to determine whether to launch an ECI on the gaming machine. Further, when the ECI is launched, the information received from the player tracking server and/or the gaming machine may be used to customize the content output by the ECI on the gaming machine. For example, the content may be customized according to known player preferences. In another example, the content may be customized according to a status of the player, which may be determined from their game play history. Further, the player tracking server may send or the remote host may store operator preferences regarding content or promotions that the operator wants to output via the ECI. The operator preferences may also be used to customize the ECI on the gaming machine.

In another embodiment, the gaming machine may send information to servers in which it does not have an established formal communication relationship. For example, when the gaming machine is idle, the gaming machine may broadcast its status to one or more remote hosts on a local area network. In response to the broadcast, one or more remote hosts may determine that they wish to output content on the gaming machine during the idle period and contact the gaming machine. In 402, the remote hosts may contact the gaming machines to request additional information, which may be publicly available to devices on the network or in 410, the remote host may initiate a resource request 410 for control of resources on the gaming machine. Prior to exchanging information regarding parameters of the resource request, such as a status of resources that may be available for control by the remote host in 414, the gaming machine and remote host may exchange information used by each device for authentication and validation purposes. Further details of interactions between the remote host and the gaming machine are described in the figure for one embodiment of the systems and methods described herein.

In 454, the remote host may evaluate the resource limitations provided by the gaming machine and determine whether it can provide content that is suitable for the resource limitations available on the gaming machine. When the remote host determines the resource limitations are acceptable, in 416, it may send a message indicating it wishes to initiate a session between the remote host and the gaming machine.

In 418, after receiving this message, the remote host and the gaming machine may exchange one or more session parameter messages including information such as a time stamp, clock information so that their clocks may be synchronized, device identification etc. In one embodiment, the information in the one or more session parameter messages may be utilized to identify state information stored on the remote host pertaining to the session between the remote host and the gaming machine in a manner that allows the state of the gaming machine and the state of an ECI generally corresponding to the state of gaming at a particular time or during a particular event to be determined.

After a session between the gaming machine and the host is initiated, in 434, the gaming machine load and execute an ECI process if it is not already executing and begin communication gaming machine transaction information to the remote host. The gaming machine transaction information may include information regarding a state of a game played on the game, player identification information, money handling information, etc. The gaming machine transaction information received from the gaming machine may affect dynamically the content the remote host sends to the gaming machine. Examples of gaming transaction information that may be transmitted are described in the G2S protocol approved by the Gaming Standards Association (Fremont, Calif.) although the present invention is not limited to the communicating the information described in the protocol or in the format described by the protocol.

In particular embodiments, the remote host may be simultaneously in sessions with a plurality of gaming machines where each gaming machine is receiving content that is being dynamically adjusted by the remote host based on information received from the gaming machines, i.e., the content is customized for the particular game state of each gaming machine. Further, the remote host may be operable to customize content based upon a "group" state. In a group state, information received from a group of gaming machines may be combined to define a state of the group. The remote host may be operable to dynamically adjust content sent to one or more gaming machines in a group based upon a group state. Thus, at a particular time, the content sent from the remote host to the gaming machine may be 1) affected by the state of the gaming machine, 2) unaffected by the state of the gaming machine, 3) affected by the state of a group of gaming machine, 4) unaffected by the state of the group of gaming machines, 5) affected by the state of another gaming machine (e.g., in a tournament situation, the remote host may adjust its content to reflect that another gaming machine different the gaming machine has won the tournament or another gaming machine has won a particular jackpot), 6) unaffected by the state of another gaming machine, or 7) combinations thereof.

In the preceding paragraph, a gaming machine to which the remote host is sending content may or may not provide information that affects a particular group state at a given time. For example, the remote host or another host may provide a progressive game with a progressive jackpot to a group of gaming machines. The gaming machine to which the remote host is sending content may be operable to play the progressive game but may not be currently participating in the progressive game at a particular time and thus not contributing to the jackpot, which in this example is one indicator of the group state of the gaming machine in the group. When the progressive jackpot reaches a certain level, the remote host may send information to the gaming machine to indicate that the jackpot has reached a certain threshold to entice a player on the gaming machine to join the progressive game. Thus, the remote host may dynamically adjust content sent to the gaming machine based upon a group state for a group of gaming machines that the gaming machine is currently not affecting.

In 456, the remote host may select its initial content to send to the gaming machine, including commands, instructions and/or data that are already stored on the remote to the gaming machine in 420. If needed, the remote host may generate all or a portion of the content to send to the gaming machine in real time. In a particular embodiment, the gaming machine may store content from previous interactions with the remote host or other remote hosts that were used by an ECI. In this case, the gaming machine may be operable to gather information on content stored on the gaming machine and send it to the remote host. The gaming machine or the remote host may initiate this interaction. If the gaming machine is storing content that is useful to the remote host, such as content it may need to send to the gaming machine in the absence of its presence on the gaming machine, the remote host may be operable to send only needed content without reduplicating content the content it may use that is already stored on the gaming machine In 458, the remote host may store information regarding the state it is controlling on the ECI, which may be affected by the content it is sending. In 436, the gaming machine may store and/or output content via the ECI. In 438, the gaming machine may receive input from a peripheral device, such as a touch screen sensor or generate information that may affect the content provided by the remote host. In 440, the gaming machine may determine that this information is of interest to the remote host and/or to the ECI. In one embodiment, the information may be routed to the ECI for additional processing, which may then send the information to the remote host or in 422, the gaming machine send the information directly to remote host.

In 460, the remote host may process the information received from the gaming machine and send new content including commands, instructions and/or data to the gaming machine in 424. In 442, the gaming machine may store and/or output the new content via the ECI. In 462, the remote host determines that an event has been triggered, which may be related to the content it has sent in 424. For example, the event may be the award of a 2 times bonus and the content it sent in 424 may be a presentation for this award. Thus, in 426, event information may be sent to the gaming machine, such as instructions, to the master gaming controller to double an award for the current game and update the credit meter accordingly.

In 444, in response to the event information, the gaming machine may modify the gaming machine interface. For example, in the case of the 2 times bonus award described in the previous paragraph, the gaming machine may present a credit meter scrolling up in response to the award.

In 448, the gaming machine may determine that an event has occurred that may affect a status of the session. For instance, the gaming machine may have received a cash out command, a player may withdraw a player tracking card, the gaming machine may have reached zero credits, the gaming machine may have been idle for a period, the gaming machine has received a request for resources from another remote host wishing to provide an ECI, the gaming machine has received an input signal indicating a desire to close a window associated with the ECI provided by the remote, a malfunction has occurred on the gaming machine, a tilt condition has occurred on the gaming machine, the resources available on the gaming machine have changed.

In response to the particular event, in 428, the gaming machine may renegotiate or terminate the session. For example, when the gaming machine has been idle for a period, the gaming machine may terminate the current session with the host or the gaming machine may renegotiate the session parameters, such as to provide an attract feature on an ECI associated with the remote host. In 449 and 466, the gaming machine and the remote host may each respectively store state information, such as information indicating the session was terminated or was renegotiated.

The interaction diagram was provided for illustrative purposes only and the systems and methods described herein are not to be limited by the types of interactions or order of interactions described in FIG. 4. Accordingly, it should be appreciated that in one embodiment, the present disclosure provides a gaming device including a primary game played using a game interface operable upon a wager by a player, at least one display device, at least one input device, and at least one local processor. The master gaming machine controller may be programmed to operate a remote host to enable the player to wager on a play of the primary game, generate or receive a primary game outcome for the play of the primary game, cause part of the display device to display the play of the primary game, and receive at least one request from the remote host to provide at least one remote controlled process on the display device. If at least one request to provide the remote controlled process is received, the local processor may be programmed to determine an availability of at least one gaming device resource. If the gaming device resource is available, the local processor may be programmed to accept the request to provide the remote controlled process; and enable the remote host to cause a portion of the display device to display the remote controlled process, wherein the remote controlled process will not affect the integrity of the play of the primary game and the remote controlled process may be displayed simultaneously with the play of the primary game and generated concurrently by the master gaming controller on the gaming machine. If the gaming device resource is not available, the local processor may be programmed to reject the request to provide the remote controlled process. It should be appreciated that maintaining the integrity of the play of the primary game includes, but is not limited to: ensuring that the game play speed of the primary game remains the same or substantially the same, ensuring that the quality of graphics of the primary game remains the same or substantially the same, ensuring that the quality of the audio of the primary game remains the same or substantially the same, ensuring that no corrupt images are displayed in association with the play of the primary game, ensuring that the correct outcomes are provided to the player in association with the play of the primary game, and/or ensuring that the functionality of the primary game remains the same or substantially the same.

In one such embodiment, if the externally controlled process is authorized by the master gaming controller, then the externally controlled process may provide (a) one or more services to the player; (b) one or more enhanced functions or features of the gaming machine to the player; (c) one or more outcomes of a game played using a window interface, described below, to a player; or (d) a combination of such services, functions and the outcomes to a player, wherein the externally controlled process is based, at least in part, on one or more aspects of the locally controlled games. In other embodiments, if the externally controlled process is authorized by the master gaming controller, then independent of the locally controlled games, the externally controlled process may provide (a) one or more services to the player; (b) one or more enhanced functions or features of the gaming machine to the player; (c) one or more outcomes of a game played using the window interface to a player; or (d) a combination of such services, functions and the outcomes to a player.

In one embodiment, the services provided to the player via the externally controlled process may include, but are not limited to one or more of the following:

(1) enabling a player to order food, drinks or coffee from the gaming machine (possibly to be delivered to the player at the gaming machine);

(2) enabling a player at a gaming machine to communicate with a person at another gaming machine;

(3) enabling a person at a gaming machine to communicate with a gaming establishment concierge, (4) enabling a player to learn information about various hotels, gaming establishments, restaurants, entertainment and/or travel services;

(5) enabling a player to make reservations, such as at a restaurant or for an event, from the gaming machine;

(6) enabling a player to transfer funds or manage a monetary account from the gaming machine;

(7) enabling a player to purchase a lottery ticket at the gaming machine;

(8) enabling a player to obtain change at a gaming machine;

(9) enabling a player to make a wager on an event or other unknown outcome of a game played using the window interface, such as a sporting event, to monitor events, to receive results and to cash out a winning event ticket at the gaming machine;

(10) enabling a player to send and receive electronic messages, such as e-mails, at the gaming machine;

(11) enabling a player to purchase various vending items at the gaming machine;

(12) enabling a player to access internet enabled services;

(13) enabling a player to check and redeem player tracking points for merchandise, entertainment or services;

(14) enabling a player to receive information related to upcoming tournaments or other gaming establishment promotions;

(15) enabling a player to watch television or a movie at the gaming machine;

(16) enabling a player to listen to music at the gaming machine;

(17) enabling a player to access the player's gaming establishment account; and

(18) enabling a player to view promotions available to that player.

In one embodiment, the enhanced functions or features of the gaming machine provided to the player via the externally controlled process include, but are not limited to one or more of the following:

(1) displaying information relating to one or more aspects of the player's gaming experience;

(2) providing personalized audio and/or video content at the gaming machine;

(3) enabling a player to pick a game to play from a plurality of available games;

(4) enabling a player to place one or more side-bets;

(5) enabling a player to play for one or more progressive awards;

(6) enabling a player to participate in a gaming tournament;

(7) providing a virtual ATM at the gaming machine;

(8) providing a virtual entertainment center at the gaming machine;

(9) providing a virtual lottery machine at the gaming machine;

(10) providing a virtual change machine at the gaming machine;

(11) providing a virtual sports book at the gaming machine;

(12) providing a virtual communication center at the gaming machine;

(13) providing a virtual concierge at the gaming machine;

(14) providing a virtual vending machine at the gaming machine;

(15) providing a virtual internet kiosk at the gaming machine;

(16) enabling a player to customize one or more aspects of the content displayed on the display device;

(17) enabling a player to customize one or more aspects of gaming machine interface;

(18) enabling a player to enroll in a player tracking system;

(19) enabling a player to play a plurality of games simultaneously or substantially simultaneously at the gaming machine;

(20) enabling a player to access personal settings at the gaming machine;

(21) enabling a player to access a score card of accomplished events (such as which poker game outcomes has the player obtained and which poker game outcomes has the player not yet obtained);

(22) enabling a player to access a tournament leader board; and

(23) enabling a player to select a favorite type of award to play for.

In one embodiment, the outcomes provided to the player via the externally controlled process may include, but are not limited to one or more of the following:

(1) a value;

(2) a modifier;

(3) an entry in an award drawing;

(4) an entry in a tournament;

(5) an additional player tracking point;

(6) a session surprise award;

(7) a modifier of any primary game awards for a set amount of time;

(8) a number of free or discounted spins or activations of a game;

(9) a prize;

(10) a progressive award;

(11) a retrigger to be utilized in a game;

(12) a wild symbol to be utilized in a game;

(13) an anti-terminator to be utilized in a game;

(14) a bonus or secondary game;

(15) a nudge of one or more reels in a reel game;

(16) a hold of one or more reels in a reel game;

(17) a scatter type pay;

(18) one or more additional paylines in a reel game;

(19) one or more additional ways to win in a reel game;

(20) one or more additional ways to trigger a secondary game;

(21) one or more available promotions;

(22) one or more surveys; and

(23) one or more non-redeemable credits.

Figure 4B:
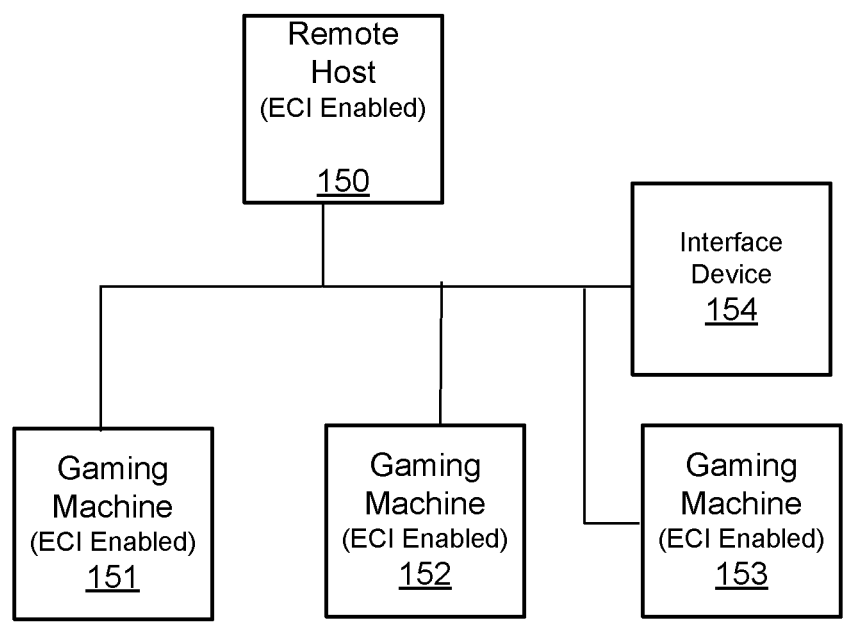
FIG. 4B is a block diagram of a remote host that is externally controlled interface (ECI) enabled connected to a plurality of gaming machines that are ECI enabled for one embodiment of the systems and methods.

FIG. 4B is a block diagram of a remote host 150 that is externally controlled interface (ECI) enabled connected to a plurality of gaming machines, 151, 152 and 153, that are ECI enabled for one embodiment of the systems and methods described herein. The remote host may also be connected to and operable to control a plurality of interface devices, such as 154. For instance, the remote host 150 may be operable to control overhead signage or other types of display devices near a bank of gaming machines to complement the content provide by an ECI on the gaming machines.

In particular embodiments, the gaming machines, 150, 151, 152, may be located proximate to one another, such as in a bank of gaming machines, at different locations in the gaming establishment or even located in different gaming establishments at different locations. Further, the present invention is not related to gaming machines, player stations available at table games and signage near table games may also be ECI enabled such that utilization by the remote is allowed. Thus, in a particular embodiment, the remote host may be operable to provide ECI enabled services to players at table games and gaming machines including shared games that involve a mixture of player's at table games and gaming machines, such as slot machines.

The remote host 150 via an ECI on each of the gaming machines may be able to coordinate content on two or more gaming machines, such as two or more of 152, 153 and 153. For instance, if two or more gaming machines share a similar theme it may be desirable to coordinate content on the two machines, such that a theme is matched. In another example, if two of more gaming machines are located in a similar location, where advertising or merchandising for a particular product or service is desirable, then the advertising or the merchandising on similarly located gaming machines may be coordinated, i.e., receive related content. In general, any content or activity that is described in relation to a single gaming device herein may be extended in a coordinated or targeted manner to a group of gaming devices.

In another embodiment, content on groups of gaming machines may be coordinated according to characteristics of the players at a group of gaming machines. For instance, the remote host may enable a group of friends and/or family to communicate with one another and play a shared game with their group while playing games on different gaming devices. For instance, the group may play a tournament game or a bonus game with each other. As an another example, the remote host may provide ECIs that allow the group to receive related content that is of interest to the group, such as a notification for the group or a part of the group that a dinner reservation or some other activity is about to start.

In general, the players in a group may share some common interest and are not limited to being known to each other. When player's have provided preference information in regards to preferences towards gaming activities and/or the gaming establishment has collected information in regards to a player's interests and gaming activities, then the remote host may provide content that is targeted toward a group of player's with similar interests. As an example, when a group of players is playing on gaming devices that are ECI enabled and a subset of the group has shown an interest in tournament games, such as past participation in tournament games, then the remote host may only send tournament information to the subset of the group that it has determined may be interested in tournament games.

In another embodiment, the remote host 150 may coordinate groups of ECIs to generate coordinated effects that span multiple gaming machines. For instance, gaming machines 151, 152 and 153 may be collocated (e.g., side-by-side), video displays on gaming machines 151, 152 and 153 may utilized in a manner such that video content on the displays appears to span multiple gaming machines. For instance, a graphic may appear to move from a first gaming machine to a second, gaming machine to a third gaming machine in a sequential fashion under control of the remote host via an ECIs on each gaming machine. If a peripheral interface device 154, such as overhead display 55 is employed, then the remote host may be also operable to move the graphic from the overhead sign to the gaming machines and vice versa.

In another example, the remote host may coordinate content on a group of gaming machines to provide an activity, such as a shared bonus game or a tournament. In this example, this example, the remote host may both coordinate and customize content. For instance, a tournament may involve a group of players playing a common game provide under control of ECIs receiving information from the remote host. Although a game with the same rules may be played by each player, the remote host may be operable to allow each player to customize content of the ECI, such as allowing each player to select a preferred type of slot game for the ECI-based tournament.

In yet other embodiments, coordinated and customized content may be generated simultaneously on a group of gaming machines. For instance, in the example in the preceding paragraph, the gaming machines may include primary and secondary displays that may each be utilized in conjunction with an ECI. On each of the primary displays, the remote host may affect the content via ECIs such that it varies with events (e.g., a particular player being identified or a particular game play event occurring, etc.). Thus, the content that is affected by the remote host may be different on each gaming machine. In conjunction to the ECIs provided on the primary displays, the remote host may control ECIs on each of the secondary displays to provide a shared bonus game played on each gaming machine. Thus, the remote host coordinates the content via the ECIs on the secondary displays to provide a shared bonus game. In this example, the gaming machines may be proximate to one another or at widely varying locations.

In the example in the preceding paragraph, the activities on one of the gaming machines participating in the shared bonus game may affect the content provided via the ECIs on the other gaming machines participating in the shared bonus game. For instance, the gaming machines, 151, 152 and 153, may all provide slot games where an outcome occurring on only one of the slot games may be communicated to the remote host 150. In response to this outcome, the content for the bonus game provided on each of the gaming machines may altered in some manner.

Figure 5A:
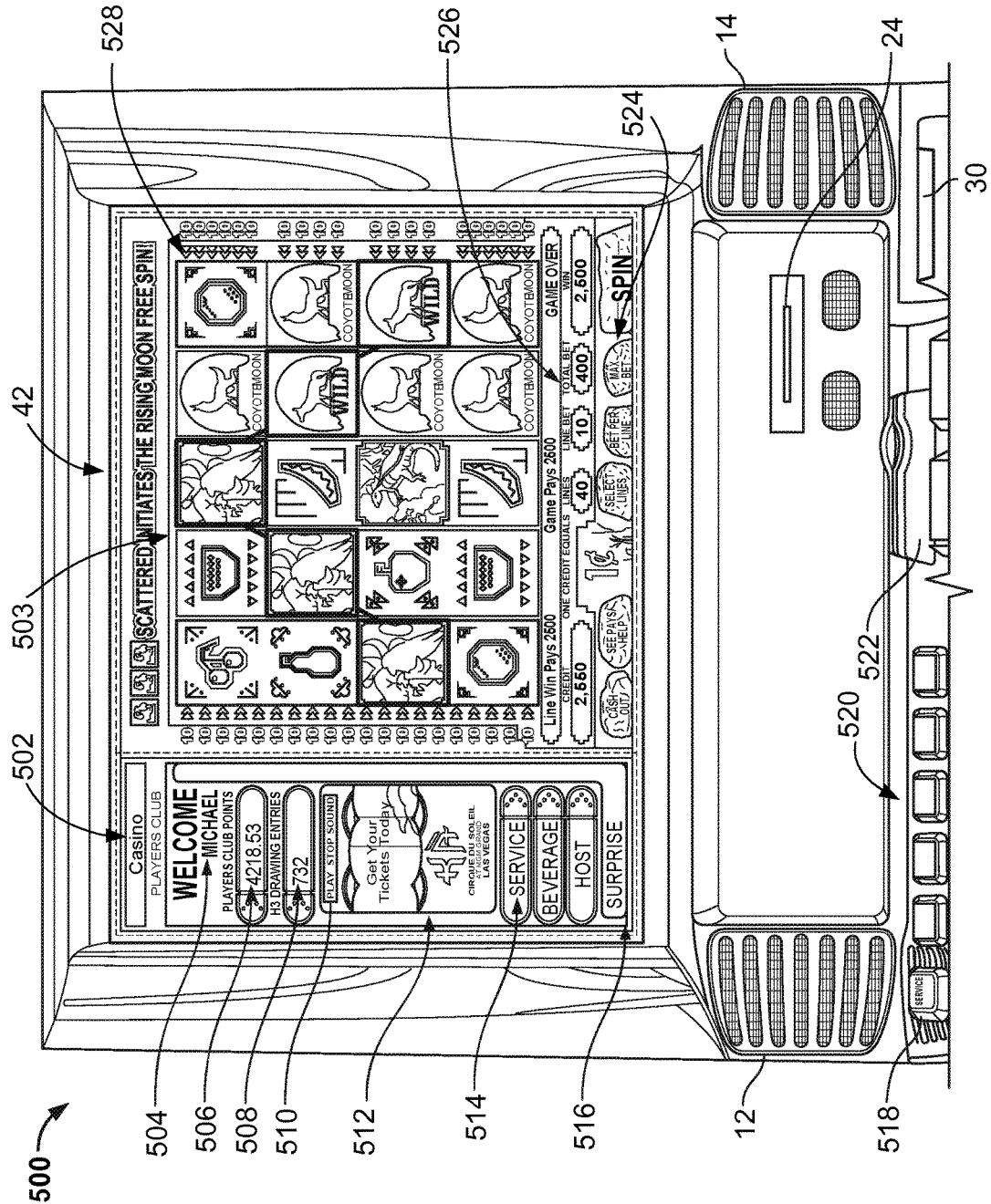
FIGS. 5A and 5B are block diagrams illustrating features of an ECI on a gaming machine for embodiments of the systems and methods.
Figure 5B:
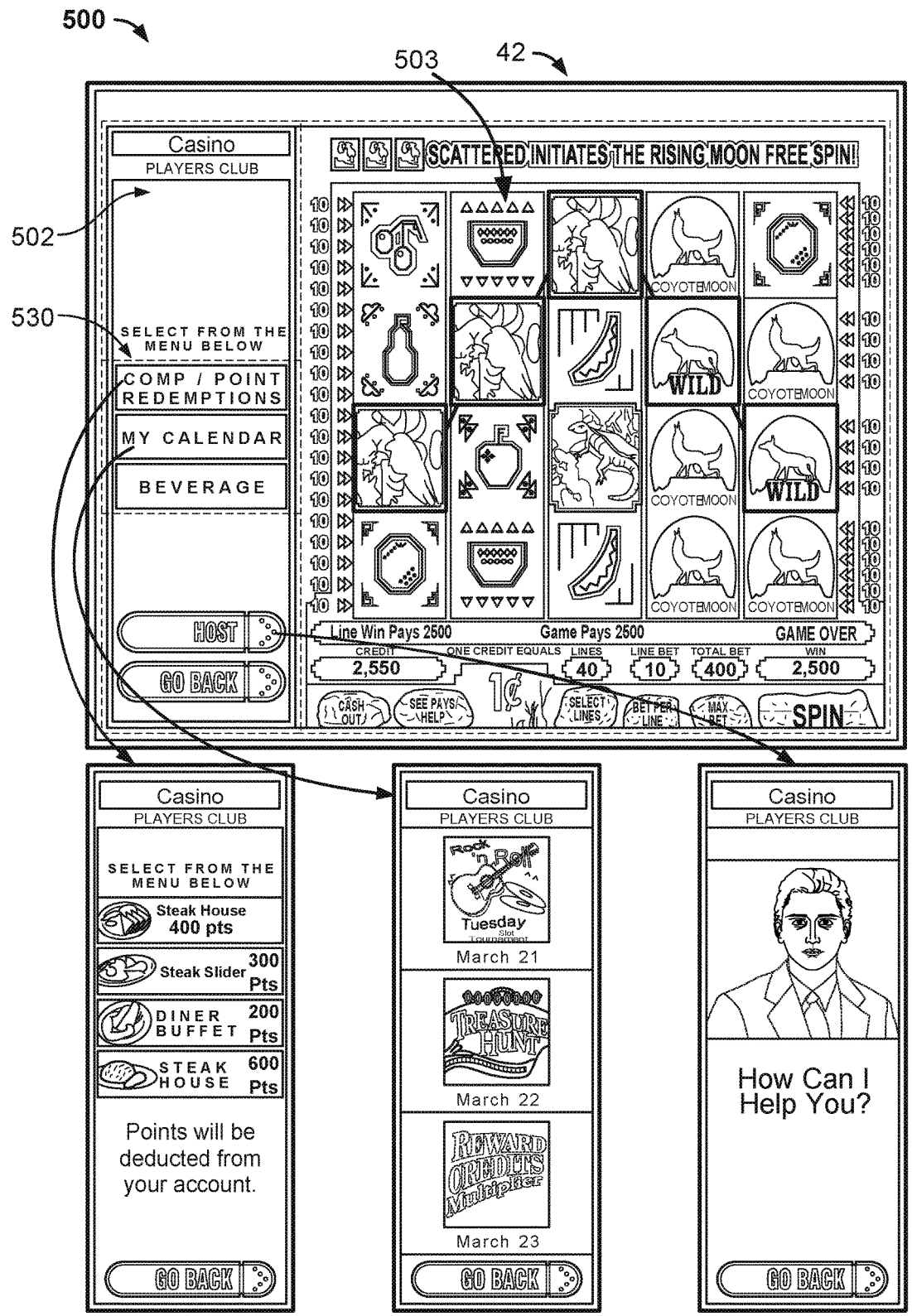

FIGS. 5A and 5B are block diagrams illustrating features of an externally controlled interface (ECI) on a gaming machine for embodiments of the present invention. In FIG. 5A, a game interface 503 comprising a portion of the touch screen display 34, speakers 12 and 14, service button 518, mechanical input buttons 520, payment or coin acceptor 28 and bill validator 30 are illustrated. The game interface 503 enables wagers to be made on a game of chance on the gaming machine 500. The game interface portion of the display 503 comprises a multi-line payline slot game during one state of the game, payline indicators 528 on the left and right of the slot game, game information 526 and game touch screen input buttons. The game interface 503 may be scaled to use a portion of the display 34. In general, the game interface 503 may be scaled to use many different sized portions of the display in different locations of the display. Further the gaming machine is not limited to a single game interface and the display may be divided into multiple portions to enable a plurality of games to be played simultaneously.

An ECI 502 also utilizes a portion of the display 502. In one embodiment, when the master gaming controller receives an input signal indicating the service button 518 has been depressed, the ECI 502 may be activated. Prior to activation of the ECI 502, the game interface 503 may occupy the entire display 34. In the example in the FIG. 5A, the ECI 502 utilizes a portion of the touch screen display 502 and the speakers 12 and 14. In different embodiments, the ECI transitions to utilize a portion of the display via a sliding window transition, via a swapping of windows transition, via an overlay of windows transition, via a scaling of windows transition, via one or more hidden windows or via any suitable transition. In other embodiments, the game interface 503 may utilize other devices coupled to the gaming machine including but not limited to the bill validator 30, card reader 24, payment acceptor 28, mechanical input buttons 520 and service button.

The ECI 502 comprises a number of components. Player information 504 including a player's name and loyalty program account information including points in a loyalty program may be output to display 34. The player information and the loyalty account information may be obtained after a player inserts a player tracking card in the card reader 24. By activating the touch screen proximate to the oval in which the club points are displayed, the player may access additional loyalty program account information or additional menus relating to player tracking. After the touch screen proximate to the oval has been activated, the format of the ECI 502 on display 34 may change to enable the additional information to be output or the information may be output via an alternate means, such as via the speakers 12 or 14 or another display on the gaming machine.

In one embodiment, the remote host controlling ECI 502 may act as a player tracking server and have the player loyalty account information locally available. In another embodiment, the remote host 502 may contact another gaming device to obtain any needed loyalty account information associated with a player. In the case where the player is not a member of the loyalty program, the ECI 502 may output information asking the player to join and providing instructions regarding how to join.

Another component of the ECI 502 may be bonus drawing information 508. As a result of their game play, the player may earn entries in a bonus drawing. A portion of the ECI display outputs bonus drawing information 508. By pressing the touch screen proximate to the oval displaying the bonus drawing information, the player may learn additional information, such as their number of drawing entries, a list of the numbers associated with each bonus drawing ticket and/or when the next bonus drawing is going to occur.

In one such embodiment, the remote host provides players with one or more entries into a bonus award drawing based on a player's gaming activity. The remote host tracks one or more aspects of the player's gaming activity and based on such tracked gaming activity, the remote host provides the player one or more entries into a bonus drawing for one or more awards or prizes. In different embodiments, the number of entries provided to each player may be predetermined, randomly determined, determined based on the player's status (such as determined through a player tracking system), determined based on a generated symbol or symbol combination, determined based on a random determination by the remote host, determined based on a random determination at the gaming machine, determined based on one or more side wagers placed, determined based on the player's primary game wager, determined based on time (such as the time of day) or determined based on any other suitable method or criteria. In one embodiment, at a designated time or upon a designated event occurring, the remote host (or other suitable system) randomly selects one or more of the drawing entries and provides the player's associated with such selected drawing entries the appropriate awards. For example, the remote host provides a player with an entry into a bonus award drawing for each cherry symbols generated in the game. In another embodiment, the remote host provides players with one or more entries into a bonus award drawing based on one or more events independent from the player's gaming activity. For example, the remote host provides a player with an entry into a bonus award drawing for every $10 wagered.

Yet another component of the ECI 502 may be advertising 512 and attract features. Based upon information known about a player, the advertising and attract features may be personalized to an individual player preferences. In FIG. 5A, advertising for a show is presented. When ECI touch screen buttons 510 are activated, additional information about the show may be presented, such as a movie clip, show times and seat availability. When the movie is presented, ECI touch screen buttons 510, enable the progress of the movie to be controlled and to be played with or without sound. In one embodiment, the ECI 502 may enable the player to make reservations for the show and print tickets for the show or print a receipt that enables a player to pick up tickets for the show.

Other components of the ECI 502 are menu buttons 514 for additional services. An activation of the touch screen proximate to the oval for each of the menu buttons 514 causes the ECI 502 to display additional information regarding services, beverages or communications with a host that may be obtained on the gaming machine. In response to the activation of one of the menu buttons 514, the ECI 502 may display additional menus and information, which is described in more detail with respect to at least FIG. 5B.

Finally, a last component of the ECI 502 for this example may be a bonus status information 516. During game play, the player may progress towards an additional bonus award. The progression may depend on factors, such as but not limited to a wager amount, how many games they initiate and events that are randomly triggered during their game play. The bonus status information 516 may include a value of a meter that displays their progress to the additional award.

In one embodiment of the ECI being utilized to provide an additional bonus award, the gaming system disclosed herein provides players with one or more bonus awards based on a player's gaming activity during a single gaming session. In one embodiment, a single gaming session may be measured by a player carding-in and carding-out through a player tracking system. In one embodiment, a gaming session award may be triggered based on one or more game play events, such as a symbol-driven trigger, which occurs during the single gaming session. In other embodiments, a gaming session award triggering event or qualifying condition may be triggered by exceeding a certain amount of game play (such as number of games, number of credits, or amount of time), or reaching a specified number of points earned during game play of the single gaming session. In another embodiment, a gaming device may be randomly or apparently randomly selected to provide a player of that gaming device one or more gaming session awards during a single gaming session. In one such embodiment, the gaming device does not provide any apparent reasons to the player for winning a gaming session award, wherein winning the gaming session award may not be t triggered by an event in or based specifically on any of the plays of any primary game during the single gaming session. That is, a player may be provided a gaming session award without any explanation or alternatively with simple explanations. In another embodiment, a player may be provided a gaming session award at least partially based on a game triggered or symbol triggered event during the single gaming session, such as at least partially based on the play of a primary game.

Figure 8:
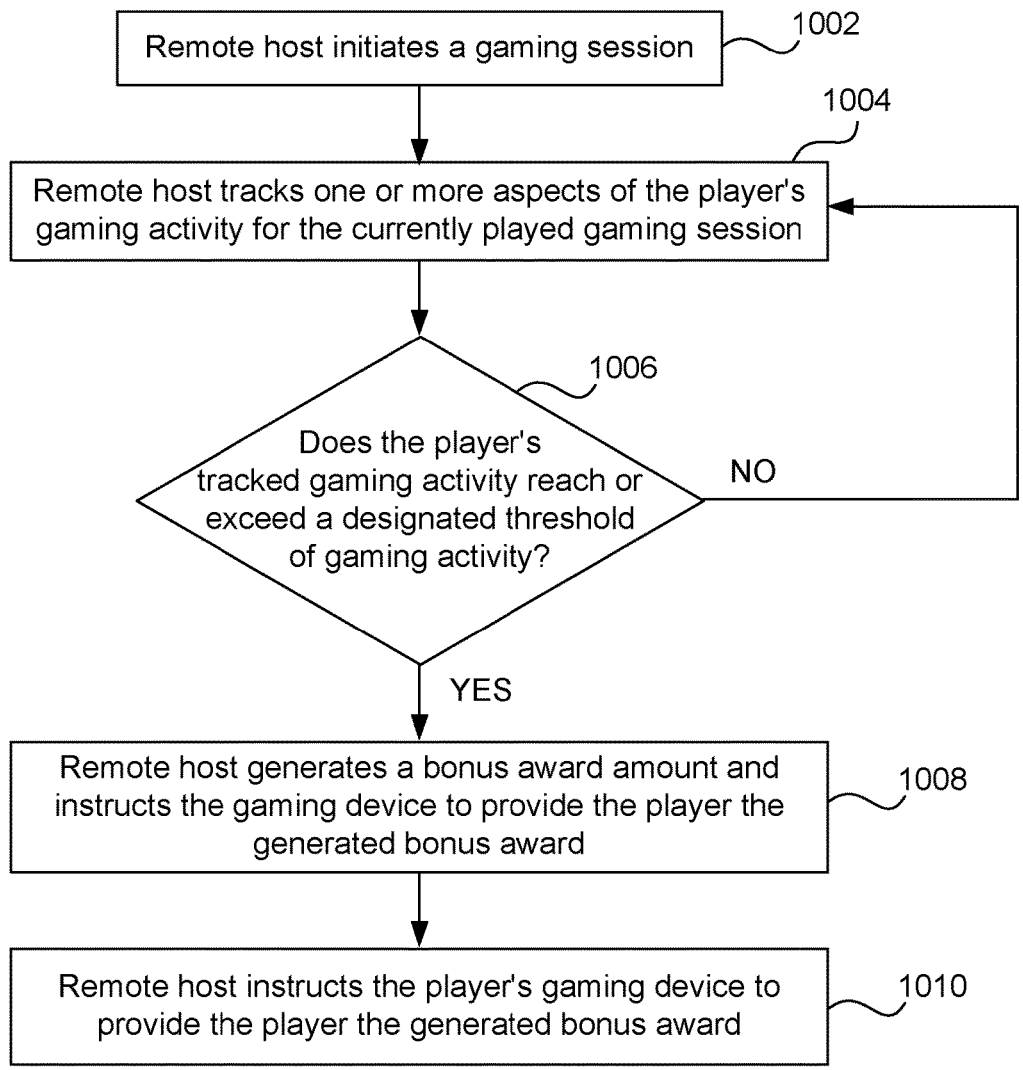
FIG. 8 is a flowchart of one embodiment of the systems and methods, illustrating the remote host proving a player a bonus award based on the player's gaming activity for the currently played gaming session.

In one such embodiment, as indicated in block 1002 of FIG. 8, upon a player inserting a player tracking card, the remote host may initiate a gaming session at the player's currently played gaming device. Upon the initiation of the gaming session, as indicated in block 1004, the remote host may track one or more aspects of the player's gaming activity for the currently played gaming session. In different embodiments, the remote host may track the amount of coin-in, any player tracking points accumulated, the number of games played, the number and types of outcomes obtained, the currency inserted into the gaming device, the amount of time since the session began, the amount of time between the generation of certain outcomes, and/or any other suitable gaming activity. It should be appreciated that in these embodiments, the gaming system may integrate certain aspects of the player's currently played gaming session to the ECI in a direct, positive feedback loop. That is, as a player continues playing one or more games, the amount of coin-in wagered and the number of player tracking points accumulated may be communicated from the gaming device to the remote host, wherein the remote host integrates this communicated data as part of the content utilized by the ECI.

In one embodiment, the remote host may track the same aspect of gaming activity for each gaming session. For example, the remote host may track the number of games played by each player in each gaming session. In another embodiment, the remote host may track different aspects of gaming activity for different gaming sessions. For example, the remote host may track the number of games played by each player in a first gaming session and may track each player's coin-in in a second gaming session. In different embodiments, which aspect of gaming activity the remote host will track may be predetermined, randomly determined, determined based on the player's status (such as determined through a player tracking system), determined based on a generated symbol or symbol combination, determined based on a random determination by the remote host, determined based on a random determination at the gaming machine, determined based on one or more side wagers placed, determined based on the player's primary game wager, determined based on time (such as the time of day) or determined based on any other suitable method or criteria.

In one embodiment, the remote host may track the same aspect of gaming activity for each player. In another embodiment, the remote host may track different aspects of gaming activity for different players. For example, the remote host may track the number of games a first player plays in a first gaming session, but may track a second player's coin-in for the first gaming session. In different embodiments, which aspect of gaming activity the remote host will track for different players is predetermined, randomly determined, determined based on the player's status (such as determined through a player tracking system), determined based on a generated symbol or symbol combination, determined based on a random determination by the remote host, determined based on a random determination at the gaming machine, determined based on one or more side wagers placed, determined based on the player's primary game wager, determined based on time (such as the time of day) or determined based on any other suitable method or criteria.

In one embodiment, each players gaming activity may be uniformly tracked by the remote host. For example, a first player's wager of $1.00 counts toward the gaming session threshold the same as a second player's wager of $1.00. In another embodiment, different players gaming activity may be tracked differently. For example, a first player's wager of $1.00 may count more toward the gaming session threshold than a second player's wager of $1.00. In different embodiment, each player's gaming activity may be tracked based on the player's status (such as determined through a player tracking system), based on a generated symbol or symbol combination in the underlying game, based on a random determination by the remote host, based on a random determination at the gaming machine, based on one or more side wagers placed, based on the player's primary game wager, based on time (such as the time of day) or based on any other suitable method or criteria.

In one embodiment, as indicated in diamond 1006 of FIG. 8, the remote host may determine if the player's tracked gaming activity reaches or exceeds a designated threshold of gaming activity. In one embodiment, the designated threshold of gaming active may be the same for each gaming session. In another embodiment, the designated threshold of gaming activity may be different for each gaming session. In different embodiments, the designated threshold of gaming activity for each gaming session is predetermined, randomly determined, determined based on the player's status (such as determined through a player tracking system), determined based on a generated symbol or symbol combination, determined based on a random determination by the remote host, determined based on a random determination at the gaming machine, determined based on one or more side wagers placed, determined based on the player's primary game wager, determined based on time (such as the time of day) or determined based on any other suitable method or criteria.

If the player's gaming activity does not reach or exceed the designated threshold of gaming activity, the remote host may continue tracking the player's gaming activity and may return to block 1004. If the player's gaming activity reaches or exceeds the designated threshold of gaming activity for the currently played gaming session, as indicated in blocks 1008 and 1010 of FIG. 8, the remote host may generate a bonus award amount or event and may instruct the local gaming device processor to provide the player the generated bonus award or event. For example, if a player's coin-in during a single gaming session is at least equal to a designated threshold coin-in level, a remote host may generate a bonus award amount and may instruct the gaming device to provide the player the generated bonus award.

In another embodiment, upon the player's tracked gaming activity reaching or exceeding a designated threshold of gaming activity for the currently played gaming session, the remote host may generate a plurality of bonus awards and may instruct the gaming device to provide the player the generated bonus awards. It should be appreciated that the gaming session bonus award may be any suitable award, including, but not limited to: a value, a modifier, a modifier of any primary game awards for a set amount of time, a number of free or discounted spins or activations of a game, a bonus or secondary game, a prize, a progressive award, a number of bonus award drawing tickets, a service or comp, a number of player account points, a temporary change in the player's account status, a number of redeemable prize points, a number of rounds in a tournament, and an entry into a group play bonus event.

In another embodiment, different features on the gaming device (accessible via the ECI) may become available to the player upon the player's gaming activity reaching or exceeding the designated threshold of gaming activity. For example, if the player's gaming activity reaches or exceeds a designated threshold of gaming activity, the gaming device may enable the player to listen to a favorite song or genre of songs while playing the gaming device. In another embodiment, different services available to the player (and accessible via the ECI) may be activated upon the player's gaming activity reaching or exceeding a designated threshold of gaming activity. For example, if a player's gaming activity reaches or exceeds a designated threshold of gaming activity, the player may be offered a free drink. In one embodiment of this example, the gaming system may alert a gaming establishment attendant to ask the player if they would like a free drink. In another embodiment of this example, the gaming system may activate a drink-order button on the player's gaming device. As mentioned above, this activated drink-order button may either access a live dispatcher or may summon a gaming establishment attendant.

In one embodiment, as seen in FIG. 5A, the player's currently played gaming device displays information to the player 516 regarding their tracking gaming activity and the designated threshold. In one embodiment, the gaming device may display to the player the amount of the player's tracked gaming activity, such as via one or more meters, but does not display information regarding the designated gaming activity threshold. In another embodiment, the gaming device may display to the player information regarding the designated gaming activity threshold, but does not display information about the amount of the player's tracked gaming activity.

In one embodiment, the gaming session bonus award may be the same for each of the players. In another embodiment, the gaming session bonus award may be different for different players. In one such embodiment, different players may play for different gaming session bonus awards based on each player's status (such as determined through a player tracking system). For example, the gaming session bonus award for a bronze level player may be the first level progressive award of an MLP, while the gaming session bonus award for a silver level player may be the second level progressive award of the MLP and the gaming session bonus award for a gold level player may be the third level progressive award of the MLP. In different embodiments, the gaming session bonus award each player may play for is predetermined, randomly determined, determined based on a generated symbol or symbol combination, determined based on a random determination by the remote host, determined based on a random determination at the gaming machine, determined based on one or more side wagers placed, determined based on the player's primary game wager, determined based on time (such as the time of day) or determined based on any other suitable method or criteria.

In one embodiment, upon a determination to provide a player a bonus award for a gaming session, the remote host may select a player to provide an accumulated value progressive award. In another embodiment, upon the player's tracked gaming activity reaching or exceeding a designated threshold of gaming activity, the remote host may randomly select a bonus award from a prize pool and may instruct the gaming device to provide the player the selected bonus award. In one such embodiment, upon a determination to provide a player a bonus award for a gaming session, the remote host may select a bonus award from a prize pool that is based on the player's status (such as determined through a player tracking system). For example, a gaming session bonus award for a bronze player may be selected from a first prize pool, a gaming session bonus award for a silver player may be selected from a second, different prize pool and a gaming session bonus award for a gold player may be selected from a third, different prize pool. In different embodiments, upon a determination to provide a player a bonus award for a gaming session, the remote host may select a bonus award from a prize pool that is based on a generated symbol or symbol combination, based on a random determination by the remote host, based on a random determination at the gaming machine, based on one or more side wagers placed, based on the player's primary game wager, based on time (such as the time of day) or based on any other suitable method or criteria.

In one such embodiment a promotional prize pool may include a plurality of inventoried items (which may include null items) and thus the prize pool is associated with a fixed cost. In this embodiment, the remote host may randomly select prizes from the pool and removes the prizes as they are provided to the players, wherein when the last prize is removed from the promotional prize pool, the promotion ends. It should be appreciated that in this embodiment, as more prizes are selected and removed from the prize pool, the probabilities of being selected associated with the remaining prizes change. In another embodiment, each bonus award is associated with a probability and the remote host randomly selects a bonus award based on these probabilities.

In another embodiment, upon the player's tracked gaming activity reaching or exceeding a designated threshold of gaming activity, the remote host may randomly determine, based on one or more probabilities, whether to provide the player a bonus award for the player's gaming session. In this embodiment, if the remote host determines to provide the player a bonus award for the player's gaming session, the remote host may generate a bonus award amount and may instruct the gaming device to provide the player the generated bonus award. On the other hand, if the remote host determines not to provide the player a bonus award for the player's gaming session, after a set interval (such as an amount of time or coin-in accumulated) the remote host may redetermine whether to provide the player a bonus award for the player's gaming session.

In one embodiment, the designated threshold of gaming activity may be the same for each player. In another embodiment, the designated threshold of gaming activity is different for different players. In one such embodiment, the designated threshold associated with each player's gaming activity may be based on the player's status (such as determined through a player tracking system). For example, a bronze player may have a threshold of gaming activity higher than a silver player, which may have a threshold of gaming activity higher than a gold player. In different embodiments, the designated threshold for each player may be predetermined, randomly determined, determined based on a generated symbol or symbol combination, determined based on a random determination by the remote host, determined based on a random determination at the gaming machine, determined based on one or more side wagers placed, determined based on the player's primary game wager, determined based on time (such as the time of day) or determined based on any other suitable method or criteria.

After providing the player a bonus award for the player's gaming session, the remote host may reset the tracked gaming activity for the player's gaming session and restarts tracking the player's gaming activity. By resetting or restarting the tracking of the player's gaming activity (after providing the player a gaming session bonus award), the gaming system disclosed herein provides the player the opportunity to win multiple gaming session bonus awards during a single gaming session. It should be appreciated that by utilizing the master gaming controller, including a gaming device CPU or processor for at least one award determination (i.e., the game of chance outcome described above) and by utilizing the remote host for at least one award determination (i.e., the gaming session bonus award provided via the window interface), the gaming system disclosed herein may be operable to provide a plurality of awards to a player wherein at least one award is determined locally and at least one award is determined remotely.

It should be appreciated that in one embodiment wherein the ECI is utilized to provide a player an additional award, the gaming system disclosed herein may be capable of providing players different types of awards based on the player's player tracking information, wherein player's wagers fund different player tracking based incentives or awards. That is, the gaming system may provide a single player a gaming session bonus award (wherein the player's gaming activity is based on the player's player tracking information) and may also provide the player a bonus drawing award (wherein the player's entries into the drawing are based on the player's player tracking information). In this embodiment, the gaming system may be operable to simultaneously run a plurality of different promotions wherein a player's standing or equity in each promotion is individually displayed to the player. Such a configuration provides increased entertainment and enjoyment for players by enabling players to win additional awards based on their player tracking status.

In another embodiment, the utilization of a dynamic game interface and a separate dynamic ECI generated on only a single display device or generated on separate displays, provides that a gaming device, which may part of a gaming system, may be operable to simultaneously display, substantially simultaneously display or sequentially display and execute multiple games wherein at least one game outcome may be determined locally by the gaming device processor (i.e., the game of chance associated with the game interface) and at least one outcome, unrelated to a game played using the game interface, is determined remotely by a remote host (i.e., the outcome provided via the ECI). In another embodiment, the utilization of a dynamic game interface and a separate dynamic ECI generated only a single display device or generated on multiple displays, provides that a gaming device, which may be part of the gaming system disclosed herein, may be operable to display the results of a plurality of different determinations wherein at least one determination is based on one or more generated symbols or symbol combinations, at least one determination is independent of any game play events and at least one determination is based on a promotional offering. In one such embodiment, at least one determination is executed in a 'thin client' configuration (i.e., the player of a primary game which is controlled by the remote host and displayed by the gaming machine or a session surprise bonus award determined by the remote host and displayed by the gaming machine) and at least one determination is executed in a 'thick client' configuration (i.e., a game of chance award determined by the master gaming controller, wherein the game of chance may have been downloaded from the remote host).

In one embodiment, when the ECI is utilized to provide a player an outcome or award in addition to a locally determined game award where the ECI based award is determined at a remote host, the remotely determined award and the locally determined game award are each determined independently. In another embodiment, the remotely determined award is based, at least in part, on the locally determined award. In another embodiment, the locally determined outcome and associated award is based, at least in part, on the remotely determined outcome.

In another embodiment when one or more ECIs are utilized to provide players one or more additional outcomes or awards via one or more promotions, the gaming system disclosed herein tracks each of the promotions provided via an ECI. In this embodiment, the gaming system compares the actual provided promotional outcomes or awards to a theoretical amount of promotional outcomes or awards. That is, the gaming system compares each gaming device's actual promotional return to a theoretical return, which may have been contemplated by a gaming establishment operator when setting up the initial promotion. Based on these comparisons, the gaming system may be enabled to change or modify one or more criteria required to obtain a promotional outcome or award to align the actual promotional return with the contemplated theoretical promotional return.

It should be appreciated that in one embodiment the gaming system disclosed herein provides an open-ended rules engine for gaming establishments to create and provide any suitable promotion to one or more players. In one such embodiment, the gaming system enables gaming establishments to set up one or more rules, wherein if an event occurs (wherein the event is either related to game play or independent of game play), then based on the set up rules, certain features, services, outcomes or functions may be provided to or otherwise made available to one or more players. In one embodiment, the gaming system may enable the gaming establishment to set up or input rules related to the different criteria for a player winning an award, the different types of awards available to players, or combinations thereof, to achieve an average expected payback for one or more promotions and/or any combination thereof. As described above, the one or more promotions may be provided via ECIs executing on one or more gaming devices. Accordingly, the open-ended rules engine provides increased flexibility to a gaming establishment operator to further define and configure different aspects of a player's gaming experience.

In such one embodiment, the gaming system disclosed herein may enable a gaming establishment operator to configure the open-ended rules engine by defining different criteria for a player winning an award. In different embodiments, the criteria may be based on a player's player tracking status, based on if a player has a player tracking card in a gaming device of the gaming system, based on a player's amount of game play over a designated period of time, based on the generation of a designated symbol combination at a designated wager level, based on one or more side wagers placed, based on the player's primary game wager, based on time (such as the time of day) or based on any other suitable method or criteria. For example, a gaming establishment operator may utilize the open-ended rules engine to establish that if a player's currently played gaming device generates a designated symbol combination which includes three cherry symbols, and if the player has wagered at least one credit on each available payline, then the player is eligible for a gaming establishment defined promotion.

In another such embodiment, the gaming system disclosed herein may enable a gaming establishment operator to configure the open-ended rules engine by defining what type of award a player may win. In different embodiments, the type of award a player may win includes, but is not limited to, a monetary award, a non-monetary prize, an offer to purchase an item, an entry in a promotion, a modifier, a modifier of any primary game awards for a set amount of time, a number of free or discounted spins or activations of a game, a bonus or secondary game, a progressive award, a number of bonus award drawing tickets, a service or comp, a number of player account points, a temporary change in the player's account status, a number of redeemable prize points, a number of rounds in a tournament, and an entry into a group play bonus event. Expanding on the example described above, if a player's currently played gaming device generated a designated symbol combination which included three cherry symbols and the player wagered at least one credit on each available payline, then the open-ended rules engine (previously set up by the gaming establishment operator) may be used to determine that the player is eligible to win an award of ten bonus award drawing tickets.

In another such embodiment, the open-ended rules engine may be used to determine and to display to a gaming establishment operator a theoretical payout or average expected payback of different selectable criteria for a player winning an award and different selectable types of awards, which may be provided to a player. In this embodiment, the open-ended rules engine may enable a gaming establishment operator to select different criteria to create different promotions, wherein the gaming system displays how changes of different criteria affect a promotion's theoretical payout or average expected payback. Using the example described above, the open-ended rules engine may be operable to inform the gaming establishment operator the different average expected paybacks if the gaming system includes a first promotion where a player is provided ten drawing tickets if the player's currently played gaming device generated a designated symbol combination which included three cherry symbols and the player wagered at least one credit on each available payline versus a second promotion where a player is provided eight drawing tickets if the player's currently played gaming device generated a designated symbol combination which included three cherry symbols and the player wagered at least one credit on each available payline. Accordingly, the utilization of the open-ended rules engine enables different gaming establishments to create and implement different promotional offers to differentiate themselves from other gaming establishments.

As indicated above, in one embodiment, the gaming system disclosed herein may be operable to display any suitable information, including progressive jackpot information, via one or more ECIs to the players through one or more displays on the gaming machines or additional information displays positioned near the gaming machines, such as above a bank of system gaming machines. This information may be used to entertain the players, inform the players about any aspect of game play occurring on one or more gaming devices in the gaming system or inform the player of any aspect of any promotional offering occurring on one or more gaming devices in the gaming system. It should be appreciated that such information can be provided to the players through any suitable audio, audio-visual or visual devices.

As seen in FIG. 5B, a few examples of menu navigation available with the ECI 502 are illustrated. In FIG. 5B, the ECI 502 outputs touch screen buttons 530. In response to an activation of the touch screen proximate to each menu button, the ECI 502 may output different media, including but not limited to video and audio based information. For example, when the play activates the comp/point redemptions, the ECI 502 may enable the player to redeem their points for merchandise, entertainment or services. In one embodiment, when the comp button is activated, a menu of restaurants and points required to obtain a meal at each restaurant. In another embodiment, when a selection of a restaurant is made, points may be deducted from the player loyalty account and the player may receive a receipt or a voucher indicating their award. In one embodiment, the ECI 502 may enable the player to obtain additional information about each restaurant and even make reservations. An activation of the "go back" button on the touch screen may cause the ECI 502 to return to a previous menu page.

An activation of the "my calendar" button on the touch screen may cause the ECI 502 to display information regarding upcoming events that may be of interest to the player on the ECI 502. An activation of the touch screen proximate to each event may cause the ECI to display additional information about the event. An activation of the "beverage" button on the touch screen causes the ECI 502 to display additional menu items regarding beverages that are available for the player to order (not shown). These menus may enable the player to place an order for the beverage which may be brought to the gaming machine 500.

An activation of the "host" button on the touch screen may cause the 502 to display an ECI for providing a communication interface. As is illustrated in FIG. 5B, the communication interface may initiate a "live" communication session with a casino host. A communication session including video and audio transmissions is shown. In general, the communication interface may be used to initiate communications with casino representatives, other players at gaming machines or even remote communications to cell phones and other communication devices. The communication interface may utilize video, audio, text or combinations thereof to provide the communications.

In a particular embodiment, the communication interface and the comp interface that shows the points needed to redeem a meal may be simultaneously instantiated as separate ECIs displayed simultaneously on one or more display screens. In this embodiment, the ECI providing the comps may communicate information to the ECI providing the communication interface, such as a restaurant selection that has been input. The host utilizing the communication may receive this information via the ECI for the communication interface and use it to provide the player a service, such as making a reservation for the player or communicating additional information about the restaurant.

Figure 9A:
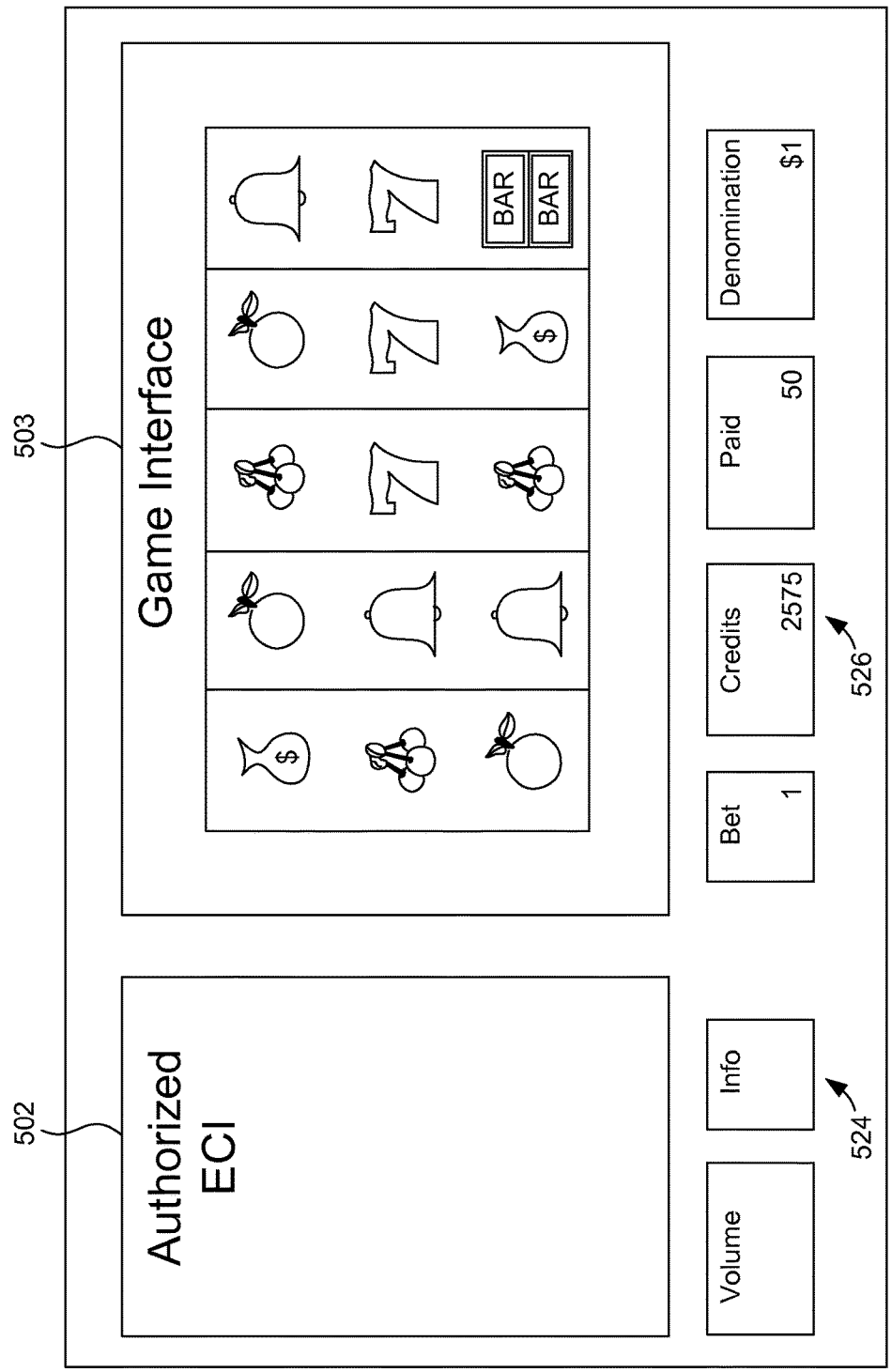
FIG. 9A is an enlarged elevation view of one embodiment illustrating a player interface and a separate game interface for the systems and methods described herein.

In another embodiment, as illustrated in FIG. 9A, the gaming system enables one or more players at one or more gaming machines to interact with the gaming machine and/or the remote host via a customizable interface. In FIGS. 9A-9D, an ECI and a game interface are shown on a single display for illustrative purposes only. In various embodiments, on a single gaming device, one or more ECIs and/game interfaces may be distributed on a plurality of different displays where the number of ECIs and/or game interfaces generated and the distribution of the ECIs and/game interfaces on the plurality of different displays including a position/location on each display may vary with time. Further, although, in FIGS. 5A, 5B, 9A-9D, ECIs utilizing touch screen enabled displays are emphasized, the present invention is not so limited, and as described with at least respect to FIG. 3B, different combination of input and output devices not limited to touch screen enabled displays or even requiring a touch screen enabled display, may be utilized as components of an ECI.

Figure 9B:
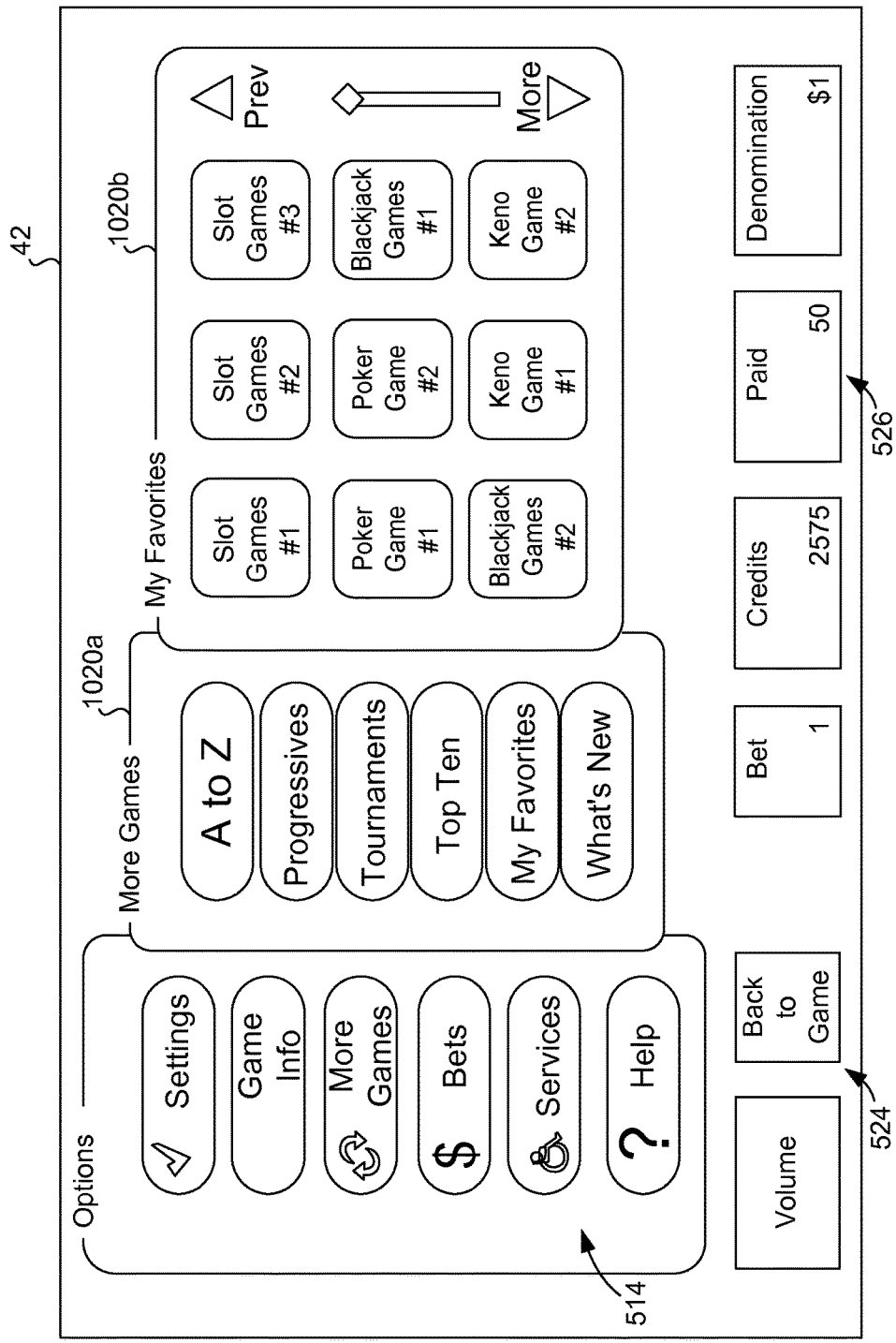
FIGS. 9B, 9C and 9D are enlarged elevation views of one embodiment of the present invention, illustrating a plurality of different nested menus and the different aspects of the player's gaming experience which may be modified utilizing the nested menus.
Figure 9C:
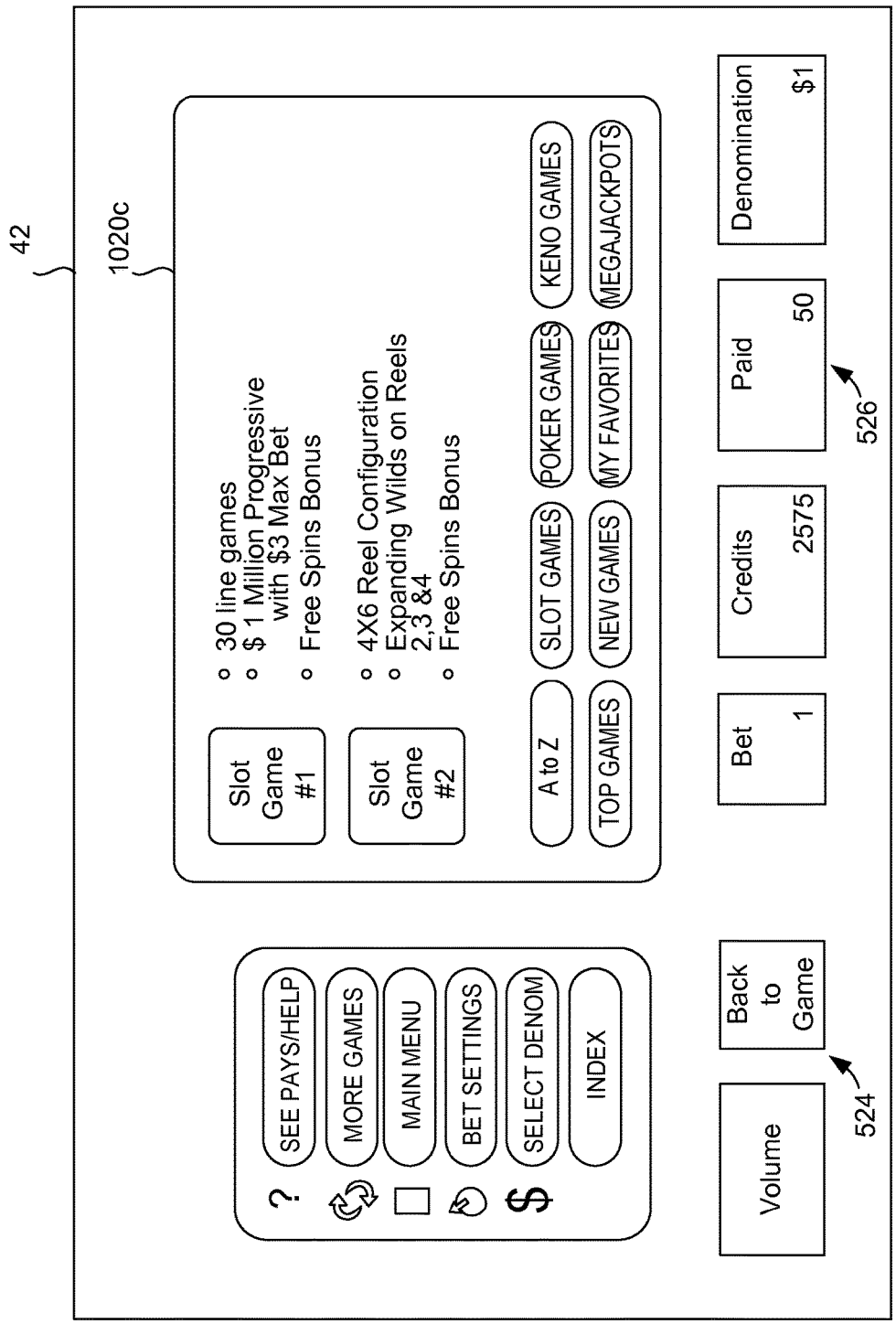
Figure 9D:
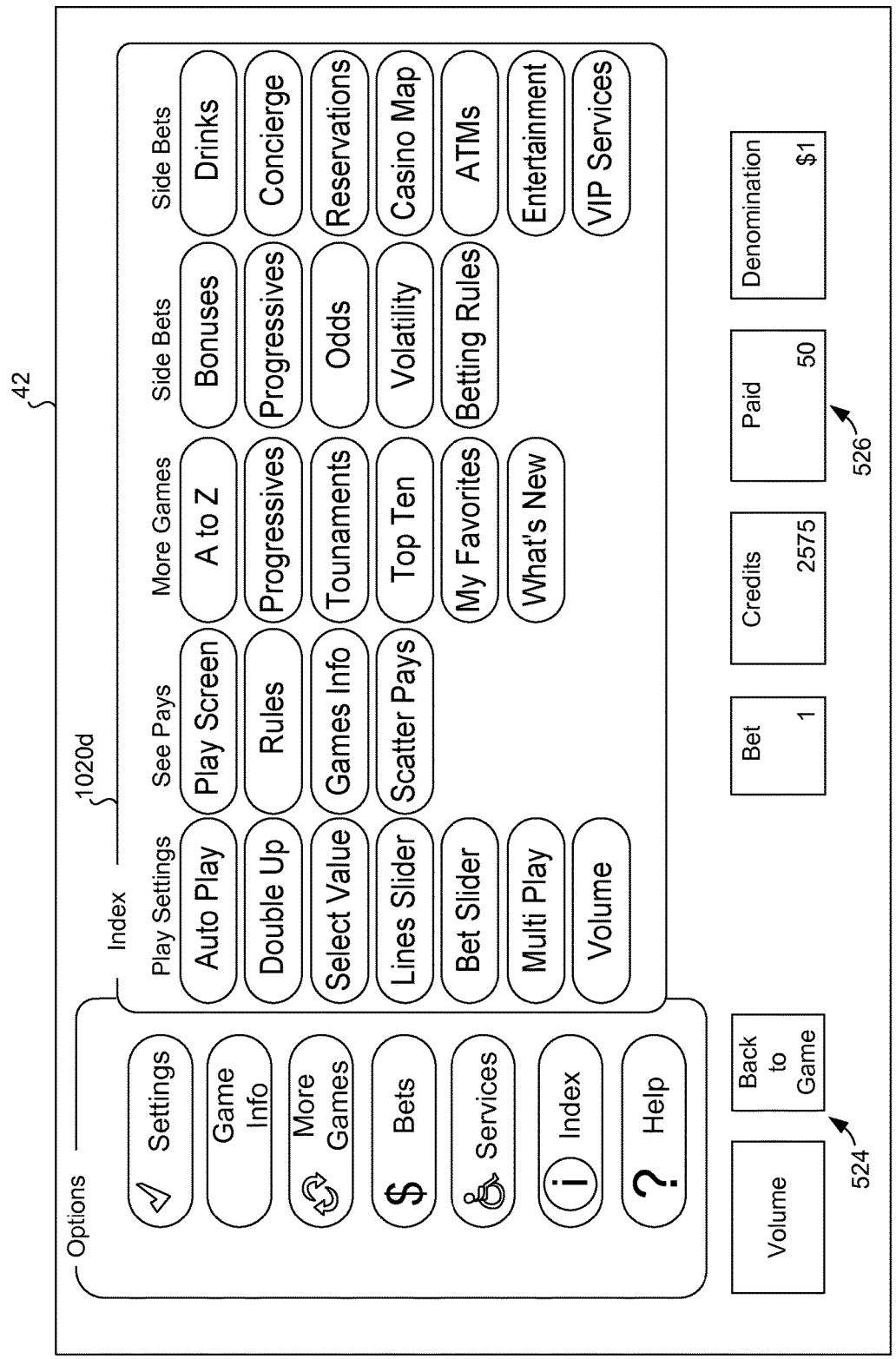

In one embodiment, one or more aspects of the customizable interface are associated with functions performed by the remote host (i.e., the player or ECI interface 502) and/or one or more aspects of the customizable interface are associated with functions performed by the gaming machine (i.e., the game interface 503). That is, as illustrated in FIG. 9D, the result of at least one player input that is detected on the gaming device may cause a change related to the locally controlled game (e.g., a player changing their bet amount via the bet slider input) and the result of at least another player input may cause a change related to the externally controlled process (e.g., a player notifying a gaming establishment concierge via the concierge input). In another embodiment, one or more aspects of the customizable interface may be independent of the game interface (controlled by the master gaming controller including a gaming machine processor) and/or one or more aspects of the customizable interface may be based on one or more events associated with the game interface. In different embodiments, the customizable interface is associated with information personal to the player, information relating to the plurality of different games available to the player, information communicated from a gaming establishment services system, information communicated from at least another gaming machine or information relating to any other suitable aspect of the player's experience at the gaming machine. This configuration may enable different customizable features performed by different processors at different locations to be simultaneously displayed and altered by the player, thus enhancing the player's gaming experience.

In a first setting of one embodiment of the gaming machine of the gaming system disclosed herein, the display device may be operable to display gaming outcomes. In a second setting of this embodiment, the display may be operable to shade the gaming outcomes and activate an interactive player menu from a single touch of a button. The button may be a touch screen activated button or mechanical button coupled to the gaming device. When this button is pressed, a menu may be displayed with a number of options that will bring up further menus, thus resulting in a number of nested menus 1020. As seen in FIGS. 9B, 9C & 9D, the plurality of nested menus 1020 may enable the player to navigate through different aspects of the interface in an efficient manner. Such an embodiment may provide the player a maximum amount of accessible information with a minimum number of player inputs. In different embodiments, the nested menus which are displayed and accessible by a player may be predetermined, determined based on the player's status (such as determined through a player tracking system), determined by the remote host, determined by the gaming machine processor, determined based on one or more side wagers placed, determined based on the player's primary game wager, determined based on time (such as the time of day) or determined based on any other suitable method or criteria. It should be appreciated that utilizing one or more nested menus optimizes the player's ease of use of the gaming machine by providing an interface wherein the features of the greatest interest are available from a single button. That is, to access the menus, the player may need only touch a single button from the base game and the menu bar will pop up giving the player immediate access to a number of features.

In one embodiment, as illustrated in FIGS. 9B and 9C, a first available submenu enables the player to interact with a remote host which stores a plurality of games. For example, by accessing a "More Games" submenu, the player accesses a database of available games. In this example, the gaming machine enables the player to choose a game to play, store one or more games as favorites, rate a game on a scale of some type (e.g., 3.5 out of 4 stars where 1 is a poor game and 4 is an excellent game or 9 out of 10 wherein 1 is a poor game and 10 is a great game), or browse information pertaining to the different games available. Such a configuration provides the player the ability to select any game that is available to play at the player's current gaming machine and thus eliminating a player having to search for a specific machine in order to play a specific game. This submenu provides the player with a superior interface for interacting with the capabilities that the disclosed gaming system present. In a particular embodiment, the submenu may be in a "tabbed" format.

The rating information provided by the player may be stored for only the player, collected and combined with other players rating information or combinations thereof. The rating information provided by the player may be stored for only the player, collected and combined with other players rating information or combinations thereof. In one embodiment, combined rating information generated from player selections may utilized by a gaming operator to determine a distribution of games in a casino and not necessarily displayed to the player. In another embodiment, the combined rating information may be displayed to players. Players viewing the combined rating information may utilize the information as an aid in regards to selecting games to play.

The rating information may be displayed alone or in combination with other information. For instance, the rating information may be displayed in conjunction with ranking information such as the most played games, the games providing the most awards (hot games), the games providing the least awards (cool games). Further, the information including the rating information, ranking information may be categorized, such as according to game theme or game type. Further, the rating information may be sorted, such as from highest to lowest ranked or lowest to highest, top 10, top 3, etc. In particular embodiments, the rating and/or ranking information may be sorted within a category (e.g., the rankings and/or ratings of the game may be sorted on only data from the particular category) or the combinations of information may be sorted across all games for which data is available and then the data may be sorted according to category.

In another embodiment, a second submenu enables the player to access designated information personal and exclusive to the player. For example, the player accesses this submenu via a "Services" button. From this menu, the gaming machine of the gaming system enables the player to access their casino account, redeem comps, check on their points, update their information, redeem qualified promotions or bonuses, or perform any other beneficial function for the player or gaming establishment. In one such embodiment, the account store game preference information (such as denomination, games, paylines, etc.) that will automatically load onto the gaming machine.

In another embodiment, a third available submenu enables the player to instruct the gaming machine processor to interact with a gaming establishment services system. From this menu, as described above, the player is enabled to connect the gaming machine with certain gaming establishment services, such as order a drink, make a reservation for dinner, make entertainment reservations, call a host or employee, report a malfunction, call for service, or perform any other gaming establishment service function that would be beneficial to the player or to the gaming establishment.

In another embodiment, a fourth available submenu available enables the player to instruct the gaming machine processor to interact with at least another gaming machine. In this embodiment, utilizing such a submenu, the player could connect with another gaming machine for purposes of shared game play, wagering on the outcome of another gaming machine, communication, participating in different bonus games not available on their own gaming machine, create their own groupings of player to participate in a bonus event, or any other possible game function. Such a configuration enables the player to enhance their gaming experience by connecting with other gaming machines, searching for a specific player/machine, join specific tournaments or progressive events or group with other players to form a group that may be associated with their own bonus event.

In another embodiment, a fifth available submenu enables the player to modify the function of at least one setting for the gaming machine. In this embodiment, possible play settings that may be modified include, but are not limited to an auto-play setting, a double-up setting, a value selection setting, a payline selection setting, a wager selection setting, a multi-play selection setting, a volume selection setting, or any other appropriate modification to the settings. This embodiment enables the player to essentially customize the gaming machine to their own personal preferences and settings. It should be appreciated that this feature may hooked into a player tracking database wherein the player could store their preferences and use this sub-menu to enact them.

In another embodiment, a sixth available submenu enables the player to display pay table information. Possible displayed information includes, but is not limited to pay screen information, game rule information, game type information, scatter pay information, winning combination information, pay table information or any other appropriate information relating to the game pay or game pay statistics. This embodiment enables the player to learn more about the game they are playing, understand what the payout/winning combinations are, and gain a feel for the game's play.

In another embodiment, a seventh available submenu enables the player to modify the function of at least one side bet setting for the gaming machine. In this embodiment, a gaming establishment may have multiple progressives running at the same time, wherein by providing the player access to a special side bet section, the gaming system enables the player to choose which progressives they wish to participate in and place a side wager. It should be appreciated that any other gaming events associated with a side wager could be linked into this submenu as well.

It should be appreciated that to build one or more of the menus described above, the remote host utilizes information specific to each gaming device, such as how the games on a designated gaming device are configured, what games are stored locally on a designated gaming device, which player is playing a designated gaming device and what promotional features is the player qualified for. In one embodiment, the player's currently played gaming device communicates information to the remote host and the remote host builds one or more menus based on this communicated information. In another embodiment, when the remote host communicates or downloads information relating to the currently played game program of the gaming device, the remote host logs in the appropriate information. In this embodiment, when determining to build one or more menus, the remote host accesses this logged in information to determine one or more menus for the player's currently played gaming device. In another embodiment, the remote host periodically checks which games are being played on one or more gaming devices and stores information or data relating resulting from these checks. In this embodiment, when building one or more menus, the remote host accesses this stored information to determine one or more menus for the player's currently played gaming device.

In the examples described above, ECIs that may be utilized by a player are described, the present invention is not limited to ECIs utilized by a player. In other embodiments, ECIs may be provided that are meant to be only accessible to a gaming operator, such as configuration, game download, metering, hand pays, jackpot verification, tax forms, or diagnostic menus, history for a particular gaming device. To access an ECI meant to be accessed by a gaming operator, the gaming device may require additional information to be entered and verified, such as a PIN number/password, a special card to be inserted in a card reader, biometric information, information from a remote host, such as an authorization or combinations thereof.

Figure 6:
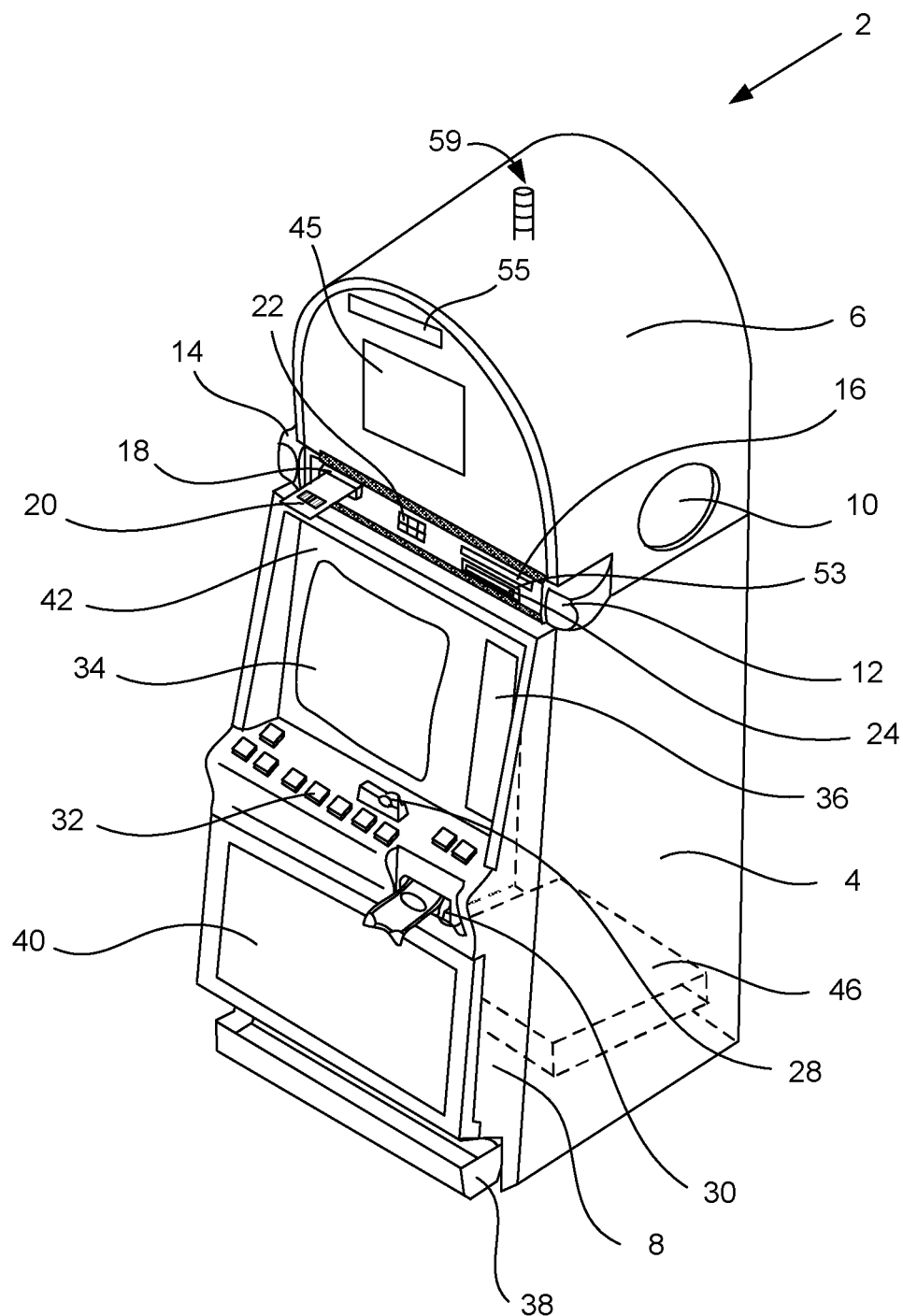
FIG. 6 illustrates a perspective view of one embodiment of a gaming machine.

FIG. 6 shows a perspective view of a gaming machine 2 in accordance with a specific embodiment of the systems and methods described herein. The gaming devices and gaming functions described with respect to at least FIG. 6 may be incorporated as components of the ECI's described above with respect to at least FIGS. 1 thru 5B and 9A-9D. Further, the gaming devices may be operated in accordance with instructions received from a remote host in communication with the gaming machine. In some instance, a host-controlled process executed on the gaming machine may share a gaming device with a process controlled by the master gaming controller 46 on the gaming machine.

As illustrated in the example of FIG. 6, machine 2 includes a main cabinet 4, which generally surrounds the machine interior and is viewable by users. The main cabinet includes a main door 8 on the front of the machine, which opens to provide access to the interior of the machine.

In one embodiment, attached to the main door is at least one payment acceptor 28 and a bill validator 30, and a coin tray 38. In one embodiment, the payment acceptor may include a coin slot and a payment, note or bill acceptor, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming machine. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming machine. In one embodiment, money may be transferred to a gaming machine through electronic funds transfer. When a player funds the gaming machine, the master gaming controller 46 or another logic device coupled to the gaming machine determines the amount of funds entered and displays the corresponding amount on the credit or other suitable display as described above. Master gaming controller 46 is connected to a peripheral device, such as a bezel 53, which may flash lights on and off, upon insertion or removal of the identification card into the card reader. Master gaming controller 46 is also connected to another peripheral device, which is an overhead display 55. Overhead display 55 is a digital display that may display a total amount accumulated in a progressive jackpot or at the gaming machine 2. Moreover, master gaming controller 46 is connected to yet another peripheral device, which is a candle 59. Candle 59 may emit light upon occurrence of a particular condition, examples of which are described below.

In one embodiment attached to the main door are a plurality of player-input switches or buttons 32. The input switches can include any suitable devices which enables the player to produce an input signal which is received by the processor. In one embodiment, after appropriate funding of the gaming machine, the input switch is a game activation device, such as a pull arm or a play button which is used by the player to start any primary game or sequence of events in the gaming machine. The play button can be any suitable play activator such as a bet one button, a max bet button or a repeat the bet button. In one embodiment, upon appropriate funding, the gaming machine may begin the game play automatically. In another embodiment, upon the player engaging one of the play buttons, the gaming machine may automatically activate game play.

In one embodiment, one input switch is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input switch is a bet max button (not shown), which enables the player to bet the maximum wager permitted for a game of the gaming machine.

In one embodiment, one input switch is a cash-out button. The player may push the cash-out button and cash out to receive a cash payment or other suitable form of payment corresponding to the number of remaining credits. In one embodiment, when the player cashes out, the player may receive the coins or tokens in a coin payout tray. In one embodiment, when the player cashes out, the player may receive other payout mechanisms such as tickets or credit slips redeemable by a cashier (or other suitable redemption system) or funding to the player's electronically recordable identification card. Details of ticketing or voucher system that may be utilized with the present invention are described in co-pending U.S. patent application Ser. No. 10/406,911, filed Apr. 2, 2003, by Rowe, et al., and entitled, "Cashless Transaction Clearinghouse," which is incorporated herein by reference and for all purposes.

In one embodiment, one input switch is a touch-screen coupled with a touch-screen controller, or some other touch-sensitive display overlay to enable for player interaction with the images on the display. The touch-screen and the touch-screen controller may be connected to a video controller. A player may make decisions and input signals into the gaming machine by touching the touch-screen at the appropriate places. One such input switch is a touch-screen button panel.

In one embodiment, the gaming machine may further include a plurality of communication ports for enabling communication of the gaming machine processor with external peripherals, such as external video sources, expansion buses, game or other displays, an SCSI port or a key pad.

As seen in FIG. 6, viewable through the main door is a video display monitor 34 and an information panel 36. The display monitor 34 will typically be a cathode ray tube, high resolution flat-panel LCD, SED based-display, plasma display, a television display, a display based on light emitting diodes (LED), a display based on a plurality of organic light-emitting diodes (OLEDs), a display based on polymer light-emitting diodes (PLEDs), a display including a projected and/or reflected image or any other suitable electronic device or display. The information panel 36 or belly-glass 40 may be a static back-lit, silk screened glass panel with lettering to indicate general game information including, for example, a game denomination (e.g. $0.25 or $1) or a dynamic display, such as an LCD, an OLED or E-INK display. In another embodiment, at least one display device may be a mobile display device, such as a PDA or tablet PC, that enables play of at least a portion of the primary or secondary game at a location remote from the gaming machine. The display devices may be of any suitable size and configuration, such as a square, a rectangle or an elongated rectangle.

The display devices of the gaming machine are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like. In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia. In another embodiment, the display device may include an electromechanical device adjacent to a video display, such as a video display positioned in front of a mechanical reel. In another embodiment, the display device may include dual layered video displays which co-act to generate one or more images.

The bill validator 30, player-input switches 32, video display monitor 34, and information panel are gaming devices that may be used to play a game on the game machine 2. Also, these devices may be utilized as part of an ECI provided on the gaming machine. According to a specific embodiment, the devices may be controlled by code executed by a master gaming controller 46 housed inside the main cabinet 4 of the machine 2. The master gaming controller may include one or more processors including general purpose and specialized processors, such as graphics cards, and one or more memory devices including volatile and non-volatile memory. The master gaming controller 46 may periodically configure and/or authenticate the code executed on the gaming machine.

In one embodiment, the gaming machine may include a sound generating device coupled to one or more sounds cards. In one embodiment, the sound generating device includes at least one and preferably a plurality of speakers or other sound generating hardware and/or software for generating sounds, such as playing music for the primary and/or secondary game or for other modes of the gaming machine, such as an attract mode. In one embodiment, the gaming machine provides dynamic sounds coupled with attractive multimedia images displayed on one or more of the display devices to provide an audio-visual representation or to otherwise display full-motion video with sound to attract players to the gaming machine. During idle periods, the gaming machine may display a sequence of audio and/or visual attraction messages to attract potential players to the gaming machine. The videos may also be customized for or to provide any appropriate information.

In one embodiment, the gaming machine may include a sensor, such as a camera that is selectively positioned to acquire an image of a player actively using the gaming machine and/or the surrounding area of the gaming machine. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

In another embodiment, the gaming devices on the gaming machine may be controlled by code executed by the master gaming controller 46 (or another logic device coupled to or in communication with the gaming machine, such as a player tracking controller) in conjunction with code executed by a remote logic device in communication with the master gaming controller 46. As described above with respect to at least FIGS. 1A to 5B and 7, 8, 9A-9D, the master gaming controller 46 may execute ECI processes that enable content generated and managed on a remote host to be output on the gaming machine. The gaming machine may receive and send events to a remote host that may affect the content output on an instantiation of a particular ECI. The master gaming controller 46 may be configured to limit the resources that can be utilized by the ECI processes executing on the gaming machine at any given time and may constantly monitor resources utilized by the ECI processes to ensure that gaming experience on the gaming machine is optimal.

Many different types of games, including mechanical slot games, video slot games, video poker, video black jack, video pachinko and lottery, may be provided with gaming machines of this present invention. In particular, the gaming machine 2 may be operable to provide a play of many different games of chance. The games may be differentiated according to themes, sounds, graphics, type of game (e.g., slot game vs. card game), denomination, number of paylines, maximum jackpot, progressive or non-progressive, bonus games, etc.

In one embodiment, the gaming machine 2 may be operable to enable a player to select a game of chance to play from a plurality of different games available on the gaming machine. For example, the gaming machine may provide a menu with a list of the different games that are available for play on the gaming machine and a player may be able to select from the list a first game of chance that they wish to play. In one such embodiment, a memory device of the remote host stores different game programs and instructions, executable by a gaming machine processor, to control the gaming machine. Each executable game program represents a different game or type of game, which may be played on one or more of the gaming machines in the gaming system. Such different games may include the same or substantially the same game play with different pay tables. In different embodiments, the executable game program is for a primary game, a secondary game or both. In another embodiment, the game program may be executable as a secondary game to be played simultaneously with the play of a primary game (which may be downloaded to or fixed on the gaming machine) or vice versa.

In one such embodiment, each gaming machine includes at least one or more display devices and/or one or more input switches for interaction with a player. A local processor, such as the above-described gaming machine processor or a processor of a local server, is operable with the display device(s) and/or the input switch(es) of one or more of the gaming machines. In operation, the remote host is operable to communicate one or more of the stored game programs to at least one local gaming machine processor. In different embodiments, the stored game programs are communicated or delivered by embedding the communicated game program in a device or a component (e.g., a microchip to be inserted in a gaming machine), writing the game program on a disc or other media, downloading or streaming the game program over a dedicated data network, internet or a telephone line. In different embodiments, the stored game programs are downloaded in response to a player inserting a player tracking card, a player selecting a specific game program, a player inserting a designated wager amount, the remote host communicating data to the gaming device regarding an upcoming tournament or promotion or any other suitable trigger. After the stored game programs are communicated from the remote host, the local gaming machine processor executes the communicated program to facilitate play of the communicated program by a player through the display device(s) and/or input switch(s) of the gaming machine. That is, when a game program is communicated to a local gaming machine processor, the local gaming machine processor changes the game or type of game played at the gaming machine.

In particular embodiments, the master gaming controller 46 may provide information to a remote host providing content to an ECI on the gaming machine 2 that enables the remote host to select graphical and audio themes for the ECI content that matches the theme of the game graphics and game sounds currently played on the gaming machine 2.

In one embodiment, the various games available for play on the gaming machine 2 may be stored as game software on a mass storage device in the gaming machine. In one such embodiment, the memory device of the gaming machine stores program codes and instructions, executable by the gaming machine processor, to control the games available for play on the gaming machine. The memory device also stores other data such as image data, event data, player input data, random or pseudo-random number generators, paytable data or information and applicable game rules that relate to the play of the gaming machine. In another embodiment, the games available for play on the gaming machine may be generated on a remote gaming device but then displayed on the gaming machine.

In one embodiment, the gaming machine 2 may execute game software, such as but not limited to video streaming software that enables the game to be displayed on the gaming machine. When a game is stored on the gaming machine 2, it may be loaded from the mass storage device into a RAM for execution. In some cases, after a selection of a game, the game software that enables the selected game to be generated may be downloaded from a remote gaming device, such as another gaming machine.

As illustrated in the example of FIG. 6, the gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a display 16 (e.g., a video LCD display) for displaying player tracking information, a card reader 24 for entering a magnetic striped card containing player tracking information, and a display screen 45, which may be a video display screen or a digital display screen. The ticket printer 18 may be used to print tickets for a cashless ticketing system. Further, the top box 6 may house different or additional devices not illustrated in FIG. 6. For example, the top box may include a bonus wheel or a back-lit silk screened panel which may be used to add bonus features to the game being played on the gaming machine. As another example, the top box may include a display for a progressive jackpot offered on the gaming machine. During a game, these devices are controlled and powered, in part, by circuitry (e.g. a master gaming controller 46) housed within the main cabinet 4 of the machine 2.

It will be appreciated that gaming machine 2 is but one example from a wide range of gaming machine designs on which the present invention may be implemented. For example, not all suitable gaming machines have top boxes or player tracking features. Further, some gaming machines have only a single game display—mechanical or video, while others may have multiple displays.

In various embodiments, the remote gaming device may be connected to the host computer via a network of some type such as a local area network, a wide area network, an intranet or the Internet. In one such embodiment, a plurality of the gaming machines may be capable of being connected together through a data network. In one embodiment, the data network is a local area network (LAN), in which one or more of the gaming machines are substantially proximate to each other and an on-site remote host as in, for example, the gaming establishment or a portion of the gaming establishment. In another embodiment, the data network is a wide area network (WAN) in which one or more of the gaming machines are in communication with at least one off-site remote host. In this embodiment, the plurality of gaming machines may be located in a different part of the gaming establishment or within a different gaming establishment than the off-site remote host. Thus, the WAN may include an off-site remote host and an off-site gaming machine located within gaming establishments in the same geographic area, such as a city or state. The WAN gaming system may be substantially identical to the LAN gaming system described above, although the number of gaming machines in each system may vary relative to each other.

In another embodiment, the data network is an internet or intranet. In this embodiment, the operation of the gaming machine can be viewed at the gaming machine with at least one internet browser. In this embodiment, operation of the gaming machine and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

In another embodiment, the remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. In addition, various combinations of gaming devices are possible on the gaming machine. For example, some gaming machine only accept cash, cashless vouchers or electronic fund transfers and do not include coin acceptors or coin hoppers. Thus, those of skill in the art will understand that the present invention, as described below, can be deployed on most any gaming machine now available or hereafter developed.

In another embodiment, the gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming machine as disclosed herein may be a device that has obtained approval from a regulatory gaming commission or a device that has not obtained approval from a regulatory gaming commission.

Some preferred gaming machines of the present assignee are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

For example, a watchdog timer is normally used in International Game Technology (IGT) gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of the some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. Gaming machines of the present assignee typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that enables the first state to be reconstructed is stored. This feature enables the game to recover operation to the current state of play in the event of a malfunction, loss of power, etc. that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion. Further details of a state based gaming system, recovery from malfunctions and game history are described in U.S. Pat. No. 6,804,763, titled "High Performance Battery Backed RAM Interface", U.S. Pat. No. 6,863,608, titled "Frame Capture of Actual Game Play," U.S. application Ser. No. 10/243,104, titled, "Dynamic NV-RAM," and U.S. application Ser. No. 10/758,828, titled, "Frame Capture of Actual Game Play," each of which is incorporated by reference and for all purposes.

In particular embodiments, a state of a gaming device may be reconstructed from game history information stored in multiple locations. For instance, in one embodiment, a gaming device operable to provide an ECI and a game interface simultaneously may not store state information for the ECI but only for the game interface. Thus, to reconstruct the state of gaming device including the ECI in a dispute, after a malfunction or after a power-failure, game history information may have to be retrieved from a local memory source on the gaming device and a remote memory source located on a remote host that provides the ECI. For example, the remote and gaming machine may store correlation information, such as timing information or referential information, that allows events on the gaming machine to be correlated to events occurring on the remote host. The correlation information stored at the gaming machine and/or remote host may be used to synchronize the reconstruction of a game state on the gaming machine. In a particular embodiment, a remote host that provides ECI services to a gaming device may provide an ECI that allows archival information regarding ECIs displayed on a gaming device to be retrieved.

Another feature of gaming machines, such as IGT gaming computers, is that they often include unique interfaces, including serial interfaces, to connect to specific subsystems internal and external to the gaming machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the gaming machine, serial devices may be connected in a shared, daisy-chain fashion where multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming machine to a remote device. Often SAS is used in conjunction with a player tracking system.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, e.g., via software for reading status registers. This can trigger event log entries and further data authentication operations by the gaming machine software.

Trusted memory devices and/or trusted memory sources are preferably included in an IGT gaming machine computer to ensure the authenticity of the software that may be stored on less secure memory subsystems, such as mass storage devices. Trusted memory devices and controlling circuitry are typically designed to not enable modification of the code and data stored in the memory device while the memory device is installed in the gaming machine. The code and data stored in these devices may include authentication algorithms, random number generators, authentication keys, operating system kernels, etc. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of the verification algorithms included in the trusted device, the gaming machine is enabled to verify the authenticity of additional code and data that may be located in the gaming computer assembly, such as code and data stored on hard disk drives. A few details related to trusted memory devices that may be used in the present invention are described in U.S. Pat. No. 6,685,567 from U.S. patent application Ser. No. 09/925,098, filed Aug. 8, 2001 and titled "Process Verification," which is incorporated herein in its entirety and for all purposes.

In at least one embodiment, at least a portion of the trusted memory devices/sources may correspond to memory which cannot easily be altered (e.g., "unalterable memory") such as, for example, EPROMS, PROMS, Bios, Extended Bios, and/or other memory sources which are able to be configured, verified, and/or authenticated (e.g., for authenticity) in a secure and controlled manner.

According to a specific implementation, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment of the present invention, the remote device and the trusted information source may engage in methods using zero knowledge proofs to authenticate each of their respective identities.

Gaming devices storing trusted information may utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Additional details relating to trusted memory devices/sources are described in U.S. patent application Ser. No. 11/078,966, entitled "Secured Virtual Network in a Gaming Environment", naming Nguyen et al. as inventors, filed on Mar. 10, 2005, herein incorporated in its entirety and for all purposes.

Mass storage devices used in a general purpose computer typically enable code and data to be read from and written to the mass storage device. In a gaming machine environment, modification of the gaming code stored on a mass storage device is strictly controlled and would only be enabled under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. Details using a mass storage device that may be used with the present invention are described, for example, in U.S. Pat. No. 6,149,522, herein incorporated by reference in its entirety for all purposes.

Returning to the example of FIG. 6, when a user wishes to play the gaming machine 2, he or she inserts a ticket or cash through the payment or coin acceptor 28 or bill validator 30. Additionally, the bill validator may accept a printed ticket voucher, which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 45 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights behind the belly glass 40. After the player has completed a game, the player may receive game tokens from the coin tray 38 or the ticket 20 from the printer 18, which may be used for further games or to redeem a prize. Further, the player may receive a ticket 20 for food, merchandise, or games from the printer 18.

In one embodiment, as described above, the gaming machine can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, a base or primary game played using the game interface may be a slot game with one or more paylines. The paylines may be horizontal, vertical, circular, diagonal, angled or any combination thereof. In this embodiment, the gaming machine includes at least one and preferably a plurality of reels, such as three to five reels, in either electromechanical form with mechanical rotating reels or video form with simulated reels and movement thereof. In one embodiment, an electromechanical slot machine includes a plurality of adjacent, rotatable reels, which may be combined and operably coupled with an electronic display of any suitable type. In another embodiment, if the reels are in video form, one or more of the display devices, as described above, display the plurality of simulated video reels. Each reel displays a plurality of indicia or symbols, such as bells, hearts, fruits, numbers, letters, bars or other images, which preferably correspond to a theme associated with the gaming machine. In another embodiment, one or more of the reels are independent reels or unisymbol reels. In this embodiment, each independent or unisymbol reel generates and displays one symbol to the player. In one embodiment, the gaming machine awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming machine determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming machine provides the player one award for that occurrence of the generated winning symbol combination. For example, if one winning symbol combination is generated on the reels, the gaming machine will provide a single award to the player for that winning symbol combination (i.e., not based on paylines that would have passed through that winning symbol combination). It should be appreciated that because a gaming machine with wagering on ways to win provides the player one award for a single occurrence of a winning symbol combination and a gaming machine with paylines may provide the player more than one award for the same occurrence of a single winning symbol combination (i.e., if a plurality of paylines each pass through the same winning symbol combination), it is possible to provide a player at a ways to win gaming machine more ways to win for an equivalent bet or wager on a traditional slot gaming machine with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming machine with at least one symbol generated in an active symbol position. For example, a three reel gaming machine with three symbols generated in active symbol positions on each reel includes 27 ways to win (i.e., 3 symbols on the first reel.times.3 symbols on the second reel.times.3 symbols on the third reel). A four reel gaming machine with three symbols generated in active symbol positions on each reel includes 81 ways to win (i.e., 3 symbols on the first reel.times.3 symbols on the second reel.times.3 symbols on the third reel.times.3 symbols on the fourth reel). A five reel gaming machine with three symbols generated in active symbol positions on each reel includes 243 ways to win (i.e., 3 symbols on the first reel.times.3 symbols on the second reel.times.3 symbols on the third reel.times.3 symbols on the fourth reel.times.3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming machine may enable a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming machine uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming machine provides the player three ways to win (i.e., 3 symbols on the first reel.times.1 symbol on the second reel.times.1 symbol on the third reel.times.1 symbol on the fourth reel.times.1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming machine provides the player twenty-seven ways to win (i.e., 3 symbols on the first reel.times.3 symbols on the second reel.times.3 symbols on the third reel.times.1 symbol on the fourth reel.times.1 symbol on the fifth reel).

In one embodiment, to determine any award(s) to provide to the player based on the generated symbols, the gaming machine individually determines if a symbol generated in an active symbol position on a first reel forms part of a winning symbol combination with or is otherwise suitably related to a symbol generated in an active symbol position on a second reel. In this embodiment, the gaming machine classifies each pair of symbols, which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming machine classifies the two cherry symbols as a string of related symbols because the two cherry symbols form part of a winning symbol combination.

After determining if any strings of related symbols are formed between the symbols on the first reel and the symbols on the second reel, the gaming machine determines if any of the symbols from the next adjacent reel should be added to any of the formed strings of related symbols. In this embodiment, for a first of the classified strings of related symbols, the gaming machine determines if any of the symbols generated by the next adjacent reel form part of a winning symbol combination or are otherwise related to the symbols of the first string of related symbols. If the gaming machine determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming machine adds the related cherry symbol generated on the third reel to the previously classified string of cherry symbols.

On the other hand, if the gaming machine determines that no symbols generated on the next adjacent reel are related to the symbols of the first string of related symbols, the gaming machine marks or flags such string of related symbols as complete. For example, if the first string of related symbols is the string of related cherry symbols and none of the symbols of the third reel are related to the cherry symbols of the previously classified string of cherry symbols, the gaming machine marks or flags the string of cherry symbols as complete.

After either adding a related symbol to the first string of related symbols or marking the first string of related symbols as complete, the gaming machine proceeds as described above for each of the remaining classified strings of related symbols which were previously classified or formed from related symbols on the first and second reels.

After analyzing each of the remaining strings of related symbols, the gaming machine determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming machine marks each of the remaining pending strings of related symbols as complete.

When each of the strings of related symbols is marked complete, the gaming machine compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming machine enables the player to play a conventional game of video draw poker and initially deals five cards all face up from a virtual deck of fifty-two card deck. Cards may be dealt as in a traditional game of cards or in the case of the gaming machine, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming machine compares the final five-card hand to a payout table which utilizes conventional poker hand rankings to determine the winning hands. The gaming machine provides the player with an award based on a winning hand and the credits the player wagered.

In another embodiment, the base or primary game may be a multi-hand version of video poker. In this embodiment, the gaming machine deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming machine displays a plurality of selectable indicia or numbers on at least one of the display devices. In this embodiment, the player selects at least one or a plurality of the selectable indicia or numbers via an input device such as the touch screen. The gaming machine then displays a series of drawn numbers to determine an amount of matches, if any, between the player's selected numbers and the gaming machine's drawn numbers. The player is provided an award based on the amount of matches, if any, based on the amount of determined matches.

In one embodiment, in addition to winning credits or other awards in a base or primary game, as described above, the gaming machine may also give players the opportunity to win credits in a bonus or secondary game played. The bonus or secondary game may be played using the game interface. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game. In other embodiments, the triggering event or qualifying condition may be by exceeding a certain amount of game play (such as number of games, number of credits, amount of time), or reaching a specified number of points earned during game play of the primary game.

In another embodiment, the gaming machine processor or remote host randomly provides the player one or more plays of one or more secondary games. In one such embodiment, the gaming machine does not provide any apparent reasons to the player for qualifying to play a secondary or bonus game that may be played using the window interface. In this embodiment, qualifying for a bonus game played using the window interface is not triggered by an event in or based specifically on any of the plays of any primary game. That is, the gaming machine may simply qualify a player to play a secondary game in the window interface without any explanation or alternatively with simple explanations. In another embodiment, the gaming machine (or remote host) qualifies a player for a secondary game at least partially based on a game triggered or symbol triggered event, such as at least partially based on the play of a primary game.

In one embodiment, the gaming machine includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game played using the window interface need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 7:
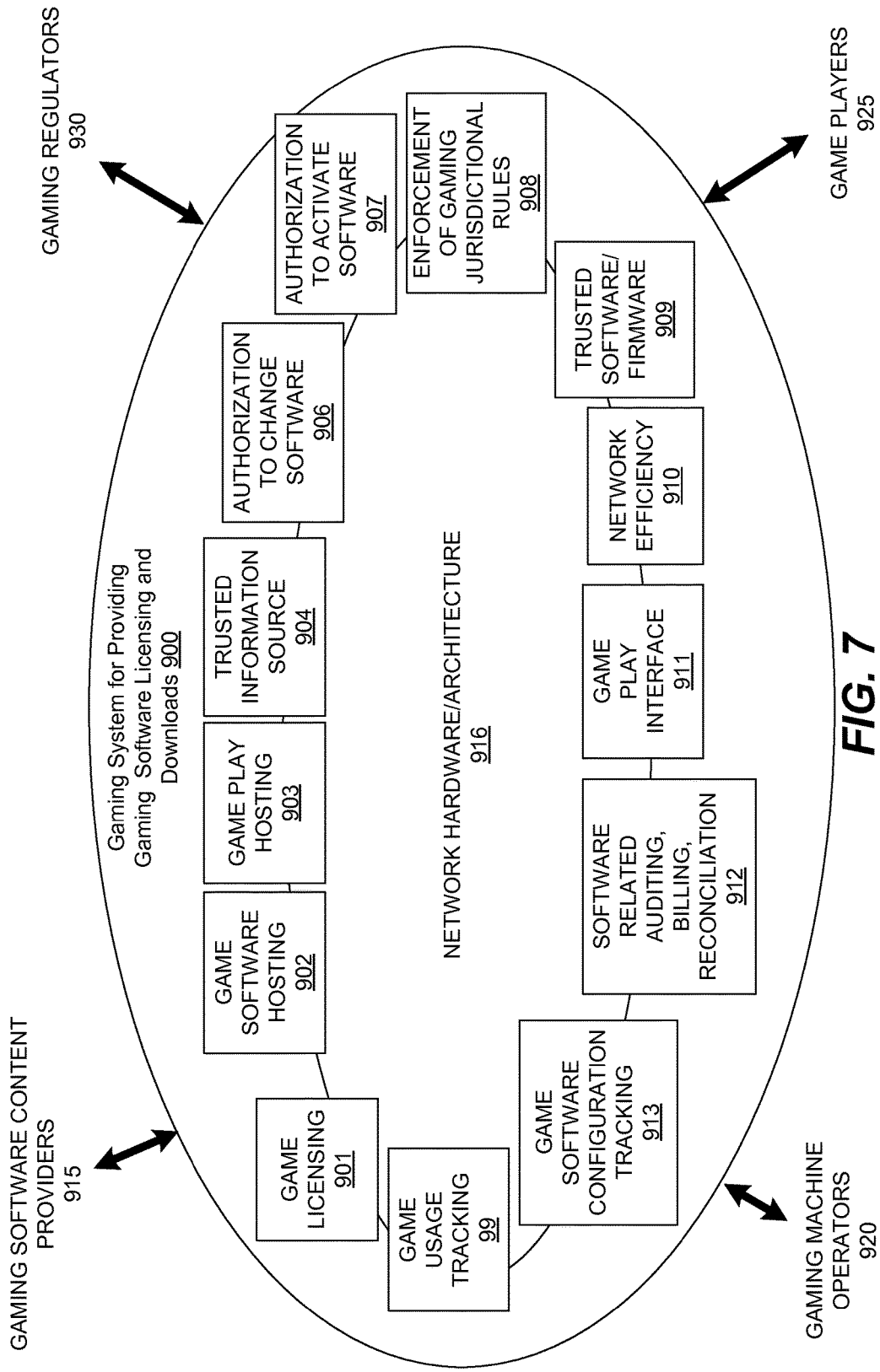
FIG. 7 illustrates a block diagram of a gaming system for embodiments of the systems and methods.

FIG. 7 shows a block diagram illustrating components of a gaming system 900 which may be used for implementing various aspects of the present invention. In FIG. 7, the components of a gaming system 900 for providing game software licensing and downloads are described functionally. The described functions may be instantiated in hardware, firmware and/or software and executed on a suitable device. In the system 900, there may be many instances of the same function, such as multiple game play interfaces 911. Nevertheless, in FIG. 7, only one instance of each function is shown. The functions of the components may be combined. For example, a single device may comprise the game play interface 911 and include trusted memory devices or sources 909. The described components and their functions may be incorporated various embodiments of the servers and clients described with respect to at least FIGS. 1A and 6.

The gaming system 900 may receive inputs from different groups/entities and output various services and or information to these groups/entities. For example, game players 925 primarily input cash or indicia of credit into the system, make game selections that trigger software downloads, and receive entertainment in exchange for their inputs. Game software content providers provide game software for the system and may receive compensation for the content they provide based on licensing agreements with the gaming machine operators. Gaming machine operators select game software for distribution, distribute the game software on the gaming devices in the system 900, receive revenue for the use of their software and compensate the gaming machine operators. The gaming regulators 930 may provide rules and regulations that must be applied to the gaming system and may receive reports and other information confirming that rules are being obeyed.

In the following paragraphs, details of each component and some of the interactions between the components are described with respect to FIG. 7. The game software license host 901 may be a server connected to a number of remote gaming devices that provides licensing services to the remote gaming devices. For example, in other embodiments, the license host 901 may 1) receive token requests for tokens used to activate software executed on the remote gaming devices, 2) send tokens to the remote gaming devices, 3) track token usage and 4) grant and/or renew software licenses for software executed on the remote gaming devices. The token usage may be used in utility based licensing schemes, such as a pay-per-use scheme.

In another embodiment, a game usage-tracking host 915 may track the usage of game software on a plurality of devices in communication with the host. The game usage-tracking host 915 may be in communication with a plurality of game play hosts and gaming machines. From the game play hosts and gaming machines, the game usage tracking host 915 may receive updates of an amount that each game available for play on the devices has been played and on amount that has been wagered per game. This information may be stored in a database and used for billing according to methods described in a utility based licensing agreement.

The game software host 902 may provide game software downloads, such as downloads of game software or game firmware, to various devious in the game system 900. For example, when the software to generate the game is not available on the game play interface 911, the game software host 902 may download software to generate a selected game of chance played on the game play interface. Further, the game software host 902 may download new game content to a plurality of gaming machines via a request from a gaming machine operator.

In one embodiment, the game software host 902 may also be a game software configuration-tracking host 913. The function of the game software configuration-tracking host is to keep records of software configurations and/or hardware configurations for a plurality of devices in communication with the host (e.g., denominations, number of paylines, paytables, max/min bets). Details of a game software host and a game software configuration host that may be used with the present invention are described in co-pending U.S. Pat. No. 6,645,077, by Rowe, entitled, "Gaming Terminal Data Repository and Information System," filed Dec. 21, 2000, which is incorporated herein in its entirety and for all purposes.

A game play host device 903 may be a host server connected to a plurality of remote clients that generates games of chance that are displayed on a plurality of remote game play interfaces 911. For example, the game play host device 903 may be a server that provides central determination for a bingo game play played on a plurality of connected game play interfaces 911. As another example, the game play host device 903 may generate games of chance, such as slot games or video card games, for display on a remote client. A game player using the remote client may be able to select from a number of games that are provided on the client by the host device 903. The game play host device 903 may receive game software management services, such as receiving downloads of new game software, from the game software host 902 and may receive game software licensing services, such as the granting or renewing of software licenses for software executed on the device 903, from the game license host 901.

In particular embodiments, the game play interfaces or other gaming devices in the gaming system 900 may be portable devices, such as electronic tokens, cell phones, smart cards, tablet PC's and PDA's. The portable devices may support wireless communications and thus, may be referred to as wireless mobile devices. The network hardware architecture 916 may be enabled to support communications between wireless mobile devices and other gaming devices in gaming system. In one embodiment, the wireless mobile devices may be used to play games of chance.

The gaming system 900 may use a number of trusted information sources. Trusted information sources 904 may be devices, such as servers, that provide information used to authenticate/activate other pieces of information. CRC values used to authenticate software, license tokens used to enable the use of software or product activation codes used to activate to software are examples of trusted information that might be provided from a trusted information source 904. Trusted information sources may be a memory device, such as an EPROM, that includes trusted information used to authenticate other information. For example, a game play interface 911 may store a private encryption key in a trusted memory device that is used in a private key-public key encryption scheme to authenticate information from another gaming device.

When a trusted information source 904 is in communication with a remote device via a network, the remote device will employ a verification scheme to verify the identity of the trusted information source. For example, the trusted information source and the remote device may exchange information using public and private encryption keys to verify each other's identities.

Gaming devices storing trusted information might utilize apparatus or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

The gaming system 900 of the systems and methods described herein may include devices 906 that provide authorization to download software from a first device to a second device and devices 907 that provide activation codes or information that enable downloaded software to be activated. The devices, 906 and 907, may be remote servers and may also be trusted information sources. One example of a method of providing product activation codes that may be used with the present invention is describes in previously incorporated U.S. Pat. No. 6,264,561.

A device 906 that monitors a plurality of gaming devices to determine adherence of the devices to gaming jurisdictional rules 908 may be included in the system 900. In one embodiment, a gaming jurisdictional rule server may scan software and the configurations of the software on a number of gaming devices in communication with the gaming rule server to determine whether the software on the gaming devices is valid for use in the gaming jurisdiction where the gaming device is located. For example, the gaming rule server may request a digital signature, such as cyclic redundancy check's (CRC's), of particular software components and compare them with an approved digital signature value stored on the gaming jurisdictional rule server.

Further, the gaming jurisdictional rule server may scan the remote gaming device to determine whether the software is configured in a manner that is acceptable to the gaming jurisdiction where the gaming device is located. For example, a maximum bet limit may vary from jurisdiction to jurisdiction and the rule enforcement server may scan a gaming device to determine its current software configuration and its location and then compare the configuration on the gaming device with approved parameters for its location.

A gaming jurisdiction may include rules that describe how game software may be downloaded and licensed. The gaming jurisdictional rule server may scan download transaction records and licensing records on a gaming device to determine whether the download and licensing was carried out in a manner that is acceptable to the gaming jurisdiction in which the gaming device is located. In general, the game jurisdictional rule server may be utilized to confirm compliance to any gaming rules passed by a gaming jurisdiction when the information needed to determine rule compliance is remotely accessible to the server.

Game software, firmware or hardware residing a particular gaming device may also be used to check for compliance with local gaming jurisdictional rules. In one embodiment, when a gaming device is installed in a particular gaming jurisdiction, a software program including jurisdiction rule information may be downloaded to a secure memory location on a gaming machine or the jurisdiction rule information may be downloaded as data and utilized by a program on the gaming machine. The software program and/or jurisdiction rule information may be used to check the gaming device software and software configurations for compliance with local gaming jurisdictional rules. In another embodiment, the software program for ensuring compliance and jurisdictional information may be installed in the gaming machine prior to its shipping, such as at the factory where the gaming machine is manufactured.

The gaming devices in game system 900 may utilize trusted software and/or trusted firmware. Trusted firmware/software is trusted in the sense that is used with the assumption that it has not been tampered with. For instance, trusted software/firmware may be used to authenticate other game software or processes executing on a gaming device. As an example, trusted encryption programs and authentication programs may be stored on an EPROM on the gaming machine or encoded into a specialized encryption chip. As another example, trusted game software, i.e., game software approved for use on gaming devices by a local gaming jurisdiction may be required on gaming devices on the gaming machine.

In the systems and methods, the devices may be connected by a network 916 with different types of hardware using different hardware architectures. Game software can be quite large and frequent downloads can place a significant burden on a network, which may slow information transfer speeds on the network. For game-on-demand services that require frequent downloads of game software in a network, efficient downloading is essential for the service to remain viable. Thus, in the systems and methods, network efficient devices 910 may be used to actively monitor and maintain network efficiency. For instance, software locators may be used to locate nearby locations of game software for peer-to-peer transfers of game software. In another example, network traffic may be monitored and downloads may be actively rerouted to maintain network efficiency.

One or more devices in the systems and methods described herein may provide game software and game licensing related auditing, billing and reconciliation reports to server 912. For example, a software licensing billing server may generate a bill for a gaming device operator based upon a usage of games over a time period on the gaming devices owned by the operator. In another example, a software auditing server may provide reports on game software downloads to various gaming devices in the gaming system 900 and current configurations of the game software on these gaming devices.

At particular time intervals, the software auditing server 912 may also request software configurations from a number of gaming devices in the gaming system. The server may then reconcile the software configuration on each gaming device. In one embodiment, the software auditing server 912 may store a record of software configurations on each gaming device at particular times and a record of software download transactions that have occurred on the device. By applying each of the recorded game software download transactions since a selected time to the software configuration recorded at the selected time, a software configuration is obtained. The software auditing server may compare the software configuration derived from applying these transactions on a gaming device with a current software configuration obtained from the gaming device. After the comparison, the software-auditing server may generate a reconciliation report that confirms that the download transaction records are consistent with the current software configuration on the device. The report may also identify any inconsistencies. In another embodiment, both the gaming device and the software auditing server may store a record of the download transactions that have occurred on the gaming device and the software auditing server may reconcile these records.

There are many possible interactions between the components described with respect to FIG. 7. Many of the interactions are coupled. For example, methods used for game licensing may affect methods used for game downloading and vice versa. For the purposes of explanation, details of a few possible interactions between the components of the system 900 relating to software licensing and software downloads have been described. The descriptions are selected to illustrate particular interactions in the game system 900. These descriptions are provided for the purposes of explanation only and are not intended to limit the scope of the systems and methods.

In one embodiment, as described above, the systems and methods described herein may be implemented in various configurations for gaming machines, including but not limited to: (1) a dedicated gaming machine, wherein the computerized instructions for controlling any games (which are provided by the gaming machine) are provided with the gaming machine prior to delivery to the gaming establishment; and (2) a changeable gaming machine, where the computerized instructions for controlling any games (which are provided by the gaming machine) are downloadable to the gaming machine through a data network when the gaming machine is in the gaming establishment. In another embodiment, the computerized instructions for controlling any games are communicated from the remote host, the central server or central controller to a gaming machine local processor and memory devices. In such a "thick client" embodiment, the gaming machine local processor executes the communicated computerized instructions to control any games (or other suitable interfaces) provided to a player.

In one alternative embodiment, the computerized instructions for controlling any games are executed by a remote host, a central server or central controller. In such a "thin client" embodiment, the remote host remotely controls any games (or other suitable interfaces) and the gaming machine is utilized to display such games (or suitable interfaces) and receive one or more inputs or commands from a player. In one embodiment, one or more gaming machines in a gaming system may be thin client gaming machines and one or more gaming machines in the gaming system may be thick client gaming machines. In another embodiment, certain functions of the gaming machine are implemented in a thin client environment and certain other functions of the gaming machine are implemented in a thick client environment. In one such embodiment, computerized instructions for controlling any primary games are communicated from the remote host to the gaming machine in a thick client configuration and computerized instructions for controlling any secondary games or bonus functions are executed by a remote host in a thin client configuration. It should be appreciated that one, more or each of the functions of the remote host as disclosed herein may be performed by one or more gaming machine processors. It should be further appreciated that one, more or each of the functions of one or more gaming machine processors as disclosed herein may be performed by the remote host.

In one embodiment, the gaming machine randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming machine generates the award or other game outcome to be provided to the player based on the associated probabilities. In this embodiment, since the gaming machine generates outcomes randomly or based upon one or more probability calculations, there is no certainty that the gaming machine will ever provide the player with any specific award or other game outcome.

In an alternative embodiment, the remote host maintains one or more predetermined pools or sets of predetermined game outcomes. In this embodiment, the remote host receives the game outcome request and independently selects a predetermined game outcome from a set or pool of game outcomes. The remote host flags or marks the selected game outcome as used. Once a game outcome is flagged as used, it is prevented from further selection from the set or pool and cannot be selected by the remote host upon another wager. The provided game outcome can include a primary game outcome, a secondary game outcome, primary and secondary game outcomes, or a series of game outcomes such as free games.

The remote host communicates the generated or selected game outcome to the initiated gaming machine. The gaming machine receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the remote host and communicated to the initiated gaming machine to be presented or displayed to the player. Central production or control can assist the gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming machines based on the results of a bingo, keno or lottery game. In this embodiment, each individual gaming machine utilizes one or more bingo, keno or lottery games to determine the predetermined game outcome value provided to the player for the interactive game played at that gaming machine. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming machine is enrolled in the bingo game, such as upon an appropriate wager or engaging an input device, the enrolled gaming machine is provided or associated with a different bingo card. Each bingo card includes a matrix or array of elements, wherein each element is designated with a separate indicia, such as a number. It should be appreciated that each different bingo card includes a different combination of elements. For example, if four bingo cards are provided to four enrolled gaming machines, the same element may be present on all four of the bingo cards while another element may solely be present on one of the bingo cards.

In operation of these embodiments, upon providing or associating a different bingo card to each of a plurality of enrolled gaming machines, the remote host randomly selects or draws, one at a time, a plurality of the elements. As each element is selected, a determination is made for each gaming machine as to whether the selected element is present on the bingo card provided to that enrolled gaming machine. This determination can be made by the remote host, the gaming machine, a combination of the two, or in any other suitable manner. If the selected element is present on the bingo card provided to that enrolled gaming machine, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming machine requires the player to engage a daub button (not shown) to initiate the process of the gaming machine marking or flagging any selected elements.

After one or more predetermined patterns are marked on one or more of the provided bingo cards, a game outcome is determined for each of the enrolled gaming machines based, at least in part, on the selected elements on the provided bingo cards. As described above, the game outcome determined for each gaming machine enrolled in the bingo game is utilized by that gaming machine to determine the predetermined game outcome provided to the player. For example, a first gaming machine to have selected elements marked in a predetermined pattern is provided a first outcome of win $10 which will be provided to a first player regardless of how the first player plays in a first game and a second gaming machine to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment insures that at least one bingo card will win the bingo game and thus at least one enrolled gaming machine will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming machine may be provided a supplemental or intermittent award regardless of if the enrolled gaming machine's provided bingo card wins or does not win the bingo game as described above.

In another embodiment, the game outcome provided to the player is determined by a remote host and provided to the player at the gaming machine. In this embodiment, each of a plurality of such gaming machines are in communication with the remote host. Upon a player initiating game play at one of the gaming machines, the initiated gaming machine communicates a game outcome request to the remote host. In one embodiment, the remote host receives the game outcome request and randomly generates a game outcome for the primary game based on probability data. In another embodiment, the remote host randomly generates a game outcome for the secondary game based on probability data. In another embodiment, the remote host randomly generates a game outcome for both the primary game and the secondary game based on probability data. In this embodiment, the remote host is capable of storing and utilizing program code or other data similar to the processor and memory device of the gaming machine.

In another embodiment, one or more of the gaming machines are in communication with a remote host for monitoring purposes. That is, when not communicating with the remote host regarding any ECIs, each individual gaming machine randomly generates the game outcomes to be provided to the player and the remote host monitors the activities and events occurring on the plurality of gaming machines. In one embodiment, the gaming network includes a real-time or on-line accounting and gaming information system operably coupled to the remote host. The accounting and gaming information system of this embodiment includes a player database for storing player profiles, a player tracking module for tracking players and a credit system for providing automated casino transactions.

In another embodiment, a plurality of gaming machines at one or more gaming sites may be networked to the remote host in a progressive configuration, as known in the art, wherein a portion of each wager to initiate a base or primary game may be allocated to one or more progressive awards. In one embodiment, a progressive gaming system host site computer is coupled to a plurality of the remote hosts at a variety of mutually remote gaming sites for providing a multi-site linked progressive automated gaming system. In one embodiment, a progressive gaming system host site computer may serve gaming machines distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each remote host computer is responsible for all data communication between the gaming machine hardware and software and the progressive gaming system host site computer. In one embodiment, an individual gaming machine may trigger a progressive award win. In another embodiment, a remote host (or the progressive gaming system host site computer) determines when a progressive award win is triggered. In another embodiment, an individual gaming machine and a remote host (or progressive gaming system host site computer) work in conjunction with each other to determine when a progressive win is triggered, for example through an individual gaming machine meeting a predetermined requirement established by the remote host.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming machine is randomly or apparently randomly selected to provide a player of that gaming machine one or more progressive awards. In one such embodiment, the gaming machine does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via the gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming machine to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, the gaming system maintains at least one progressive award by allocating a percentage of a player's wager into the player's own progressive award or pool (i.e., a personal progressive award). In this embodiment, upon the occurrence of an event (either associated with game play or independent of game play), the gaming system provides the player their personal progressive award. In one such embodiment, the gaming system displays, via one or more ECI's (as described above), information related to their personal progressive award.

In another embodiment, a plurality of players at a plurality of linked gaming machines in a gaming system participate in a group gaming environment. In one embodiment, a plurality of players at a plurality of linked gaming machines work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming machines compete against one another for one or more awards. In one such embodiment, a plurality of players at a plurality of linked gaming machines participate in a gaming tournament for one or more awards. In another embodiment, a plurality of players at a plurality of linked gaming machines play for one or more awards wherein an outcome generated by one gaming machine affects the outcomes generated by one or more linked gaming machines.

The window interface, as described herein, is an interface that displays a product or service to a third-party user that may be other than a developer of a wager-based game played using the game interface or a manufacturer of a gaming machine. A player may be offered a product or service via the window interface for winning or losing an amount of credits in the main game played using the game interface, for winning or losing an amount of credits in a bonus game played using the game interface, for winning or losing an amount of credits in a bonus game played using the window interface, or for accumulating a number of player tracking points.

A third-party processor, which may be a processor of the remote host 110 (FIGS. 1A-1C), collects information from various sources, such as a player tracking server, a gaming device used to play a wager-based game, and a graphical element creation server used to create an event representation describing a product or service, and the third-party processor sends an instruction to make an offer of the product or service via the window interface based on the information.

Further, the third-party processor can subscribe to and receive notifications of whether a particular event representation is displayed on the gaming device, whether a voucher is printed on a printer connected to the gaming device, or whether a particular command is communicated between the gaming device and a third-party device. The third-party device includes the third-party processor. Moreover, the third-party processor can obtain information regarding a peripheral device, such as a candle or a bezel, of the gaming device, or regarding a printer connected to the gaming device.

Additionally, the third-party device can orchestrate occurrences of a plurality of events on the gaming device or a plurality of gaming devices based on a plurality of conditions without a need to communicate with any of the gaming devices until after the events occur. Moreover, the third-party device can control whether information requested by the third-party device is stored or discarded if a connection between the third-party device and a server-based system or the gaming device is lost. The server-based system including a set of servers, such as the player tracking server and the graphical element creation server, and is connected between the gaming device and the third-party device. Accordingly, the systems and methods described herein facilitate the third-party user to offer a product or service to a player playing a wager-based game at the gaming device.

Moreover, the gaming device determines whether information is received from the third-party device. Upon determining that the information is not received from the third-party device, the gaming device does not send the information to a content approval server, described below, to validate the information. On the other hand, upon determining that the information is received from the third-party device, the gaming device sends the information to the content approval server to validate the information before displaying the information.

Figure 10:
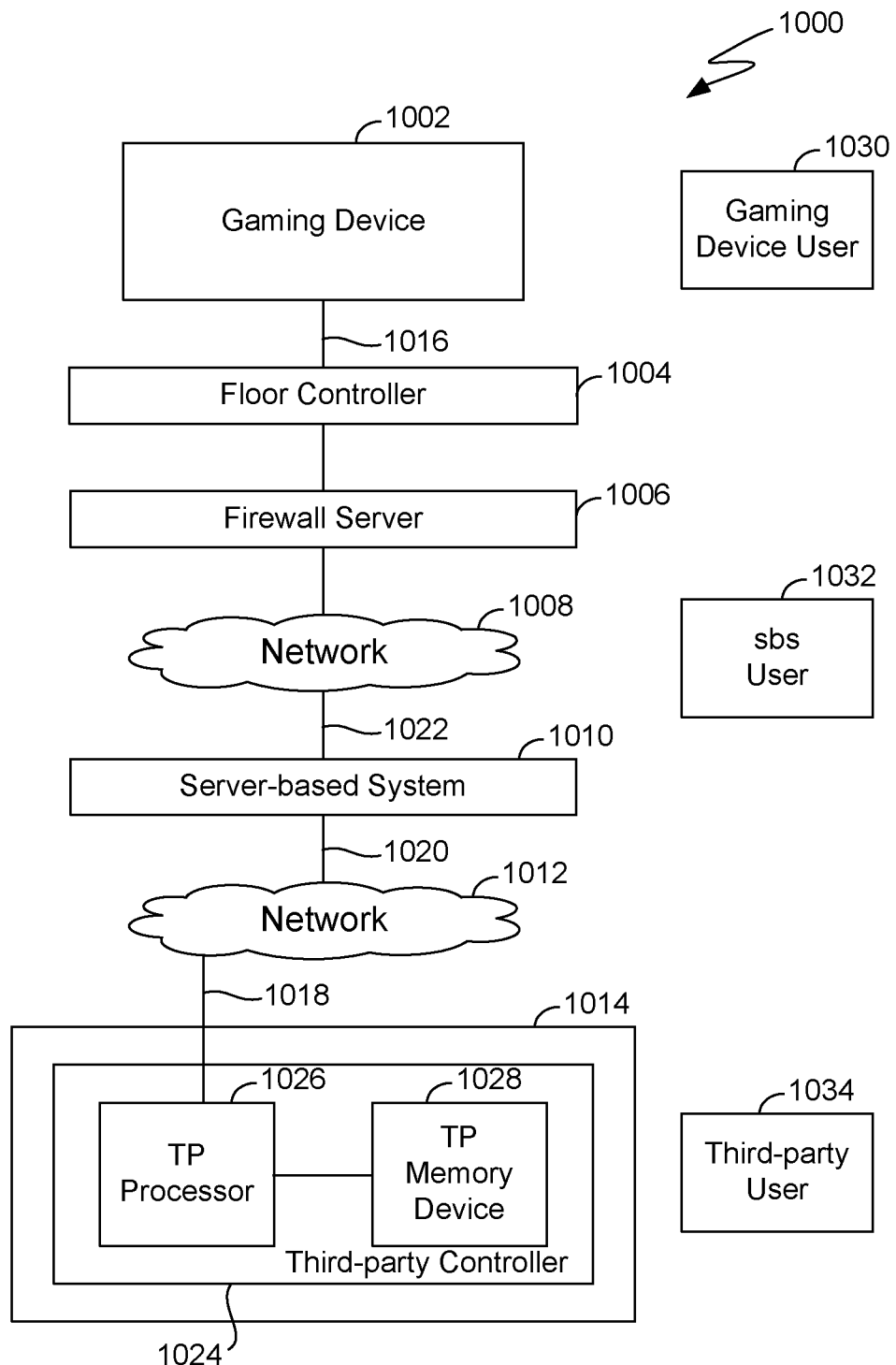
FIG. 10 is a block diagram of an embodiment of a system for interfacing with a third-party application.

FIG. 10 is a block diagram of an embodiment of a system 1000 for interfacing with a third-party application. System 1000 includes a gaming device 1002, a floor controller 1004, a firewall server 1006, a network 1008, a server-based system (sbs) 1010, a network 1012, and a third-party device (TPD) 1014. Gaming device 1002 is connected to server-based system 1010 via a gaming device-sbs (gd-sb) communication link 1016 and server-based system 1010 is connected to third-party device 1014 via an sb-third party (sb-TP) communication link 1018. Each network 1008 and 1012 may be a wide area network, such as the Internet, or a local area network, such as the Intranet. Each network 1008 and 1012 may include routers, bridges, and/or hubs.

Gaming device 1002 may be a gaming machine, a kiosk, a wireless gaming device, or a computer. Examples of gaming device 1002 include gaming machine 201 (FIG. 2), gaming machine 300 (FIG. 3A), the gaming machine shown in FIG. 4A, gaming machine 151 (FIG. 4B), gaming machine 152 (FIG. 4B), gaming machine 153 (FIG. 4B), and gaming machine 2 (FIG. 6). Server-based system 1010 is connected to network 1012 via a communication link 1020 and is connected to network 1008 via a communication link 1022. Examples of third-party device 1014 includes remote host 110 (FIGS. 1A-1C), a computing device that includes host server 202 (FIG. 2), a computing device that include host server 204 (FIG. 2), a remote host shown in FIG. 4A, and remote host 150 (FIG. 4B). Third-party device 1014 includes a third-party controller (TPC) 1024 that further includes a third-party processor (TPP) 1026 and a third-party memory device (TPMD) 1028. Third-party processor 1026 is available from Intel™ corporation, Motorola™ corporation, or AMD™ corporation. Third-party memory device 1028 may be a RAM, a ROM, or a combination of RAM and ROM. As used herein, the term server refers to a controller, a computer, a programmable logic controller, an application specific integrated circuit, and other programmable circuits. Each server, described herein, performs a specific function of a specific set of functions as described herein. Further, as used herein, the term controller refers to a computer, a server, a programmable logic controller, an application specific integrated circuit, and other programmable circuits. Moreover, as used herein, the term processor is not limited to just those integrated circuits referred to in the art as a processor, but broadly refers to a microcontroller, a microcomputer, a programmable logic controller, an application specific integrated circuit, and other programmable circuits.

Gaming device 1002 is managed and controlled by a gaming device user 1030, who represents a manufacturer of gaming device 1002 or a supplier of the gaming device 1002 that receives gaming device 1002 from the manufacturer for selling or leasing gaming device 1002. Examples of gaming device user 1030 include IGT™ corporation or an employee of IGT corporation. Server-based system 1010 is managed and controlled by an sbs user 1032, who may be the same as gaming device user 1030. A third-party user 1034 manages and controls third-party device 1024. Examples of third-party user 1034 includes a manufacturer of a product or a provider of a service. A product or service may be offered by third-party user 1034 or by any other user, such as, a restaurant or a buffet within the gaming establishment. Examples of a service offered to a player playing a game at gaming device 1002 includes a service of providing a massage to the player, a legal service for managing legal issues of the player, an accounting service for managing an account of the player, a tax service for managing taxes related to the player, a travel service for managing transportation of the player, and a room service for sending the product or service to a room rented or owned by the player. Examples of a product includes a cell phone, vehicle, a drink, a food item, a voucher to a show, a voucher to a cruise, a voucher to a stay at a hotel, a voucher to receive discounted legal services, a voucher to receive discounted tax services, and a voucher to receive discounted accounting services. A voucher may include cashable credits or non-cashable credits. An example of cashable credits is a credit that can be redeemed for cash at a cashier station within the gaming establishment. An example of non-cashable credit includes a credit that cannot be redeemed for cash and can be redeemed for a product or service.

Third-party user 1034 is other than gaming device user 1030. For example, third-party user 1034 is a manufacturer of cell-phones and gaming device user 1030 is a manufacturer of a gaming machine. As another example, third-party user 1034 offers a cruise service to a player and gaming device user 1030 develops a wager-based game played at a gaming machine.

Third-party device 1014 communicates with gaming device 1002 via server-based system 1010. For example, third-party device 1014 communicates with server-based system 1010 by using the S2S protocol via sb-TP communication link 1018. Server-based system 1010 converts a communication received from third-party device 1014 from the S2S protocol format to the G2S protocol format, and sends the communication in the G2S protocol format via gd-sb communication link 1016 to gaming device 1002. As another example, server-based system 1010 receives a communication in the G2S protocol format from gaming device 1002 via gd-sb communication link 1016 and converts the communication from the G2S protocol format to an S2S protocol format, and sends the communication in the S2S protocol format via sb-TP communication link 1018 to third-party device 1014. As yet another example, server-based system 1010 communicates with gaming device 1002 via a Wireless Fidelity (Wi-Fi) protocol, a Transmission Control Protocol/Internet Protocol (TCP/IP), or Ethernet protocol. An example of the S2S protocol is a Simple Object Access Protocol (SOAP) over hypertext transfer protocol (HTTP).

In another embodiment, networks 1008 and 1012 are part of server-based system 1010. In various embodiments, server-based system 1010 is connected to gaming device 1002 directly by gd-sb communication link 1016 and is connected to third-party device 1014 directly by sb-TP communication link 1018. In various embodiments, gaming device user 1030 represents a developer of a wager-based game played by using the game interface. In other embodiments, sbs user 1032 is the same as third-party user 1034. In another embodiment, sbs user 1032 is not the same as gaming device user 1030. For example, sbs user 1032 may be a manufacturer of servers and gaming device user 1034 may be a manufacturer of gaming machines.

Figure 11:
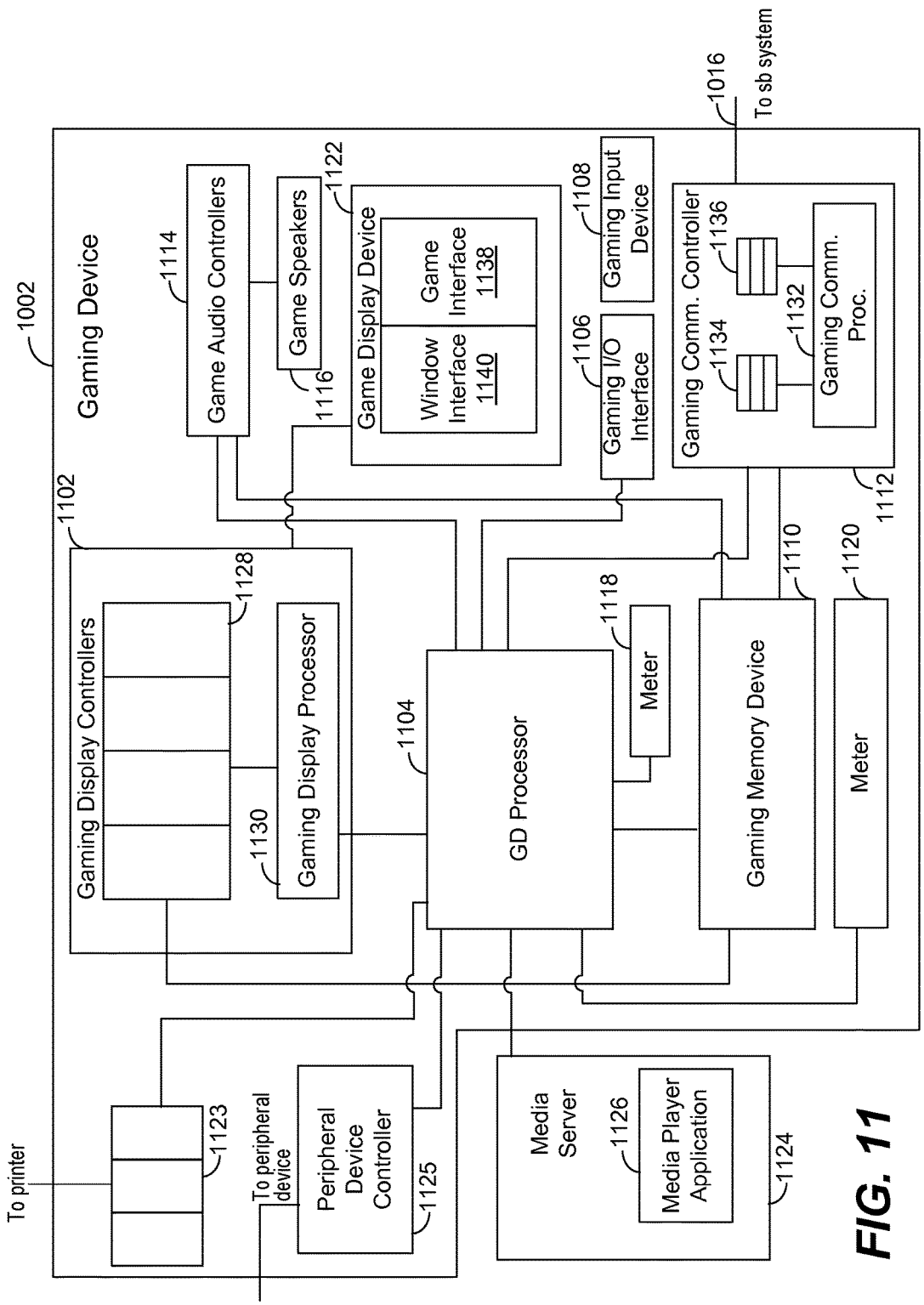
FIG. 11 is a block diagram of an embodiment of a gaming device of the system of FIG. 10.

FIG. 11 is a block diagram of an embodiment of gaming device 1002. Gaming device 1002 includes a gaming display controller (GDC) 1102, a gaming device processor 1104, a gaming input/output (I/O) interface 1106, a gaming input device 1108, a gaming memory device 1110, a gaming communication controller 1112, a gaming audio controller 1114, a set of game speakers 1116, a meter 1118, an additional meter 1120, and a gaming display device 1122, a printer queue 1123, and a peripheral device controller 1125.

Speakers 10, 12 and 14 (FIGS. 5A and 6) are examples of game speakers 1116. Gaming device processor 1104 is connected to a media server 1124, which may be a Flash™ player application server or a Windows™ media player application server. Media server 1124 includes a media player application 1126, which may be a Flash™ player or a Windows™ media player. Gaming display controller 1102 includes a gaming display controller queue 1128 and a gaming display processor 1130. A queue, as described herein, is a buffer, which may be a shift register or a part of RAM. As an example, a queue is a first-in-first-out (FIFO) buffer. As another example, a queue is a last-in-first-out (LIFO) buffer. An example of gaming display controller queue 1128 includes executable space 338 (FIG. 3A). Meter 1118 may also be a shift register, such as a counter, and additional meter 1120 may be a shift register, such as a counter.

Examples of gaming input device 1108 include bar-coded ticket 20 (FIG. 6), an ATM card, a credit card, a debit card, a player tracking card, a button, a touch screen, a keypad, a card, a stylus, or a keyboard, a ticket, a coin, a voucher, or paper money. For example, gaming input device 1108 may be touch screen 254 (FIG. 2), input 350 (FIG. 3A), input buttons 32 (FIGS. 3B and 6), and touch screen 35 (FIG. 3B). Gaming I/O interface 1106 may be a card reader, a coin acceptor, a bill validator, a universal serial bus (USB) interface, a serial interface, or a parallel interface. For example, gaming I/O interface 1106 may include card reader 256 (FIG. 2), card reader 24 (FIG. 3B), print reader 39 (FIG. 3B), bill validator 30 (FIGS. 3B and 3C), coin acceptor 28 (FIGS. 3B and 3C), any of device interfaces 255 (FIG. 3C), USB 265 (FIG. 3C), serial 270 (FIG. 3C), and PCI 280 (FIG. 3C).

Gaming communication controller 1112 includes a gaming communication processor 1132, a gaming input queue 1134 and a gaming output queue 1136, and may also include a modem or a network interface card (NIC) that allows gaming device 1002 to communicate with network 1008. Gaming display controller 1102 includes a gaming display controller 1102. Examples of any of gaming input queue 1134 and gaming output queue 1136 include a buffer. Gaming memory device 1110 may be a RAM, a ROM, or a combination of the RAM and ROM. Examples of gaming memory device 1110 include memory 244 (FIG. 2), and secure memory 326 (FIG. 3A). Gaming device processor 1104 may be master gaming controller (MGC) 46 (FIG. 6). Examples of gaming device processor 1104 include processor 242 (FIG. 2), CPU 340 (FIG. 3A), and CPU 342 (FIG. 3A). Other examples of gaming device processor 1104 include a processor manufactured by Intel™ corporation, Motorola™ corporation, or by Advanced Micro Devices™ (AMD™) corporation.

Gaming display device 1122 may be a cathode ray tube (CRT), a plasma display device, a liquid crystal display (LCD) device, an OLED display device, or an LED display device. Other examples of gaming display device 1122 includes display 102 (FIGS. 1A, 1B, and 1C), display 246 (FIG. 2), display 248 (FIG. 2), display 34 (FIGS. 3B, 3C, and 6), and touch screen 35 (FIGS. 3B and 3C). Examples of gaming display processor 1130 include a video controller or a video display processor. Gaming display processor 1130 may include GPU 344 (FIG. 3A) and/or GPU 346 (FIG. 3A).

Gaming display device 1122 displays a game interface 1138 and a window interface 1140. Example of game interface 1138 includes game interface 116 (FIGS. 1A-1C), game interface 232 (FIG. 2), and game interface 503 (FIGS. 5A and 9A). Example of window interface 1140 include bonus interface 118 (FIG. 1B), service interface 120 (FIGS. 1B and 1C), and ECI 502 (FIGS. 5A, 5B, and 9A). Window interface 1140 is an event representation representing a product or service offered by third-party user 1034. For example, window interface 1140 includes an image of a product or service offered by third-party user 1034 or by the gaming establishment. As another example, window interface 1140 includes a Flash™ video of a couple vacationing in the Bahamas or an image of a Sony™ camcorder. As yet another example, window interface 1140 includes a textual description that a player playing a game at gaming device 1002 has won a drink or a car.

A value within meter 1118 may represent a count of credits in a bonus game played using game interface 1138 or window interface 1140, a count of credits in a progressive game played using game interface 1138 or window interface 1140, a count of credits printed on a printer connected to gaming device 1002, or a count of credits transferred to an account metering server 1312, described below. A value within additional meter 1120 may represent a count of credits in a bonus game played using game interface 1138 or window interface 1140, a count of credits in a progressive game played using game interface 1138 or window interface 1140, a count of credits printed on a printer connected to gaming device 1002, or a count of credits transferred to an account metering server, described below. As an example, if a value of meter 1118 includes a count of the main game played using game interface 1138, a value of additional meter 1120 includes a count of a bonus game played using game interface 1138 or window interface 1140. As another example, if a value of meter 1118 includes a count of cash, such as, paper money or coins, received at gaming device 1002, a value of additional meter 1120 includes a value of credits received by a player in exchange for the cash. Meter 1118 or additional meter 1120 may be associated with a theme, described below, within window interface 1140, a paytable associated with a game, and a denomination used in the game.

Gaming communication controller 1112 receives a command from server-based system 1010 via gd-sb communication link 1016. Gaming communication processor 1132 removes a layer, such as a G2S protocol layer, from a command received via gd-sb link to generate an instruction, and sends the instruction to gaming memory device 1110. Gaming device processor 1104 retrieves an instruction stored within gaming memory device 1110 and determines whether data within the instruction includes a printer ID, a peripheral device ID, or a gaming device ID. Upon determining that data within an instruction stored within gaming memory device 1110 includes a printer ID, gaming device processor 1104 sends the data, such as a print file, to printer queue 1123 and a printer prints the data within the printer queue. The print file may be a joint photographic experts group (JPEG), a text file, or a bitmap file. Upon determining that data within an instruction stored within gaming memory device 1110 includes a peripheral device ID, gaming device processor 1104 communicates the data, such as a text file or a bitmap file, with peripheral device controller 1125 and the peripheral device controller 1125 actuates a peripheral device to implement the data. Upon determining that data within an instruction stored within gaming memory device 1110 includes a gaming device ID, gaming device processor 1104 forwards the data, such as content, within the instruction to gaming display controller queue 1128 for display.

Gaming display processor 1130 retrieves data from gaming display controller queue 1128 and executes media player application 1126 to display the data as window interface

1140. Gaming device processor 1104 may also send audio data stored within gaming memory device 1110 to gaming audio controller 1114 that actuates speakers to output a sound that may be synchronized with a display of window interface 1140 on gaming display device 1122. Moreover, gaming device processor 1104 may also send data stored within gaming memory device 1110 to a peripheral device connected to gaming device 1002 or to printer connected to the gaming device.

Gaming device processor 1104 determines whether to send an instruction to server-based system 1010 or to third-party device 1014. Gaming device processor 1104 determines to send an instruction to server-based system 1010 or to third-party device 1014 to execute an input received from gaming device user 1030 via gaming input device 1108 or upon an occurrence of an event at gaming device 1002, at a printer connected to the gaming device, or at a peripheral device connected to the gaming device. Upon determining to send an instruction, gaming device processor 1104 sends the instruction to gaming communication controller 1112 and gaming communication controller 1112 converts the instruction into a command by applying a layer, such as a G2S protocol format layer, to the instruction. Gaming communication controller 1112 sends a command in a G2S protocol format to server-based system 1010 via gd-sb communication link 1016 or to third-party device 1014 via gd-sb communication link 1016, server-based system 1010, and sb-TP communication link 1018.

In various embodiments, gaming input device 1108 is integrated on a screen of gaming display device 1122. In other embodiments, media server 1124 is connected gaming device processor 1104 via gaming communication controller 1112. In various embodiments, gaming device 1002 determines to send an instruction to server-based system 1010 or to third-party device 1014 based on a determination made by gaming device processor 1104 or by gaming device user 1030.

Figure 12:
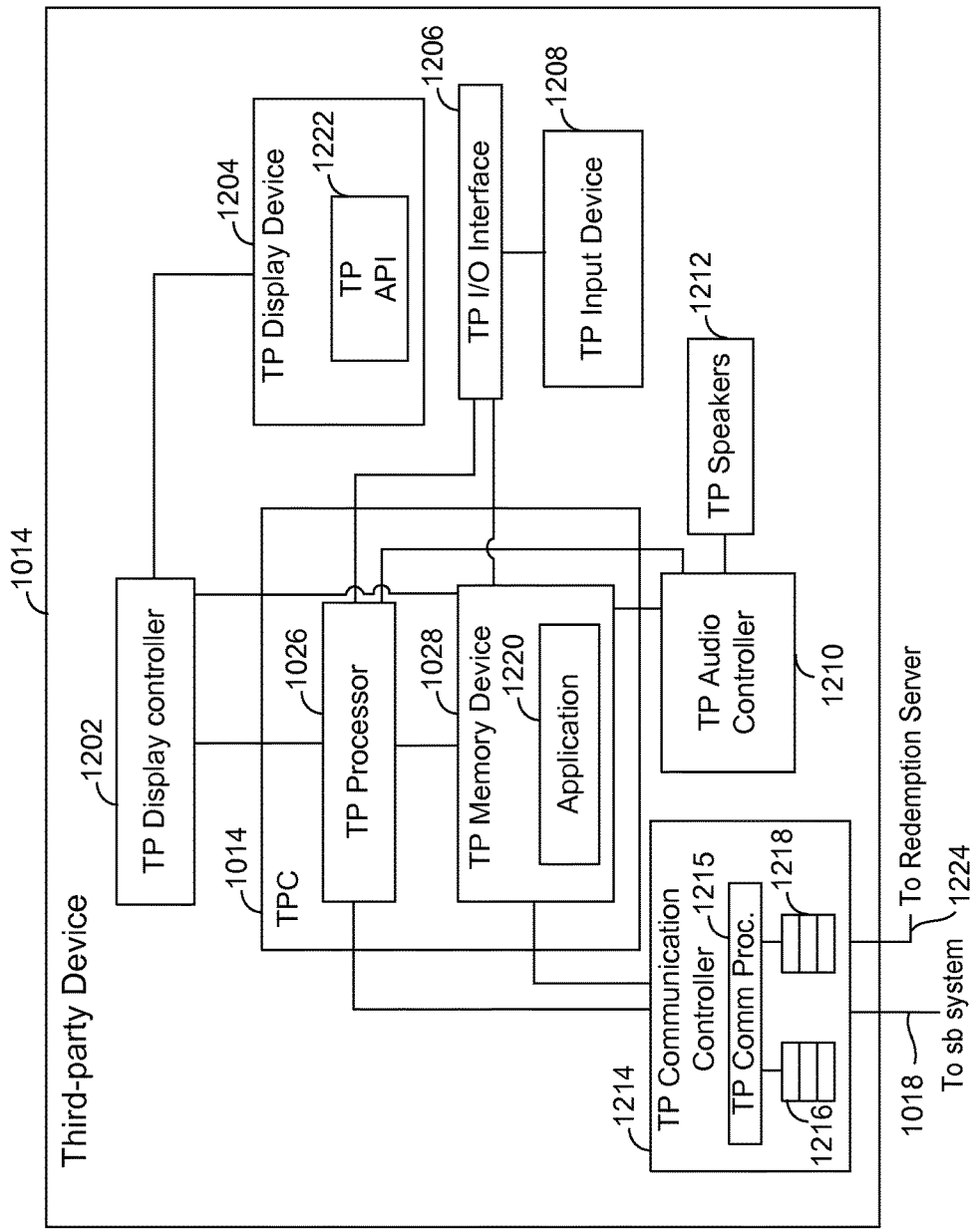
FIG. 12 is a block diagram of an embodiment of a third-party device of the system of FIG. 10.

FIG. 12 is a block diagram of an embodiment of third-party device 1014. Third-party device 1014 includes a third-party display controller 1202, third-party controller 1014, a third-party display device 1204, a third-party I/O interface 1206, a third-party input device 1208, a third-party audio controller 1210, a set of third-party speakers 1212, and a third-party communication controller 1214. Third-party display controller 1202 may be a controller card, such as a video controller card, or a display processor, such as a video display processor. Examples of third-party display device 1204 include a cathode ray tube, a plasma display device, a liquid crystal display device, and a light emitting diode display device, such as an OLED display device or a PLED display device. Examples of third-party communication controller 1214 include a modem or a network interface card. Third-party communication controller 1214 includes a third-party communication processor 1215, a third-party input queue 1216 and a third-party output queue 1218. Each of third-party input and output queues 1216 and 1218 is a buffer, which may be a register, such as a shift register. Third-party processor 1026 executes an application 1220 stored within third-party memory device 1028 to generate a third-party application program interface (TP API) 1222 on third-party display device 1204. Third-party user 1034 views window interface 1140 and/or game interface 1138 on TP API 1222 and may use TP API 1222 to send a command to or communicate with gaming device 1002 via server-based system 1010. For example, third-party user 1034 receives information on TP API 1222, whether gaming input device 1108, such as a player tracking card, a credit card, or a debit card, is inserted or removed by a player into gaming device 1002. As another example, third-party user 1034 views, on TP API 1222, a value of meter 1118 displayed on gaming device 1002, and/or sends a command to gaming device 1002 via server-based system 1010 to set a bonus award. TP API 1222 may prompt third-party user 1034 for a username and password and determines whether the username and password matches a username and password stored in third-party memory device 1028 before providing access to TP API 1222 to communicate with gaming device 1002 via server-based system 1010.

Third-party input device 1208 may be a keyboard, a mouse, a touch screen integrated within third-party display device 1204, a stylus, a keypad, or a combination of the keyboard, mouse, stylus, touch screen, and keypad. Third-party I/O interface 1206 may be a universal serial bus (USB) interface, a serial interface, or a parallel interface device that facilitates communication between third-party input device 1208 and third-party processor 1026.

Third-party input queue 1216 of third-party communication controller 1214 receives a command from server-based system 1010 via sb-TP communication link 1018 or from a redemption server, described below, via a redemption communication link 1224. Third-party communication controller 1214 removes a layer, such as a TCP/IP protocol layer or an S2S layer, from a command stored within third-party input buffer 1216 and sends an instruction within the command to third-party memory device 1028.

Third-party processor 1026 retrieves an instruction stored within third-party memory device 1028, retrieves data from the instruction, and sends the data to third-party display controller 1202. Third-party display controller 1202 displays data within TP API 1222 on third-party display device 1204. For example, TP API 1222 includes a display of window interface 1140 and/or game interface 1138 in real-time synchronous to the display of the window interface 1140 and/or game interface 1138 on gaming display device 1122. Third-party processor 1026 may also send data to third-party audio controller 1210 that drives third-party speakers 1212 to output a sound in conjunction with display of TP API 1222.

Third-party memory device 1028 receives information from third-party user 1034. Third-party user 1034 uses third-party input device 1208 to input information via TP API 1222 into third-party memory device 1028. Third-party processor 1026 retrieves, from third-party memory device 1028$s$, information that is received from third-party user 1034 or that is generated by third-party processor 1026 without receiving an input from third-party user 1034, and sends an instruction including the information to third-party communication controller 1214. Third-party communication controller 1214 receives an instruction stored within third-party memory device 1028, applies a layer, such as TCP/IP, Ethernet, and/or S2S, to the instruction to generate a command and stores the command within third-party output queue 1218. Third-party output queue 1218 sends a command in an S2S format to server-based system 1010 via sb-TP communication link 1018 or to the redemption server 1302 via redemption communication link 1224.

In another embodiment, third-party processor 1026 does not receive information from third-party user 1034 via third-party input device 1208. Instead, third-party processor 1026 generates an instruction in response to a command received via third-party communication controller 1214 and server-based system 1010 from gaming device 1002.

Figure 13:
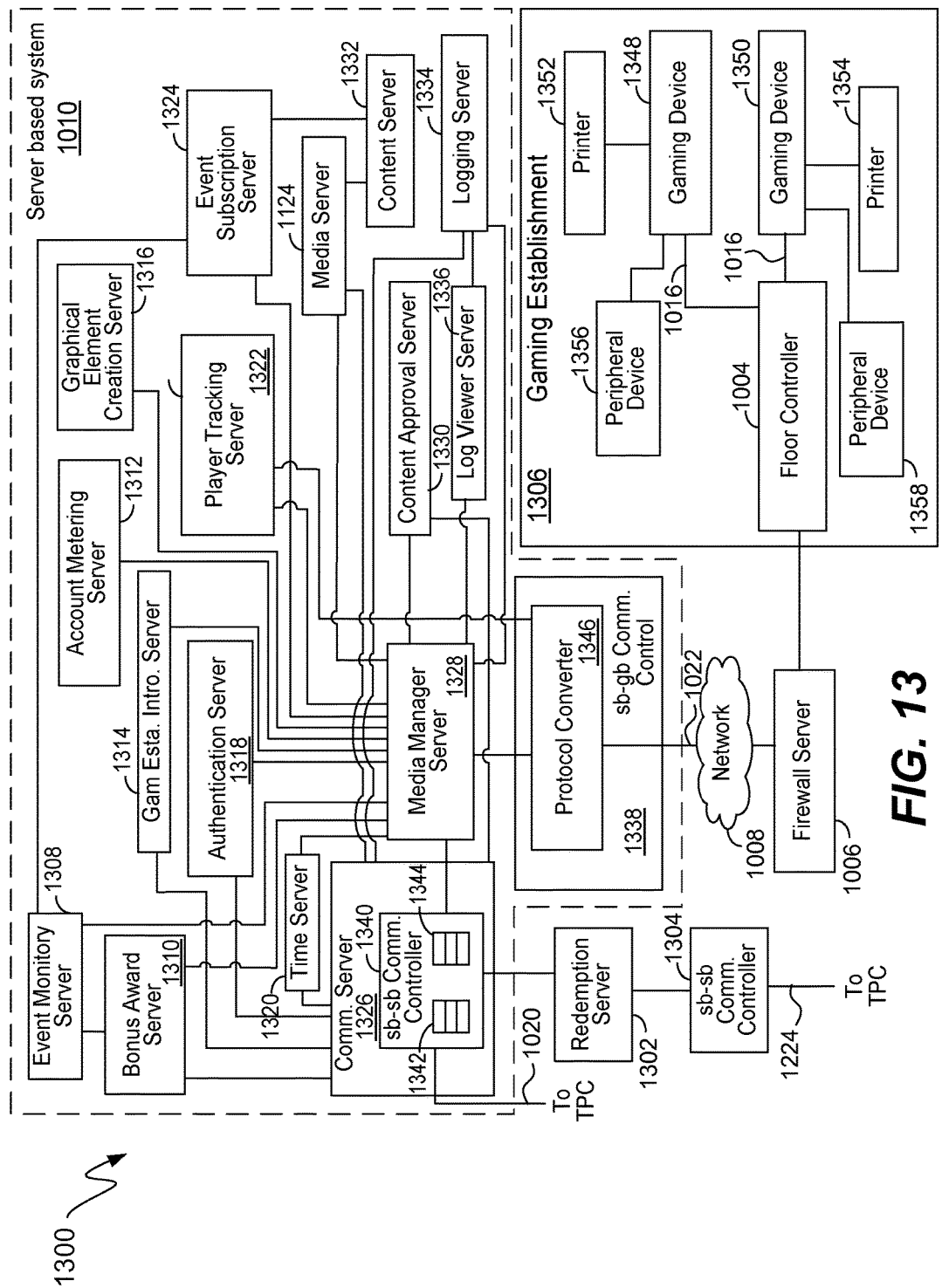
FIG. 13 a block diagram of another embodiment of a system for interfacing with a third-party application.
Figure 14:
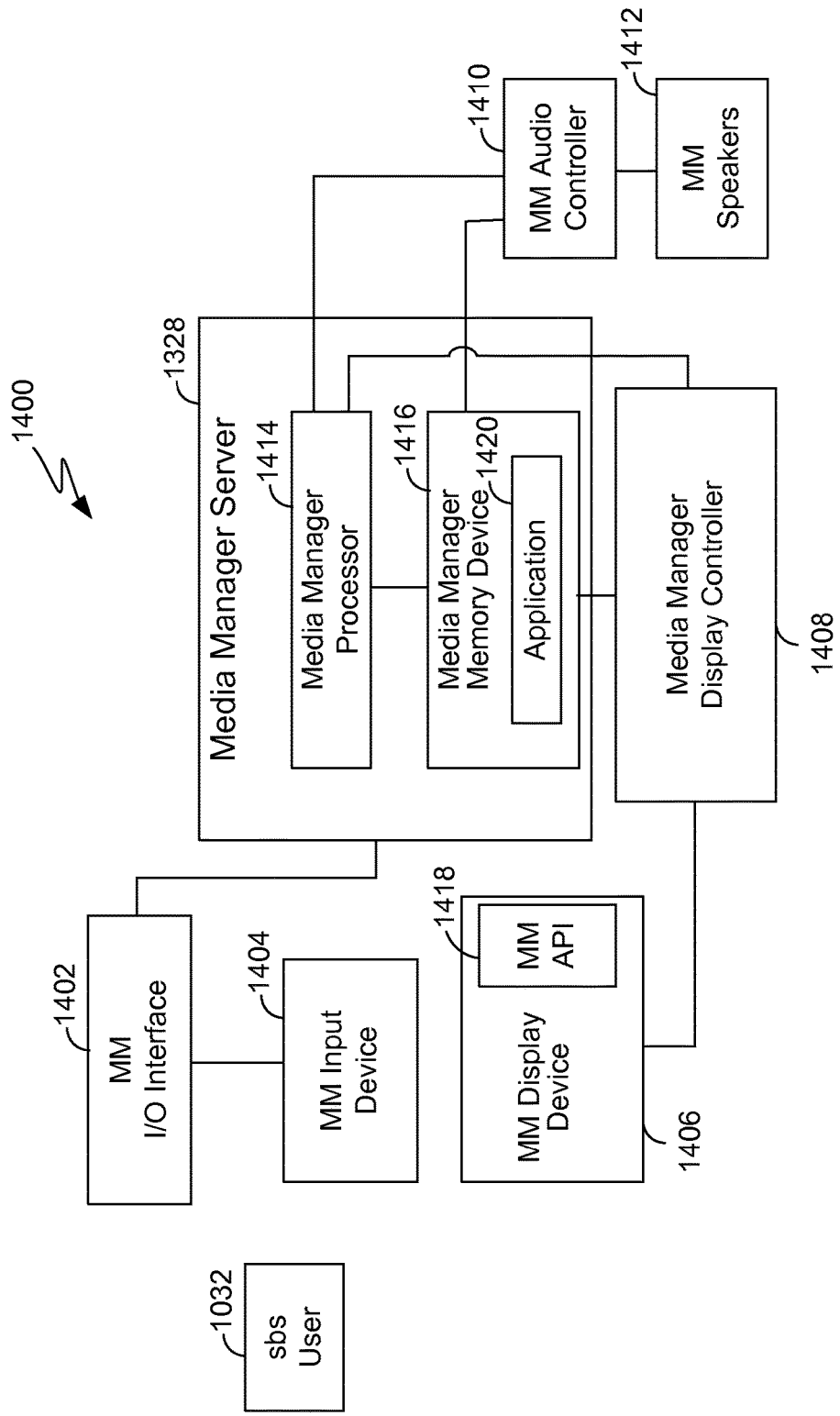
FIG. 14 is a block diagram of a subsystem within the system of FIG. 13.

FIG. 13 is a block diagram of an embodiment of a system 1300 for interfacing with a third-party application and FIG.

14 is a block diagram of a subsystem 1400 for offering the product or service. System 1300 includes server-based system 1010, a redemption server 1302, firewall server 1006, network 1008, a server-based-to-server-based (sb-sb) communication controller 1304, and a gaming establishment 1306. Gaming establishment 1306 may be a casino, a restaurant, an airport, a motel, or a hotel. Server-based system 1010 includes an event monitoring server 1308, a bonus award server 1310, an account metering server 1312, a gaming establishment information server 1314, a graphical element creation server 1316, an authentication server 1318, a time server 1320, a player tracking server 1322, an event subscription server 1324, media server 1124, a communication server 1326, a media manager (MM) server 1328, a media manager I/O interface 1402, a media manager input device 1404, a media manager display device 1406, a media manager display controller 1408, a media manager audio controller 1410, a set of media manager speakers 1412, a content approval server 1330, a content server 1332, a logging server 1334, a log viewer server 1336, and a server-based-with-gaming device (sb-gd) communication controller 1338. Time server 1320, media server 1124, content server 1332, and gaming establishment information server 1314 are web servers, such as HTTP servers.

Communication server 1326 includes an sb-sb communication controller 1340 that includes a server-based input queue 1342 and a server-based output queue 1344. The sb-gd communication controller 1338 includes a protocol converter 1346. Each server-based input queue 1342 and a server-based output queue 1344 may be a register. Gaming establishment 1306 includes floor controller 1004, a gaming device 1348, a gaming device 1350, a printer 1352, a printer 1354, a peripheral device 1356, and a peripheral device 1358. Each peripheral device 1356 and 1358 may be an overhead display, such as overhead display (FIG. 6), a bezel, such as bezel 53 (FIG. 6), or a candle, such as candle 59 (FIG. 6). Gaming device 1348 may be a slot machine, a gaming machine used to play card games, such as Blackjack, Poker, and/or a gaming machine used to play keno or bingo. Gaming device 1350 may also be a slot machine, a gaming machine used to play card games, such as Blackjack, Poker, and/or a gaming machine used to play keno or bingo. Gaming machine 2 (FIG. 6) is an example of any of gaming devices 1348 and 1350. Gaming device 1002 (FIG. 11) is an example of any of gaming devices 1348 and 1350.

Media manager server 1328 includes a media manager processor 1414 and a media manager memory device 1416. Examples of media manager input device 1404 includes a keyboard, a touch screen integrated within media manager display device 1406, a mouse, a stylus, a keypad, or a combination of the keyboard, mouse, stylus, touch screen, and keypad. Media manager I/O interface 1402 may be a USB interface, a serial interface, or a parallel interface. Examples of media manager display device 1406 includes a plasma display device, a cathode ray tube, an OLED display device, or an LED display device. Media manager display device 1406 displays a media manager API (MM API) 1418 upon execution, by media manager processor 1414, of an application 1420 stored in media manager memory device 1416. Parameters of the MM API 1418 may include a version of application 1420 and a minimum requirement of media manager display device 1406 for displaying the MM API 1418 within the media manager display device 1406. Media manager display controller 1408 may be a controller card, such as a video controller card, or a display processor, such as a video display processor. Media manager memory device 1416 may be a RAM, ROM, or a combination of ROM and RAM.

Firewall server 1006 prevents unauthorized access by network and/or server based system to floor controller 1004, gaming device 1348, gaming device 1350, peripheral device 1356, peripheral device 1358, printer 1352, and/or printer 1354. For example, sbs user 1032 registers, via media manager input device 1404, an sbs user name and an sbs user password with firewall server 1006. After registration by sbs user 1032, firewall server 1006 provides access to media manager server 1328 to floor controller 1004, printer 1352, printer 1354, peripheral device 1356, peripheral device 1358, gaming device 1348, and gaming device 1350 upon validating the sbs user name and the sbs user password. Upon obtaining access via firewall server 1006, media manager server 1328 receives a set of gaming device identifications (IDs) identifying gaming devices 1348 and 1350, a set or printer IDs identifying printers 1352 and 1354, and a set of peripheral device IDs identifying peripheral devices 1356 and 1358. For example, a gaming device ID that identifies gaming device 1348 is different than a gaming device ID that identifies gaming device 1350. Further, upon obtaining access via firewall server 1006 to gaming device 1002, media manager server 1328 may request a state, such as idle or active, of gaming device 1002. For example, if no game is played by a player at gaming device 1002, an idle state is returned by gaming device 1002 and if a game is played at the gaming device 1002, an active state is returned.

Logging server 1334 logs all commands received by server-based system 1010 from third-party device 1014. For example, logging server 1334 logs a seteventsubscription command, a requestdeviceinformation command, a triggerevent command, a setproperty command, a requestupdate command, a setplayertrackingsubscription command, all of which are described below, received from third-party device 1014 logs data referred to or included within any of the commands, logs a time at which any of the commands are sent by third-party device 1014, logs a time at which any of the commands are received by a destination device. Logging server 1334 logs a command and identifies the command with a command ID assigned to the command, a task ID within the command, an event ID within the command, an ID of the source device sending the command, and/or an ID of the destination device receiving the command. Examples of ID of the source device include a MAC address of the source device and a URI of an application stored within the source device. Examples of ID of the destination device include a MAC address of the destination device and a URI of an application stored within the destination device. The command ID may be generated by the source device. An example of the source ID includes an IP address or a media access control (MAC) address of the source device and an example of the destination ID includes an IP address or a MAC address of the destination device. The destination device may be gaming device 1002 or a server of server-based system 1010 designated to receive a command from third-party device 1014.

In addition, logging server 1334 logs responses sent by floor controller 1004, gaming device 1002, printer 1352, printer 1354, peripheral device 1356, and/or peripheral device 1358, and server-based system 1010 to a command received from third-party device 1014. For example, logging server 1334 logs a frequency of operation of peripheral device 1356, a value of meter 1118, a color of on duty cycle of candle 59. As another example, logging server 1334 logs a command sent by server-based system 1010 to third-party device 1014. As yet another example, logging server 1334 logs a command including information sent by gaming device 1002 to third-party device 1014 via server-based system 1010 and the command sent by gaming device 1002 includes information regarding an event representation monitored by event monitoring server 1308.

Moreover, logging server 1334 logs a communication sent by media manager server 1328 to content server 1332 to change content stored within content server 1332 and a response sent by content server 1332 to the communication received from the media manager. Further, logging server 1334 logs a command sent by media manager server 1328 to content server 1332 to access content within content server 1332 for playing the content. Logging server 1334 includes a secure memory device, such as a non-volatile or a magnetoresistive random access memory (MRAM) that is accessed by sbs user 1032 upon validation of user name and/or password of sbs user 1032.

Log viewer server 1336 includes a log viewer application that is executed to view a log stored by logging server 1334. For example, sbs user 1032 controls media manager input device 1404 to control media manager processor 1414 to execute the logging viewer application to view, via MM API 1418, a log stored in logging server 1334. As another example, third-party user 1034 controls third-party input device 1208 to control third-party processor 1026 to download and execute the log viewer application from logging viewer server to view, in TP API 1222, a log stored in and downloaded from logging server 1334.

In other embodiments, sbs user 1032 registers, via media manager input device 1404, an sbs user name or an sbs user password with firewall server 1006. In these embodiments, after registration by sbs user 1032, firewall server 1006 provides access to media manager server 1328 to floor controller 1004, printer 1352, printer 1354, peripheral device 1356, peripheral device 1358, gaming device 1348, and gaming device 1348 upon validating the sbs user name or the sbs user password. In other embodiments, graphical element creation server 1316 is included within media manager server 1328. In various embodiments, system 1300 includes any number of floor controllers and each floor controller is connected to any number of gaming devices. Similarly, in other embodiments, gaming establishment 1306 includes any number of printers connected to gaming device 1348 and any number of peripheral devices connected to the gaming device 1348. In other embodiments, protocol converter 1346 is located outside server-based system 1010. In still another embodiment, all servers of system 1300 are web servers.

In various embodiments, all servers of server-based system 1010 have access to floor controller 1004, printers 1352 and 1354, peripheral device 1356, peripheral device 1358, gaming device 1348, and gaming device 1350 when media manager server 1328 has access. In other embodiment, each server of server-based system 1010 obtains separate access to floor controller 1004, printers 1352 and 1354, peripheral device 1356, peripheral device 1358, gaming device 1348, and gaming device 1350.

In various embodiments, sbs user 1032 enters a pin number that is validated by media manager server 1328 to provide access to MM API 1418. In these embodiments, upon determining that the pin number is invalidated, media manager server 1328 does not provide access to MM API 1418 to sbs user 1032.

Further, in various embodiments, gaming device 1348 is located within a zone of gaming establishment 1306 and the zone is different than a zone, of gaming establishment 1306, including gaming device 1350. Moreover, in other embodiments, gaming device 1348 is located within an area of gaming establishment 1306 and the area is different than a zone, of gaming establishment 1306, including gaming device 1350. Additionally, in various embodiments, gaming device 1348 is located within a pit of gaming establishment 1306 and the pit is different than a pit, of gaming establishment 1306, including gaming device 1350. In other embodiments, gaming devices 1348 and 1350 are located within the same zone, same area, or same pit of game establishment.

Figure 15:
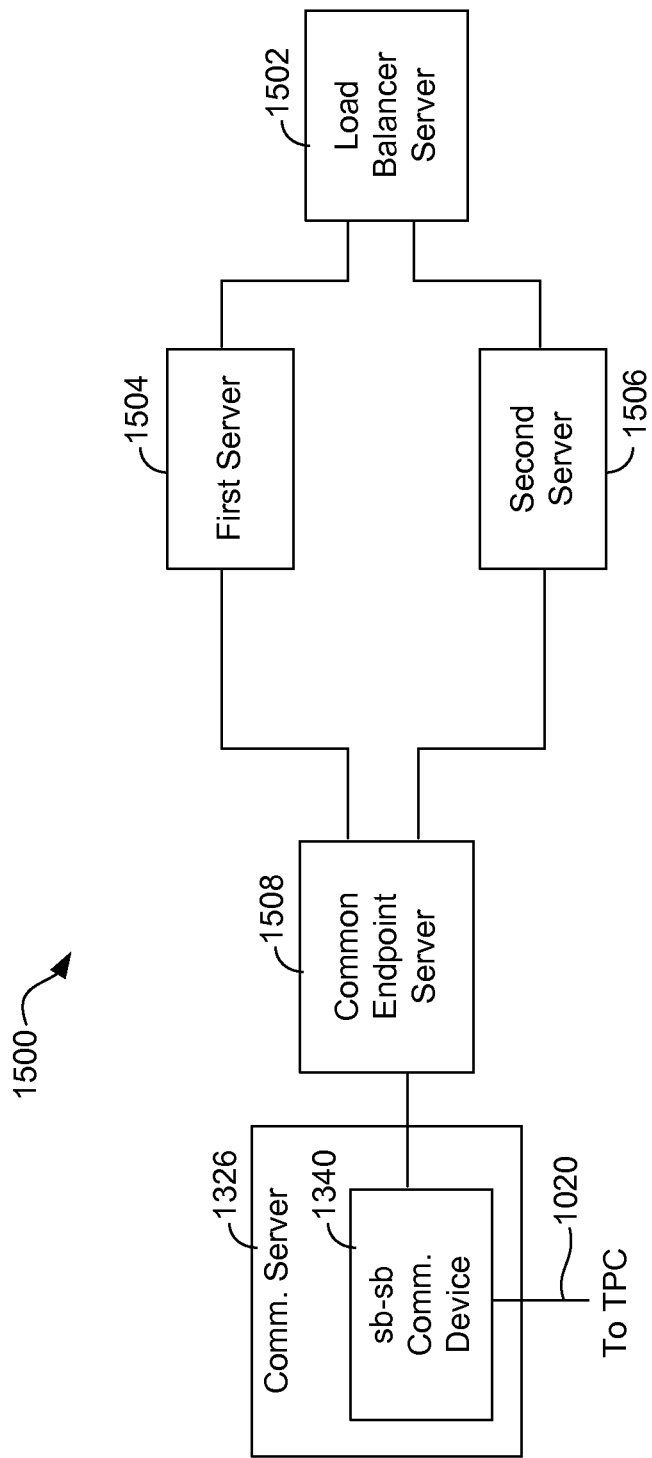
FIG. 15 is a block diagram of yet another embodiment of a system for interfacing with a third-party application.

FIG. 15 is a block diagram of an embodiment of a system 1500 for interfacing with a third-party application. System 1500 includes a load balancer server 1502, a first server 1504, a second server 1506, a common endpoint server 1508, and communication server 1326. An example of common endpoint server 1508 includes media manager server 1328. First server 1504 may be event monitoring server 1308, bonus award server 1310, account metering server 1312, gaming establishment information server 1314, graphical element creation server 1316, redemption server 1302, authentication server 1318, time server 1320, player tracking server 1322, event subscription server 1324, media server 1124, communication server 1326, media manager server 1328, content approval server 1330, content server 1332, logging server 1334, or log viewer server 1336. Second server 1506 may be event monitoring server 1308, bonus award server 1310, account metering server 1312, gaming establishment information server 1314, graphical element creation server 1316, authentication server 1318, redemption server 1302, time server 1320, player tracking server 1322, event subscription server 1324, media server 1124, communication server 1326, media manager server 1328, content approval server 1330, content server 1332, logging server 1334, or log viewer server 1336.

Second server 1506 may perform different functions than those performed by first server 1504. For example, first server 1504 may be player tracking server 1322 and second server 1506 may be graphical element creation server 1316. As another example, first server 1504 may be gaming establishment information server 1314 and second server 1506 may be event monitoring server 1308.

Load balancer server 1502 balances a load, such as a number of CPU cycles, measured in hertz (Hz) or memory device space, between first and second servers 1504 and 1506. For example, load balancer server 1502 determines whether a load of first server 1504 exceeds a threshold and upon determining that the load exceeds the threshold, load balancer server 1502 assigns some functions performed by first server 1504 to second server 1506. As another example, load balancer server 1502 determines whether a space within a memory device of first server 1504 exceeds a threshold and upon determining that the space exceeds the threshold, load balancer server 1502 stores some information from the memory device space into a memory device of second server 1506

An IP address or a MAC address of common endpoint server 1508 is mentioned in all commands or communications between the common endpoint server 1508 and any of floor controller 1004, gaming device 1002, printer 1352, printer 1354, peripheral device 1356, peripheral device 1358, and third-party device 1014. Common endpoint server 1508 forwards a command received from gaming device 1348, gaming device 1350, peripheral device 1356, peripheral device 1358, printer 1352, printer 1354, floor controller 1004, or third-party device 1014 to an appropriate server, such as player tracking server 1322 having an IP address different than the IP address of common endpoint server

1508. For example, if a runtask command, described below, or the triggerevent command, described below, includes an IP address of media manager server 1328, common endpoint sends the command to media manager server 1328.

In other embodiments, second server 1506 may perform the same functions as that of first server 1504. For example, both first server 1504 and second server 1506 may distribute functions described herein as being performed by player tracking server 1322. As another example, both first server 1504 and second server 1506s may distribute functions described herein as being performed by event monitoring server 1308.

In yet other embodiments, common endpoint server 1508, other than media manager server 1328, is connected between media manager server 1328 and sb-sb communication controller 1310, and between media manager server 1328 and protocol converter 1346.

Figure 16:
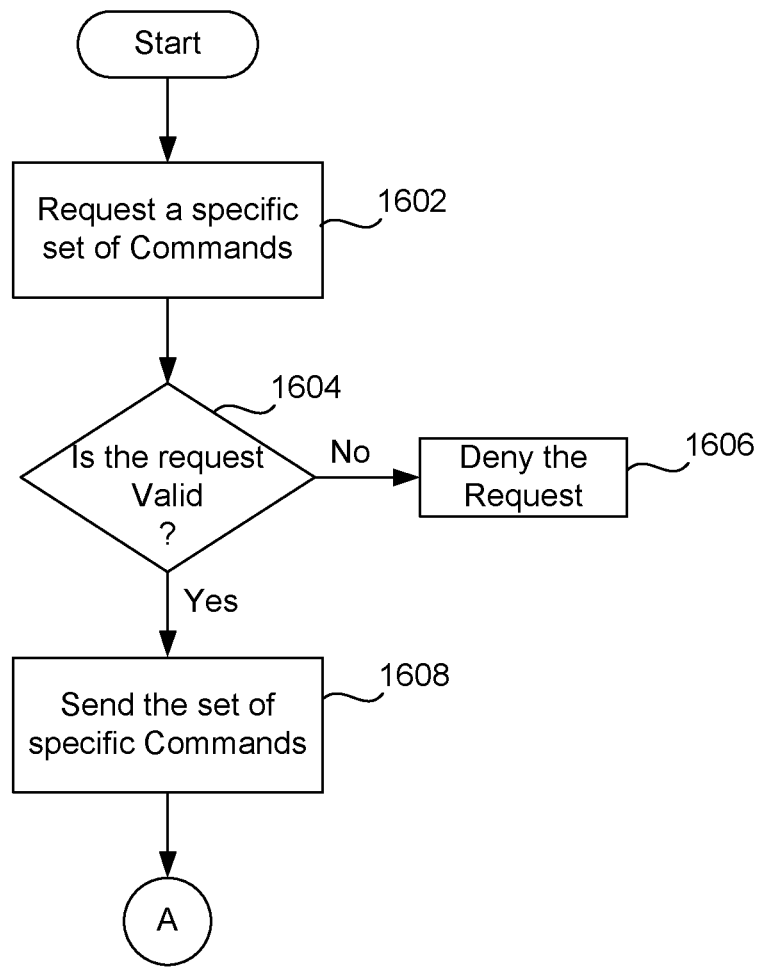
FIG. 16 is a flowchart of an embodiment of a method for interfacing with a third-party application.
Figure 17:
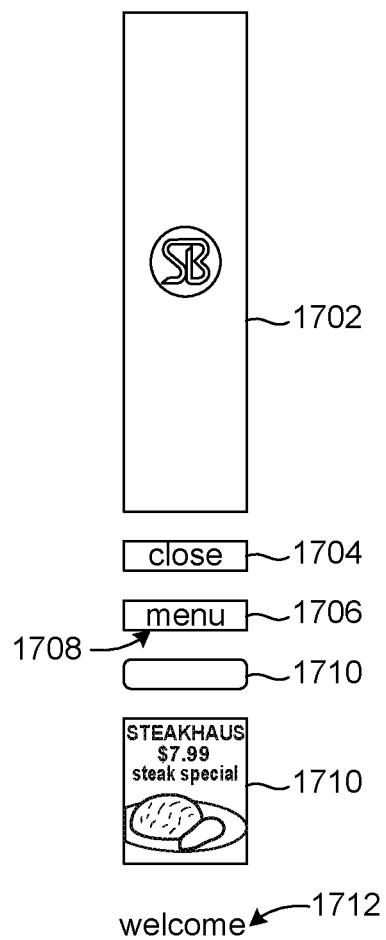
FIG. 17 shows examples of a plurality of graphical elements used to represent the product or service.

FIG. 16 is a flowchart of an embodiment of a method for interfacing with a third-party application, and FIG. 17 shows examples of a plurality of graphical elements. Third-party user 1034 provides input via third-party input device 1208 to third-party processor 1026 and upon receiving the input, third-party processor 1026 executes a client, such as a web client or an e-mail client, to request 1602, using an S2S protocol, a set of specific commands from server-based system 1010. An email client or a web client is stored within third-party memory device 1028. Third-party processor 1026 sends the request 1602 via third-party communication controller 1214 and network 1012 to server-based system 1010.

Upon receiving the request 1602 via sb-sb communication controller 1340, authentication server 1318 determines 1604 whether request 1602 is valid. For example, authentication server 1318 compares stored identification information, such as a username of third-party user 1034 and a password of third-party user 1034, stored within a memory device of the server with the identification information received from third-party user 1034 to determine whether request 1602 is valid. If the stored identification information does not match, authentication server 1318 determines that the request 1602 is valid. Otherwise, in case of the match, authentication server 1318 determines that the request 1602 is valid.

Upon determining that the request 1602 is invalid, authentication server 1318 denies 1606 the request 1602. On the other hand, upon determining that the request 1602 is valid, authentication server 1318 communicates with media manager server 1328 that stores the specific set of commands in a memory device of the media manager server 1328 and upon receiving the communication, media manager server 1328 sends 1608 the specific set of commands requested 1602 by third-party processor 1026 to the processor.

The specific set of commands may include IDs of each server within server-based system 1010. Moreover, each command within the specific set of commands has a command ID. For example, the seteventsubscription command, described below, has a command ID and the triggerevent command has a command ID. Further, each command communicated between server-based system 1010 and third-party device 1014 includes a command ID that is sent by a source device that sends the command. Further, any commands communicated between server-based system 1010 and any of printer 1352, printer 1354, peripheral device 1356, peripheral device 1358, gaming device 1348, and gaming device 1350 includes a command ID sent by a source device that sends the command.

The request 1602 may include a request for a graphical element creation application, which is executed to create a graphical element. For example, upon authentication by authentication server 1318 of the identification information of third-party user 1034, authentication server 1318 communication with graphical element creation server 1316 and graphical element creation server 1316 sends the graphical element creation application to third-party device 1014 via sb-sb communication controller 1340 and third-party communication controller 1214. Examples of the graphical element creation application include a text file compiler, a print file compiler, a bitmap file compiler, a JPEG file compiler, Adobe Photoshop™, Adobe Flash™, and Adobe Illustrator™ Examples of a graphical element includes a background 1702, a button 1704, a button 1706 including a menu 1708, a button 1710, an image 1710, a text block 1712, which are illustrated in FIG. 16. Other examples of a graphical element include text within a text file or a print file, a linkable media, and a loadable media. A set of graphical elements are combined and assigned functionality by executing the graphical element creation application to create content, such as window interface 1140. Content is also sometimes referred to herein as event representation. Content may also include a text file, a bitmap file, a JPEG file, or a print file.

As another example, the request 1602 may include a request for a content approval application, described below. In this example, upon authentication of third-party user 1034 by authentication server 1318, authentication server 1318 communicates with content approval server 1330 regarding request 1602 for the content approval application and upon receiving the communication, content approval server 1330 sends the content approval application via sb-sb communication controller 1340 and third-party communication controller 1214 to third-party processor 1026.

As yet another example, request 1602 includes a request to send a copy of media player application 1126. In this example, upon authenticating of third-party user 1034, authentication server 1318 communicates with media server 1124 regarding a request for a copy of media player application 1126 and upon receiving the communication, media server 1124 sends the media player application 1126 to third-party device 1014 via sb-sb communication controller 1340.

In various embodiments, the set of specific commands requested 1602 by third-party device 1014 include a command to communicate from third-party device 1014 with graphical element creation server 1316 via media manager server 1328 to use the graphical element creation application stored within graphical element creation server 1316 to create and combine a set of graphical elements and assign functionality to the graphical elements to create content. In these embodiments, the graphical element creation application is executed by graphical element creation server 1316.

In other embodiments, the set of specific commands requested 1602 by third-party device 1014 include a command to communicate from third-party device 1014 with content approval server 1330 to test and approve content by executing the content approval application stored within content approval server 1330. In these embodiments, the content approval application is executed by content approval server 1330. In yet other embodiments, the set of specific commands requested by third-party device 1014 includes a command to send a description of content from third-party device 1014 to media manager server 1328.

In other embodiments, request 1602 sent by third-party device 1014 may include a request to obtain a software development kit (SDK) from server-based system 1010. In these embodiments, the SDK is used by third-party user

1034 to develop the content approval application or the graphical element creation application. In other embodiments, the SDK is used by third-party user 1034 to develop content that is displayed on gaming display device 1122. In these embodiments, the SDK includes the graphical element creation application. In various embodiments, any command, described herein, sent by third-party device 1014 after receiving the specific set of commands is included within the specific set of commands.

Figure 18:
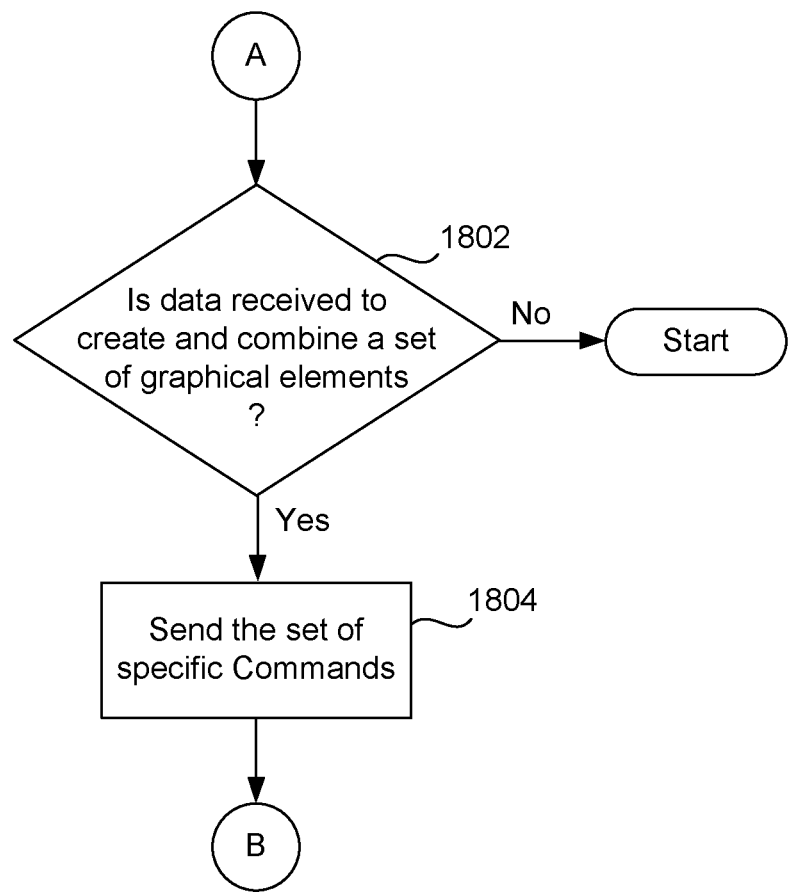
FIG. 18 is a continuation of the flowchart of FIG. 16.

FIG. 18 is a continuation of the flowchart of FIG. 16. Upon receiving the specific set of commands requested 1602 and upon determining that third-party user 1034 is logged onto third-party device 1014, third-party processor 1026 determines 1802 whether the user has provided data via third-party input device 1208 to send a createmediaevent command, to create content. For example, third-party user 1034 may provide data, such as, a textual description of content, images to be included to create the content, a textual description of a property of a graphical element. The createmediaevent command is one of the commands in the specific set. Upon determining 1802 that data is not received, the method returns to 1602 or the method ends.

On the other hand, upon determining 1802 that data is received, third-party device 1014 sends 1804 the createmediaevent command via third-party communication controller 1214 and sb-sb communication controller 1340 to media manager server 1328 to create content. Upon receiving the createmediaevent command, media manager server 1328 communicates the command to graphical element creation server 1316 and the graphical element creation server 1316 creates content based on data within the command received from third-party device 1014. As an example, graphical element creation server 1316 includes a graphical element registry, such as a database, including a plurality of graphical elements and a plurality of links between the graphical elements and motions of the graphical elements. In this example, upon execution of the graphical element creation application triggered by a selection of a description of a graphical element displayed in MM API 1418 by sbs user 1032 via media manager input device 1404, graphical element creation server 1316 retrieves the graphical element and any link between the graphical element and a motion of the graphical element, and provides the graphical element and the motion to media manager server 1328. In this example, sbs user 1032 selects the description of the graphical element based on data, received from third-party device 1014, describing the graphical element Further, in this example, upon receiving the motion and the graphical element, media manager processor 1414 displays the graphical element and the motion on media manager display device 1406. In this example, a graphical element within the graphical element registry includes a name of the graphical element, a description of the graphical element, and a function name of the functionality of the graphical element. In this example, the motion of graphical element may be a flying motion of Superman™, a blinking motion of an eye, or a running motion of a runner.

As another example, graphical element creation server 1316 executes Flash™ tools of the graphical element creation application to create a graphics compiled Flash™ file including a set of graphical elements and/or to create an application module including a description of functionality, such as motion, of the graphical elements. For example, an application module maybe an XML file or a binary-coded file describing whether a graphical element is dynamic and if so, includes a description of motion of the graphical element.

In other embodiments, graphical element creation server 1316 executes the graphical element creation application upon receiving the createmediaevent command and upon execution of the application, graphical element creation server 1316 retrieves a graphical element and a link between the graphical element and a motion of the graphical element, and provides the graphical element and the motion to media manager server 1328.

In another embodiment, sbs user 1032 uses media manager input device 1404 to execute As another example, graphical element creation server 1316 executes Flash™ tools of the graphical element creation application to create a graphics compiled Flash™ file including a set of graphical elements and/or to create an application module including a description of functionality, such as motion, of the graphical elements.

Figure 19:
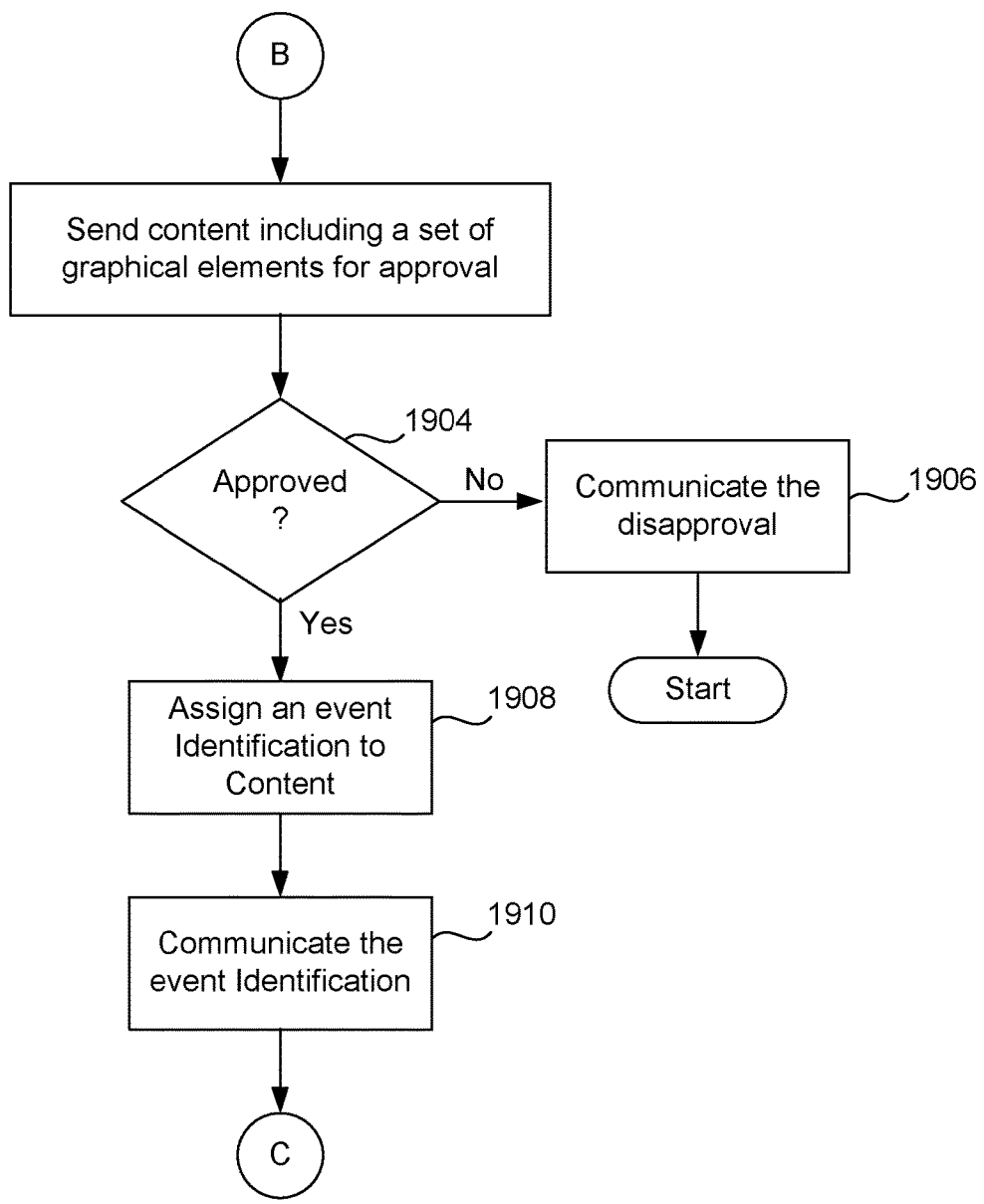
FIG. 19 is a continuation of the flowchart of FIG. 18.

FIG. 19 is a continuation of the flowchart of FIG. 18. Upon creation of content, graphical element creation server 1316 sends 1902 the content to content approval server 1330 that executes the content approval application to determine 1904 whether to approve the content for display on gaming device 1002. For example, content approval server 1330 executes the content approval application to parse content to identify a portion of the content that may be obscene or inappropriate for public display or that may be harmful to third-party processor 1026, media manager server 1328, or gaming device processor 1104. For example, content approval server 1330 executes the content approval application to determine whether the content includes profane language or obscene images. As another example, content approval server 1330 executes the content approval application to determine whether the content includes a virus or a worm that is harmful to third-party processor 1026, media manager server 1328, or gaming device processor 1104. Upon determining that content may be obscene, inappropriate, or harmful, content approval server 1330 determines that the content is invalid and disapproves the content. Otherwise, upon determining that content is not obscene, inappropriate, and harmful, content approval server 1330 determines that the content is valid and approves the content.

Upon disapproval of content, content approval server 1330 communicates the disapproval to media manager server 1328 that further sends a command to communicate 1906 the disapproval via sb-sb communication controller 1340 and third-party communication controller 1214 to third-party processor 1026. Upon reception of disapproval, the method ends or third-party user 1034 may use TP API 1222 and third-party input device 1208 to change data describing content or a graphical element within the content, and send the changed data to third-party processor 1026, which communicates a command including the changed data to media manager server 1328 for approval.

On the other hand, upon approval of content by content approval server 1330, media manager server 1328 generates a validated file from a graphics compiled Flash™ file and an application module describing a functionality of graphical elements of the Flash™ file by including an electronic signature of content approval server 1330 in the validated file. An electronic signature may be encrypted. The validated file may include a print file or a text file.

Media manager server 1328 stores the validated file within media manager memory device 1416 and assigns 1908 an event ID to the file and communicates 1910 the event ID and the file to floor controller 1004 via firewall server 1006. Media manager sever 1328 communicates, to third-party device 1014, the validated file and an event ID assigned to the file, may communicate, to third-party device 1014, a set of gaming device IDs of gaming devices 1348 and 1350 that the media manager server has access to, may communicate, to third-party device 1014, a set of printer IDs of printers 1352 and 1354 that the media manager server has access to, and the may communicate, to third-party device 1014, a set of peripheral device IDs of peripheral devices 1356 and 1358 that media manager has access to. Media manager sever 1328 communicates, to content approval server 1330, the validated file and an event ID assigned to the file for storage of the validated file and the event ID within the content approval server. Third-party processor 1026 receives the validated file, an event ID assigned to the file, may receive a set of gaming device IDs of gaming devices 1348 and 1350, may receive a set of printer IDs of printers 1352 and 1354, and may receive a set of peripheral device IDs of peripheral devices 1356 and 1358 from media manager server 1328, and stores the validated file, the event ID, the gaming device IDs, the printer IDs, and the peripheral device IDs within third-party memory device 1028.

In various embodiments in which third-party processor 1026 receives the graphical element creation application from graphical element creation server 1316, upon determining that third-party user 1034 activates the graphical element creation application via third-party input device 1208 and TP API 1222, third-party processor 1026 executes the graphical element creation application and receives various inputs from the user via third-party input device 1208 and TP API 1222 to create a set of graphical elements, combine the graphical elements, and assign functionality to the graphical elements. As an example, third-party user 1034 executes the graphical element creation application to view a textual description of a graphical element and selects the description via TP API 1222 and third-party input device 1208. In this example, upon receiving the selection, third-party processor 1026 retrieves the graphical element and a link of the graphical element to a motion of the graphical element by executing the graphical element creation application, and displays the motion to third-party user 1034 on third-party display device 1204.

Figure 20:
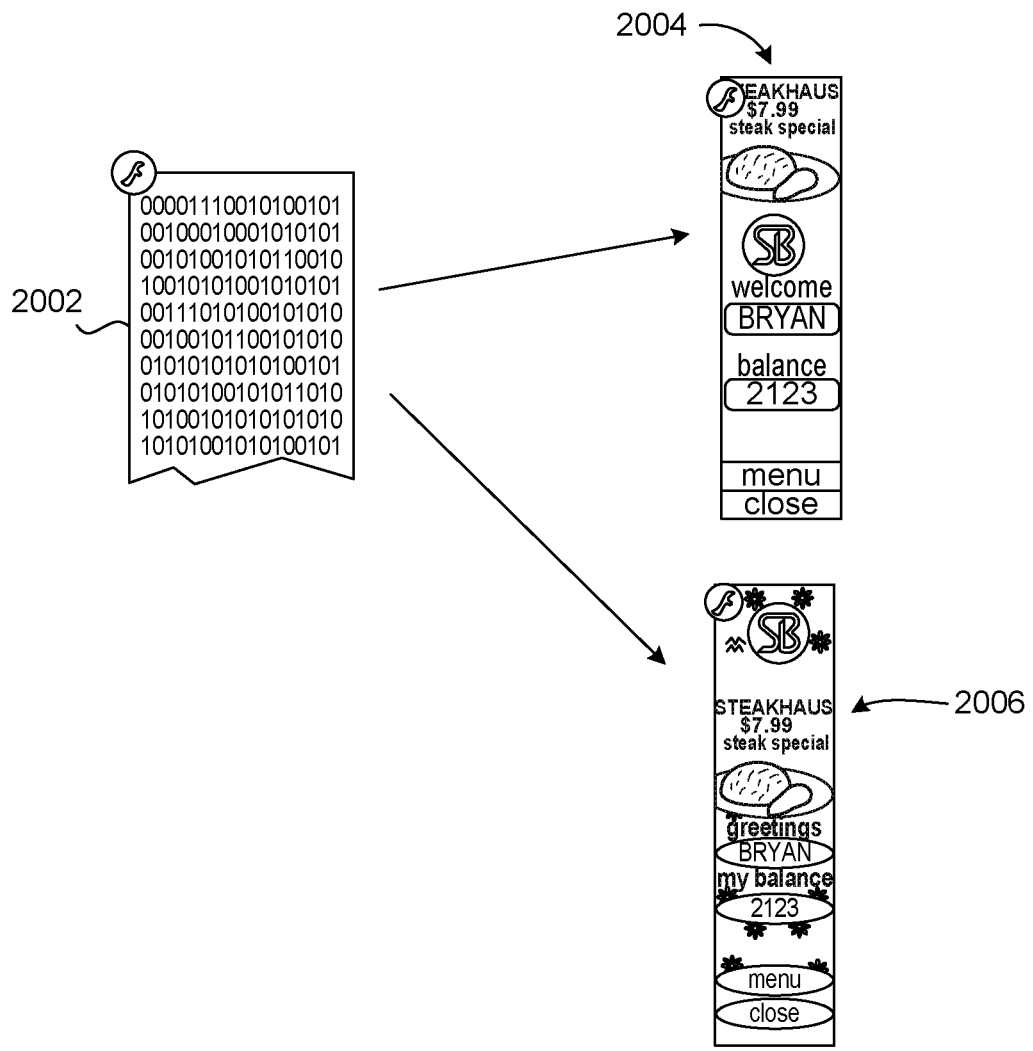
FIG. 20 shows an exemplary application module and an exemplary graphics compiled Flash™ file created by using the methods of FIGS. 16, 18, and 19.

As another example, third-party user 1034 uses a set of Flash™ tools of the graphical element creation application to develop a combination of graphical elements having functionality described in an application module. An exemplary application module 2002 and an exemplary graphics compiled Flash™ file 2004 are shown in FIG. 20. Application module 2002 is a binary-coded file. In other embodiments, an application module may be an XML file. A graphics compiled Flash™ file provides a look of an event representation. The graphical element creation application is executed to associate an application module with a set of graphical elements in a graphics compiled Flash™ file. For example, the graphical element creation application is executed to associate application module 2002 with graphics compiled Flash™ file 2004 and with another graphics compiled Flash™ file 2006. Graphics compiled Flash™ file 2004 has a look different than a look of graphics compiled Flash™ file 2006. For example, "menu" within graphics compiled Flash™ file 2006 is within an oval block and "menu" within graphics compiled Flash™ file 2004 is within a rectangular block. As another example, graphics compiled Flash™ file 2006 has a Christmas background, which is a theme, with red color and graphics compiled Flash™ file 2004 has a regular theme without a holiday look and a red color.

In various embodiments, upon receiving the createmediaevent command, sbs user 1032 views the command via MM API 1418 and provides input via the API and media manager input device 1404 to create content. In these embodiments, upon receiving an input from sbs user 1032 to create and combine a set of graphical elements via MM API 1418, media manager server 1328 communicates with graphical element creation server 1316 and upon receiving the communication, graphical element creation server 1316 executes the graphical element creation application to create and combined the graphical elements, and to link the graphical elements with a functionality to the graphical elements. In these embodiments, upon creation of content, graphical element creation server 1316 communicates with media manager server 1328 regarding the creation and media manager presents a display of the completion to sbs user 1032 via MM API 1418. In these embodiments, upon receiving the display of completion, sbs user 1032 provides input via MM API 1418 and media manager input device to media manager processor 1414 to communicate with content approval server 1330 to determine whether to approve or disapprove the content. Further, in these embodiments, content approval server 1330 receives the command from media manager server 1328 regarding determining whether to approve or disapprove the content and executes the content approval application to make the determination.

In another embodiment, upon creation of content, third-party processor 1026 receives an input from third-party user 1034 via TP API 1222 and third-input device 1208 to execute the content approval application and upon receiving the input, third-party processor 1026 executes the application to determine to approve or disapprove the content. In other embodiments, upon creation of content, third-party processor 1026 executes the content approval application to determine whether the content is valid. For example, third-party processor 1026 executes the content approval application to parse content to identify a portion of the content to determine whether the content is valid. In this example, third-party processor 1026 determines whether the content is valid in the same manner as that determined by content approval server 1330.

In various embodiments, media manager server 1328 receives content from graphical element creation server 1316 and displays the content on media manager display device 1406. The sbs user 1032 views content displayed on media manager display device 1406 and decides whether to approve or disapprove the content for display in public on gaming display device 1122. The sbs user 1032 determines whether to approve or disapprove content based on a set of policies developed by the user or by a regulatory authority, such as Nevada Gaming Control Board (NGCB).

In various embodiments, upon creation of content, graphic element creation server sends the content to media manager server 1328 and the media manager server 1328 sends the content to content approval server 1330. In these embodiments, media manager server 1328 receives a decision as to whether the content is approved or disapproved from content approval server 1330. Further, in this example, sbs user 1032 views the decision displayed on media manager display device 1406 and decides whether to approve or disapprove the content based on the policies.

In other embodiments, content approval server 1330 includes a set of counters, such as registers, to count, such as increment or decrement, a number of approvals of content received from multiple third-party users via multiple third-party controllers, such as remote hosts 202 and 204 (FIG. 2), to count a number of disapprovals of the content, and to count a number of pending decisions whether to approve or disapprove the content.

In yet other embodiments, a validated file includes an electronic signature, of approval of content, received from content approval server 1330. In various embodiments, a validated file includes an electronic signature of approval of content from content approval server 1330 and/or sbs user 1032.

In various embodiments, third-party device 1014 sends a command, which is one of the commands within the specific set of commands, to media manager server 1328 to inquire whether content is approved by content approval server 1330 and/or sbs user 1032. In these embodiments, media manager server 1328 sends the command to content approval server 1330 and/or prompts sbs user 1032 to determine a status of the content. Further, in these embodiments, upon receiving the command, content approval server 1330 responds to media manager server 1328 by indicating whether the status of the content is approved, disapproved, or pending approval or disapproval. Moreover, in these embodiments, upon receiving the prompt, sbs user 1032 responds to media manager server 1328 via MM API 1418 and media manager input device 1404 regarding the status of content. Media manager server 1328 receives the status from content approval server 1330 and/or sbs user 1032, and sends a command including the status to third-party device 1014.

In various embodiments, regardless of whether third-party controller 1014 executes the content approval application to determine whether to approve or disapprove content, content approval server 1330 and/or sbs user 1032 determines whether to approve or disapprove the content. For example, upon approval or disapproval of content determined by executing the content approval application stored in third-party controller 1014 or regardless of whether the content approval application is executed by third-party device 1014, third-party device 1014 sends a command, which is one of the commands in the specific set of commands, including the content and an instruction to determine whether to approve or disapprove the content to media manager server 1328. In this example, media manager receives the command via sb-sb communication controller 1340, sends the command to content approval server 1330, and awaits a decision of approval or disapproval from the content approval server 1330. In this example, upon receiving the decision, media manager server 1328 sends a command including the decision to third-party device 1014.

In other embodiments, media manager server 1328 sends a graphics compiled Flash™ file and an application module to floor controller 1004 via firewall server 1006. In yet another embodiment, media manager server 1328 stores a graphics compiled Flash™ file within media manager memory device 1416 and assigns an event ID to the file. In this embodiment, media manager server also stores an application module including a functionality of graphical elements of the graphics compiled Flash™ file within media manager memory device 1416.

In various embodiments, media manager server 1328 communicates the validated file and an event ID assigned to the file to content server 1332 for storage within content server 1332. In other embodiments, media manager server 1328 communicates or a graphics compiled Flash™ file, and an application module, and an event ID assigned to the file and the module to content server 1332 for storage within content server 1332. In various embodiments, media manager server 1328 communicates the validated file and an event ID assigned to the file to any server of server-based system 1010 for storage within the server. In other embodiments, media manager server 1328 communicates or a graphics compiled Flash™ file, and an application module, and an event ID assigned to the file and the module to any server of server-based system 1010 for storage within the server.

In other embodiments, media manager sever 1328 communicates, to third-party device 1014, a graphics compiled Flash™ file, an application module describing a functionality of graphical elements within the Flash™ file, an event ID assigned to the Flash™ file, may communicate, to third-party device 1014, a set of gaming device IDs of gaming devices 1348 and 1350 that the media manager server has access to, may communicate, to third-party device 1014, a set of printer IDs of printers 1352 and 1354 that the media manager server has access to, and may communicate, to third-party device 1014, a set of peripheral device IDs of peripheral devices 1356 and 1358 that the media manager server has access to. Third-party processor 1026 receives the graphics compiled Flash™ file, the application module, an event ID assigned to the Flash™ file, may receive the a set of gaming device IDs of gaming devices 1348 and 1350, may receive a set of printer IDs of printers 1352 and 1354, and may receive a set of peripheral device IDs of peripheral devices 1356 and 1358 from media manager server 1328, and stores the Flash™ file, the application module, the event ID, the gaming device IDs, the printer IDs, and the peripheral device IDs within third-party memory device 1028.

Figure 21:
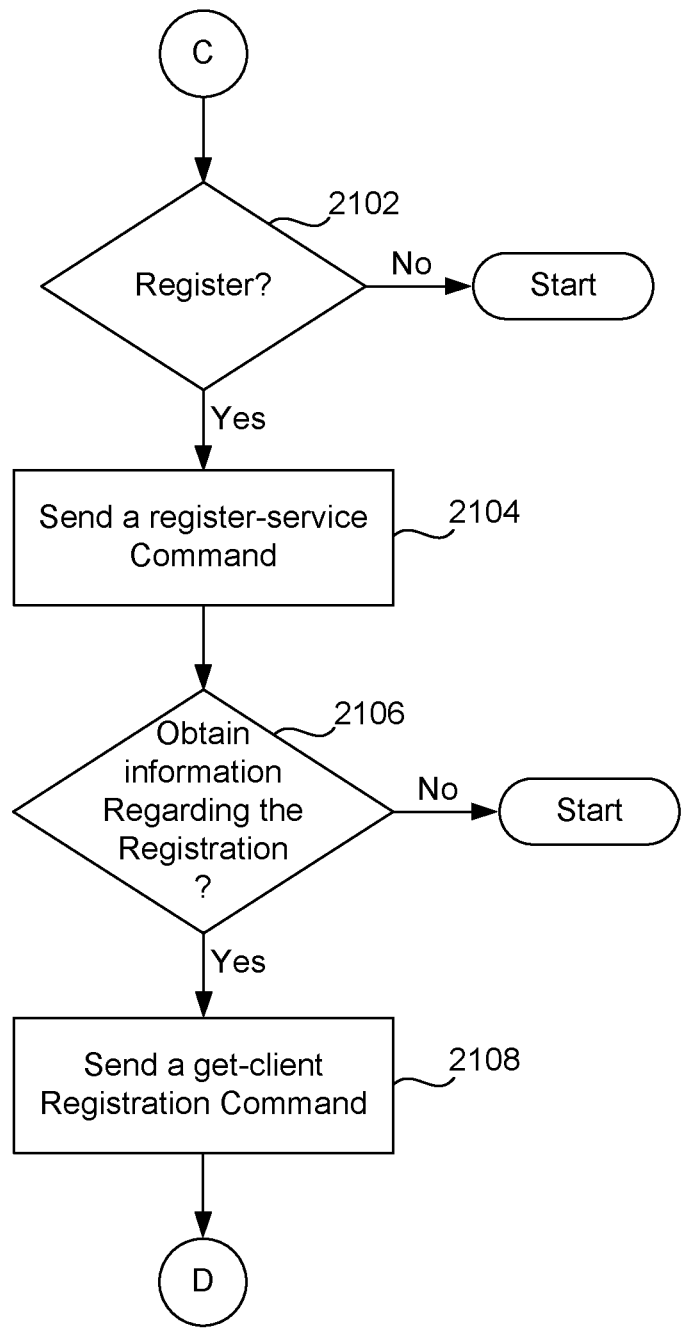
FIG. 21 is a continuation of the flowchart of FIG. 19.

FIG. 21 is a continuation of the flowchart of FIG. 19. Third-party device 1014 determines 2102 whether to register third-party device 1014 with server-based system 1010. For example, upon reception of the specific set of commands by third-party device 1014, third-party processor 1026 receives an input from third-party user 1034 whether to register third-party device 1014 with server-based system 1010. Upon determining 2102 not to register, the method ends or returns to 1602. On the other hand, upon determining 2102 to register, third-party device 1014 sends 2104 a registerservice command including a uniform resource identifier (URI) of an application, such as application 1220 within third-party memory device 1028, to register third-party device 1014 with media manager server 1328 of server-based system 1010. The registerservice command is one of the commands in the specific set of commands. Upon receiving the registerservice command, media manager server 1328 of server-based system 1010 and gaming device 1002 that media manager server 1328 has access to registers the URI of application 1220 and all communication between third-party device and any of gaming device 1348, gaming device 1350, peripheral device 1356, peripheral device 1358, printer 1352, printer 1354, and server-based system 1010 occurs using the URI. If application 1220 within third-party memory device 1028 is not registered with media manager server 1328, server-based system 1010 does not recognize a command sent from third-party device 1014. Similarly, if application 1220 within third-party memory device 1028 is not registered with gaming device 1002, gaming device 1002 does not recognize a command sent from third-party device 1014. Media manager server 1328 may also register a time and/or a date third-party device 1014 registers with media manager server 1328.

Further, third-party processor 1026 determines 2106 whether to obtain information regarding registration of third-party device 1014 with server-based system 1010. For example, third-party user 1034 decides whether to provide an input to third-party processor 1026 to obtain the information regarding the registration of third-party device 1014. Examples of the information include a URI of application within third-party memory device 1028, a date of registration of third-party device 1014 with server-based system 1010, and a time of the registration. Upon determining not to obtain the information regarding the registration, the method ends or returns to 1602. On the other hand, upon determining to register to obtain the information regarding the registration, third-party device 1014 sends 2108 a getclientregistration command to server-based system 1010. The getclientregistration command is one of the commands in the specific set of commands. Upon receiving the getclientregistration command from third-party device 1014, media manager server 1328 sends the information regarding the registration to third-party device 1014 via sb-sb communication controller 1340.

In other embodiments, upon determining 2102 to register, third-party device 1014 sends the registerservice command including a MAC address of third-party memory device 1028, to register third-party device 1014 with media manager server 1328 of server-based system 1010 and to register third-party device 1014 with gaming device 1002 that media manager service 1328 has access to. Further, in these embodiments, upon registering with media manager server 1328, all commands sent to third-party device 1014 by any server described herein, by gaming device 1002, by printer 1352, by printer 1354, by peripheral device 1356, or by peripheral device 1358 includes the MAC address of the third-party device 1014. Moreover, in these embodiments, all commands, within the specific set of commands, sent by third-party device 1014 to any server described herein, to gaming device 1002, to printer 1352, to printer 1354, to peripheral device 1356, or to peripheral device 1358 includes the MAC address of the third-party device 1014.

In other embodiments, upon registering third-party device 1014 with media manager server 1328, sb-sb communication controller 1340 communicates with third-party communication controller 1214 to receive a speed, that may be measured in bits per second (bps), of reception of commands by the third-party communication controller from the sb-sb communication controller. In these embodiments, upon receiving the speed, sb-sb communication controller 1340 communicates with third-party communication controller 1214 with a speed that is less than a speed of communication of commands from sb-sb communication controller 1340 to the third-party communication controller and the speed of reception of the commands by the third-party communication controller from the sb-sb communication controller.

Figure 22:
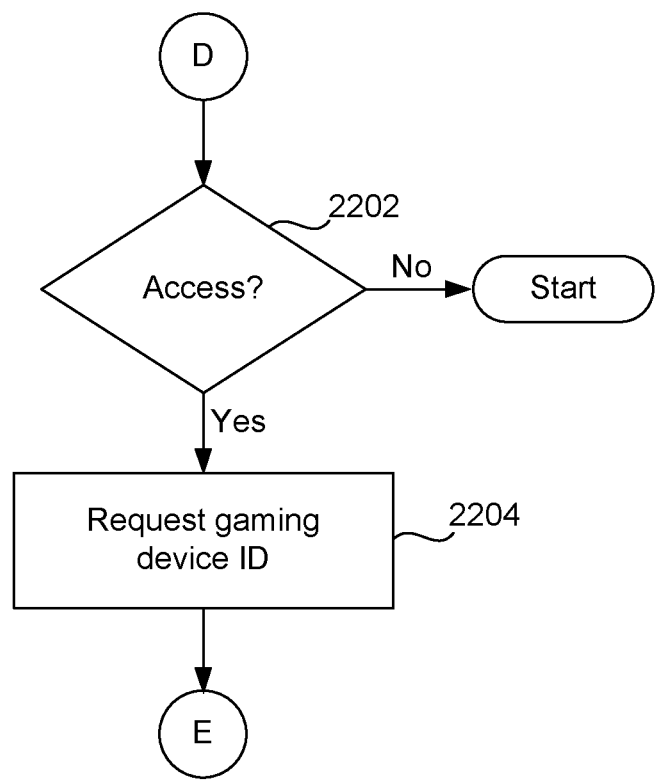
FIG. 22 is a continuation of the flowchart of FIG. 21.

FIG. 22 is a continuation of the flowchart of FIG. 21. Upon receiving the specific set of commands, third-party device 1014 sends a command, which is one the commands in the specific set of commands, to server-based system 1010 to determine 2202 whether media manager server 1328 has access to gaming devices 1348 and 1350, printers 1352 and 1354, and peripheral devices 1356 and 1358. Upon receiving a command for determining access to gaming devices 1348 and 1350, printers 1352 and 1354, and peripheral devices 1356 and 1358 and upon determining that media manager server 1328 has the access, media manager server 1328 communicates with third-party device 1014 via sb-sb communication controller 1340 that media manager server 1328 has the access. On the other hand, upon determining that media manager server 1328 does not have access to gaming device 1348, gaming device 1350, printer 1352, printer 1354, peripheral device 1356, and peripheral device 1358, the method ends or returns to 1602. Upon receiving a command from media manager server 1328 that the server has access to gaming devices 1348 and 1350, printers 1352 and 1354, and peripheral devices 1356 and 1358, third-party device 1014 sends a command, which is one the commands in the specific set, to request 2204 gaming device IDs of gaming devices 1348 and 1350. Upon receiving a command requesting gaming device IDs of gaming devices 1348 and 1350, media manager server 1328 provides the one or more gaming device IDs to third-party processor 1026 and third-party processor 1026 stores the IDs in third-party memory device 1028.

Figure 23:
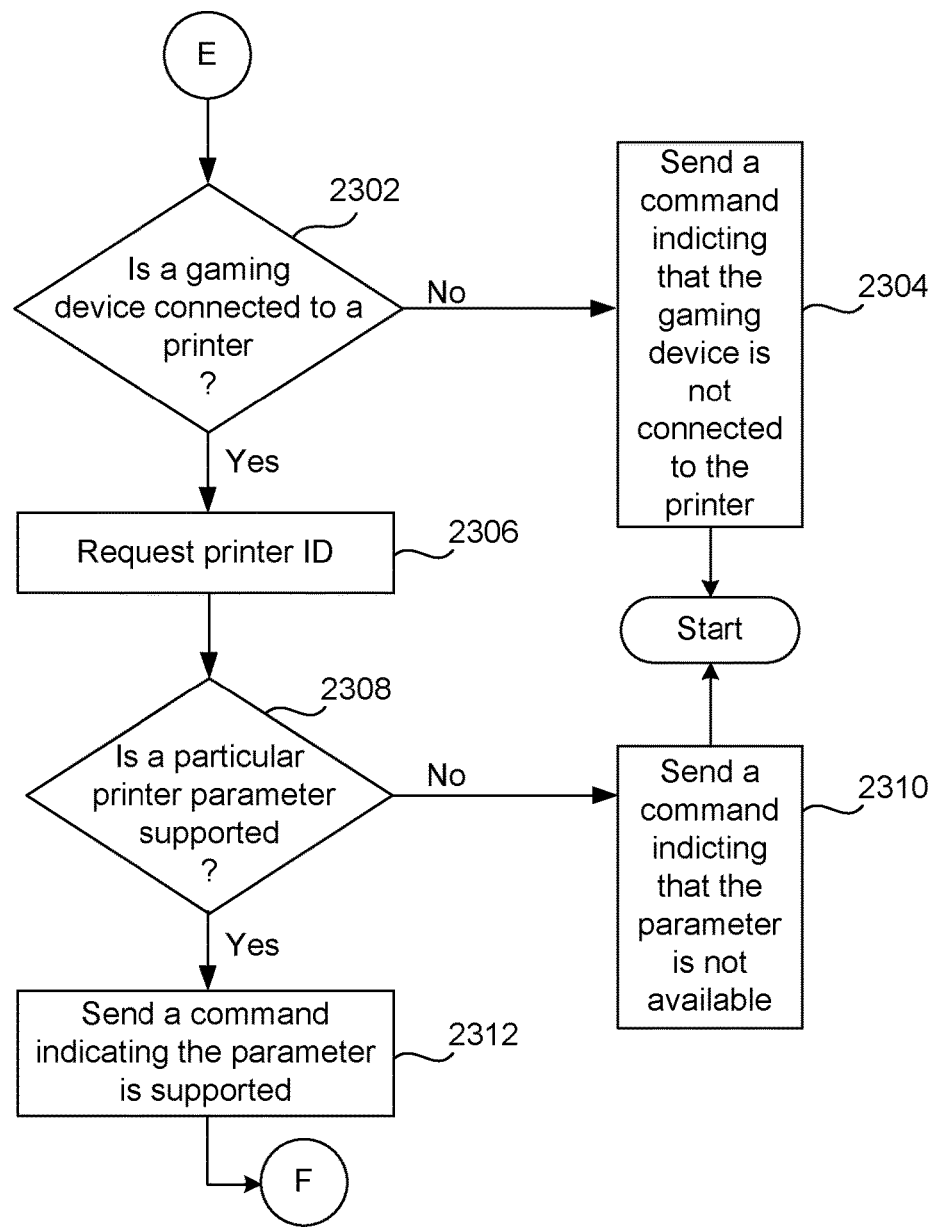
FIG. 23 is a continuation of the flowchart of FIG. 22.

FIG. 23 is a continuation of the flowchart of FIG. 22. Upon receiving the specific set of commands, third-party device 1014 sends a setprinter command to media manager server 1328 to determine 2302 whether gaming device 1348 is connected with printer 1352. For example, third-party device user 1034 provides an input via third-party input device 1208 to send the setprinter command. The setprinter command includes gaming device ID of gaming device 1348. For example, third-party device 1014 sends a gaming device ID, in the setprinter command, of gaming device 1348 if an event is to be performed using printer 1352 connected to gaming device 1348. Media manager server 1328 receives the setprinter command and determines whether printer 1352 is connected to gaming device 1348 and whether printer 1352 is locked from use or malfunctioning by sending a command to floor controller 1004 via protocol converter 1346, and receives a response from floor controller 1004 regarding whether printer 1352 is connected to gaming device 1002. Upon receiving a command from floor controller 1004 that gaming device 1348 is not connected to printer 1352 or that printer 1352 is locked from use or that printer 1352 is malfunctioning, media manager sends 2304 a command to third-party device 1014 indicating that gaming device 1348 is not connected to printer 1352 and the method returns to 1602. On the other hand, upon receiving a command from floor controller 1004 that printer 1352 is connected to gaming device 1348, that printer 1352 is not locked, and that printer 1352 is not malfunctioning, media manager server 1328 sends a command to third-party device 1014 that gaming device 1348 is connected to printer 1352.

Upon receiving a command notifying that gaming device 1348 is connected to printer 1352, third-party device 1014 sends a requestprinterID command, which is one of the commands in the specific set, including a request 2306 for printer ID of printer 1352. For example, third-party device user 1034 provides an input via third-party input device 1208 to send the requestprinterID command. The requestprinterID command includes a gaming device ID of gaming device 1348 connected to printer 1352 whose printer ID is requested by third-party device 1014. Media manager server 1328 receives the requestprinterID command from third-party device in an S2S protocol format and sends the command to floor controller 1004 via firewall server 1006. Protocol converter 1346 converts the requestprinterID command from an S2S protocol format to a G2S protocol format, and sends the command to floor controller 1004. Floor controller 1004 sends printer ID of printer 1352 to media manager server 1328 in a G2S protocol format. Protocol converter 1346 receives a command including a printer ID from floor controller 1004 and converts the command from a G2S protocol format into an S2S protocol format, and sends the printer ID to media manager server 1328 that forwards the command to third-party device 1014. Third-party processor 1026 receives printer ID of printer 1352 and stores the printer ID in third-party memory device 1028.

Third-party device 1014 sends a printerinformation command, which is one of the commands in the specific set of commands, to printer 1352 via floor controller 1004 and protocol converter 1346 to determine 2308 whether a particular printer parameter is supported by printer connected to gaming device 1348. For example, third-party device user 1034 provides an input via third-party input device 1208 to send the printerinformation command. The printerinformation command includes a printer ID of printer 1352. To determine whether printer 1352, having a printer ID, prints a particular template of a voucher, prints in a particular region of the template, and/or has a particular printer specification, third-party device 1014 sends a description and/or an ID of the particular template, a description and/or an ID of the particular region, and/or a description and/or an ID of the particular specification in the printerinformation command to media manager server 1328 in an S2S protocol format. Examples of the particular region include a top half region on a voucher, a bottom half region on the voucher, a left-half region on the voucher, or a right-half region on the voucher. Examples of the specific printer specification include a print color of printer 1352 and a print speed of printer 1352.

Media manager server 1328 receives a printerinformation command from third-party device 1014 and sends the command to floor controller 1004 via protocol converter 1346 and firewall server 1006. Protocol converter 1346 converts the printerinformation command from an S2S protocol format to a G2S protocol format, and sends the command to floor controller 1004 via firewall server 1006. Floor controller 1004 sends a command including a response to the printerinformation command to media manager server 1328 via protocol converter 1346. For example, floor controller 1004 determines from a template ID receives within the printerinformation command whether the particular template having the template ID is printed by printer 1352 having a printer ID that is also received within the command. As another example, floor controller 1004 determines by comparing a description of the particular specification within printerinformation command and a description of the specification stored within floor controller 1004 whether printer 1352 identified by a printer ID received within the printerinformation command has the specification.

If floor controller 1004 determine that there is no match between the particular printer parameter within from the printerinformation command and a parameter of printer 1352 stored within floor controller 1004, the controller sends a command indicating the unavailability of the particular printer parameter within the printerinformation command to media manager server 1328, and the media manager server 1328 sends 2310 a command indicating the unavailability of the particular printer parameter to third-party device 1014. After reception of the indication of unavailability of the particular printer parameter by third-party device 1014, the method ends or returns to 1602. On the other hand, if floor controller 1004 determines the particular printer parameter from the printerinformation command and a parameter of printer 1352 stored within floor controller 1004 match, the controller sends 2312 a command indicating the availability of the particular printer parameter to media manager server 1328. Media manager server 1328 receives a command including a response indicating the availability of the particular printer parameter via protocol converter 1346 that converts the command including the response from a G2S protocol format into an S2S protocol format. Media manager server 1328 sends a response to the printerinformation command to third-party device 1014 and third-party processor 1026 stores the particular printer parameter within third-party memory device 1028.

Third-party device 1014 does not use the particular printer parameter if a response is received from media manager server 1328 that printer 1352 does not have the particular printer parameter. For example, upon receiving a response from media manager server 1328 that printer 1352 does not print a particular template, third-party processor 1026 does not send a command to printer 1352 to print using the particular template.

Figure 24:
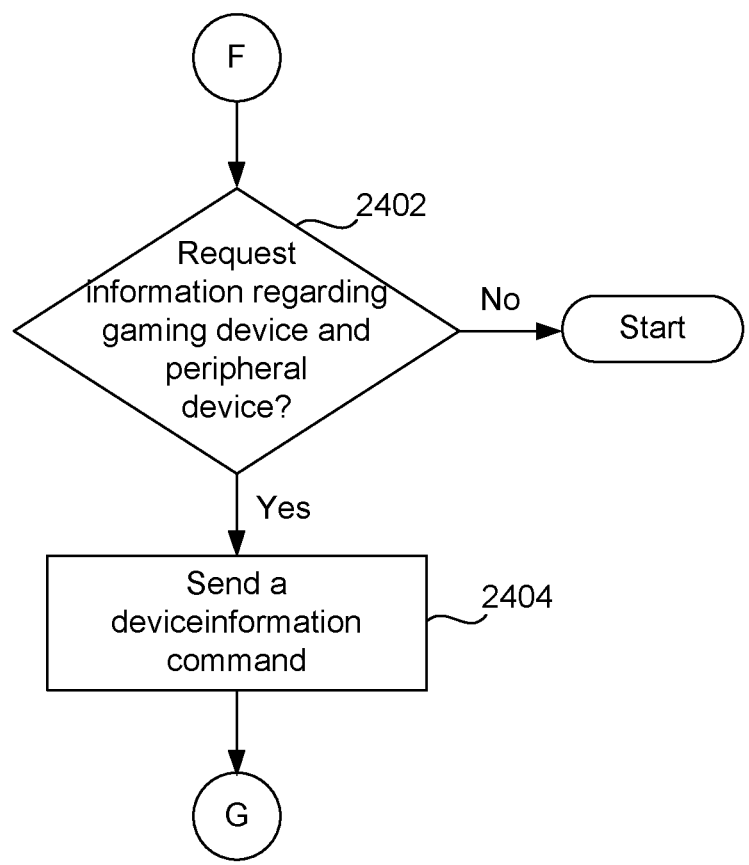
FIG. 24 is a continuation of the flowchart of FIG. 23.

FIG. 24 is a continuation of the flowchart of FIG. 23. Upon receiving a command indicating the availability of the particular printer parameter, third-party processor 1026 determines 2402 whether to request device information regarding peripheral device 1356, peripheral device 1358, gaming device 1348, and/or gaming device 1350. Examples of the device information include whether gaming device 1002 is in an active state in which gaming device processor 1104 executes a game in window interface 1140 and/or game interface 1138, whether gaming device 1002 is in an idle state in which gaming device processor 1104 does not execute a game in window interface 1140 and game interface 1138, a title of game played using game interface 1138 or window interface 1140, a denomination of game played in game interface 1138 or window interface 1140, a sum of values of meter 1118 and additional meter 1120, a value of meter 1118 as displayed on gaming display device 1122, a value of additional meter 1120 as displayed on gaming display device 1122, a paytable of game played using game interface 1138 or window interface 1140, an outcome of game played using game interface 1138 or window interface 1140, a flash frequency of bezel 53, a color of an on duty cycle of bezel 53, a color of an off duty cycle of bezel 53, a flash frequency of candle 59, a color of an on duty cycle of candle 59, a color of an off duty cycle of candle 59, a geographic location of gaming location of gaming device 1002, a pit ID of a pit in which gaming device 1002 is located, an area ID of an area of gaming establishment 1306 in which gaming device 1002 is located, a zone ID of a zone in gaming establishment 1306 having gaming device 1002, a name of wager-based game and/or a bonus game played in game interface 1138, and a name of game played using window interface 1140.

Upon determining not to request the device information, the method ends or returns to 1602. On the other hand, upon determining to request the device information, third-party device 1014 sends 2404 the requestdeviceinformation command, which is one of the commands in the specific set, to media manager server 1328 via sb-sb communication controller 1340. The requestdeviceinformation command may include a time period and an instruction to send the device information periodically at intervals of the time period.

Upon receiving the requestdeviceinformation command, media manager server 1328 requests the device information from floor controller 1004 via firewall server 1006 and protocol converter 1346, and upon receiving the device information from the floor controller 1004, media manager server 1328 sends the information to third-party device 1014. For example, upon receiving the requestdeviceinformation command including a theme ID, a paytable ID, and a denomination ID associated with meter 1118, from third-party device 1014, gaming device 1002 sends a value of the meter 1118 to third-party device 1014 via floor controller 1004. In this example, the paytable ID is an ID of a paytable used to determine an outcome of a game played using credits that are counted by meter 1118, the theme ID is an ID of a theme of an event representation of the game, and denomination ID is an ID of a denomination used to play the game. Further, in this example, the game may be played using game interface 1138 or window interface 1140. As another example, upon receiving the requestdeviceinformation command without the theme ID, the paytable ID, and the denomination ID associated with meter 1118, from third-party device 1014, gaming device 1002 sends a sum of values of meter 1118 and additional meter 1120 to third-party device 1014 via the floor controller 1004. Third-party device 1014 receives the device information from media manager server 1328 and stores the information in third-party memory device 1028.

In another embodiment, third-party device 1014 sends the requestdeviceinformation command with the theme ID, the paytable ID, and the denomination ID associated with meter 1118 having a value of credits used in playing a game in game interface 1138. In this embodiment, upon determining that the requestdeviceinformation command includes the theme ID, the paytable ID, and the denomination ID associated with meter 1118, gaming device 1002 does not send the value of the meter 1118 upon determining that the paytable ID identifies a paytable of a game played using game interface 1138 and sends a sum of values of meter 1118 and additional meter 1120. In this embodiment, the meter 1118 has a value of credits that is displayed in game interface 1138 and the additional meter 1120 has a value of credits that is displayed in window interface 1140.

In various embodiments, third-party device 1014 sends a getgroupmemberlist commands to media manager server 1328 and media manager server 1328 sends information regarding a list of devices, such as gaming device 1002, peripheral device 1356, peripheral device 1358, printer 1352, and printer 1354, that the media manager server 1328 has access to via floor controller 1004. In these embodiments, the information regarding the list of devices includes a gaming device ID of gaming device 1002, a type of gaming device 1002, a printer ID of printer 1352, a printer Id of printer 1354, a peripheral device Id of peripheral device 1356, and a peripheral device 1356 ID of peripheral device 1358. Examples of the types of gaming device 1002 include a gaming machine, a kiosk, and a cashier station. In these embodiments, media manager server 1328 receives the gaming device ID, the printer ID or printer 1352, the printer ID of printer 1354, the peripheral device ID of peripheral device 1356, and the peripheral device ID of peripheral device 1358 from floor controller 1004.

In other embodiments, third-party device 1014 sends a getwatmount to obtain via server-based system 1010 a value of meter 1118 or additional meter 1120 as displayed on gaming display device 1122.

Figure 25:
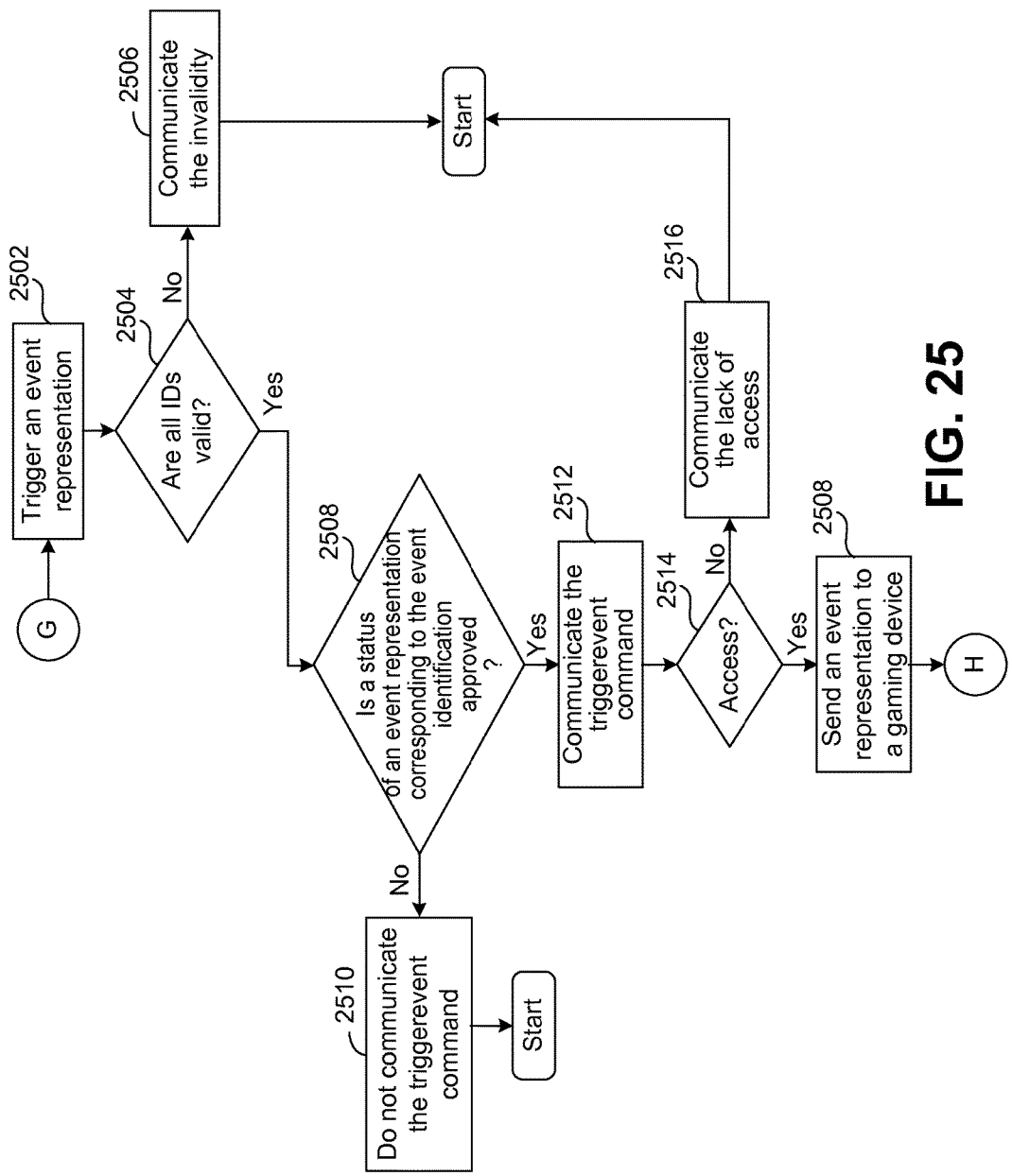
FIG. 25 is a continuation of the flowchart of FIG. 24.

FIG. 25 is a continuation of the flowchart of FIG. 24. Third-party device 1014 sends 2502 a triggerevent command, which is one of the commands in the specific set, via sb-sb controller to media manager server 1328. For example, third-party user 1034 decides to provide an input to third-party processor 1026 via third-party input device 1208 to send the triggerevent command. Third-party device 1014 includes, within the triggerevent command, an event ID of an event representation of a product or server offered by third-party user 1034 or offered within gaming establishment 1306. Third-party device 1014 further includes, within the triggerevent command, a priority in displaying one or more event representation. Third-party device 1014 may also include, within the triggerevent command, whether an application, such as media player application 1126, ECI 122, or ECI 124, that may be stored within gaming device 1002 has access to a property of a graphical element of an event representation having an event ID and whether the application has access until gaming input device 1108 is inserted into gaming machine. Third-party device 1014 includes, within the triggerevent command, a set of gaming device IDs on which one or more event representations are to be displayed. As an example, third-party device 1014 includes within the triggerevent command, a gaming device ID of gaming device 1348 and/or a gaming device ID of gaming device 1350 to display an event representation on gaming device 1348 and/or gaming device 1350. Third-party device 1014 may also include, within the triggerevent command, a player ID of a player playing a game at gaming device 1348. Third-party device 1014, may request the player ID from player tracking server 1322 that stores a set of player IDs of a plurality of players playing a game at gaming devices within gaming establishment 1306.

Media manager server 1328 receives the triggerevent command from third-party device 1014 and determines 2504 a validity of a set of IDs, such as a printer ID, a gaming device ID, a player ID, a peripheral device ID, and/or an event ID, within the command. For example, media manager server 1328 determines whether an event ID within the triggerevent command matches an event ID stored within media manager memory device 1416. As another example, media manager server 1328 determines whether a gaming device ID received within the triggerevent command matches a gaming device ID stored within media manager memory device 1416. Upon determining that all IDs of the set of IDs within the triggerevent command match corresponding IDs stored in media manager memory device 1416, media manager server 1328 determines that the IDs within the command are valid. On the other hand, if an ID, such as a gaming device ID, within the triggerevent command does not match a corresponding ID, such as a gaming device ID, stored within media manager memory device 1416, media manager server 1328 determines that IDs within the command are invalid. Upon determining that one or more IDs within the triggerevent command are invalid, media manager server 1328 communicates 2506 an error message indicating that the one or more IDs are invalid to third-party device 1014. The method may end after process 2506 or return to 1602 after processor 2506.

On the other hand, upon determining that IDs within the triggerevent command are valid, media manager server 1328 associates one or more event representations stored within media manager memory device 1416 with one or more event IDs received within the triggerevent command. Upon associating an event ID within an event representation stored within media manager memory device 1416, media manager server 1328 sends the event ID to content approval server 1330 to determine 2508 whether the status of the event representation is approved, disapproved, or pending approval or disapproval. Content approval server 1330 accesses a memory of the server to determine whether an event ID that matches an event ID received from media manager server 1328 has a status of approved, disapproved, or pending approval or disapproval.

Upon determining that the matched event ID stored within content approval server 1330 has a status of pending or disapproved, the server communicates with media manager server 1328 a notification of the status and the media manager server 1328 does not communicate 2510 the triggerevent command, received from third-party device 1014, to floor controller 1004. The method may end after process 2510 or return to process 1602 after process 2510. In addition to not communicating the triggerevent command to floor controller 1004, media manager server 1328 communicates a notification of the status of pending of disapproved to third-party device 1014. On the other hand, upon determining that the matched event ID stored within content approval server 1330 has a status of approved, content approval server 1330 communicates the status to media manager server 1328 and media manager server 1328 communicates 2512 the triggerevent command, received from third-party device 1014, to floor controller 1004 via firewall server 1006. In addition to communicating 2512 the triggerevent command, media manager server 1328 communicates a notification of the status of approved to third-party device 1014.

Firewall server 1006 receives the triggerevent command via protocol converter 1346 and determines 2514 whether media manager server 1328 has access to floor controller 1004, gaming device 1348, gaming device 1350, printer 1352, printer 1354, peripheral device 1356, and peripheral device 1358. Upon determining that media manager server 1328 does not have access to floor controller 1004, gaming device 1348, gaming device 1350, printer 1352, printer 1354, peripheral device 1356, or peripheral device 1358, firewall server 1006 communicates 2516 to media manager server 1328 via sb-gd communication controller 1338 that the media manager server does not have the access. In addition to communicating 2516 the lack of access, firewall server 1006 does not communicate the triggerevent command to floor controller 1004. The method may end after process 2516 or return to process 1602 after process 2516.

On the other hand, upon determining that media manager server 1328 has access to floor controller 1004, gaming device 1348, gaming device 1350, printer 1352, printer 1354, peripheral device 1356, or peripheral device 1358, firewall server 1006 sends the triggerevent command in a G2S protocol format to floor controller 1004. Floor controller 1004 determines from the trigger event command, from one or more event IDs in the command, one or more printer IDs in the command, one or more peripheral device IDs in the command, and one or more gaming device IDs in the command, that one or more event representations that may have priorities are to be sent 2518 to one or more gaming devices 1002, one or more printers 1352 and 1354, or to one or more peripheral devices 1356 and 1358. For example, floor controller 1004 determines, from the triggerevent command, that an event ID is to be sent to gaming device 1002 having a gaming device ID within the command, and sends the event ID and/or event representation having the event ID to the gaming device 1002. As another example, floor controller 1004 determines that an event ID in the triggerevent command corresponds to a couple of gaming device IDs, within the command, of gaming devices 1348 and 1350, and sends the event ID and/or event representations referred to by the event IDs to the gaming devices 1348 and 1350. As yet another example, floor controller 1004 determines that a first event ID in the triggerevent command corresponds to a gaming device ID, within the command, of gaming device 1348, determines that a second event ID in the command corresponds to a gaming device ID, within the command, of gaming device 1350, sends an event representation having the first event ID to gaming device 1348, and sends an event representation having the second event ID to gaming device 1350.

As another example, floor controller 1004 determines, from the triggerevent command, that an event ID is to be sent to printer 1352 having a printer ID within the command, and sends the event ID to the printer. In this example, the event ID identifies an event of printing a voucher. As yet another example, floor controller 1004 determines that a third event ID in the triggerevent command corresponds to a printer ID, within the command, of printer 1352, determines that a fourth event ID in the command corresponds to a printer ID, within the command, of printer 1354, sends the third event ID to printer 1352, and sends the fourth event ID to printer 1352.

As another example, floor controller 1004 determines, from the triggerevent command, that an event ID is to be sent to peripheral device 1356 having a peripheral device ID within the command, and sends the event ID to the peripheral device. As another example, floor controller 1004 determines that an event ID in the triggerevent command corresponds to a couple of peripheral device IDs, within the command, of peripheral device 1356 and 1358, and sends the event ID to the peripheral devices 1356 and 1358. As yet another example, floor controller 1004 determines that a fifth event ID in the triggerevent command corresponds to a peripheral device ID, within the command, of peripheral device 1356, determines that a second event ID in the command corresponds to a peripheral device ID, within the command, of peripheral device 1358, sends an event representation having the first event ID to peripheral device 1356, and sends an event representation having the second event ID to peripheral device 1358.

In other embodiments, if an ID, such as a player ID, within the triggerevent command does not match a corresponding ID, such as a player ID, stored within media manager memory device 1416, media manager server 1328 determines that the ID within the command is invalid. In these embodiments, the method does not end upon determining that the ID within the triggerevent command is invalid. In these embodiments, if the remaining IDs, such as an event ID and a gaming device ID, within the triggerevent command, match the corresponding remaining IDs, such as an event ID and a gaming device ID, stored within media manager memory device 1416, media manager server 1328 associates one or more event representations stored within media manager memory device 1416 with one or more event IDs received within the triggerevent command. For example, if a gaming ID within the triggerevent command is valid and a player ID within the command is invalid, media manager server 1328 sends the triggerevent command to gaming device 1002 having the gaming ID. In this example, media manager server 1328 does not determine whether a card, such as a player tracking card, a credit card, or a debit card, having the player ID is inserted into gaming device 1002 before sending the triggerevent command to gaming device 1002.

Figure 26:
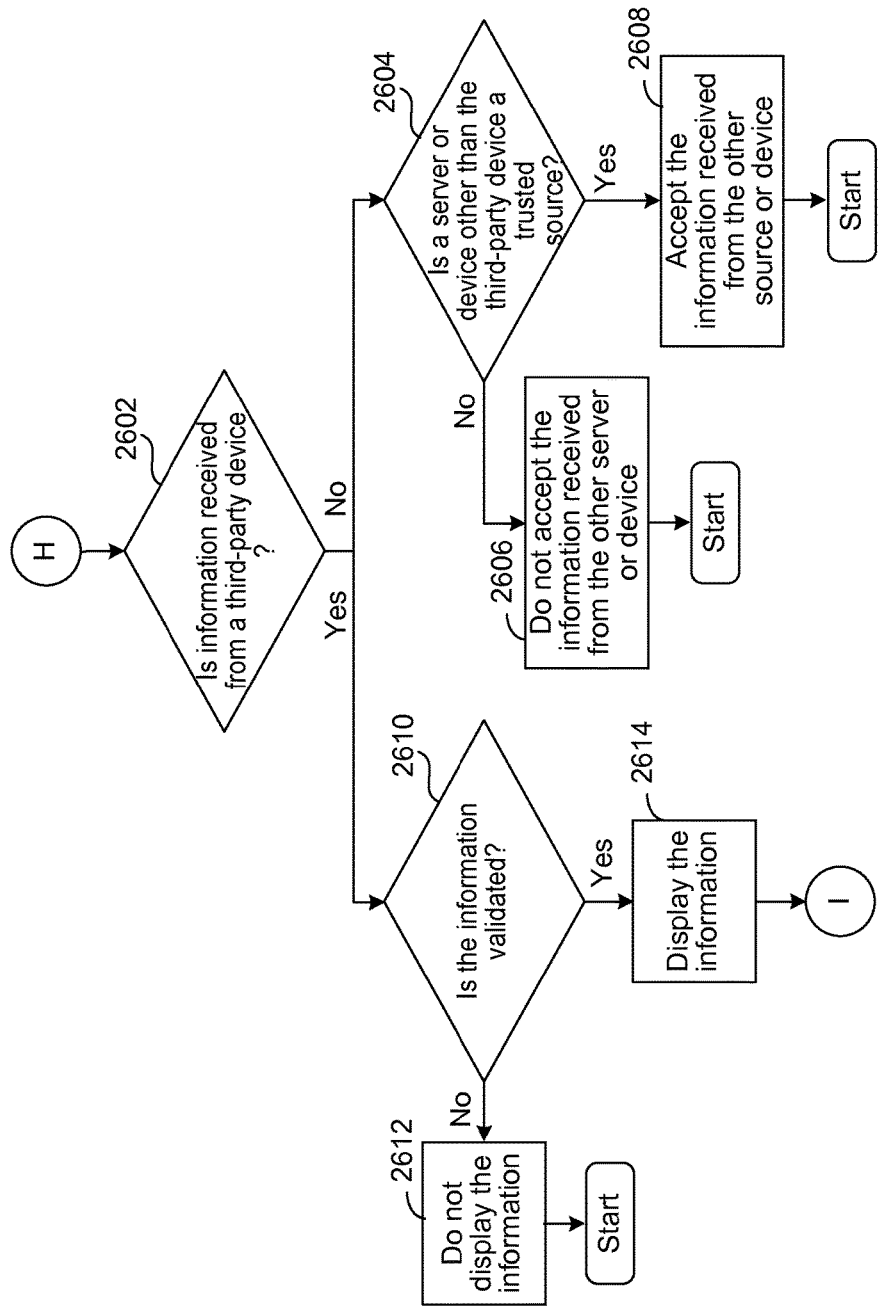
FIG. 26 is a continuation of the flowchart of FIG. 25.

FIG. 26 is a continuation of the flowchart of FIG. 25. Gaming device processor 1104 receives information within gaming memory device 1110 and determines 2602 whether the information is received from third-party device 1014. For example, gaming device processor 1104 requests gaming communication processor 1132 to determine whether an event representation and/or an event ID of the event representation received within the triggerevent command is received from third-party device 1014 via floor controller 1004. In this example, upon determining that the triggerevent command includes a URI of application 1220 stored within third-party memory device 1028, gaming communication processor 1132 determines that the event representation and/or the event ID is received from third-party device 1014 and notifies gaming device processor 1104 that the event representation and/or the event is received from the third-party device. Further, in this example, upon determining that the triggerevent command does not include a URI of application 1220 stored within third-party memory device 1028, gaming communication processor 1132 determines that the event representation and/or the event ID is not received from third-party device 1014 and notifies gaming device processor 1104 that the event representation and/or the event is not received from the third-party device.

As another example, gaming device processor 1104 requests gaming communication processor 1132 to determine whether an event representation and/or an event ID of the event representation received within the triggerevent command is received from third-party device 1014 via floor controller 1004. In this example, upon determining that the triggerevent command includes a MAC address of third-party device 1014, gaming communication processor 1132 determines that the event representation and/or the event ID is received from third-party device 1014 and notifies gaming device processor 1104 that the event representation and/or the event ID is received from the third-party device. Further, in this example, upon determining that the triggerevent command does not include the MAC address of third-party device 1014, gaming communication processor 1132 determines that the event representation and/or the event ID is not received from third-party device 1014 and notifies gaming device processor 1104 that the event representation and/or the event is not received from the third-party device.

Upon determining 2602 that information is received from a server or device other than third-party device 1004, gaming device processor 1104 does not send the information to content approval server 1332 to determine whether the information is approved by the content approval server. Examples of the server or device other than third-party device 1004 include a device, such as a gaming memory device 1110, player tracking server 1322, redemption server 1320, firewall server 1006, and any other server within server-based system 1010. Further, upon determining 2602 that information is received from a server or device other than third-party device 1004, gaming device processor 1104 determines 2604 whether the server or device other than the third-party device is a trusted source device.

Gaming device processor 1104 determines that a server or device other than third-party device 1004 is a trusted source device in any of a variety of ways. For example, each time gaming device 1002 is powered on and booted, gaming device processor 1104 executes a security-check function, such as a hash and/or an encryption/decryption function, to determine whether a game code used to generate game interface 1138, is authentic. In this example, during boot up, before uploading the game code from a ROM of gaming memory device 1110 to a RAM of the gaming memory device, gaming device processor 1104 executes a hash function on the game code stored in the ROM to create a digest and compares the digest with another digest, of the game code, stored in a secure memory device. In this example, if there is match between the two digests, gaming device processor 1104 determines that the game code within the ROM is authentic and that the ROM is a trusted source device. Also, in this example, if there is no match between the two digests, gaming device processor 1104 determines that the game code within the ROM is not authentic and that the ROM is not a trusted source device.

As another example, upon power on and boot-up, gaming device 1002 communicates with player tracking server 1322 to determine whether the player tracking server is a trusted source device. In this example, gaming device 1104 requests a validation code from player tracking server 1322 and compares the received validation code with a validation code registered, before the request, in gaming memory device 1110 by the player tracking server. Further, in this example, upon determining that the two validation codes match, gaming device processor 1104 determines that the player tracking server 1322 is a trusted source device and upon determining that the validation codes do not match, gaming device processor 1104 determines that the player tracking server is not a trusted source device.

As yet another example, upon power on and boot-up, gaming device 1002 communicates with media manager server 1328 to determine whether the media manager server is a trusted source device. In this example, gaming device 1104 requests an sbs username and an sbs password from media manager server 1328 and compares the received username and password with an sbs username and an sbs password registered, before the request, in gaming memory device 1110 by the media manager server. Further, in this example, upon determining that the two usernames match and the two passwords match, gaming device processor 1104 determines that media manager server 1328 is a trusted source device and upon determining that the two usernames do not match or the two passwords do not match, gaming device processor 1104 determines that the media manager server is not a trusted source device.

Upon determining 2604 that a server or device other than third-party device 1014 is not a trusted source device, gaming device processor 1104 determines 2606 not to accept information received from the device or server other than the third-party device. For example, upon determining that information is received from an untrusted source device, gaming device 1002 does not display the information on gaming device display 1122, does not send the information to a printer connected to the gaming device for printing, and does not send the information to a peripheral device connected to the gaming device. As another example, upon determining that a game code stored within a ROM of gaming memory device 1110 is not authentic, gaming device processor 1104 does not control gaming display processor 1130 to display game interface 1138. As yet another example, upon determining that player tracking server 1322 is not a trusted source device, gaming device processor 1104 does not control gaming display processor 1130 to display information received from the server.

Once gaming device processor 1104 determines that a server or device other than third-party device 1004 is a trusted source device after a power on and a boot-up, the gaming device processor 1104 accepts all additional information received from the trusted source device without requesting content approval server 1332 to validate the additional information or without further determining that the server or device other than the third-party device is a trusted source device based on the additional information. Gaming device processor 1104 accepts the additional information until the gaming device is powered on and booted again. For example, upon determining that a ROM within gaming memory device 1110 is a trusted source device based on information received from the ROM, gaming device processor 1104 continues to accept additional information, after a power up and a boot, from the ROM without again determining that the ROM is a trusted source device based on the additional information until the gaming device is powered on and booted again.

On the other hand, upon determining 2604 that a server or device other than third-party device 1014 is a trusted source device, gaming device processor 1104 accepts 2608 information received from the device or server other than the third-party device. For example, upon determining that information is received from a trusted source device, gaming device 1002 displays the information on gaming device display 1122, sends the information to a printer connected to the gaming device for printing, and/or sends the information to a peripheral device connected to the gaming device. As another example, upon determining that a game code stored within a ROM of gaming memory device 1110 is authentic, gaming device processor 1104 controls gaming display processor 1130 to display game interface 1138. As yet another example, upon determining that player tracking server 1322 is a trusted source device, gaming device processor 1104 controls gaming display processor 1130 to display information received from the server.

On the other hand, upon determining 2602 that information, such as an event representation and/or an event ID identifying the event representation, is received from third-party device 1014 via floor controller 1004, gaming device processor 1104 determines 2610 whether the information is validated by content approval server 1332. Gaming device 1002 sends a command to content approval server 1332 including an event representation and/or an event ID identifying the event representation to the content approval server.

Content approval server 1332 receives an event representation and/or an event ID of the event representation from gaming device 1002 and determines whether the event representation and/or the event ID is valid. For example, content approval server 1332 compares an event ID, received from gaming device 1002, of an event representation with an event ID stored within the content approval server to determine whether the two event IDs match. In this example, upon determining that the two event IDs match, content approval server 1332 determines that the event ID received from gaming device 1002 is valid. Further, in this example, upon determining that the two event IDs do not match, content approval server 1332 determines that the event ID received from gaming device 1002 is invalid. As another example, content approval server 1332 compares an event representation, received from gaming device 1002, with an event representation stored within the content approval server to determine whether the two event representations match. In this example, upon determining that the two event representations match, content approval server 1332 determines that the event representation received from gaming device 1002 is valid. Further, in this example, upon determining that the two event representations do not match, content approval server 1332 determines that the event representation received from gaming device 1002 is invalid.

Upon determining that an event ID and/or an event representation received from gaming device 1002 is invalid, content approval server 1332 sends a command including a notification of the invalidity to gaming device 1002. Gaming device processor 1104 receives the command including the notification of the invalidity and does not display 2612, on gaming display device 1122, an event representation that is invalidated by content approval server 1332.

On the other hand, upon determining that an event ID and/or an event representation received from gaming device 1002 is valid, content approval server 1332 sends a command including a notification of the validity to gaming device 1002. Gaming device processor 1104 receives the command including the notification of the validity and displays 2614, on gaming display device 1122, an event representation that is validated by content approval server 1332 and that is received from floor controller 1004. For example, gaming device processor 1104 queues an event representation within gaming display controller queue 1128 for display as window interface 1140 based on a priority assigned to the event representation.

As another example, upon receiving a first event representation and a second event representation from floor controller 1004, gaming device processor 1104 determines whether the first event representation is assigned a higher priority than the second event representation. In this example, event IDs of both the first and second event representation may be received from third-party device 1014 or from two separate third-party devices. Further, in this example, upon determining that the first event representation is assigned a higher priority than the second event representation, gaming device processor 1104 sends the first event representation to gaming display controller queue 1128 prior to sending the second event representation to the queue. As yet another example, gaming device processor 1104 receives the triggerevent command including an instruction to display an event representation. In this example, upon receiving the instruction, gaming device 1002 sends, via gaming communication controller 1112, URI of media player application 1126 to the server via protocol converter 1346 and executes a Flash™ player stored within the server to display the event representation on gaming display device 1122. In this example, an event ID of the event representation is received by gaming device 1002 from third-party device 1014. Further, in this example, the event representation having the event ID is retrieved by gaming device processor 1104 from floor controller 1004 or from content server 1332 and queued in gaming display controller 1102.

Gaming display controller 1102 actuates gaming display device 1122 to display, in window interface 1140, event representation stored within gaming display controller queue 1128. For example, gaming display controller 1102 actuates gaming display device 1122 to display the first event representation before displaying the second event representation if the first event representation is received by gaming device 1002 before receiving the second event representation.

Gaming device processor 1104 accesses media player application 1126 to display content in window interface 1140. As an example, gaming device processor 1104 access media player application 1126 from media server 1124. As another example, gaming device processor 1104 accesses media player application 1126 from gaming memory device 1110.

Similarly, upon receiving a printer ID and an event ID from floor controller 1004, printer 1354 prints a voucher including information corresponding to the event ID. For example, printer 1352 receives a printer ID of the printer, and an event ID that identifies that printer print a voucher having a specific amount of credits or print a voucher with text identified by the event ID.

Further, similarly, upon receiving a peripheral device ID and an event ID from floor controller 1004, peripheral device 1356 determines to flash at a frequency corresponding to the event ID, to flash with a color corresponding to the event ID, or with an on-duty cycle corresponding to the event ID. The method ends or returns to 1602 after any of processes 2608, 2606, and 2612.

In various embodiments, third-party device 1014 sends a command to request from media manager server 1328, a status of approved, disapproved, or pending approval or disapproval, of an event representation, and media manager server 1328 communicates with content approval server 1330 to notify third-party device 1014 of the status. In other embodiments, the first event representation represents a product or a service of a third-party user other than third-party user 1034 that offers a product or service represented by the second event representation.

In other embodiments in which no priority is assigned to an event representation by third-party processor 1026, gaming device processor 1104 randomly sends the event representation to gaming display controller queue 1128. For example, upon determining that no priority is assigned to the first and second event representations, gaming device processor 1104 sends either the first event representation or the second event representation to gaming display controller queue 1128.

In various embodiments, gaming device 1002 sends a command to third-party device 1014, via media manager server 1328, including a status whether an event representation is queued in gaming display controller queue 1128, is being displayed on gaming display device 1122, or has completed display on the gaming display device 1122, a status whether a voucher is being yet to be printed on printer 1352, is being printed on the printer, or has finished printing on the printer, and a status of whether peripheral device 1356 is yet to flash, has begun flashing, or has finished flashing.

In other embodiments, third-party device 1014 determines whether to retire an event representation from being accessed by the triggerevent command. For example, third-party user 1034 decides to retire an event representation by providing an input, via third-party input device 1208, to third-party processor 1026 to send a retiremediaevent command, which is one of the commands within the specific set of commands, to retire the event representation. In these embodiments, upon determining not to retire the event representation, third-party device 1014 does not sent the retiremediaevent command. On the other hand, in these embodiments, upon determining to retire the event representation, third-party device 1014 sends the retiremediaevent command with an event ID to graphical element creation server 1316. Graphical element creation server 1316 communicates with content server 1332 to remove an event representation having the event ID from being accessed by any triggerevent command sent by third-party device 1014 after the retirement.

In various embodiments, third-party device 1014 sends a canceltriggerevent command after sending the triggerevent command. Upon receiving an instruction to cancel an event identified in the canceltriggerevent command via server-based system 1010, gaming device processor 1104 determines whether the event is queued in gaming display controller queue 1128, is currently being displayed on gaming device 1002 displayed, or has finished displaying on gaming device 1002 display. Upon determining that the event is queued in gaming display controller queue 1128, gaming device processor 1104 removes the event from the queue. On the other hand, upon determining that the event is currently being displayed on gaming display device 1122, gaming device processor 1104 sends a command to media player application 1126 of media server 1124 to terminate the application. Further, upon determining that the event has finished displayed on gaming display device 1122, gaming device 1002 sends a command to third-party device 1014 indicating that the event has finished displaying and that the canceltriggerevent command cannot be executed.

In other embodiments, upon determining 2602 that information is received from third-party device 1014 and that the information is invalidated by content approval server 1332, gaming device 1002 requests the content approval server to approve the information on the fly. In these embodiments, content approval server 1332 receives the request and executes the content approval application to approve or disapprove the information. Further, in these embodiments, upon disapproving the information, content approval server 1332 communicates the disapproval to gaming device 1002 and gaming device processor 1104 does not control gaming display device 1102 to display the information on gaming display device 1122, does not send the information to a printer, such as printer 1352, connected to the gaming device, and does not send the information to a peripheral device, such as peripheral device 1356, connected to the gaming device. In these embodiments, upon approving the information, content approval server 1332 communicates the approval to gaming device 1002 and gaming device processor 1104 controls gaming display device 1102 to display the information on gaming display device 1122, sends the information to a printer connected to the gaming device, and/or sends the information to a peripheral device connected to the gaming device.

In yet other embodiments, upon determining 2602 that information is received from third-party device 1014, gaming device processor 1104 executes the content approval application stored within gaming memory device 1110 to approve or disapprove the information without sending the information to content approval server 1332. In these embodiments, upon disapproving the information, gaming device processor 1104 does not control gaming display device 1102 to display the information on gaming display device 1122, does not send the information to a printer, such as printer 1352, connected to the gaming device, and does not send the information to a peripheral device, such as peripheral device 1356, connected to the gaming device. In these embodiments, upon approving the information, gaming device processor 1104 controls gaming display device 1102 to display the information on gaming display device 1122, sends the information to a printer connected to the gaming device, and/or sends the information to a peripheral device connected to the gaming device.

Figure 27:
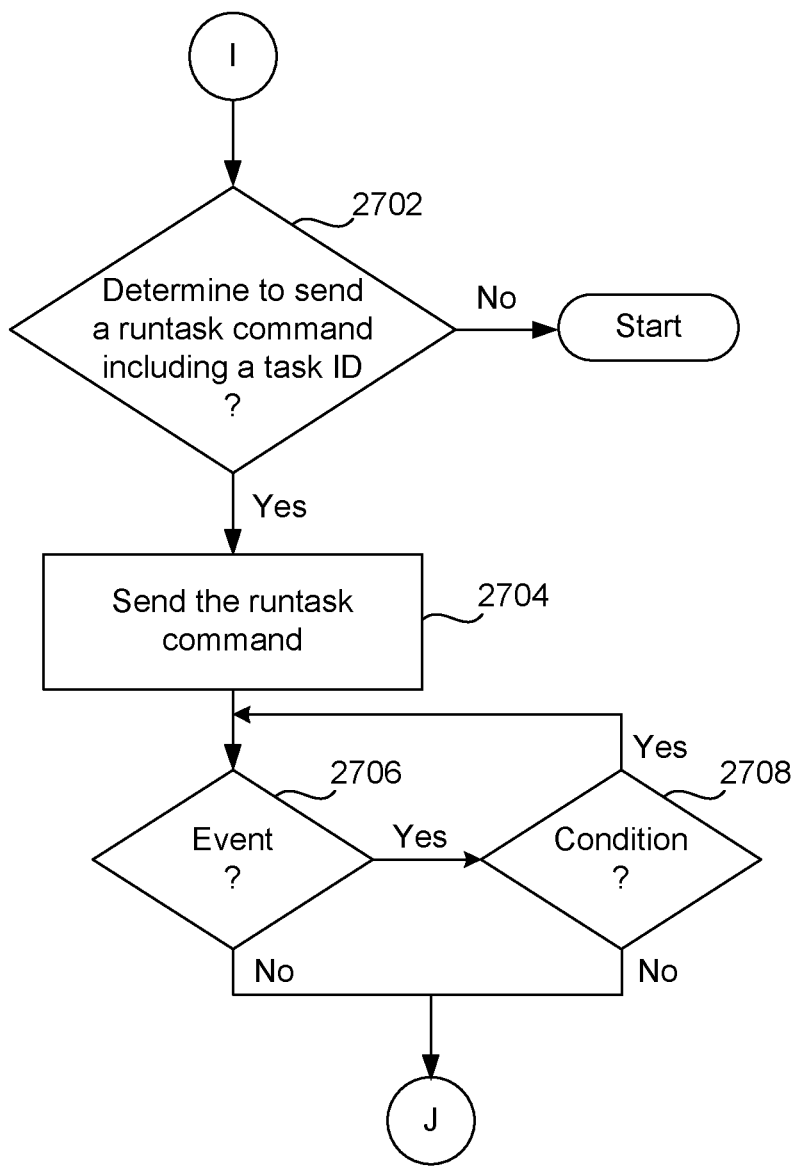
FIG. 27 is a continuation of the flowchart of FIG. 26.

FIG. 27 is a continuation of the flowchart of FIG. 26. Third-party device 1014 determines 2702 whether to send the runtask command to gaming device 1002 via server-based system 1010. For example, upon reception of the specific set of commands by third-party device 1014, third-party processor 1026 receives an input from third-party user 1034 whether to send the runtask command to gaming device 1002 via server-based system 1010. Upon determining 2702 not to send the runtask command, the method ends or returns to 1602. On the other hand, upon determining 2702 to send the runtask command, third-party device 1014 sends 2704 the runtask command and includes within the command, a task ID of a task to be performed on one or more gaming devices 1002. As an example, third-party device 1014 includes, within the runtask command, a task ID that refers to a time period for displaying an event representation on gaming device 1002, a time period of displaying an event representation on gaming display device 1122 while a player tracking card is inserted into gaming device 1002, a time period of displaying an event representation on display device independent of a status, described below, of a player playing a game at gaming device 1002, an amount of cashable or non-cashable credits, or a time period of displaying an event representation of gaming device 1002 independent of whether the player tracking card is inserted into gaming device 1002.

As another example, third-party device 1014, includes within the runtask command, one or more event IDs of one or more event representations of a product or server offered by third-party user 1034 or offered within gaming establishment 1306. In this example, third-party device 1014 further includes, within the runtask command, one or more priorities in displaying the one or more event representations. As yet another example, third-party device 1014 may also include, within the runtask command, whether an application, such as ECI 122 and/or ECI 124, stored within gaming device 1002 has access to a property of a graphical element of an event representation having the event ID and whether the application has the access until gaming input device 1108 is inserted into gaming device 1002. As another example, third-party device 1014 includes, within the runtask command, a set of gaming device IDs on which one or more event representations are to be displayed. As another example, a task includes one or more events and one or more conditions that trigger the one or more events.

As yet another example, a task includes a third event of printing a voucher, having a voucher ID, at printer 1352 upon occurrence of a condition of displaying an event representation at gaming device 1002. In this example, the task includes a fourth event of flashing a bezel of gaming device 1002 at a particular frequency and with a particular color during an on duty cycle upon occurrence of a condition of printing the voucher. As another example, a task includes a fifth event of displaying an event representation on gaming device 1002 upon occurrence of a condition of determining that a certain amount of credits are displayed on game interface 1138 or window interface 1140 to a player playing a wager-based game at gaming device 1002. In this example, the task includes a sixth event of flashing candle 59 connected to gaming device 1002 upon occurrence of a condition of displaying the event representation and a seventh event of displaying, within window interface 1140, "You have won" upon occurrence of a condition of the flashing of the candle. In this example, game interface 1138 may be used to play a main game or a bonus game.

As yet another example, a task includes an event of printing a voucher upon an occurrence of a condition of initiating a bonus game after a play of a main game or upon occurrence of a condition of initiating play of the main game. In this example, the bonus game is played using game interface 1138 or window interface 1140.

An example of a task represented by a task ID includes one or more events and one or more conditions based on which the one or more events are performed. As an example, a task includes changing a priority of displaying a third event representation that is not yet displayed on gaming display device 1122 to displaying the third event representation after displaying a fourth event representation. In this example, the fourth event representation was ahead in gaming display controller queue 1128 before the change in the priority. Another example of a task includes removing the third event representation from gaming display controller queue 1128 upon determining, by gaming processor, that the third event representation is not displayed within a time period.

Examples of events include locking or unlocking a bonus game played using window interface 1140. An instruction to lock or unlock a bonus game is referred to within a task ID received by gaming device 1002 from third-party device 1014 via server-based system 1010. Another example of an event includes changing a volume output from speakers of gaming device 1002 during display of window interface 1140. In this example, third-party device 1014 refers to an amount, such as decibels, of the volume by including a task ID within the runtask command sent to gaming device 1002. Other examples of events include changing a menu upon receiving from a player via gaming input device 1108, printing a voucher by printer 1352, flashing of a bezel connected to gaming device 1348, flashing of the bezel at a particular frequency referred to by a task ID, flashing of the bezel with an on-duty cycle color of red, flashing of the bezel with an off duty cycle color of blue, flashing of a candle connected to gaming device 1002, flashing of the candle at a particular frequency referred to by a task ID, flashing of the candle with an on-duty cycle color of blue, flashing of the candle with an off duty cycle color of white, and displaying by overhead display 55 of text.

Further examples of events include an event performed upon receiving an input from a player playing a wager-based game via gaming input device 1108 or an event performed upon occurrence, such as display of an event representation on gaming device 1002. In these examples, the input received from the player via gaming input device 1108 may be a selection of game indicia, such as a number of paylines, a keno number, a bingo number, a Poker card, or a Blackjack card, on game interface 1138 or window interface 1140. Further, in these examples, another example of input received from the player includes receiving gaming input device 1108 from the player playing a wager-based game at gaming device 1002.

Examples of conditions include whether a graphical element displayed on gaming device 1002 is pressed or released by a player playing a game using gaming device 1002, whether a press button is selected on touch screen 35 (FIG. 3B), or whether the button is released. Other examples of a condition include whether a graphical element displayed on window interface 1140 is pressed by a player playing a game using game interface 1138 for a specific period of time referred to by a task ID or is released for a specific period of time referred to by the task ID.

Third-party device 1014 may include, within a task ID, a voucher ID of a voucher printed at printer 1352 and/or include an event ID. For example, third-party device 1014 includes a task ID within the runtask command and the task ID includes a couple of event IDs referring to a couple of event representations to be displayed as window interface 1140. As another example, third-party device 1014 includes a task ID within the runtask command and the task ID includes a voucher ID of a voucher to be printed using printer 1352. Third-party processor 1026 associates a task ID with a particular task to be performed by gaming device 1002 having a gaming device ID mentioned in the runtask command.

Media manager server 1328 receives the runtask command from third-party device 1014 and executes 2504, 2506, 2508, 2510, and 2512 (FIG. 25) except that media manager server 1328 executes 2504, 2506, 2508, 2510, and 2512 on the runtask command instead of the triggerevent command.

Floor controller 1004 receives the runtask command from media manager server 1328 and determines from the runtask command, from one or more event IDs in the command, from one or more printer IDs in the command, from one or more peripheral device IDs in the command, and from one or more gaming device IDs in the command, that one or more event representations that may have priorities are to be sent to one or more gaming devices 1002, that one or more events are to be performed at one or more printers 1352 and 1354, or that one or more events are to be performed at one or more peripheral devices 1356 and 1358. For example, floor controller 1004 determines, from a task ID in the runtask command, that a group of event IDs are to be sent to gaming device 1002 having a gaming device ID within the command, and sends the event IDs and/or event representations having the event IDs to the gaming device 1002. As another example, floor controller 1004 determines that a group of event IDs in the runtask command corresponds to a couple of gaming device IDs, within the command, of gaming devices 1348 and 1350, and sends the event IDs and/or event representations referred to by the event IDs to the gaming devices. As another example, floor controller 1004 determines that a set of events and conditions correspond to a gaming device ID of gaming device 1348, and sends the events and the conditions to the gaming device 1348.

As yet another example, floor controller 1004 determines from a task ID of the runtask command whether a display in window interface 1140 on gaming device 1348 is to be synchronized with a display in window interface 1140 on gaming device 1350. As yet another example, floor controller 1004 determines from a task ID of the runtask command whether a display in overhead display 55 on gaming device 1348 is to be synchronized with a display in overhead display 55 on gaming device 1350. As another example, floor controller 1004 determines from a task ID of the runtask command whether a voucher is to be printed at printer 1352 and/or at printer 1354. In this example, upon determining that the runtask command includes a printer ID of printer 1352, floor controller 1004 sends the command to gaming device 1348 connected to the printer. Further, in this example, upon determining that the runtask command includes a printer ID of printer 1354, floor controller 1004 sends the command to gaming device 1350 connected to the printer. As yet another example, floor controller 1004 determines from a task ID of the runtask command having an event ID whether an event, such as flashing or display, referred to by the event ID is to be performed at peripheral device 1356 and/or at peripheral device 1358. In this example, upon determining that the runtask command includes a peripheral device ID of peripheral device 1356, floor controller 1004 sends the command to gaming device 1348 connected to the peripheral device. Further, in this example, upon determining that the runtask command includes a peripheral device ID of peripheral device 1358, floor controller 1004 sends the command to gaming device 1350 connected to the peripheral device.

Gaming device processor 1104 receives a task ID of the runtask command and determines 2706 whether the task ID refers to an instruction for performing an event, such as displaying an event representation, printing a voucher using printer 1352 or printer 1354, flashing bezel 53, flashing candle 59, or outputting sounds via game speakers 1116. As an example, gaming device processor 1104 determines whether a showscreen instruction is referred to by a task ID of the runtask command along with a first time period for displaying window interface 1140 on gaming display device 1122 and further determines whether a hide screen instruction is referred to by the task ID of the command along with a second time period for hiding the window interface 1140.

Upon determining that a task ID within the runtask command refers to performing one or more events, gaming device processor 1104 executes a performance of the one or more events and determines 2708 whether a condition associated with the one or more events and that is referred to by the task ID has occurred upon occurrence of the one or more events referred to by the task ID. For example, upon determining that the showscreen instruction is referred to by a task ID of the runtask command, gaming device processor 1104 controls gaming display device 1122 via gaming display controller 1102 to display window interface 1140 for the first time period and upon determining that the hide screen instruction is received, gaming device processor 1104 controls gaming display device 1122 via gaming display controller 1102 to hide window interface 1140 for the second time period. In this example, when window interface 1140 is hidden, the interface is not visible on gaming display device 1122. Further, in this example, the window interface 1140 is hidden on gaming display device 1122 when the interface is hidden behind game interface 1138 or the window interface 1140 is not displayed on the display device. In this example, the hiding of the window interface 1140 and the display of the window interface are events. As another example, gaming device processor 1104 determines whether a condition referred to by a task ID and associated with an occurrence of an event is satisfied. Examples of a condition include a selection, by a player, of gaming input device 1108 to complete play of a game in window interface 1140 or game interface 1138, selection, by the player, of the input device to continue playing the game, and selection, by the player, of the input device to select a menu, text, button, or image on window interface 1140 or game interface 1138.

Upon determining that a condition referred to in a task ID of the runtask command has not occurred, the method continues as described below in FIG. 30. On the other hand, upon determining that a condition referred to in a task ID of the runtask command has occurred, gaming device processor 1104 determines 2706 whether one or more event IDs, mentioned within the task ID, are associated with the condition. For example, gaming device processor 1104 determines whether a player selects a menu on window interface 1140 and upon receiving the selection, gaming device processor 1104 determines to control gaming display device 1122 to display a submenu within the menu. In this example, the selection of the menu is an example of a condition referred to by a task ID of the runtask command and the display of the submenu is an example of an event having an event ID within the task ID. As another example, gaming device processor 1104 determines whether a player selects an image of a drink displayed on window interface 1140 and upon selection of the display, gaming device 1348 determines to control printer 1352 to print a voucher for obtaining the drink. In this example, the selection of the image is an example of a condition referred to by a task ID of the runtask command and the printing of the voucher is an example of an event having an event ID within the task ID. As yet another example, upon determining that a condition occurred, gaming device processor 1104 determines to instruct printer 1352 to print a voucher with a voucher ID. In this example, printer 1352 prints the voucher with the voucher ID upon receiving an instruction and data stored within gaming memory device 1110 from gaming device processor 1104. Further, in this example, gaming device 1002 sends the voucher ID to third-party device 1014 via server-based system 1010 and third-party device 1014 stores the voucher ID in third-party memory device 1028. In this example, the printing is an example of an event referred to by a task ID of the runtask command and the communication of the voucher ID from gaming device 1002 to third-party device 1014 is another example of an event having an event ID within the task ID.

As another example, gaming device processor 1104 determines whether a player selects an image of a service displayed on window interface 1140 and upon selection of the display, gaming device 1348 determines to control peripheral device 1358 to flash or to display an image of the service. In this example, the selection of the image is an example of a condition referred to by a task ID of the runtask command and the flashing or the display of the image on peripheral device 1358 is an example of an event having an event ID within the task ID.

Upon determining 2706 that there is no event ID, mentioned within a task ID, associated with a condition referred to in the task ID, the method continues as described below in FIG. 30. On the other hand, upon determining that there are one or more event IDs, mentioned within a task ID, associated with one or more conditions referred to in the task ID, gaming device processor 1104 executes the one or more events referred to by the one or more event IDs. As an example, gaming device processor 1104 queues a group of event representations within gaming display controller queue 1128 for display as window interface 1140 upon determining that a player has inserted a player tracking card at gaming device 1348. In this example, the insertion of the player tracking card is an example of a condition referred to by a task ID of the runtask command and the display is an example of an event having an event ID within the task ID. As yet another example, gaming device processor 1104 controls printer 1352 via printer queue 1123 to print a voucher upon determining that a player has won a certain number of credits on a game played using game interface 1138 or window interface 1140 and controls gaming display processor 1130 to display an event representation during the printing. In this example, the winning of the certain number of credits is an example of a condition referred to by a task ID of the runtask command and the printing and the display are examples of events having event IDs associated with the condition.

As another example, gaming device processor 1104 controls gaming display device 1122 to pause a display of an event representation, such as window interface 1140, on gaming display device 1122 based on a time period of display of the event representation or based on an input, such as a press of a pause button in window interface 1140 or a removal of gaming input device 1108 from gaming device 1002 by a player. In this example, if a task ID includes information that an event representation is to be dynamically displayed for a specific time period and then pause for a specific time period, gaming device processor 1104 executes the dynamic display and then pauses the display. In this example, an ECI application, such as ECI 122 or 124 (FIGS. 1B and 1C), that is executed to display the event representation also enters a pause state when gaming device processor 1104 pauses the display of the event representation on gaming display device 1122. In this example, when the event representation is paused, gaming device processor 1104 continues to queue, within gaming output queue 1136, information to be sent to server-based system 1010 and/or to third-party device 1014 via server-based system 1010, and continues to send the information. In this example, the reception of the input from the player or the occurrence of the time period are examples of conditions, and the pause of the display is an example of an event.

As another example, gaming device processor 1104 controls gaming display device 1122 to unpause a display of an event representation, such as window interface 1140, on gaming display device 1122 based on an input, such as a press of an unpause button or a play button in window interface 1140 or an insertion of gaming input device 1108 into gaming device 1002, from a player or based on a time period of the pause of the event representation. In this example, a task ID of the runtask command includes information that an event representation is to be paused for a specific time period and then unpaused for a specific time period, gaming device processor 1104 executes the pause and the unpause on gaming display device 1122 via gaming display controller 1102. In this example, an ECI application, such as ECI 122 or 124 (FIGS. 1B and 1C), that is executed to display the event representation also enters an unpause state, such as a play state, when gaming device processor 1104 unpauses the display of the event representation on gaming display device 1122. Further, in this example, the reception of the input from the player or the occurrence of the time period are examples of conditions, and the unpause of the display is an example of an event.

As another example, gaming device 1002 locks out a display of window interface 1140 based on an input received, via gaming input device 1108, from an operator of gaming establishment 1306. In this example, gaming device processor 1104 locks an operation, such as a display, of window interface 1140 upon determining that a valid lock out code is received from the operator. In this example, the locking is an example of an event and the reception of the input is an example of a condition based on which the event is performed. In this example, third-party device 1014 sends a lock out code within a task ID of the runtask command and gaming device processor 1104 matches the lock out code sent by the third-party device 1014 with the lock out code received from the operator to determine whether the lock out code received from the operator is valid. Moreover, in this example, third-party device 1014 sends the task ID that refers to text or an image to be displayed on window interface 1140 or overhead display 55 during the lock out. During a lock out of window interface 1140, gaming device processor 1104 and gaming display controller 1102 do not change information within the window interface 1140.

As another example, gaming device processor 1104 remotes a lockout of window interface 1140 upon receiving a valid release code from an operator of gaming establishment 1306. In this example, a task ID of the runtask command received from third-party device 1014 includes a release code for removing the lock out. Further, in this example, upon receiving an input, such as a release code, from the operator, gaming device processor 1104 compares the release code received from the operator with the release code within the task ID. In this example, upon determining that the release code received from the operator matches the release code within the task ID, gaming device processor 1104 determines that the release code received from the operator is valid and removes the lock out. On the other hand, in this example, upon determining that the release code received from the operator does not match the release code within the task ID, gaming device processor 1104 determines that the release code received from the operator is invalid, does not remove the lock out, and notifies gaming device 1002 via server-based system 1010 of the nonremoval. In this example, the reception of the release code from the operator is an example of a condition and the removal of the lockout is an example of an event.

As another example, gaming device processor 1104 controls gaming display controller 1102 to generate window interface 1140 periodically. Further in this example, gaming device 1002 displays window interface 1140 for a first time period specified in a task ID of the runtask command received from third-party device 1014 and upon determining that an input is not received from a player via gaming input device 1018 within the first time period, gaming device 1002 discontinues the display for a second time period specified in the task ID. In this example, upon determining that the input is received from a player via the gaming input device within the second time period, gaming device 1002 displays again window interface 1140 for the first time period. In this example, the nonreception of the input is an example of a condition, the discontinuation of the display for the second time period is an example of an event, the reception of the input is an example of another condition, and the display of window interface 1140 for the first time period upon receiving the input is an example of an event.

As another example, gaming device processor 1104 controls gaming display controller 1102 to display the first event representation upon determining that an input received via gaming input device 1018 is a press on a graphical element displayed in window interface 1140 and controls gaming display controller 1102 to display the second event representation upon determining that an input received via the gaming input device is a release of the graphical element displayed in window interface 1140. In this example, the reception of the press is an example of a condition referred to by a task ID of the runtask command received from third-party device 1014, the display of the first event representation is an example of an event having an event ID within the task ID, the reception of the release is an example of another condition referred to by the task ID, and the display of the second event representation is an example of an event having an event ID within the task ID.

In various embodiments, gaming device processor 1104 communicates with third-party processor 1026 via server-based system 1010 and third-party communication processor 1215 to modify TP API 1122 based on the hardware and software specifications of gaming device 1002. For example, upon determining that gaming display device 1122 displays with a resolution of 1280.times.1024, gaming device processor 1104 communicates the resolution to third-party processor 1026 and the third-party processor modifies TP API 1122 to change an indication of the resolution on the TP API to 1280.times.1024. In this example, third-party user 1034 looks at the indication on TP API 1122 and decides whether to use third-party input device 1208 to send the runtask command to gaming device 1002 having the resolution. As another example, upon determining that gaming device processor 1104 or gaming display processor 1130 has a specific processing speed, gaming device processor 1104 communicates the speed to third-party processor 1026 via server-based system 1010 and third-party communication processor 1215 to modify TP API 1122 to indicate the speed on the TP API. In this example, third-party user 1034 looks at the indication of speed on TP API 1122 and decides whether to send the runtask command to gaming device 1002 based on the indication. In this example, third-party user 1034 may decide not to send the runtask command including a large number, such as between 10 and 20, of event IDs to gaming device 1002 upon deciding that the speed is low, such as ranging between 88 million instructions per second (MIPS) and 100 MIPS. Further, in this example, third-party user 1034 may decide to send the runtask command including the large number of event IDs to gaming device 1002 upon deciding that the speed is high, such as ranging between 10,000 MIPS and 40,000 MIPS.

In other embodiments, a server of server-based system 1010 communicates with third-party processor 1026 via third-party communication processor 1215 to modify TP API 1122 based on the hardware and software specifications of gaming device 1002. For example, upon determining that gaming display device 1122 displays with a resolution of 1024.times.768, a server of server-based system 1010 communicates the resolution to third-party processor 1026 and the third-party processor modifies TP API 1122 to change an indication of the resolution on the TP API to 1024.times.768. In this example, third-party user 1034 looks at the indication on TP API 1122 and decides whether to use third-party input device 1208 to send the runtask command to gaming device 1002 having the resolution. As another example, upon determining that gaming device processor 1104 or gaming display processor 1130 has a specific processing speed, a server of server-based system 1010 communicates the speed to third-party processor 1026 via third-party communication processor 1215 to modify TP API 1122 to indicate the speed. In this example, third-party user 1034 looks at the indication of speed on TP API 1122 and decides whether to send the runtask command to gaming device 1002 based on the indication.

In yet other embodiments, upon determining a plurality of matched event IDs stored within content approval server 1330 has a status of approved, content approval server 1330 communicates the status to media manager server 1328 and media manager server 1328 determines whether gaming device 1002 designated by a gaming device ID within the triggerevent command has a hardware and software specification that can display a set of event representations having the matched event IDs. For example, upon determining that the matched event IDs correspond to a video stream, media manager server 1328 communicates with gaming device 1002 that media manager server 1328 has access to in order to determine whether the gaming device is capable of video playback. In this example, upon receiving a command from gaming device processor 1104 that gaming device 1002 is not capable of video playback, media manager server 1328 determines that gaming device 1002 is not capable of playing the video stream. In these embodiments, upon determining that gaming device 1002 designated by the gaming device ID does not have the hardware and/or software specification, media manager server 1328 does not send the runtask command having the event representations and communicates a notification to third-party device 1014 regarding the lack of specification. In these embodiments, on the other hand, upon determining that gaming device 1002 has the hardware and software specification, media manager server 1328 communicates the runtask command received from third-party device 1014 to floor controller 1004 via firewall server 1006.

In various embodiments, third-party device 1014 does not send the triggerevent command after sending the runtask command to gaming device 1002 and sends the triggerevent command via server-based system 1010 after receiving an acknowledgment from the gaming device 1002 that all events referred to by the runtask command are performed. In other embodiments, third-party device 1014 does not send a second runtask command after sending a first runtask command to the gaming device 1002 and sends the second runtask command via said server-based system 1010 to the gaming device 1002 after receiving an acknowledgment from the gaming device 1002 that all events within the first runtask command are performed.

In other embodiments, after an occurrence of a condition at gaming device 1002, gaming device 1002 communicates with third-party device 1014 via server-based system 1010 information regarding the condition, the third-party device determines that an event be performed upon occurrence of a condition at gaming device 1002, and gaming device 1002 receives information, such as event ID, voucher ID, a priority, and/or task ID, regarding the event from third-party device 1014 via server-based system 1010. As an example, gaming device 1348 sends a command via protocol converter 1346 to player tracking server 1322 and to third-party device 1014 via server-based system 1010 that a first player has inserted a player tracking card into gaming device 1002 and gaming device 1350 sends a command via protocol converter 1346 to player tracking server 1322 and to third-party device 1014 that a second player has inserted a player tracking card into gaming device 1002. In this example, the insertions of the cards are examples of conditions. In this example, upon receiving a notification of the insertions, third-party device 1014 obtains from player tracking server 1322 a status of the first and second players, and obtains from gaming establishment information server 1314, a location of gaming devices 1348 and 1350 within gaming establishment 1306. Further, in this example, the first player may have a gold status and the second player may have a bronze status. Also, in this example, gaming device 1348 may be located closer to a massaging service in gaming establishment 1306 and gaming device 1350 may be located closer to a buffet server in gaming establishment 1306.

In this example, upon obtaining the status of the first and second players and the locations of the gaming device 1348 and 1350, third-party device 1014 determines to a send a first triggerevent command to gaming device 1348 via server-based system 1010 and the first triggerevent command includes an event ID of an event representation having a first theme, such as a Christmas theme or another holiday theme. Further, in this example, the event representation referred to in the first triggerevent command includes a menu having information regarding the massage service. In this example, upon obtaining the status of the first and second players and the locations of the gaming device 1348 and 1350, third-party device 1014 determines to send a second triggerevent command to gaming device 1350 via server-based system 1010 and the second triggerevent command includes an event ID of an event representation having a regular theme, such as a non-holiday theme, and having a menu including information regarding the buffer service.

As another example, upon receiving a first condition, such as a selection of a menu or a button, via input device from a player playing a wager-based game at gaming device 1002, gaming device 1002 sends a notification of the occurrence of the first condition to third-party device 1014 via server-based system 1010 and waits to receive information regarding a first event in response to the first condition from third-party device 1014. In this example, the first event may be displaying an event representation in game interface 1138 or window interface 1140. Further in this example, third-party responds to the notification of the occurrence of the first condition with the information regarding the first event.

As another example, third-party device 1014 sends the triggerevent command to gaming device 1002 via server-based system 1010 and protocol converter 1346 to determine whether a condition, such as an acceptance by a player via gaming input device 1108 to an offer or a product or service made by third-party device 1014 us window interface 1140 to the player, occurred and to instruct gaming device 1002 to notify third-party device 1014 of the acceptance. Further, in this example, upon receiving the notification of the acceptance, third-party device 1014 sends a deductfromgamingdevice command and a watamount command to gaming device 1002 via server-based system 1010. Further, in this example, the deductfromgamingdevice command instructs gaming device 1002 to deduct a number of credits mentioned within the watamount command from meter 1118. In this example, upon receiving the deductfromgamingdevice command and the watamount command, gaming device processor 1104 deducts the number of credits from meter 1118. In this example, the deduction from meter 1118 is an example of an event. Further, in this example, the deductfromgamingdevice and the watamount commands are commands within the specific set of commands.

As another example, upon determining that a player playing a game at gaming device 1002 has won a certain number of credits via game interface 1138 or window interface 1140, the gaming device displays an event representation having an event ID within the triggevent command. In this example, upon displaying the event representation, gaming device 1002 sends a command to third-party device 1014 including the occurrence of the winning to determine whether third-party device 1014 has determined an event following the winning. In this example, third-party device 1014 receives the command from gaming device 1002 via server-based system 1010 and determines to provide a bonus award to the player. Further, in this example, upon determining to provide the bonus award, third-party device 1014 sends a setbonusaward command, which is one of the commands in the specific set, to gaming device 1002 and/or sends a printvoucher command to printer 1352 via server-based system 1010 to print a voucher with a voucher ID. In this example, the winning is an example of a condition and the printing is an example of an event. Further in this example, the printvoucher command is one of the commands in the specific set.

As another example, upon determining that a player playing a game at gaming device 1002 has lost a certain number of credits via game interface 1138 or window interface 1140, the gaming device displays an event representation that includes a description of an offer of a product or server and that has an event ID within the triggevent command. In this example, upon displaying the event representation, gaming device 1002 sends a command to third-party device 1014 including the occurrence of the loss to determine whether third-party has determined an event following the loss. In this example, third-party device 1014 receives the command from gaming device 1002 via server-based system 1010 and determines to cancel a bonus award offered to the player. Further, in this example, upon determining to cancel the bonus award, third-party device 1014 sends a cancelbonusaward command to gaming device 1002 to cancel the offer. In this example, gaming device 1002 receives the cancelbonusaward from third-party device 1014 via server-based system 1010 and determines whether a player playing a game at gaming machine has accepted the offer. Upon determining that the player has accepted the offer, gaming device 1002 notifies third-party device 1014 that the bonus award cannot be canceled. On the other hand, upon determining that the offer is not accepted, gaming device 1002 withdraws the offer by removing a display of the offer on gaming display device 1122. In this example, the loosing of the credits is an example of a condition and the cancellation is an example of an event.

As yet another example, upon determining that a player playing a game at gaming device 1348 has made a request to redeem a voucher printed using printer 1352, gaming device 1348 sends a command including the request, a URI of application 1220 stored within third-party device 1014, and a voucher ID of the voucher to redemption server 1302. In this example, redemption server 1302 receives the command including the request to redeem and the voucher ID from gaming device 1002 via floor controller 1004, firewall server 1006, and protocol converter 1346, and determines whether the request is made to third-party device 1014 or to another third-party device based on the URI. In this example, upon determining that the request is made to third-party device 1014, redemption server 1302 sends the request and the voucher ID to third-party device 1014. Further, in this example, third-party receives the command including the request to redeem from redemption server 1302, approves or disapproves the request, and sends the approval or disapproval to gaming device 1002 via redemption server 1302. In this example, on the other hand, upon determining that the request to redeem is destined for the other third-party device, redemption server 1302 sends the command including the request to the other third-party device.

Moreover, in this example, upon receiving the request to redeem with the voucher ID, third-party processor 1026 determines whether the voucher having the voucher ID is previously redeemed before the request is received and whether the voucher ID matches a voucher ID stored within third-party memory device 1028. In this example, third-party device 1014 sends a command including a denial of the request to redeem upon determining that the voucher ID received from redemption server 1302 does not match the voucher ID stored within third-party memory device 1028 or that the voucher has been previously redeemed. Further, in this example, on the other hand, third-party device 1014 sends a command including an acceptance of the request to redeem upon determining that the voucher ID received from redemption server 1302 matches the voucher ID stored within third-party memory device 1028 and that the voucher has not been previously redeemed. In this example, the reception of the request to redeem by gaming device 1002 is an example of a condition and the acceptance or denial of the request is an example of the determination whether to perform an event. In this example, the commands including the acceptance or the denial of the request to redeem are commands within the specific set of commands.

As yet another example, gaming device 1002 sends a remote host method name mentioned within a task ID received from third-party device 1014 to call a method, such as a particular version of the method, located within third-party memory device 1028 and provides data regarding an occurrence of a condition at gaming device 1002 to third-party device 1014. In this example, gaming device 1002 sends the remote host method name upon determining that the condition has occurred. In this example, the condition may be reception of an input via gaming input device 1108 from a player playing a game at gaming device 1002 or an occurrence of an event referred to in the task ID occurred. In this example, gaming device 1002 sends the remote host method name with a transaction ID. Further, in this example, third-party processor 1026 receives the remote host method name via server-based system 1010 and protocol converter 1346, determines to execute the method having the name to generate a set of results, and executes the method. In this example, third-party device 1014 sends a servicerespon-secommand, which is one of the commands in the specific set of commands, including the results and the transaction ID to gaming device 1002 via server-based system 1010. In this example, the determination made by third-party processor 1026 to perform the method to produce the results is an example of the determination to perform an event based on the condition. In this example, if third-party processor 1026 determines that third-party memory device 1028 does not include the method called for by gaming device 1002, third-party device 1014 informs gaming device 1002 via server-based system 1010 that third-party device 1014 does not include the method.

As another example, gaming device 1002 sends a command to third-party device 1014 via media manager server 1328 that a certain threshold, referred to by a task ID, is reached by a player playing a wager-based game using game interface 1138 or playing a game using window interface 1140. In this example, the threshold may be a certain number of credits won by the player, a certain amount of money won by the player, a certain number of times a game is played by the player using gaming device 1002, a time of day at which a game is played by the player using gaming device 1002, a location of gaming device 1002, a date on which a game is played by the player using gaming device 1002, a rank of the player in a tournament game, a status of the player based on a player tracking account, or a number of remaining entries of a product or service offered by third-party user 1034 or an entity within gaming establishment 1306 via window interface 1140. In this example, media manager server 1328 receives the certain threshold and sends the threshold to third-party device 1014.

Further, in this example, third-party device 1014 determines whether to send the triggerevent command including an event ID based on the reception of the certain threshold. In this example, upon determining to send the triggerevent command, third-party device 1014 sends the command to gaming device 1002 via media manager server 1328 and gaming display processor 1104 displays an event representation having the event ID on gaming display device 1122. In this example, on the other hand, upon determining not to send the triggerevent command, third-party device 1014 notifies gaming device 1002 of the determination. Moreover, in this example, media manager server 1328 determines whether a response to the command including the certain threshold is received from third-party device 1014 within a time period. In this example, upon determining that the response is not received within the time period, media manager server 1328 sends a failure code to gaming device 1002. In this example, the occurrence of the certain threshold is an example of an occurrence of a condition and the display of the event representation is an occurrence of an event based on the condition. Further, in this example, the determination to send the event ID is an example of the determination to perform an event.

Figure 28:
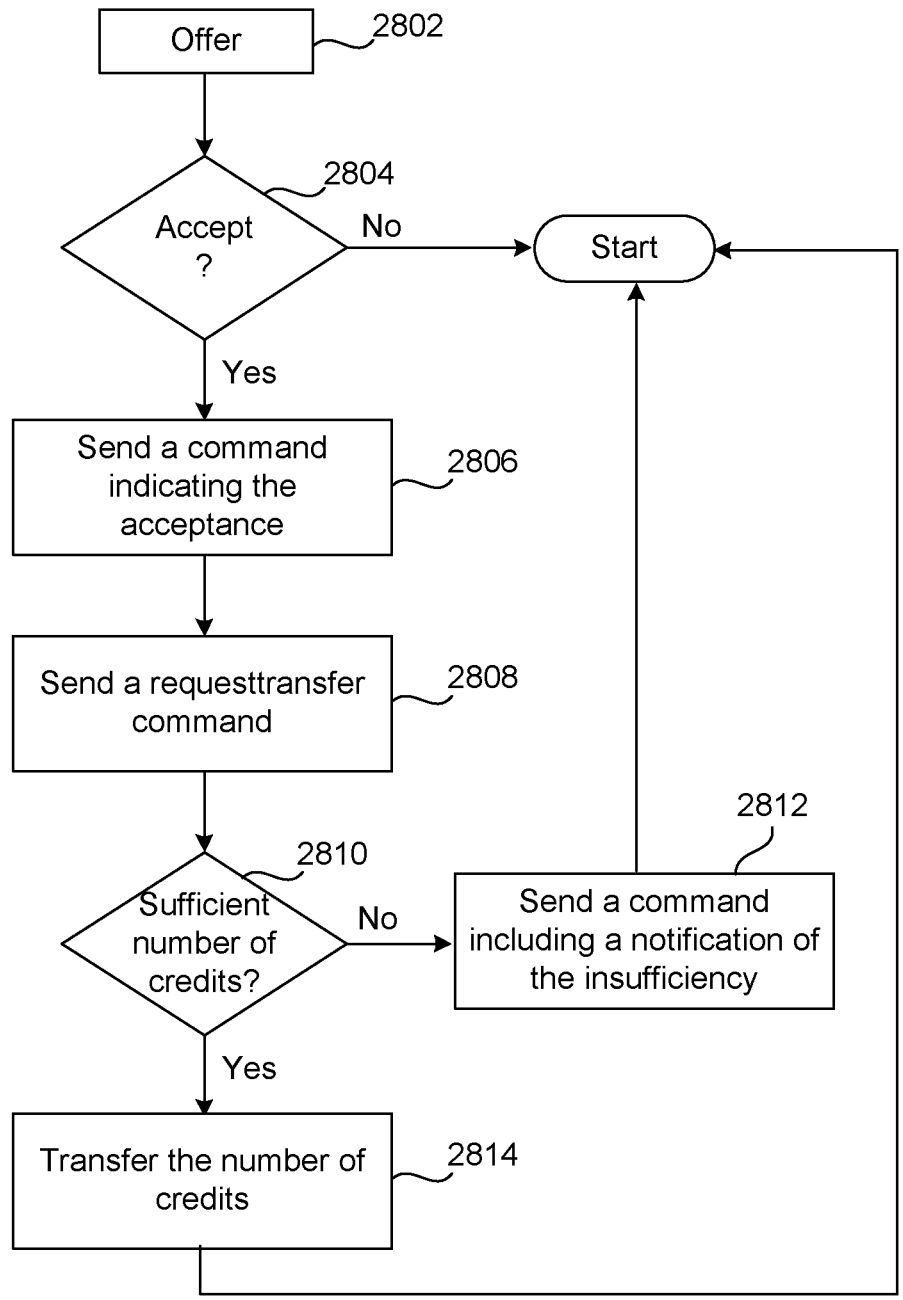
FIG. 28 is a flowchart of an embodiment of processes within the method of FIG. 27.

As yet another example illustrated in FIG. 28, third-party device 1014 offers 2802 a product or service to a player via window interface 1140 for a certain number of credits. In this example, third-party device 1014 sends a command, which is one of the commands in the specific set, to gaming device 1002 via server-based system 1010 to display the offer on gaming display device 1122. In this example, upon sending the offer, third-party processor determines 2804 whether a player playing a game at gaming device 1002 has accepted the offer. Further, in this example, upon determining that the player not accepted the offer via gaming input device 1108, the method ends or returns to 1602. Moreover, in this example, on the other hand, upon determining that the player has accepted the offer via gaming input device 1108, gaming device 1002 sends 2806 a command to third-party device 1014 via server-based system 1010 regarding the acceptance to account metering server 1312, which may be an EZ™ Pay server, and the account metering server 1312 communicates the acceptance to third-party device 1014 via sb-sb communication controller 1340. In this example, upon receiving the command regarding the acceptance, third-party device 1014 sends 2808 a requesttransfer command, which is one of the commands in the specific set, including the certain number of credits and gaming device ID of gaming device 1002 to account metering server 1312.

In this example, upon receiving the requesttransfer command, account metering server 1312 determines 2810, by sending a command to gaming device 1002, whether there are sufficient credits, within meter 1118, at least equal to the certain number of credits to accommodate the transfer of credits. Further, in this example, upon receiving a command from gaming device 1002 and determining that the number of credits in meter 1118 are not sufficient, account metering server 1312 sends 2812 a command including a notification of the insufficiency to third-party device 1014. In this example, the method may end after process 2812 or return to process 1602 after process 2812. In this example, on the other hand, upon determining that the number of credits in meter 1118 is sufficient, account metering server 1312 validates the transfer and sends the requesttransfer command, via a G2s protocol format, to gaming device 1002. Further, in this example, upon receiving the requesttransfer command, gaming device 1002 sends a command to account metering server 1312 to transfer 2814 the certain number of credits from meter 1118 to account metering server 1312. In this example, account metering server 1312 sends a command including a notification of the completion of the transfer to third-party device 1014. The method may end after process 2814 or return to process 1602 after process 2814.

Figure 29:
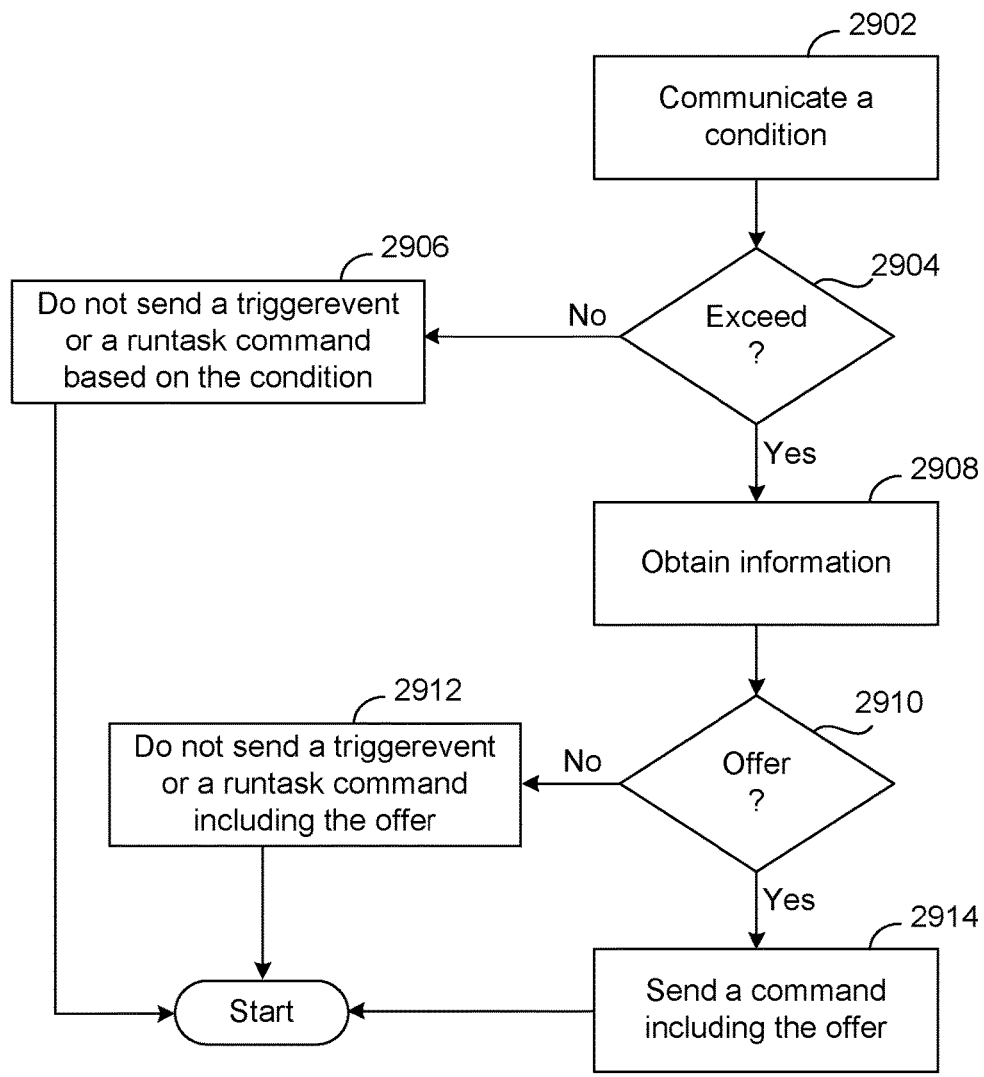
FIG. 29 is a flowchart of an embodiment of processes within the method of FIG. 27.

As yet another example illustrated in FIG. 29, gaming device 1002 communicates 2902 a command including a condition that occurred at gaming device 1002 to third-party device 1014. In this example, gaming device 1002 sends, to third-party device 1014 via server-based system 1010, a first amount of credits or money lost within a time period, which is a condition referred to by a task ID sent to gaming device 1348, by the first player playing a first game at gaming device 1348. Moreover, in this example, gaming device 1002 sends a second amount of credits or money lost within a time period, which is also a condition referred to by a task ID sent to gaming device 1350, by the second player playing a second game at gaming device 1350. In this example, the first game may be a wager-based game played using game interface 1138 or a game played using window interface 1140. Further, in this example, the second game may be a wager-based game played using game interface 1138 or a game played using window interface 1140.

In this example, upon receiving the first and second amounts, third-party processor 1026 determines whether the first and second amount exceeds 2904 a limit that may be provided by third-party user 1034 via third-party device 1014. Upon determining that none of first and second amounts exceeds the limit, third-party device 1014 does not send 2906 a command, such as a triggerevent command or a runtask command, to gaming device 1002. On the other hand, upon determining that each of the first and second amounts exceeds the limit, third-party device 1014 obtains information regarding the first and second players, such as status of the first and second players, from player tracking server 1322 via sb-sb communication controller 1340 by sending one of the commands in the specific set of commands and obtains information regarding a current time from time server 1320. Further, in this example, upon determining that the both the first and second amounts exceed the limit, third-party device 1014 sends a command within one of the specific set of commands to obtain 2908 information from floor controller 1004 via server-based system 1010 regarding location of gaming devices 1348 and 1350 within gaming establishment 1306 and obtain information from gaming establishment information server 1314 regarding gaming establishment 1306. In this example, upon obtaining information regarding the current time, information regarding gaming establishment 1306, information from player tracking server 1322, and information regarding location of gaming devices 1348 and 1350 within gaming establishment 1306, third-party processor 1026 determines 2910 whether to offer a product or service to the first and/or second players based on all the information and/or other limitations. In this example, the limitations are provided by third-party user 1034 to third-party processor 1026 via third-party input device 1208.

Further, in this example, upon determining that the first player has a gold status, that the second player has a bronze status, that the first player has lost more credits than the second player, that gaming establishment 1306 includes a buffet service, that gaming device 1348 is located within a certain distance of the buffet, third-party processor 1026 determines to offer a voucher for a buffer to the first player and not the second player. Further, in this example, upon obtaining information that the first player has lost more credits than the second player in a specific time period, that gaming establishment 1306 includes a buffer service, that gaming device 1348 is located within a certain distance of the buffet service, and that only one voucher can be issued, third-party device 1014 offers a voucher to the first player and not the second player. In this example, third-party device 1014 determines to offer a voucher to the first player via window interface 1140 or by sending a command to printer 1352 and/or printer 1354 to print a voucher. Further, in this example, upon obtaining information that the first and second players have silver status, that the first player won more credits than the second player in a specific period of time, that the gaming establishment 1306 includes a buffet service, that only one voucher can be issued, and that the buffet service is located within a certain distance of gaming device 1002, third-party device 1014 determines to send a command including an event ID including a voucher ID to printer 1352 to print a voucher with the voucher ID at the printer.

In this example, upon determining not to offer a product or service to the first and second players, third-party device 1014 does not send 2912 a command, such as the trigger event command or the runtask command, to gaming devices 1348 and 1350. On the other hand, in this example, upon determining to offer a product or service to the first and/or second players, third-party sends 2914 a command, such as the triggerevent command or the runtask command, including an offer to gaming device 1348 and/or gaming device 1350 and the command includes an offer timeout period and an event ID of an event representation that includes an accept button or a decline button. In this example, the method ends after any of processes 2906, 2912, and 2914, or the method returns to process 1602 after any of the processes 2906, 2912, and 2914.

Further, in this example, gaming device 1348 and/or gaming device 1350 that is designated to receive an offer from third-party device 1014, receives the triggerevent command or the runtask command from third-party device 1014 via protocol converter 1346 and server-based system 1010, and displays the offer on gaming display device 1122 or controls printer 1352 to print a voucher including the offer. In this example, if the triggerevent command includes an instruction for printer 1352 to print an offer without providing a choice to the first and/or second players to accept or decline the offer, the printer 1352 prints the offer. Further, in this example, the first and/or second players to whom the offer is made may accept the offer by selecting the accept button via gaming input device 1108, may decline the offer by selecting the decline button via gaming input device 1108, or the offer may time out within the offer timeout period. In this example, upon receiving an acceptance or a declination of the offer from the first player, gaming device 1002 notifies third-party device 1014 of the acceptance or the declination via server-based system 1010. In this example, upon determining that the offer timeout period has expired, gaming device 1002 communicates a notification regarding the expiration to third-party device 1014 via server-based system 1010.

Moreover, in this example, third-party device 1014 receives information regarding the first and second players from player tracking server 1322, information regarding a location of gaming establishment 1306 from gaming establishment information server 1314, information regarding a location of gaming devices 1348 and 1350 from floor controller 1004, information including a notification regarding an acceptance, a decline, or the expiration from gaming device 1348 and/or gaming device 1350, and changes a number of entries of the offer based on the all the information and the current time. To illustrate, upon receiving information from gaming device 1348 that the first player has declined the offer, from player tracking server 1322 that the second player has inserted a player tracking card at gaming device 1350, from gaming establishment information server 1314 that gaming establishment 1306 does not offer a buffet service and offers a massage service, from floor controller 1004 that gaming device 1350 at which the second player plays a game is within a certain distance of the massage service, and that the current time is less than a time at which the massage service within gaming establishment 1306 closes, third-party device 1014 offers the massage service within the gaming establishment to the second player via gaming device 1350. As another illustration, upon receiving information from gaming device 1348 that the first player has declined the offer, from player tracking server 1322 that the second player has removed a player tracking card at gaming device 1350, from gaming establishment information server 1314 that gaming establishment 1306 does not offer a buffet service and offers a massage service, from floor controller 1004 that gaming device 1002 at which the second player plays a game is within a certain distance of the massager service, and that the current time is less than a time at which the massage service within gaming establishment 1306 closes, third-party device 1014 does not offer a massage service within the gaming establishment to the second player via gaming device 1350.

As yet another illustration, upon receiving information from gaming device 1348 that the first player has accepted the offer, from player tracking server 1322 that the second player has not removed a player tracking card inserted into gaming device 1350, from gaming establishment information server 1314 that gaming establishment 1306 offers a buffet service until 11 pm pacific standard time (PST), and from floor controller 1004 that gaming device 1350 is within a certain distance of the buffet, and from time server 1320 that the current time is 10 pm PST, third-party processor 1026 offers the buffet to the second player via gaming device 1350 and decrements an amount of entries of the offer within counter of third-party device 1014 by one. As still another illustration, upon receiving information from gaming device 1350 that the offer timeout period expired, that the second player has not removed a player tracking card from gaming device 1350, that the second player has a gold status, from gaming establishment information server 1314 that gaming establishment 1306 has a buffet service, from floor controller 1004 that gaming device 1350 is within a certain distance of the buffet, from time server 1320 that the current time is past 11 pm, third-party device 1014 does not make an offer to the second player of a voucher for the buffet.

Examples of the limitations include a number of vouchers that are issued by third-party device 1014. Examples of information regarding gaming establishment 1306 includes a geographical region, such as a city, state, or country, in which gaming establishment 1306 is located, whether gaming establishment 1306 includes a particular product, such as food, drinks, or a service, such as a buffet or a hotel room, and time at which the gaming establishment starts and ends offering the product or service. Examples of information regarding the location of gaming device 1002 include a zone in gaming establishment 1306 in which gaming device 1002 is located, a pit in gaming establishment 1306 in which gaming device 1002 is located, an area within gaming establishment 1306 in which gaming device 1002 is located, a bank of gaming device 1002s including gaming device 1002, and whether gaming device 1002 is located within a certain distance, such as feet or yards, of a service offered within gaming establishment 1306.

It is noted that the methods described with respect to FIG. 28 and FIG. 29 are executed in real time. For example, when the first player removes a player tracking card from gaming device 1348 while third-party device 1014 determines whether to make an offer to the first and/or second players, third-party device 1014 receives information from player tracking server 1322 that the first player has removed a player tracking card from gaming device 1348 and the second player has not removed a player tracking card from gaming device 1350, and upon receiving the information, third-party device 1014 makes an offer, via window interface 1140, to the second player instead of the first player who lost more credits than the second player. As another example, at a time during which third-party device 1014 determines to make an offer to the second player and not the first player and during which the offer timeout period has not expired, upon receiving information that the first player has reinserted a player tracking card after removing the card from gaming device 1348, third-party device 1014 makes an offer to the first and the second players.

In various embodiments, third-party device 1014 extends an offer to a player playing a gaming device 1002 until the player has inserted a player tracking card within gaming device 1002. In other embodiments, third-party device 1014 extends an offer to a player playing a game at gaming device 1002 independent of whether the player has inserted a player tracking card in gaming device 1002.

In various embodiments, gaming device processor 1104 communicates with third-party device 1014 via server-based system 1010 to determine whether third-party device 1014 has determined a condition corresponding to an event occurred on game interface 1138 or window interface 1140, and receives the condition from third-party device 1014 via server-based system 1010. For example, upon determining that an event, such as a printing or a voucher or a display of an event representation has occurred, gaming device 1002 sends a notification of the occurrence of the event to third-party device 1014 via server-based system 1010 and waits to receive information regarding a condition in response to the event from third-party device 1014. The condition may be whether the voucher is redeemed or whether an input is received from a player playing a game at gaming device 1002. Third-party device 1014 responds to the notification of the occurrence of the event with the information regarding the condition.

In other embodiments, gaming device processor 1104 determines whether a set of events within a task are performed at gaming device 1002. In these embodiments, upon determining that the set of tasks is performed, gaming device 1002 communicates the completion of performance to third-party device 1014 via floor controller 1004 and server-based system 1010. Further, in these embodiments, upon determining that one of the events in the set is not performed, for example, as a result of malfunction or any other error of gaming device 1002, gaming device 1002 notifies floor controller 1004 of the error and the controller sends a command including the notification to third-party device 1014 via server-based system 1010. Third-party device 1014 receives the notification of the error and may determine to send a triggerevent command to trigger an occurrence of an event at gaming device 1002.

In various embodiments, third-party device 1014 sends the runtask command including a task ID that includes an event expiration time period of an event ID in the command. In these embodiments, the event expiration time period may be measured from a time the runtask command is sent by third-party device 1014 to a time an event representation corresponding to the event ID is displayed on gaming device 1002 having a gaming device ID mentioned in the runtask command. In these embodiments, event monitoring server 1308 determines whether a command is received from gaming device 1002 indicating that the event representation is displayed on gaming device 1002 within the event expiration time period. In these embodiments, upon determining that the command is not received from gaming device 1002 indicating that the event representation is displayed on gaming device 1002 within the event expiration time period, event monitoring server 1308 communication a notification of the nonexecution of the command to media manager server 1328 that further sends a command including a notification of the nonexecution to third-party device 1014. In these embodiments, if media manager server 1328 does not communicate the runtask command to gaming device 1002 via floor controller 1004 before the event expiration time period expires, media manager server 1328 sends a command including a notification of the expiration to third-party device 1014 and does not communicate the runtask command to gaming device 1002.

In other embodiments, third-party device 1014 sends the runtask command including a task ID that does not include an event expiration time period. In these embodiments, media manager server 1328 sends the runtask command to gaming device 1002 any time after receiving the command.

Figure 30:
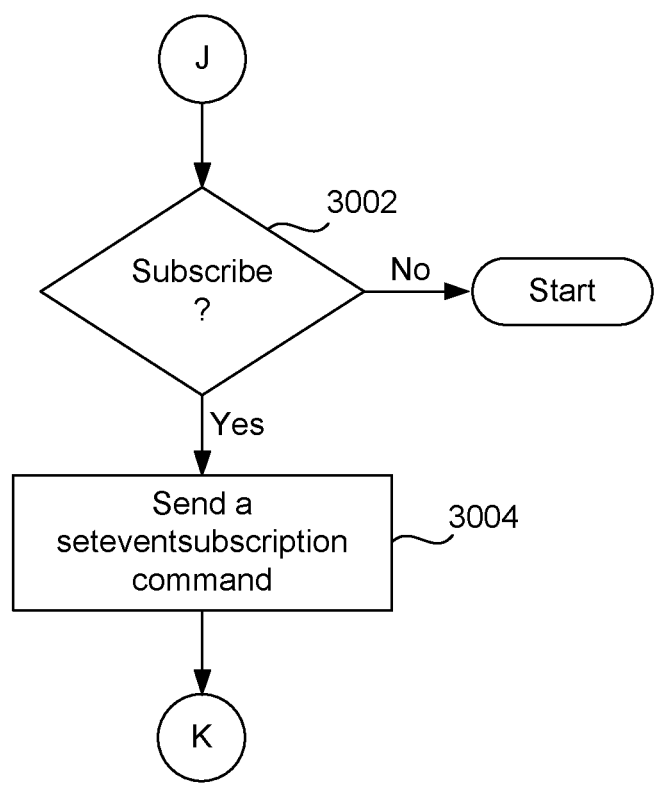
FIG. 30 is a continuation of the flowchart of FIG. 27.

FIG. 30 is a continuation of the flowchart of FIG. 27. Third-party device 1014 determines 3002 whether to subscribe to an occurrence of an event at gaming device 1002. For example, third-party user 1034 decides to provide input to third-party processor 1026 via third-party input whether to receive a notification of an occurrence, such as a display, of an event representation in window interface 1140 or game interface 1138 on gaming display device 1122. As another example, third-party device 1014 determines whether to receive a value of a meter 1118 as displayed on gaming display device 1122. As yet another example, third-party device 1014 determines whether to obtain a value of meter 1118 periodically at certain time periods or upon an occurrence of an event at gaming device 1002. As another example, third-party device 1014 determines whether to receive a notification of printing a voucher at printer 1352.

Upon determining not to subscribe to an occurrence of an event, the method ends or returns to 1602. On the other hand, upon determining to subscribe to an occurrence of an event, third-party device 1014 sends 3004 a seteventsubscription command, which is one of the commands in the specific set of commands, to event subscription server 1324 via sb-sb communication controller 1340 and/or media manager server 1328. The seteventsubscription includes a gaming device ID of gaming device 1348, a gaming device ID of gaming device 1350, a printer ID of printer 1352 connected to the gaming device 1348, a printer ID of printer 1354 connected to the gaming device 1348, peripheral device Id of peripheral device 1356 connected to gaming device 1348 and/or peripheral device Id of peripheral device 1358 connected to gaming device 1350. The seteventsubscription command may also include a time period for periodically receiving a value of meter 1118 or may include a condition, such as reception of an input from a player playing a game at gaming device 1002, that occurs to send the value of the meter 1118 to third-party device 1014.

Event subscription server 1324 receives, via sb-sb communication controller 1340 and/or media manager server 1328, the seteventsubscription command from third-party device 1014. Upon receiving the seteventsubscription command, event subscription server 1324 communicates with event monitoring server 1308 than the command is received from third-party device 1014 and event monitoring server 1308 determines whether an event having an event ID occurred at gaming device 1348, gaming device 1350, printer 1352, printer 1354, peripheral device 1356, or peripheral device 1356 that is referred to by an ID in the seteventsubscription command. For example, event monitoring server 1308 determines whether an event, such as a display of an event representation having an event ID in the seteventsubscription command or a change in a value of meter 1118, occurred at gaming device 1002 having a gaming device ID in the command. As another example, event monitoring server 1308 determines whether a value of a meter 1118 displayed in window interface 1140 or in game interface 1138 reaches a specific value mentioned in the seteventsubscription command. In this example, meter 1118 may count a number credits available to a player to play a game using window interface 1140 or game interface 1138, a number of player tracking points awarded to the player, or a number of credits won or lost by the player in playing the game. As another example, event monitoring server 1308 determines whether printer 1352 prints a voucher having a voucher ID mentioned in the eventsubscription command.

Upon determining that no event having an event ID mentioned within the eventsubscription command occurred, event monitoring server 1308 does not send a command including information regarding the event to third-party device 1014. On the other hand, upon determining that an event having an event ID mentioned within the eventsubscription command occurred, event monitoring server 1308 sends a command including information regarding the event to third-party device 1014 via media manager server 1328 and sb-sb communication controller 1340. Example of information regarding an event includes a voucher ID of a voucher printed at printer 1352, a description or a template ID of a template printed at printer 1352, a notification that an event representation having an event ID mentioned within the eventsubscription command occurred at gaming device 1002, a graphics compiled Flash™ file of the event representation displayed at gaming device 1002, a light color of bezel 53 during an on-duty cycle, a frequency of flashing of candle 59, a print file printed at printer 1352, a value of meter 1118 or additional meter 1120 as displayed on gaming display device 1122, and a property of a graphical element of the event representation.

Figure 31:
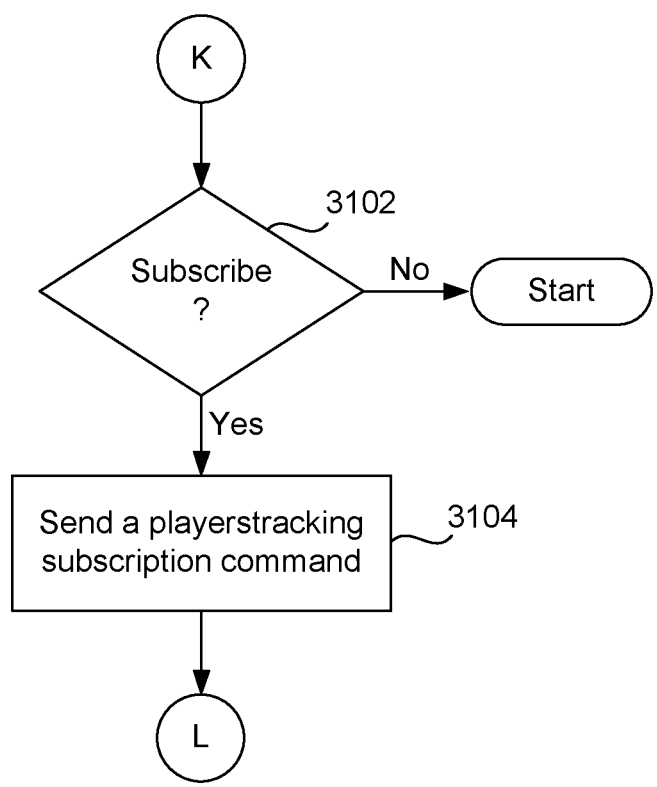
FIG. 31 is a continuation of the flowchart of FIG. 30.

FIG. 31 is a continuation of the flowchart of FIG. 30. Third-party device 1014 determines 3102 whether to subscribe to information regarding a player playing a game using game interface 1138 or window interface 1140 at gaming device 1002. For example, third-party user 1034 decides whether to provide an input to third-party processor 1026 via third-party input device 1208 whether to subscribe to information regarding a player playing a game at gaming device 1002. Examples of information regarding a player include whether a player tracking card is inserted into or removed from gaming device 1002 by the player, a time of the insertion, a date of the insertion, a day of the insertion, a time of the removal, a date of the removal, a name of the player tracking card, a status of the player tracking card, a number of games played by the player by using the player tracking card, a number of games won by the player by using the player tracking card, a number of games lost by the player by using the player tracking card, whether the player is using the player tracking card for a first time, whether the player tracking card is a master or a copy, a player tracking account number associated with the player tracking card, a point balance associated with the account and accumulated by the player over a specific period of time, a residence address of the player, a contact phone number of the player, an email address of the player, a name of the player, an age of the player, a birth date of the player, a player tracking card ID of the player tracking card, a product or service that is preferred by the player, a marriage anniversary of the player, a gender of the player, a status, such as platinum, gold, silver, or bronze, of the player. A status of a player may be determined based on an amount to of wager placed by the player for a game session of a game played using game interface 1138 or window interface 1140, a number of player tracking points won or lost by the player over a time period, and/or a number of credits won or lost in playing the game.

Upon determining not to subscribe, the method ends or returns to 1602. On the other hand, upon determining to subscribe, third-party device 1014 sends 3104 the setplayertrackingsubscription command, which is one of the commands in the specific set, to player tracking server 1322 via sb-sb communication controller 1340 and media manager server 1328. The setplayertrackingsubscription command includes a gaming device ID of gaming device 1002 at which a player tracking card may be inserted by a player playing a game at the gaming device and a player tracking card ID of the card. Upon receiving the setplayertrackingsubscription command, player tracking server 1322 sends information regarding a player that is assigned a player tracking card having a player tracking card ID mentioned in the setplayertrackingsubscription command. Third-party device 1014 receives information regarding a player from player tracking server 1322 and stores the information in third-party memory device 1028.

Figure 32:
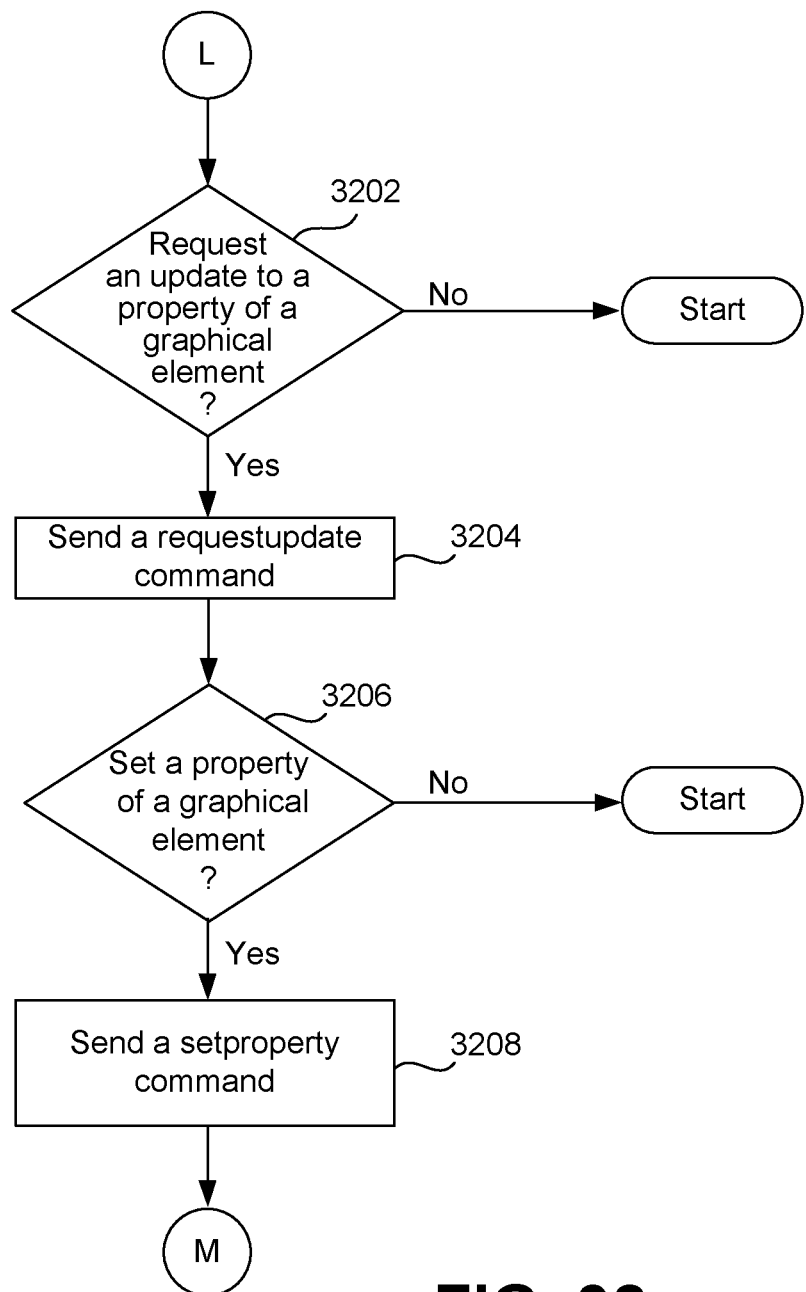
FIG. 32 is a continuation of the flowchart of FIG. 31.

FIG. 32 is a continuation of the flowchart of FIG. 31. Third-party device 1014 determines 3202 whether to request an update to a property of a graphical element. For example, third-party user 1034 decides whether to provide an input via third-party input device 1208 to third-party processor 1026 to request an update to a property of a graphical element. As another example, third-party processor 1026 determines to periodically request an update to a property of a graphical element and the period is input by third-party user 1034 via third-party input device 1208. As yet another example, third-party user 1034 desires to know whether a particular property of a graphical element is updated and selects, via third-party input device 1208, a name of the graphical element, and an update button displayed on third-party display device 1204 to generate an instruction of a requestupdate command, which is one the commands in the specific set, to request the update. Upon determining not to request an update to a property of a graphical element, the method ends or returns to 1602. On the other hand, upon determining to request an update to a property of a graphical element, third-party device 1014 sends 3204 the requestupdate command to request an update to a property of a graphical element to server-based system 1010.

Graphical element creation server 1316 receives the requestupdate command from third-party device 1014 and determines whether there is an update, in the graphical element registry, to a property of a graphical element described within the requestupdate command. Upon determining that there is no update to a property of a graphical element described within the requestupdate command, graphical element creation server 1316 communicates with third-party device 1014 that there is no update to the graphical element. On the other hand, upon determining that there are updates to a property of a graphical element described within the request update command, graphical element creation server 1316 sends the update to third-party device 1014. Third-party processor 1026 receives an update to a property of a graphical element from graphical element creation server 1316 and stores the update in third-party memory device 1028.

Third-party processor 1026 determines 3206 whether to set a property of a graphical element. For example, third-party user 1034 decides whether to provide an input via third-party input device 1208 to third-party processor 1026 to set a property of a graphical element. Upon determining not to set a property of a graphical element, the method ends or returns to 1602. On the other hand, upon determining to set a property of a graphical element, third-party device 1014 sends 3208 the setproperty command to set a property of a graphical element in window interface 1140 of gaming display device 1122. For example, third-party user 1034 views, via TP API 1222, a graphical element displayed in window interface 1140 on gaming display device 1122 and decides to change a property, such as a start frame and/or an end frame of a movie clip of the graphical element, a Flash™ video of the graphical element, an image of the graphical element, a movie of the graphical element, text of the graphical element, color of the graphical element, or position of the graphical element, by sending an instruction within the setproperty command.

Third-party device 1014 sends 3208 the setproperty command including an instruction to change a property of a graphical element displayed in window interface 1140. Examples of the change in the property of a graphical element include a change from a dynamic graphical element to a static graphical element, a change from a static graphical element to a dynamic graphical element, a change from a graphical element that is invisible on gaming display device 1122 to a graphical element that is visible on gaming display device 1122, a change in a color of a graphical element, a change in text displayed within the graphical element, and a change from a graphical element that is visible on gaming display device 1122 to a graphical element that is not visible on gaming display device 1122. Media manager server 1328 receives the setproperty command and sends the command to content approval server 1330 that may approve or disapprove the change to the property. Upon disapproval of the change to the property, content approval server 1330 communicates with media manager server 1328 regarding the disapproval and media manager server 1328 sends a command indicating the disapproval to third-party device 1014.

On the other hand, upon approving the change to the property, content approval server 1330 communicates the approval to media manager server 1328 that sends a command including a notification of the approval to third-party device 1014. Further, in addition to sending a command including a notification of the approval, media manager server 1328 sends the set property command including the change to the property to floor controller 1004 via firewall server 1006. Media manager server 1328 also sends the change to the property to the graphical element registry. Floor controller 1004 sends the change to the property to gaming device 1002 and/or gaming device 1002 based on one or more gaming device IDs in the setproperty command. Gaming device 1002 and/or gaming device 1002 receives and displays the change to the property on gaming display device 1122.

In various embodiments, third-party device 1014 sends a cancelproperty command, which is one of the commands in the specific set, to gaming element creation server to cancel a property of a graphical element. In these embodiments, the cancelproperty command includes a description of a property of the graphical element or an ID assigned to the graphical element by graphical element creation server 1316. Further, in these embodiments, upon receiving the cancelproperty command, graphical element creation server 1316 removes the property from the graphical element registry. In these embodiments, upon receiving the triggerevent command including an event ID having an event representation including the graphical element with the property after the property is removed from the graphical element registry, gaming device processor 1104 does not display the property on gaming display device 1122.

Figure 33:
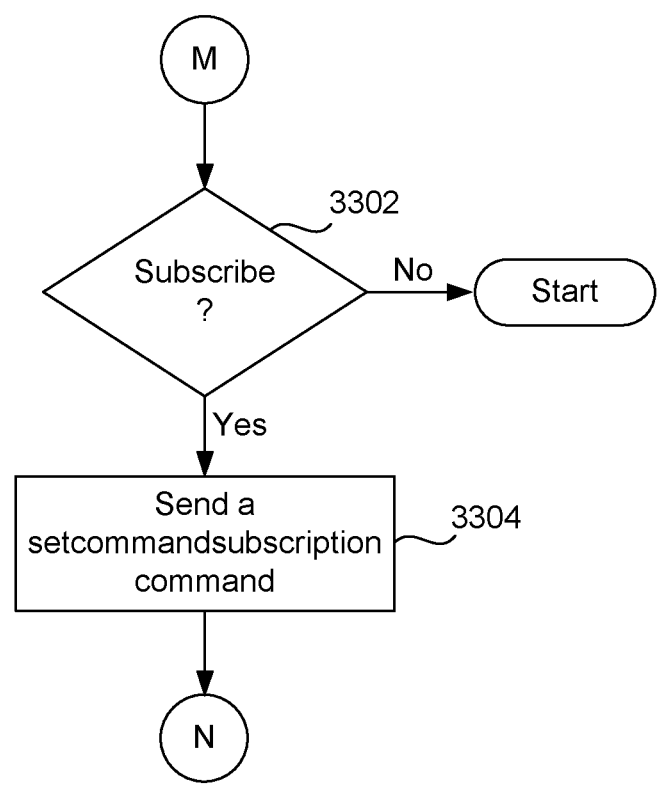
FIG. 33 is a continuation of the flowchart of FIG. 32.

FIG. 33 is a continuation of the flowchart of FIG. 32. Third-party device 1014 determines 3302 whether to subscribe to an occurrence of a command. For example, third-party device 1014 determines whether to receive a notification of an occurrence, such as a communication, of one of the commands in the specific set, sent from third-party device 1014 to event subscription server 1324. As another example, third-party processor 1026 determines whether to receive a notification of an occurrence of a command sent by server-based system 1010 to request the device information from floor controller 1004. As yet another example, third-party processor 1026 determines whether to receive a notification of an occurrence of a command sent by gaming device 1002 to third-party device 1014 via server-based system 1010. As another example, third-party processor 1026 determines whether to receive a notification of a command sent by server-based system 1010 to third-party device 1014. As yet another example, third-party processor 1026 determines whether to receive a notification of a command sent by server-based system 1010 to gaming device 1002, gaming device 1002, peripheral device 1356, peripheral device 1358, printer 1352, or printer 1354. As another example, third-party user 1034 decides whether to provide an input to third-party input device 1208 to subscribe to an occurrence of a command.

Upon determining not to subscribe, the method ends or returns to 1602. On the other hand, upon determining to subscribe, third-party device 1014 sends 3304 a setcommandsubscription command, which is one of the commands in the specific set, to media manager server 1328 of server-based system 1010 via sb-sb communication controller 1340. The setcommandsubscription command includes an event ID, a task ID, an ID of the source device sending the command, an ID of a command to subscribe to, and/or an ID of the destination device. The source device may be gaming device 1002, printer 1352, printer 1354, peripheral device 1356, peripheral device 1358, third-party device 1014 or a server of server-based system 1010. The destination device may be gaming device 1002, printer 1352, printer 1354, peripheral device 1356, peripheral device 1358, third-party device 1014 or a server of server-based system 1010, and is not the source device. Each of the destination device and the source device are an endpoint of a command.

Upon receiving the setcommandsubscription command via sb-sb communication controller 1340 from third-party device 1014, media manager server 1328 communicates with logging server 1334 to receive information regarding a command referred to by a set of IDs, including an event ID, a task ID, an ID of the destination device, an ID of the command, and/or an ID of the source device, within the setcommandsubscription command, and receives, from the logging server 1334, command information regarding the command referred to by the IDs. Examples of the command information include a time and/or date of a command sent by the source device, a time and/or date of the command received by the destination device, an instruction within the command, data within the command, an application module referred to within the command, a validated graphics complied Flash™ file referred to within the command, a graphics compiled Flash™ file referred to within the command, an ID of the command, an event ID within the command, a task ID within the command, and whether the command includes a request for a simple or a complex command, described below.

Upon determining that there is no command that has the set of IDs within a memory device of logging server 1334 that matches the set of IDs received within the setcommandsubscription command, logging server 1334 does not send a command requested by the setcommandsubscription command to third-party device 1014. On the other hand, upon determining that the set of IDs within a memory device of logging server 1334 matches the set of IDs received within the setcommandsubscription command, logging server 1334 sends a command requested by the setcommandsubscription to third-party device 1014 via media manager server 1328.

Figure 34:
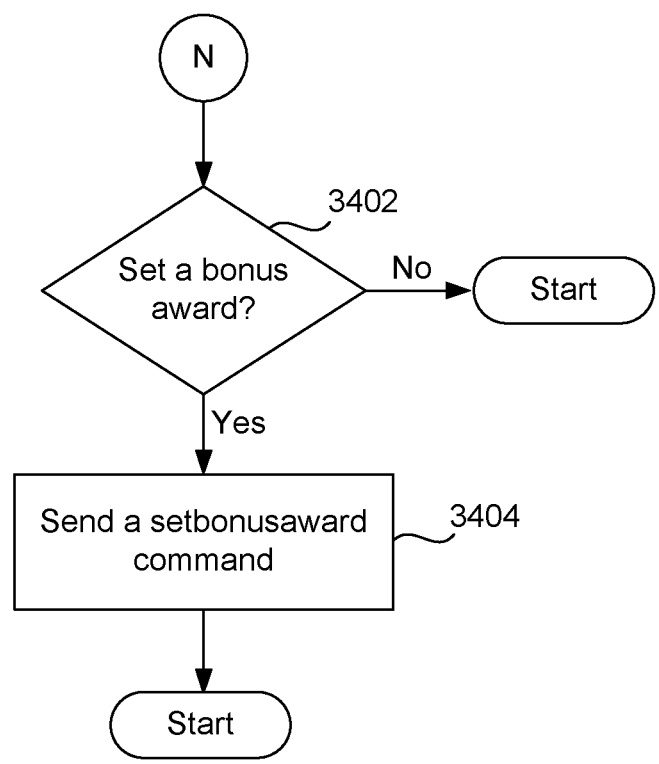
FIG. 34 is a continuation of the flowchart of FIG. 33.

FIG. 34 is a continuation of the flowchart of FIG. 33. Third-party device 1014 determines 3402 whether to send a setbonusaward command to bonus award server 1310. For example, third-party user 1034 decides whether to provide a value of bonus award to a player playing a game using game interface 1138 or window interface 1140, and communicates with third-party processor 1026 to send the setbonusaward command. As another example, upon receiving information from gaming device 1002 that a player 1002 accumulates a certain number of points on player tracking card or plays a certain number of games using game interface 1138 or window interface 1140 at gaming device 1002, third-party processor 1026 determines to send the setbonusaward command. As another example, upon receiving information from gaming device 1002 that a player achieves a certain number of credits by playing a game using game interface 1138 or window interface 1140 at gaming device 1002, third-party processor 1026 determines to send the setbonusaward command. As yet another example, upon determining that gaming input device 1108 is input into gaming device 1002 or an event has occurred at the gaming device, peripheral device 1356, or printer 1352, third-party processor 1026 determines to send the setbonusaward command. The bonus award may be a product or service offered by third-party user 1034 or by gaming establishment 1306. The bonus award may be in the form of credits displayed on gaming device 1348 display or a voucher printed using printer 1352.

Upon determining not to send the setbonusaward command, the method ends or returns to 1602. On the other hand, upon determining to send the setbonusaward command, third-party processor 1026 sends 3404 the setbonusaward command to bonus award server 1310 via sb-sb communication controller 1340. Bonus award server 1310 receives the setbonusaward command and sets the bonus award. Upon reception of the setbonusaward command, bonus award server 1310 may send a bonuscommit command to third-party device 1014 and receive an acknowledgment from third-party device 1014 to ensure that third-party device 1014 is committed to providing the bonus award. Bonus award server 1310 sends the setbonus award to gaming device 1348 or printer 1352 designated within the command. Upon reception of the setbonusaward command via protocol converter 1346 and floor controller 1004, gaming device processor 1104 controls gaming display device 1122 to display the bonus award. Further, upon receiving the setbonusaward command including a printer ID and an instruction for printer 1352 to print a voucher including the bonus award, gaming device 1348 controls printer 1352 to print the voucher. The method ends or starts after process 3404.

If bonus award server 1310 receives a cancelbonus command from third-party device 1014 after sending the setbonusaward command to gaming device 1002, bonus award server 1310 sends the cancelbonusaward command to gaming device 1002. Gaming device processor 1104 determines whether the bonus award is displayed in window interface 1140 upon receiving the cancelbonus award command. Upon determining that the bonus award is displayed in window interface 1140, gaming device processor 1104 hides the display of the bonus award or replaces the display with another event representation referred to by an event ID within the cancelbonus award command. Upon determining that the bonus award is not displayed in window interface 1140 after receiving the setbonusaward and cancelbonusaward commands, gaming device processor 1104 controls gaming display processor 1130 to not display the bonus award on gaming display device 1122 or on overhead display 55. On the other hand, upon determining that the bonus award is printed in a voucher or the bonus award is accepted by a player playing a game at gaming device 1002 by selecting an accept button in window interface 1140, gaming device 1002 notifies third-party device 1014 that the bonus award cannot be canceled.

Figure 35:
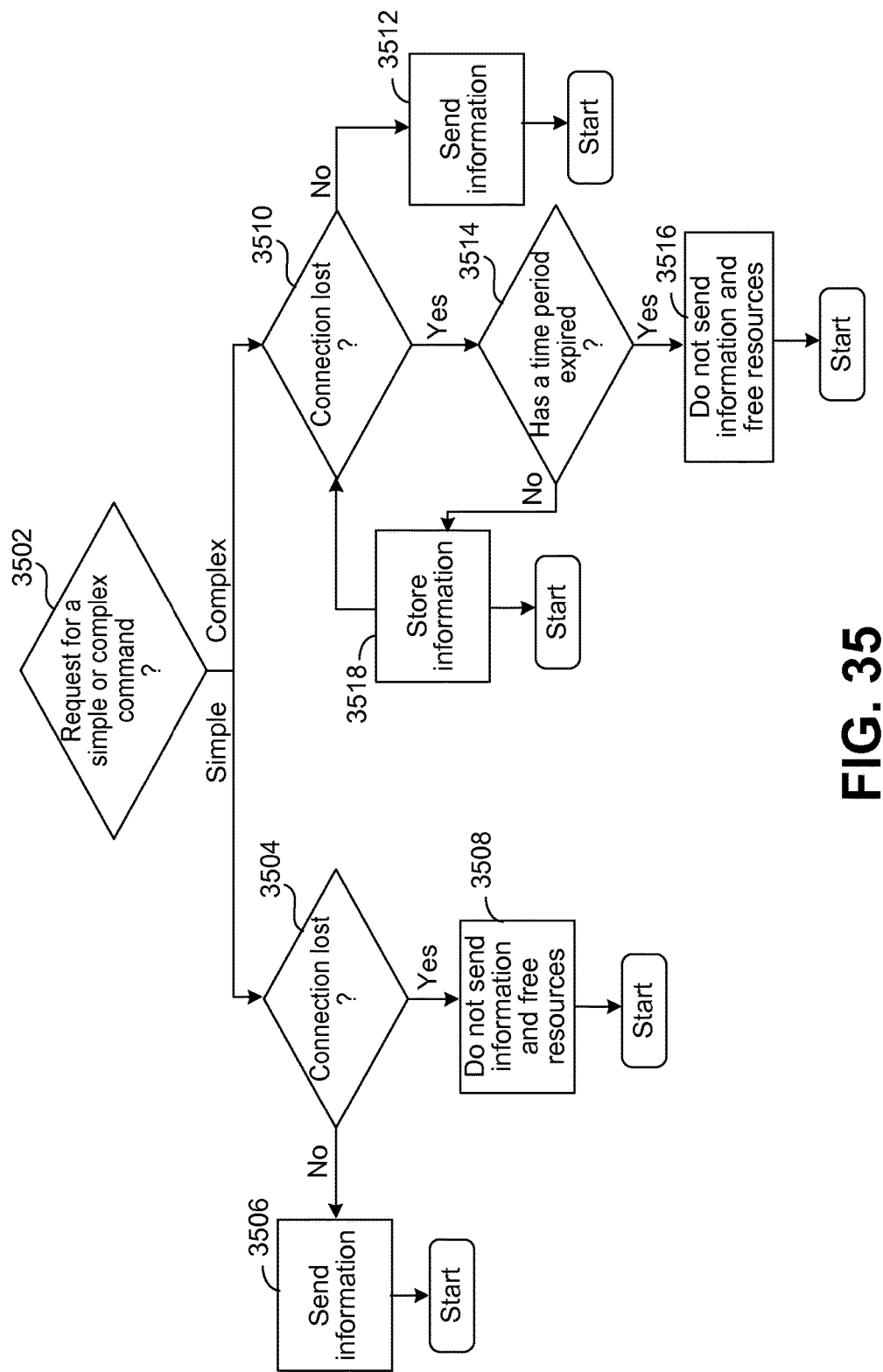
FIG. 35 is a flowchart of another embodiment of a method for interfacing with a third-party application.

FIG. 35 is a flowchart of an embodiment of a method for interfacing with a third-party application. For any of the commands within the specific set of commands, received from third-party-device 1014 by server-based system 1010, the destination device determines 3502 whether the command includes a request to send a simple command or a complex command. For example, upon receiving the seteventsubscription command from third-party device 1014, event subscription server 1324 determines whether the seteventsubscription command includes a request to send is a simple command or a complex command. As another example, upon receiving the setplayertrackingsubscription command from third-party device 1014, player tracking server 1322 determines whether the setplayertrackingsubscription command includes a request for a simple or a complex command. As yet another example, upon receiving the requestdeviceinformation command from third-party device 1014, media manager server 1328 determines whether the command includes a request for a simple or a complex command.

Upon determining that a command, within the specific set of commands, received from third-party device 1014 is a request to send a simple command, the destination device determines 3504 whether a connection is lost between the destination device and third-party device 1014. Upon determining 3504 that a connection is not lost, the destination device sends 3506, to third-party device 1014, requested information, such as the device information, information regarding a player, or information regarding an event, requested by the third-party device 1014 within the command sent by the third-party device.

On the other hand, upon determining 3504 that a connection is lost, the destination device does not send 3508 information requested by third-party device 1014 within a request to send a simple command and frees resources, such as applications, memory space, input queue, and/or output queues, used to communicate and receive information from a device, such as floor controller 1004 or any other device within gaming establishment 1306, used to receive a command from the third-party device 1014, and used to send the requested information to the third-party device 1014. For example, upon determining that a connection is lost between player tracking server 1322 and third-party device 1014 via sb-sb communication controller 1340, player tracking server 1322 discards any information that is requested by third-party device 1014 regarding a player and that is stored within a memory device of the server. In this example, player tracking server 1322 flags that CPU cycles occupied with the sending of information to third-party device 1014 and receiving the command including a request for information from third-party device 1014 are free for use. Further, in this example, player tracking server 1322 deletes any of the information stored within server-based input queue 1342 and server-based output queue 1344. Moreover, in this example, player tracking server 1322 sends a data lost notification to third-party device 1014. In this example, third-party device 1014 determines that the connection is lost upon determining that a response to a command, which is one the commands in the specific set, sent to player tracking server 1322 is not received within a time period. In this example, the player tracking server 1322 determines that the connection is lost upon determining that a response to a command sent to third-party device 1014 is not received within a time period or upon determining that one of the command in the specific set of commands is not received from the third-party device within a specific time period.

Upon determining 3502 that a command, within the specific set of commands, includes a request to send a complex command, the destination device determines 3510 whether a connection between the destination device and third-party device 1014 is lost. Upon determining 3510 that a connection is not lost, the destination device sends 3512, to third-party device 1014, requested information, such as the device information, information regarding a player, or information regarding an event, requested by the third-party device 1014 within the command including the request for a complex command.

On the other hand, upon determining 3510 that a connection is lost, the destination device designated to receive a command from third-party device 1014 determines 3514 whether a time period following the loss of connection has expired. The expiration time period may be requested by third-party device 1014 within a command including a request to send a complex command or may be generated by the destination device designated to receive a command including the request from the third-party device 1014. Upon determining that an acknowledgment or information requested is not received within the expiration time period and that a connection between the destination device and third-party device 1014 is not restored, the destination device 3516 does not send the requested information and frees resources, such as applications, memory space, input queue, and/or output queues, used to communicate and receive information from a device, such as floor controller 1004 or any other device within gaming establishment 1306, used to receive a command from the third-party device 1014, and used to send the requested information to the third-party device 1014. For example, upon determining that a connection is lost between media manager server 1328 and third-party device 1014 via sb-sb communication controller 1340, media manager server 1328 discards any information that is requested by third-party device 1014 regarding gaming device 1348, peripheral device 1356, or printer 1352, and that is stored within a memory device of the server. In this example, media manager server 1328 flags that CPU cycles occupied with the sending of information to third-party device 1014 and receiving the command including a request for information from third-party device 1014 are free and available for use. Further, in this example, media manager server 1328 deletes, from server-based input queue 1342 and server-based output queue 1344, any of the information requested. Moreover, in this example, media manager server 1328 sends a data lost notification to third-party device 1014.

On the other hand, upon determining that the expiration time period is not expired, the destination device stores 3518 the requested information within a memory device of the destination device, determines 3510 whether a connection between the destination device and third-party device 1014 is restored within the expiration time period. For example, media manager server 1328 determines that a connection between media manager server 1328 and third-party device 1014 is restored upon receiving a commandsonline command from third-party device 1014. In this example, the commandsonline command is one of the commands within the specific set of commands. Further, in this example, third-party communication processor 1215 sets third-party input queue 1216 and third-party output queue 1218 before sending the commandsonline command. Further, in this example, third-party device 1014 sends the commandsonline command upon determining that a connection is lost between third-party device 1014 and server-based system 1010. In this example, third-party device 1014 determines that the connection is lost upon determining that a response to a command, which is one the commands in the specific set, sent to media manager server 1328 is not received within a time period. In this example, the media manager server 1328 determines that the connection is lost upon determining that a response to a command sent to third-party device 1014 is not received within a time period or upon determining that one of the command in the specific set of commands is not received from the third-party device within a specific time period.

Upon determining 3510 a connection is restored, the destination device sends 3512 the requested information stored within the memory device of the destination device to third-party device 1014. The destination device may obtain via floor controller 1004 and/or generate the requested information within the expiration time period. The method ends after processes 3506, 3508, 3512, 3516, and 3518 or the method returns to process 1602 after processes 3506, 3508, 3512, 3516, and 3518.

Third-party device 1014 may remove a connection established between the device and the destination device by sending a commandsoffline command, which is one of the commands within the specific set, to the destination device. Third-party device 1014 clears third-party input queue 1216 and third-party output queue 1218 upon sending the commandsoffline command and the destination device clears its input and output queues, such as server-based input queue 1342 and server-based output queue 1344, upon receiving the commandsoffline command.

In other embodiments, third-party device 1014 sends a command, such as the seteventsubscription command, to a server of server-based system 1010 including a request to provide a response including a complex command to third-party device 1014. In these embodiments, third-party device 1014 requests within the command sent to the server that the server store all information, such as information in response to the seteventsubscription command, until third-party device 1014 sends an acknowledgment of the receipt of the information to the server. Further, in these embodiments, upon determining that a connection between the server and third-party device 1014 is lost, the server does not empty server-based input queue 1342 and server-based output queue 1344 until receiving the acknowledgment from third-party device 1014.

In various embodiments, server-based system 1010 maintains, within sb-sb communication controller 1340, a separate queue for each third-party device 1014. For example, sb-sb communication controller 1340 includes first server-based output queue 1344 for sending commands including information to third-party device 1014, such as one including remote 202 (FIG. 2), and a separate second server-based output queue for sending commands including information to another third-party device, such as one including remote host 204 (FIG. 2). As another example, sb-sb communication controller 1340 includes first server-based output queue 1342 for receiving commands from third-party device 1014 and a separate second server-based input queue 1342 for receiving commands from another third-party device. In these embodiments, any loss of connection between third-party device 1014 and server-based system 1010 does not affect the separate queues for communicating with the other third-party device and any loss of connection between server-based system 1010 and the other third-party device does not affect server-based input queue 1342 and server-based output queue 1344. For example, sb-sb communication controller 1340 may remove all commands within first server-based input queue 1342 and first server-based output queue 1344 upon determining that a connection with third-party device 1014 is lost and maintains the second server-based input queue and the second server-based output queue upon determining that a connection between server-based system 1010 and the other third-party device is not lost.

As another example, sb-sb communication controller 1340 does not empty the second server-based input device and the second server-based output queue until an acknowledgment of receipt of information requested within a command sent by the other third-party device is received. Further, in this example, sb-sb communication processor empties first server-based input queue 1342 and first server-based output queue 1344 after the loss of connection. In this example, third-party device 1014 sends a command to server-based system 1010 that a response to the command include a simple command. Further, in this example, the other third-party device sends a command to server-based system 1010 that a response to the command include a complex command.

It is noted that any of the communication links described herein may be a copper cable, a fiber-optics cable, or a wireless medium. Moreover, it is noted that in other embodiments, a single audio/display controller is used instead of separate audio controller and display controllers described herein. It is further noted that in various embodiments, each command includes a time to live of the command. In these embodiments, the time to live is determined by the source device sending a command. Moreover, in these embodiments, if an instruction within the command is not executed within the time to live, the instruction is not executed and a source device is notified of the non-execution. It is also noted that in an embodiment, third-party user 1034 collaborates with an owner of a service or a product offered within gaming establishment 1306 to offer the product or service via window interface 1140 to a player playing a game at gaming device 1002.

It is also noted that the processes in the flowcharts of FIGS. 16, 18, 19, and 21-35 can be executed in an order other than the one described herein. For example, some of the processes in the flowcharts can be performed in parallel. As another example, any of processes 2102, 2202, 2302, 2402, 3002, 3102, 3202, 3302, and 3402 can follow directly after process 1608. As another example, process 2502 follows directly after process 1910. As yet another example, process 2702 follows directly after process 1910. As another example, process 3402 follows directly after process 1910.

It is noted that in various embodiments, none of the commands within the specific set of commands affects an outcome of a wager-based game played using window interface 1140. For example, gaming device processor 1104 determines whether an instruction received within a command sent from third-party device 1014 via server-based system 1010 includes an instruction to change an outcome of a game played in game interface 1138. In this example, upon determining that the instruction is to change the outcome, gaming device processor 1104 does not execute the instruction. As another example, upon determining that an instruction to change the outcome is received from third-party device 1014, gaming device processor 1104 notifies personnel, such as an operator of gaming establishment 1306, regarding the instruction via gaming display device 1122, game speakers 1116, and/or overhead display 55.

It is further noted that any of the subscriptions described herein may be canceled by third-party device 1014. For example, third-party device 1014 sends a canceleventsubscription command to event subscription server 1324 to cancel an event subscribed to by sending the seteventsubscription command. In this example, the canceleventsubscription command may include an event ID and a printer ID of printer 1352, a gaming device ID of gaming device 1348, or a peripheral device ID of peripheral device 1356 at which an event that is represented by the event ID and that is subscribed to by third-party device 1014. In this example, upon receiving the canceleventsubscription command, event subscription server 1324 communicates the command to event monitoring server 1308 and event monitoring server 1308 does not communicate to third-party device 1014 an occurrence of an event initially subscribed to by third-party device 1014. Moreover, in this example, until a canceleventsubscription command is received from another third-party device, such as one including remote host 204, event monitoring server 1308 continues to send subscribed information regarding an event to the other third-party device. As another example, third-party device 1014 sends a cancelcommandsubscription command to cancel a subscription to a command subscribed by sending the setcommandsubscription command.

It is also noted that in various embodiments, if third-party device 1014, such one including remote host 202 (FIG. 2) sends a first createmediaevent command including a description of an event and another third-party device, such as one including remote host 204 (FIG. 2), sends a second createmediaevent command including the same event description to graphical element creation server 1316, the graphical element creation server rejects the command later in time and notifies the third-party device from whom the command is received later of the rejection. Further, in other embodiments, if third-party device 1014 sends the first createmediaevent command including a description of an event and the same third-party device 1014 sends the second createmediaevent command including the same event description to graphical element creation server 1316, the server rejects the command later in time and notifies the third-party device 1014 of the rejection.

It is also noted that in various embodiments, a condition is an event. It is further noted that any of the functions, of the methods for interfacing with a third-party application, described herein may be embodied as a computer program in a computer-readable medium, which may be a memory device, a hard disc, or a compact-disc ROM (CD-ROM). It is also noted, that in other embodiments, the systems and methods described herein can be practiced in gaming devices located in different gaming establishments.

Although the foregoing present methods and systems have been described in detail by way of illustrations and examples for purposes of clarity and understanding, it will be recognized that the above described methods and systems may be embodied in numerous other specific variations and embodiments without departing from the spirit or essential characteristics of the methods and systems. Certain changes and modifications may be practiced, and it is understood that the methods and systems are not to be limited by the foregoing details, but rather is to be defined by the scope of the appended claims.

Although the foregoing present methods and systems have been described in detail by way of illustrations and examples for purposes of clarity and understanding, it will be recognized that the above described methods and systems may be embodied in numerous other specific variations and embodiments without departing from the spirit or essential characteristics of the methods and systems. Certain changes and modifications may be practiced, and it is understood that the methods and systems are not to be limited by the foregoing details, but rather is to be defined by the scope of the appended claims.

What is claimed is:

1. A system configured to interface with a third-party application, said system comprising:
   a server-based system configured to communicate with a third-party via a third party device, wherein the server-based system includes:
      an advertisement content approval server configured to:
         (i) receive advertising content from the third party device, the advertising content relating to an advertisement of a product or service offered by the third-party,
         (ii) determine whether to approve the received advertising content based on a set of predetermined advertisement approval policies,
         (iii) if the determination is to approve the received advertising content, communicate the approved advertising content to a gaming device, and
         (iv) if the determination is not to approve the received advertising content, enable the third party device to change the advertising content for a subsequent approval; and
   the gaming device including a display device and a plurality of input devices including an acceptor and a cashout device, the gaming device configured to:
      (a) if a physical item is received via the acceptor, establish a credit balance based, at least in part, on a monetary value associated with the received physical item,
      (b) cause the display device to display any approved advertising content relating to the advertisement of the product or service, and (c) if a wager is placed on a play of a game:
  (i) determine a game outcome, wherein the determined game outcome is independent of the advertising content that is displayed on the display device,
  (ii) display the determined game outcome,
  (iii) determine any award associated with the determined game outcome, and
  (iv) display any determined award associated with the determined game outcome, wherein the credit balance is increasable based on any determined award associated with the determined game outcome, and
(d) if a cashout input is received via the cashout device, cause an initiation of any payout associated with the credit balance.

2. The system in accordance with claim 1, wherein:
said third-party device is operated by the third-party user other than a gaming device user controlling said gaming device, and
said third-party device is controlled by a third-party user that is other than a server-based system user controlling said server-based system.

3. The system in accordance with claim 1, wherein:
said server-based system includes a media manager server,
said third-party device is configured to request a specific set of commands from said server-based system, and
said media manager server is configured to send the specific set of commands to said third-party device upon receiving an authentication of said third-party device.

4. The system in accordance with claim 1, wherein:
said server-based system includes a media manager server,
the set of predetermined advertisement approval policies are developed by at least one of: a gaming device user and a regulatory authority, and
said media manager server is configured to create an event identification of the advertising content upon receiving a determination from said advertisement content approval server that the advertising content is approved.

5. The system in accordance with claim 4, which includes a floor controller, wherein:
said third-party device is configured to send a triggerevent command including a priority for displaying the advertising content, the event identification and a gaming device identification identifying said gaming device to said media manager server,
said media manager server is configured to determine whether the event identification is valid upon receiving the event identification from said third-party device,
said media manager server is configured to access the advertising content corresponding to the event identification upon determining that the event identification is valid,
said media manager server is configured to send the triggerevent command and the advertising content to said floor controller,
said floor controller is configured to send the triggerevent command and the event representation to said gaming device having the gaming device identification, and
said gaming device is configured to display the advertising content upon receiving the triggerevent command based on the priority.

6. The system in accordance with claim 1, which includes a plurality of devices connected to said gaming device, wherein:
said third-party device is configured to request a specific set of commands from said server-based system,
the specific set of commands includes a runtask command to perform a task related to the devices connected to said gaming device,
the task includes a sequence for performing a plurality of events on said gaming device and said devices connected to said gaming device, and
the plurality of events are performed based on a plurality of conditions.

7. The system in accordance with claim 1, which includes a protocol converter, wherein:
said third-party device includes a third-party processor, said third-party processor is configured to request a specific set of commands from said server-based system,
said gaming device is connected to a printer,
the specific set of commands includes a set of printer commands to:
  (i) determine whether said gaming device is connected to the printer and
  (ii) determine whether the printer has a printer parameter,
said protocol converter is configured to:
  (i) convert the set of printer commands from a system-to-system protocol to a game-to-system protocol, and
  (ii) send the set of printer commands to said gaming device,
said gaming device is configured to provide a set of responses to the set of printer commands to said third-party device via said server-based system, and
said third-party processor is configured to determine whether to use said printer upon receiving the responses.

8. The system in accordance with claim 1, wherein said third-party device includes:
a redemption server configured to:
  receive a command including a redemption request to redeem a voucher from said gaming device,
  determine whether the redemption request is designated to be sent to said third-party device, and
  send the redemption request to said third-party device upon determining that the redemption request is designated to be sent to said third-party device, and
a third-party processor configured to:
  approve or disapprove the redemption request,
  send a command including the approval or disapproval to said gaming device via said redemption server, and
  deny the redemption request upon determining that the voucher is redeemed previously or a voucher identification of the voucher is invalid.

9. The system in accordance with claim 1, wherein said third-party device is configured to:
request a specific set of commands from said server-based system, wherein the specific set of commands includes a seteventsubscription command, and
send the seteventsubscription command to said server-based system to receive a notification of an occurrence of an event including the advertising content on said gaming device.

10. The system in accordance with claim 1, which includes a peripheral device connected to said gaming device,
wherein said third-party device includes a third-party processor configured to request information regarding said gaming device and said peripheral device, the information including a frequency of operation of said peripheral device or a color emitted by said peripheral device.

11. The system in accordance with claim 1, wherein said third-party device includes a third-party processor configured to receive a notification of an input from a player playing a wager-based game at said gaming device or a notification of an occurrence of an event including the advertising content at said gaming device,
said third-party device is configured to send a triggerevent command to said gaming device via said server-based system upon receiving the notification, and
the triggerevent command includes an event ID of an event representation that has a graphical element different than a graphical element of the advertising content.

12. The system in accordance with claim 1, wherein said third-party device is configured to request a specific set of commands from said server-based system, and
said server-based system is configured to:
determine whether one of the commands received from said third-party device includes a request to send a complex command,
determine whether a connection between said server-based system and said third-party device is lost for less than a period of time measured from the loss of connection,
store all information designated to be sent to said third-party device upon determining that the connection is lost for less than the period of time,
send the information to said third-party device upon determining that the connection is restored within the time period, and
not send the information to said third-party device upon determining that the connection is not restored within the time period.

13. The system in accordance with claim 1, wherein said third-party device includes a third-party processor configured to request that a response to a command includes a simple command, and
said server-based system is configured to:
determine whether a connection between said server-based system and said third-party device is lost before a time information in response to the command is to be sent to said third-party device, and
delete the response from a queue upon determining that the connection is lost.

14. The system in accordance with claim 1, wherein said server-based system includes a logging device configured to securely log content or a command, communicated between at least one of: said server-based system and said third-party device, and said gaming device and said server-based system.

15. The system in accordance with claim 1, wherein said gaming device is configured to:
determine whether a command sent by said third-party device includes an instruction to change the game outcome of the game played using a game interface on said gaming device, and
reject the command upon determining that the command includes an instruction to change the game outcome.

16. The system in accordance with claim 1, wherein said third-party device is configured to:
request a specific set of commands from said server-based system, the specific set of commands includes a deductfromgamingdevice command and a watamount command, and
send the deductfromgaming device command to said gaming device via said server-based system to deduct from said gaming device a number of credits specified in the watamount command.

17. The system in accordance with claim 1, which includes a redemption server configured to:
receive a plurality of redemption requests from said gaming device and other gaming devices, and
send the requests to a third-party controller of said third party device,
wherein said third-party controller is configured to:
determine whether a number of the redemption requests is exceeded, whether a time period for satisfying the redemption requests is expired, or whether a voucher identification associated with one of the redemption requests is received previously before receiving the one of the redemption requests, and
deny the redemption requests that exceed the number, that are received after expiration of the time period, or that include a voucher identification received previously.

18. The system in accordance with claim 1, wherein said server-based system is configured to:
maintain a separate queue for each of said third-party device and another third-party device, and
determine whether a connection is lost between said server-based system and said third-party device, and the loss of connection does not affect the queue for the other third-party device.

19. The system in accordance with claim 1, wherein:
said third-party device is configured to send a triggerevent command to trigger a display of an event representation on said gaming device, and
said advertisement content approval server is configured to:
determine whether the event representation has a status of approved, disapproved, or pending a decision of approval or disapproval,
not send the triggerevent command to said gaming device upon determining that the status is disapproved or pending, and
send the triggerevent command to said gaming device upon determining that the status is approved.

20. The system in accordance with claim 1, wherein:
said third-party device configured to send a triggerevent command including an event expiration time period and an event identification of an event representation, and
said server-based system is configured to:
determine whether the event expiration time period measured from a time of sending the triggerevent command has expired before the event representation is displayed on said gaming device or before the triggerevent command is sent to said gaming device,
inform said third-party device that the event expiration time period has expired upon determining that the event expiration time period has expired, and
not send the triggerevent command to said gaming device upon determining that the event expiration time period has expired.

21. The system in accordance with claim 1, wherein said third-party device is configured to send a command to said server-based system, the command includes an instruction that a request to the command be persisted by said server-based system until a command is received from said third-party device.

22. The system in accordance with claim 1, wherein said server-based system includes a media manager server,
said gaming device includes a gaming display device configured to display the advertising content and receive an input from a player playing a game,
said gaming device is configured to communicate information regarding the input via said media manager server to a third-party controller of said third party device, and
said third-party controller is configured to send a command including data in response to the information sent by said gaming device via said media manager server.

23. The system in accordance with claim 1, wherein:
said server-based system includes an account metering server,
said third-party device is configured to send a request transfer command to said server-based system to request a transfer of a number of credits from said gaming device to said account metering server, and
said account metering server is configured to:
verify whether a credit meter of said gaming device has sufficient balance to transfer the number of credits,
transfer the number of credits from said gaming device to said account metering server upon determining that the credit meter has the sufficient balance, and
inform said third-party device of the completion of the transfer.

24. The system in accordance with claim 1, wherein said server-based system includes a graphical element creation server configured to associate a first file describing a functionality of a graphical element with a second file describing a look of the graphical element and a third file describing a look of the graphical element, the look described in the second file is different than the look described in the third file.

25. The system in accordance with claim 24, wherein the second file is presented to a player having a status different than a player presented with the third file.

26. The system in accordance with claim 1, which includes a floor controller and a firewall server,
wherein said server-based system includes a media manager server,
said media manager server and said advertisement content approval server are configured to be accessible by a user for approving the advertising content and electronically signing approved advertising content,
said media manager server is configured to compile a first file describing a functionality of a graphical element, a second file describing a look of the graphical element, and the signature into a compiled file, and
said floor controller is configured to receive the compiled file via the firewall server.

27. A system configured to interface with a third-party application, said system comprising:
a server-based system configured to communicate with a third-party via a third party device, wherein the server-based system includes an advertisement content approval server configured to:
(i) receive advertising content from the third party device, the advertising content relating to an advertisement of a product or service offered by the third party,
(ii) determine whether to approve the received advertising content based on a set of predetermined advertisement approval policies, and
(iii) if the determination is not to approve the received advertising content, enable the third party device to change the advertising content for a subsequent approval; and
a gaming device including a display device and a plurality of input devices including an acceptor and a cashout device, the gaming device configured to:
(a) if a physical item is received via the acceptor, establish a credit balance based, at least in part, on a monetary value associated with the received physical item,
(b) receive information relating to the advertising content from the third-party device,
(c) determine whether the information is approved for display by the advertisement content approval server,
(d) if a wager is placed on a play of a game:
(i) determine a game outcome,
(ii) display the determined game outcome,
(iii) determine any award associated with the determined game outcome, and
(iv) display any determined award associated with the determined game outcome, wherein the credit balance is increasable based on any determined award associated with the determined game outcome, and
(e) if a cashout input is received via the cashout device, cause an initiation of any payout associated with the credit balance.

28. The system in accordance with claim 27, wherein said gaming device is configured to not display the information upon determining that the information is received from said third-party device and is not approved for display.

29. A method for interfacing with a third-party application, said method comprising:
receiving, at a server-based system and from a third-party device operated by a third-party, advertising content relating to an advertisement of a product or service offered by the third-party;
determining whether to approve the received advertising content based on a set of predetermined advertisement approval policies;
if the determination is not to approve the received advertising content, enabling the third-party device to change the advertising content for a subsequent approval; and
if the determination is to approve the received advertising content, sending a command to a gaming device to display the approved advertising content on the gaming device on a display device of the gaming device, wherein the approved advertising content is independent of a game outcome determined for a play of a wager game at said gaming device, wherein a credit balance is increasable based on any award associated with the game outcome determined for the play of the wager game, said credit balance being increasable via an acceptor of a physical item associated with a monetary value, and said credit balance being decreasable in association with a cashout input received via a cashout device.

30. The method in accordance with claim 29, which includes:

receiving a request for a specific set of commands from said third-party device; and sending the specific set of commands to said third-party device upon receiving an authentication of said third-party device.

31. The method in accordance with claim 29, wherein the set of predetermined advertisement approval policies are developed by at least one of: a gaming device user and a regulatory authority.

32. The method in accordance with claim 29, which includes creating an event identification of the advertising content upon approving the advertising content based on the set of predetermined advertisement approval policies.

33. The method in accordance with claim 29, which includes determining and sending a set of commands to said third-party device, wherein said server-based system and said third-party device communicate using the set of commands.

34. The system in accordance with claim 1, wherein the third party application includes a virtual lottery machine configured to enable a player to purchase a lottery ticket at the gaming device.

35. The system in accordance with claim 34, wherein the server-based system is configured to operate with the virtual lottery machine to cause a printer of the gaming device to print the lottery ticket.

36. The system in accordance with claim 27, wherein the third party application includes a virtual lottery machine configured to enable a player to purchase a lottery ticket at the gaming device.

37. The system in accordance with claim 36, wherein the server-based system is configured to operate with the virtual lottery machine to cause a printer of the gaming device to print the lottery ticket.

38. The method in accordance with claim 29, which includes enabling a player to purchase a lottery ticket in association with a virtual lottery machine.

39. The method in accordance with claim 38, which includes causing a printer of the gaming device to print the lottery ticket.

* * * * *